ELECTRONIC SWITCHING TELEPHONE SYSTEM

Filed Sept. 15, 1958 62 Sheets-Sheet 1

INVENTOR.
DONALD M. RAGER, JR.
BY F. H. Henson
ATTORNEY

Jan. 17, 1961 D. M. RAGER, JR 2,968,697

ELECTRONIC SWITCHING TELEPHONE SYSTEM

Filed Sept. 15, 1958 62 Sheets-Sheet 2

ELECTRONIC SWITCHING TELEPHONE SYSTEM

Filed Sept. 15, 1958 62 Sheets-Sheet 3

Jan. 17, 1961 D. M. RAGER, JR 2,968,697

ELECTRONIC SWITCHING TELEPHONE SYSTEM

Filed Sept. 15, 1958 62 Sheets-Sheet 4

Jan. 17, 1961 D. M. RAGER, JR 2,968,697

ELECTRONIC SWITCHING TELEPHONE SYSTEM

Filed Sept. 15, 1958 62 Sheets-Sheet 6

Jan. 17, 1961 D. M. RAGER, JR 2,968,697

ELECTRONIC SWITCHING TELEPHONE SYSTEM

Filed Sept. 15, 1958 62 Sheets-Sheet 9

Jan. 17, 1961 D. M. RAGER, JR 2,968,697

ELECTRONIC SWITCHING TELEPHONE SYSTEM

Filed Sept. 15, 1958 62 Sheets-Sheet 11

Jan. 17, 1961 D. M. RAGER, JR 2,968,697

ELECTRONIC SWITCHING TELEPHONE SYSTEM

Filed Sept. 15, 1958 62 Sheets-Sheet 12

Jan. 17, 1961 D. M. RAGER, JR 2,968,697

ELECTRONIC SWITCHING TELEPHONE SYSTEM

Filed Sept. 15, 1958 62 Sheets-Sheet 13

Jan. 17, 1961 D. M. RAGER, JR 2,968,697

ELECTRONIC SWITCHING TELEPHONE SYSTEM

Filed Sept. 15, 1958 62 Sheets-Sheet 14

Jan. 17, 1961 D. M. RAGER, JR 2,968,697

ELECTRONIC SWITCHING TELEPHONE SYSTEM

Filed Sept. 15, 1958 62 Sheets-Sheet 17

Jan. 17, 1961 D. M. RAGER, JR 2,968,697

ELECTRONIC SWITCHING TELEPHONE SYSTEM

Filed Sept. 15, 1958 62 Sheets-Sheet 18

Jan. 17, 1961 D. M. RAGER, JR 2,968,697

ELECTRONIC SWITCHING TELEPHONE SYSTEM

Filed Sept. 15, 1958 62 Sheets-Sheet 21

Jan. 17, 1961 D. M. RAGER, JR 2,968,697

ELECTRONIC SWITCHING TELEPHONE SYSTEM

Filed Sept. 15, 1958 62 Sheets-Sheet 23

Jan. 17, 1961 D. M. RAGER, JR 2,968,697

ELECTRONIC SWITCHING TELEPHONE SYSTEM

Filed Sept. 15, 1958 62 Sheets-Sheet 26

SEIZURE DETECTOR-230

Jan. 17, 1961 D. M. RAGER, JR 2,968,697

ELECTRONIC SWITCHING TELEPHONE SYSTEM

Filed Sept. 15, 1958 62 Sheets-Sheet 29

LINE FINDER-30

Jan. 17, 1961 D. M. RAGER, JR 2,968,697

ELECTRONIC SWITCHING TELEPHONE SYSTEM

Filed Sept. 15, 1958 62 Sheets-Sheet 30

LINE LINK AND TRUNK LINK ALLOTTER-32

Jan. 17, 1961 D. M. RAGER, JR 2,968,697

ELECTRONIC SWITCHING TELEPHONE SYSTEM

Filed Sept. 15, 1958 62 Sheets-Sheet 33

LINE LINK AND TRUNK LINK ALLOTTER-32

FIRST SELECTOR-36

Jan. 17, 1961 D. M. RAGER, JR 2,968,697

ELECTRONIC SWITCHING TELEPHONE SYSTEM

Filed Sept. 15, 1958 62 Sheets-Sheet 38

Jan. 17, 1961 D. M. RAGER, JR 2,968,697

ELECTRONIC SWITCHING TELEPHONE SYSTEM

Filed Sept. 15, 1958 62 Sheets-Sheet 40

CONNECTOR-40

Jan. 17, 1961 D. M. RAGER, JR 2,968,697

ELECTRONIC SWITCHING TELEPHONE SYSTEM

Filed Sept. 15, 1958 62 Sheets-Sheet 44

Jan. 17, 1961 D. M. RAGER, JR 2,968,697

ELECTRONIC SWITCHING TELEPHONE SYSTEM

Filed Sept. 15, 1958 62 Sheets-Sheet 46

CONNECTOR ALLOTTER-345

Jan. 17, 1961 D. M. RAGER, JR 2,968,697

ELECTRONIC SWITCHING TELEPHONE SYSTEM

Filed Sept. 15, 1958 62 Sheets-Sheet 48

ELECTRONIC SWITCHING TELEPHONE SYSTEM

Filed Sept. 15, 1958 62 Sheets-Sheet 55

Jan. 17, 1961 D. M. RAGER, JR 2,968,697

ELECTRONIC SWITCHING TELEPHONE SYSTEM

Filed Sept. 15, 1958 62 Sheets-Sheet 56

ELECTRONIC SWITCHING TELEPHONE SYSTEM

Filed Sept. 15, 1958 62 Sheets-Sheet 57

ELECTRONIC SWITCHING TELEPHONE SYSTEM

Filed Sept. 15, 1958 62 Sheets-Sheet 61

Jan. 17, 1961 D. M. RAGER, JR 2,968,697

ELECTRONIC SWITCHING TELEPHONE SYSTEM

Filed Sept. 15, 1958 62 Sheets-Sheet 62

2,968,697

ELECTRONIC SWITCHING TELEPHONE SYSTEM

Donald M. Rager, Jr., Buffalo, N.Y., assignor to General Dynamics Corporation, Rochester, N.Y., a corporation of Delaware Filed Sept. 15, 1958, Ser. No. 760,903

40 Claims. (Cl. 179—18)

This invention relates in general to electronic switching systems, and, more particularly, to electronic switching automatic telephone systems.

Many types of automatic switching systems have been developed for connecting the lines of telephone, telegraph, and other communication systems together for the purpose of transmitting signals between the lines. Most of the switching systems developed for this purpose have utilized electromechanical devices, such as relays and stepping switches. In recent years electronic switching systems have been proposed to overcome the inherent limitations of slowness, physical size, power requirements and maintenance problems of the electromechanical devices.

Most of the proposed electronic telephone systems are of the type wherein a connection is established between the subscribers and the local exchange and the dialing of the numerical digits representing the called number is accomplished by the opening and closing of an electrical circuit, much as the line relay in electromechanical systems. However, in military applications, or in systems where rough terrain separates the various offices of a telephone system, it is often necessary to use radio links to interconnect the various offices of the system, in which case it is necessary to employ different facilities, such as voice frequency dialing, for establishing a connection between offices and the transmission of numerical digit information between offices. On the other hand, while voice frequency signalling has been proposed in prior art arrangements, these systems have not been adapted for pulse multiplex transmission of the voice frequency dialing signals either within a local exchange or between local exchanges.

Accordingly, it is the general object of this invention to provide a new and improved telephone system.

It is a more particular object of this invention to provide a new and improved connector arrangement for an electronic telephone system wherein a number of connectors may employ a common interrogating matrix to determine whether the called line is busy or idle and wherein facilities are provided for completing a connection to lines which employ voice frequency dialing at the subset to initiate the call.

In the electronic switching telephone system herein disclosed, the line circuits within each local office are interconnected by means of pulse multiplex highway networks which are shared by a number of simultaneously calling lines in establishing connections between subscribers. When a calling subscriber comes off-hook his subset is arranged to develop a voice frequency seize signal which is modulated on pulses in the time position assigned to the call and a dial tone signal is returned in the same time position under the control of the assigned first selector when linkage has been seized. This dial tone signal is employed in the calling subscriber's subset to terminate transmission of the seize signal developed upon coming off-hook. The called line number is then dialed by generating different voice frequency combinations in the calling subscriber's subset which are modulated on pulses appearing in the time position assigned to the call and the corresponding numerical digits are then registered in the selector and connector stages of the equipment. When the called line answers the called subscriber's subset generates a seize signal, as when this subset is used to initiate a call, and the connector in which the called line number is registered is employed to develop a dial tone signal which is modulated on pulses appearing in the time position assigned to the call and is transmitted to the called subscriber's subset which responds by terminating the seize signal developed when the called subscriber answers. Conversation is then permitted between the calling and called subscribers on a pulse multiplex basis.

In accordance with a further feature of the invention only one time position is employed for such voice frequency dialing arrangements, separation between calling and called line speech transmission being effected on a physical four-wire basis so that a maximum number of simultaneous calls can be accommodated with a given number of pulse time positions on a particular pulse multiplex highway, and to facilitate use of radio links between subscribers and their local office and also between offices. In accordance with another feature of the invention, facilities are employed for routing successive calling lines to different pulse multiplex highways so that traffic is substantially equally distributed therebetween.

The invention, both as to its organization and method of operation, together with further objects and advantages thereof, will best be understood by reference to the following specification taken in conjunction with the accompanying drawings in which:

Fig. 1 shows the trunking diagram of a telephone system in which the present invention is embodied;

Figs. 2 and 3 when arranged with Fig. 3 to the right of Fig. 2 show a local office embodying the principles of the present invention in simplified block diagram form;

Figs. 4 to 25, inclusive, when arranged in the manner shown in Fig. 63, show the circuit arrangement of the local office of Figs. 2 and 3 in more detailed block diagram form;

Figs. 26 and 27, when arranged with Fig. 27 to the right of Fig. 26 comprise a schematic of one of the line circuits of the system of Figs. 4 to 25, inclusive;

Fig. 28 is a schematic diagram of one of the seizure detectors employed in the system shown in Figs. 4 to 25, inclusive;

Figs. 29 and 30, when arranged with Fig. 30 to the right of Fig. 29, comprise a schematic diagram of one of the line finders of the system shown in Figs. 4 to 25, inclusive;

Fig. 31 is a schematic diagram of one of the line links employed in the system of Figs. 4 to 25, inclusive;

Figs. 32 and 33, when arranged with Fig. 33 to the right of Fig. 32, constitute a schematic diagram of the line and trunk link allotter employed in the system of Figs. 4 to 25, inclusive;

Fig. 34 is a schematic diagram of one of the link output matrices employed in the system of Figs. 4 to 25, inclusive;

Figs. 35 to 39, inclusive, when arranged in the manner shown in Fig. 64, comprise a schematic diagram of one of the first selectors employed in the system of Figs. 4 to 25, inclusive;

Fig. 40 is a schematic diagram of one of the second selectors employed in the system of Figs. 4 to 25, inclusive;

Figs. 41 to 45, inclusive, when arranged in the manner shown in Fig. 65, comprise a schematic diagram of one of the connectors employed in the system of Figs. 4 to 25, inclusive;

Fig. 46 is a schematic diagram of one of the common interrogating matrices employed in the system of Figs. 4 to 25, inclusive;

Figs. 47 and 48, when arranged with Fig. 48 below Fig. 47, comprise a schematic diagram of one of the connector-allotters employed in the system of Figs. 4 to 25, inclusive;

Figs. 49 to 51, inclusive, when arranged in the manner shown in Fig. 66, comprise a schematic diagram of one of the dial-to-dial trunk circuits employed in the system of Figs. 4 to 25, inclusive;

Figs. 52 to 57, inclusive, when arranged in the manner shown in Fig. 67, comprise a schematic diagram of the attendant's cabinet provided in the system of Figs. 4 to 25, inclusive;

Figure 1:
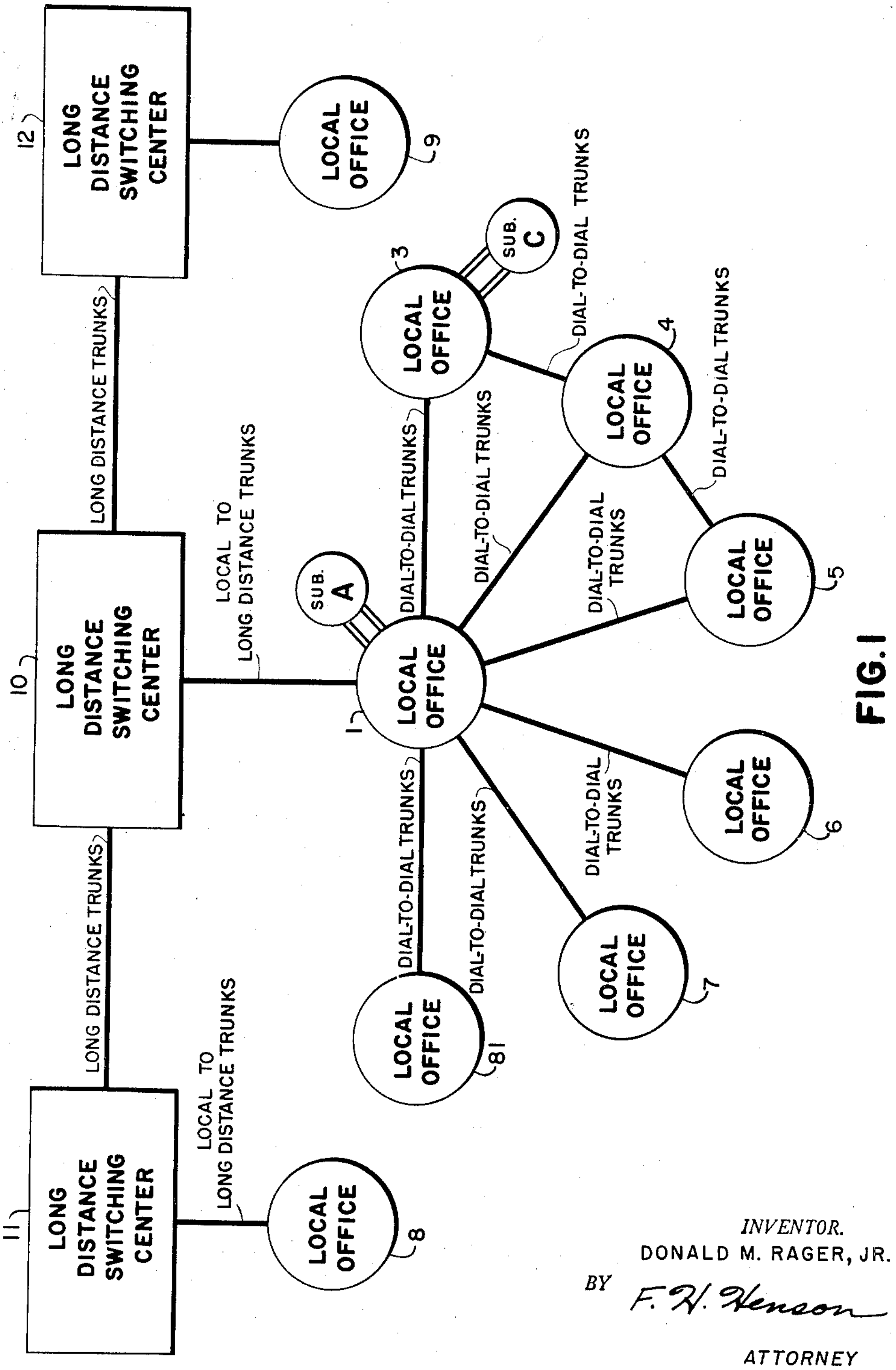

Considering first the general operational features of the overall system shown in Fig. 1 of the drawings, a local office 1 is provided which in the illustrated embodiment is adapted to provide service for 200 local subscribers, one of which is indicated by the substation A. The substations, such as the substation A are connected to the local office 1 on a four-wire basis and voice frequency dialing is employed at each substation in setting up a telephonic connection. The local office 1 is connected to a number of other local offices, such as the local offices 3, 4, 5, 6, 7 and 81, by means of dial-to-dial trunk lines, these trunk lines being four-wire which may either be physical wire or include radio links. Calls may be placed directly between subscribers at local office 1, such as the subscriber at substation A, and the subscribers at one of the other local offices such as the subscriber at the illustrated substation C of local office 3 over these dial-to-dial trunks. The local office 1 is also connected by means of four-wire local-to-long-distance trunk lines to a long distance switching center 10, the center 10 being connected by means of long distance trunks which are also four-wire to other long distance switching centers such as the centers 11 and 12, a local office 8 being illustrated as served by the center 11 and the local office 9 being illustrated as being served by the center 12. If a subscriber at the local office 1 wishes to place a call to one of the remote local offices, such as the local office 8, he dials a prefix digit of "9" and the call is routed to the operator at the long distance switching center 10, this operator performing the necessary functions in completing the call to the local office 8.

The present invention is concerned with the arrangements provided in the local office 1 for setting up the above described calls either internally within the office 1 or to other local offices directly or through one or more long distance switching centers. The facilities provided at the local office 1 are shown in simplified block diagram form in Figs. 2 and 3 of the drawings. Referring to these figures, a pulse multiplex highway network, indicated as highway No. 1, is provided in the local office 1 and is employed to transmit simultaneously a number of two-way conversations on a pulse multiplex basis. In the illustrated embodiment highway No. 1 is arranged to have twenty-five time positions or time slots available for simultaneous conversations and a number of similar highway networks may be provided within the local office as desired to meet traffic requirements.

Figure 24:
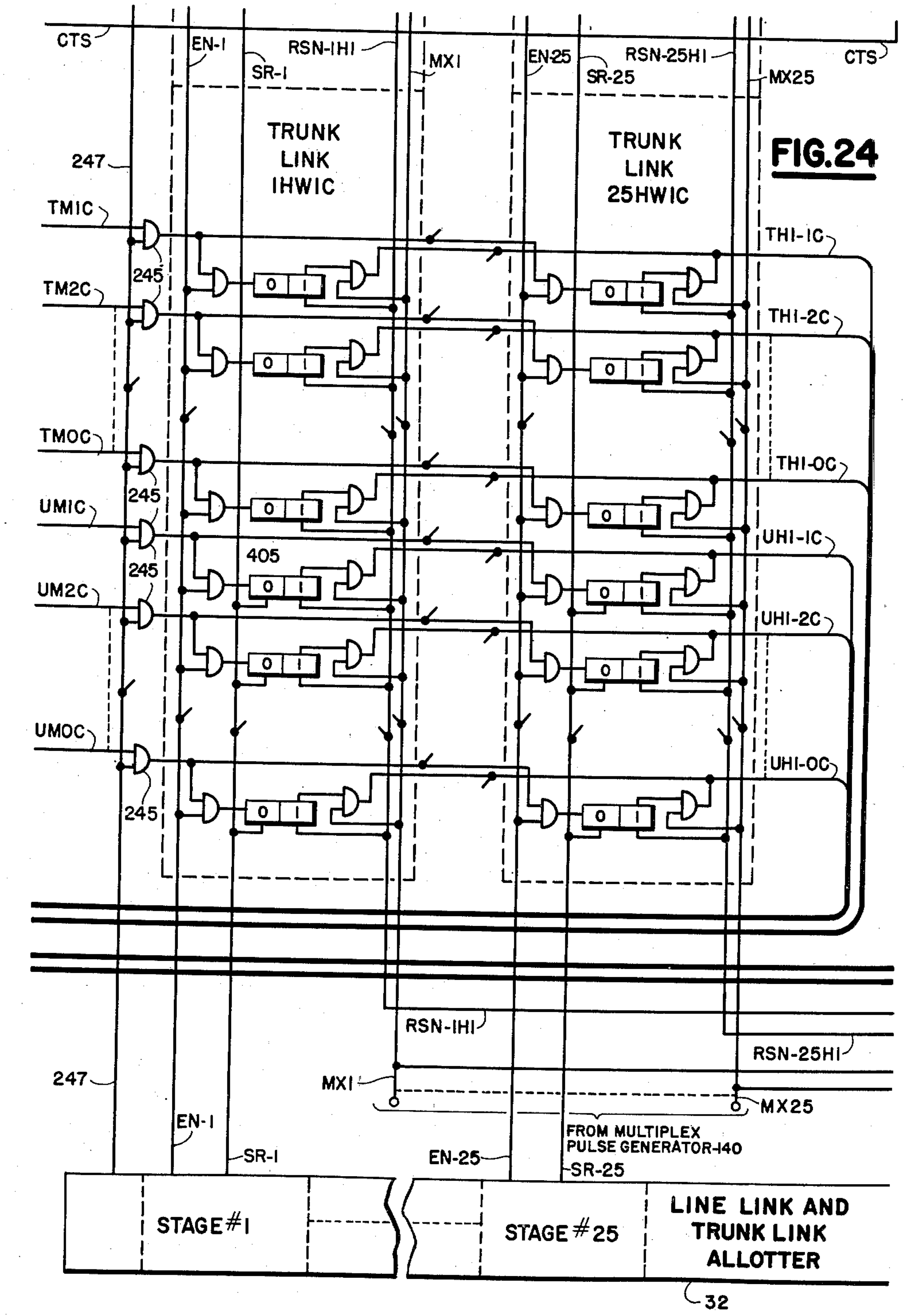
Figure 25:
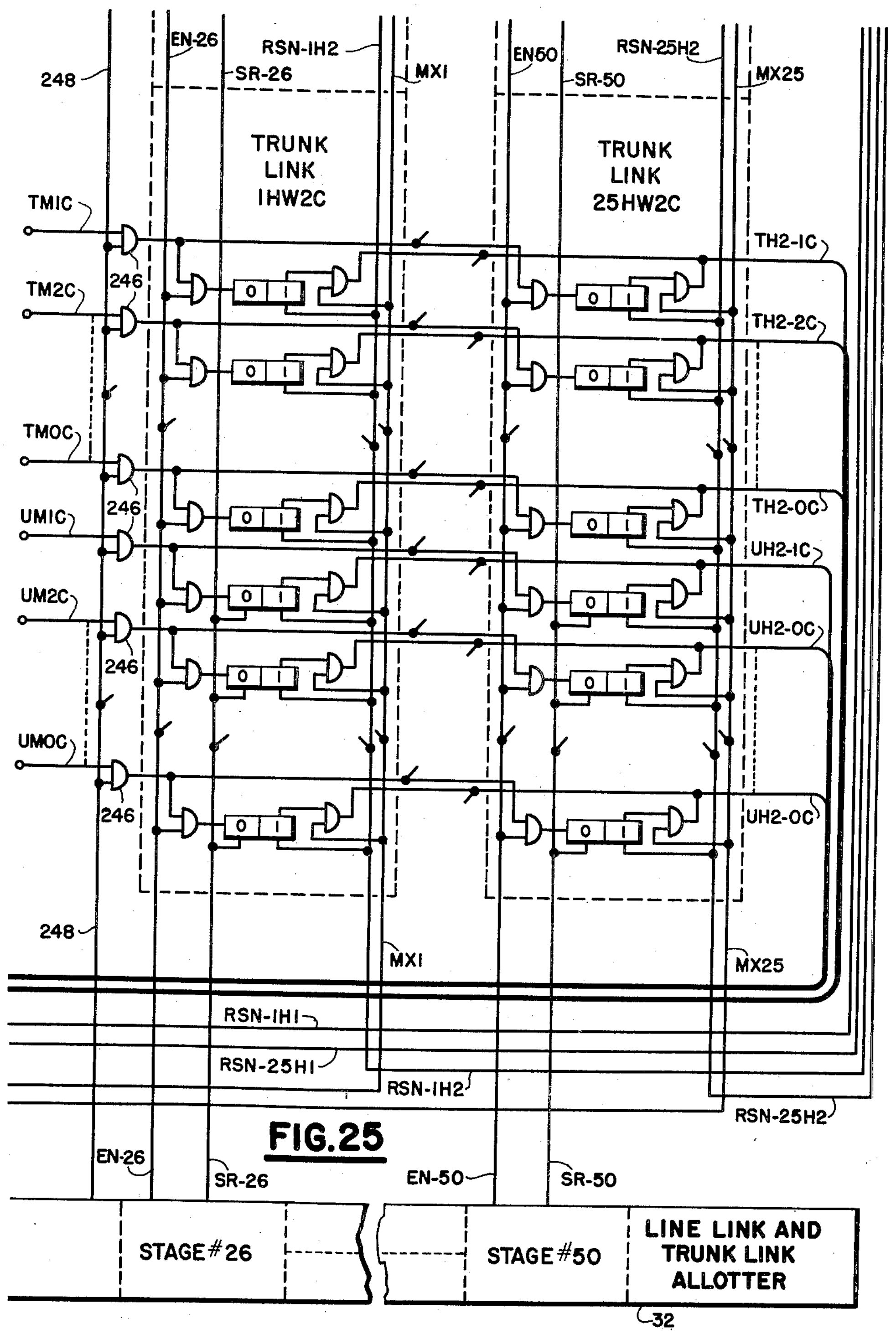

Each of the subscriber's lines in the local office 1 is arranged to be connected to highway No. 1 through voice switches which are individual to the lines and are turned on in a particular time position which is assigned at random to the call initiating line. More particularly, the subscriber substation A terminates in a line circuit 111 which is connected to the send highway pair 20 of highway No. 1 by means of the voice switch 26 and is connected to the receive pair 21 of this highway by means of the voice switch 27. These voice switches, as well as the other voice switches of the system referred to hereinafter, are indicated in logic form in the drawings by a circle within which is positioned a triangle pointing in the direction of speech or signal transmission when the voice switch is referred to as being open. These voice switches are shown and described in detail in connection with Fig. 26 of the drawings. Normally the voice switches 26 and 27 are closed. However, when a call is initiated at the subscriber's substation A a voice frequency seize signal is transmitted from the line circuit 111 to a line finder 30 which is common to the first one hundred subscriber lines in local office 1 and continuously scans all of the line circuits associated therewith to detect such call initiating seizure signals. When the line finder 30 receives a seizure signal it transmits a signal identifying the calling line to a group of twenty-five line link circuits which are provided one for each of the twenty-five pulse multiplex time positions provided for transmission on highway No. 1, the illustrated line links 1HW1A, 2HW1A and 25HW1A being shown in Fig. 2. These links are permanently assigned specific time positions in the twenty-five time position pulse multiplex frame which is used for simultaneous speech transmission over highway No. 1. Furthermore, these line links are successively allotted to the use of calling lines by means of a line link and trunk link allotter 32 (Figs. 24 and 25 of detailed block diagram) which provides an enabling signal to a particular one of the line links so that this line link is prepared for the first call.

Assuming that the line link 1HWA is enabled by the allotter 32, the calling line identifying signals transmitted to this link from the line finder 30 are registered in this link and a pulse multiplex output signal in the first time position is supplied to a link output matrix 34. The link output matrix 34 comprises one hundred individual output circuits corresponding to individual subscriber's lines and a pulse multiplex signal in the first time position is thus transmitted over the control conductor LH1–111 to the voice switches 26 and 27 so that these voice switches are turned on during the first pulse time position and speech and supervisory signals are transmitted to the highway No. 1 send pair 20 and received from the highway No. 1 receive pair 21 in this time position.

The equipment provided for establishing a call in any one of the twenty-five time positions provided on highway No. 1, includes a first selector and connector for each hundreds line group of subscriber lines. In the illustrated embodiment, the first selector 36 and the connectors 38 and 40 are permanently associated with the first time position designated as MX1, the connector 38 serving the first hundreds line group in the local office 1 and the connector 40 serving the second hundreds line group thereof.

The first selectors associated with each of the time position channels on highway 1 are arranged to control the transmission of a dial tone signal to the calling subscriber and dial tone modulated pulses are continuously provided in each time position on highway No. 1 during periods when the first selectors of these channels are not in use. More particularly, a voice switch is associated with each first selector, such as the voice switch 42 associated with the first selector 36, and this voice switch is normally arranged to transmit dial tone modulated pulses in the first time position channel on highway No. 1 to the receive pair of conductors 21 thereof. Accordingly, as soon as a call is initiated at the substation A and the voice switch 27 is opened in the MX1 time position the dial tone modulated pulses in the corresponding time position on the receive conductors 21 are transmitted through this voice switch to the line circuit 111 wherein they are demodulated and transmitted to the subscriber to inform him that dialing may be initiated. As soon as the first digit is dialed into the first selector 36 this selector functions to control the voice switch 42 so that dial tone modulated pulses in the first time position are no longer supplied to the receive conductor 21 and dial tone transmission to the calling subscriber is terminated.

The subset at the substation A is provided with facilities for voice frequency dialing, as described in detail in a copending application of Woodhull and Stern, S.N. 761,045, filed Sept. 15, 1958, and assigned to the same assignee as the present invention. While reference may be had to this copending application for a detailed description of this subset, for the purposes of the present invention it may be stated that the subset is arranged to develop voice frequency signals of different combinations which represent numerical digits as well as signals indicating seizure, release and recall of the operator. A typical code arrangement of voice frequencies may be as follows:

| Digit | Frequency A, c.p.s. | Frequency B, c.p.s. |
|---|---|---|
| 1 | 1,100 | 1,300 |
| 2 | 1,100 | 1,500 |
| 3 | 1,300 | 1,500 |
| 4 | 1,700 | 1,100 |
| 5 | 1,700 | 1,300 |
| 6 | 1,700 | 1,500 |
| 7 | 1,100 | 1,900 |
| 8 | 1,300 | 1,900 |
| 9 | 1,500 | 1,900 |
| 0 | 1,700 | 1,900 |
| Seize | 1,500 | ---- |
| Release | 900 | 1,100 |
| Recall | 900 | 1,300 |

In addition the subset is provided with ringing facilities which respond to a suitably keyed 420 cycle per second ringing control signal by developing a 2400 cycle audible ringing signal within the subset which energizes a transducer in the subset so that the transmission of conventional ringing current to the subset is not required.

A voice switch 44 is connected between the send conductors 20 of highway 1 and the first selector 36 and the voice switch 44 is continuously opened in the MX1 time position assigned to the selector 36. Assuming that the subscriber wishes to place a call to one of the lines in the second hundreds group in the local office 1, such as substation B served by a line circuit 210, when the subscriber dials the first digit "2," which comprises the dialing frequencies 1100 c.p.s. and 1500 c.p.s., these dialing frequencies are multiplexed onto the send conductors 20 by the voice switch 26 in the MX1 time position and the dialing frequency modulated pulses in this time position pass through the voice switch 44 to the first selector 36. A multi-frequency receiver is provided in the first selector 36 which detects the dialing frequencies which comprise the first digit and translates these dialing frequencies into a corresponding numerical digit which is registered in the selector 36.

When the second and third digits "1" and "1" are dialed, the correspondingly modulated pulses in the MX1 time position are transmitted through the voice switch 44 to the first selector 36 wherein they are translated into numerical digits and are transmitted by way of the corresponding conductors of the cable S2–1H1 to the connector 40 serving the second hundreds line group. In the connector 40 the second and third digits are registered, a busy test is performed to determine the busy or idle condition of the called line and if the called line is idle the connector 40 transmits pulses in the MX1 time position to a connector output matrix 46 which serves the lines in the second hundreds group including the line 210. The connector output matrix 46 is provided with individual output circuits for the one hundred lines served thereby and a pulse multiplex signal is transmitted over the control conductor CH1–211 to the voice switches 48 and 50 associated with the line circuit 210 so that these voice switches are opened in the first time position channel of highway No. 1, the voice switch 48 being connected to receive conductors 21 and the voice switch 50 being connected to the send conductor 20.

At the same time that the connector 40 transmits a pulse multiplex signal to the connector output matrix 46, this connector also opens a voice switch 47 in the MX1 time position assigned to the connector 40 so that MX1 pulses modulated with a 420 cycle ringing control signal, which may itself be modulated to provide suitable on-off intervals, is supplied to the send conductors 20 and these ringing signal modulated pulses are transmitted through the voice switch 50 to the line circuit 210 wherein they are demodulated and the ringing control signal is transmitted to the subset at the substation B to provide an audible ringing signal at this substation. At the same time, the connector 40 opens a voice switch 45 in the MX1 time position so that MX1 pulses modulated with a ringback tone signal are supplied to the receive conductors 21 and these pulses are transmitted through the voice switch 27 to the line circuit 111 wherein they are demodulated and supplied to the substation A to inform the calling subscriber that the called line is being rung.

When the called subscriber at the called substation B answers and lifts his receiver the subset at substation B is arranged to transmit a seize tone signal to the line circuit 210 and this seize tone signal is multiplexed in the voice switch 48 so that corresponding MX1 pulses which are modulated with this seizure tone are transmitted to the receive conductors 21. These seize tone modulated pulses enter a voice switch 54 which is continuously opened in the MX1 time position and is associated with a release circuit 56 wherein the seize tone signal is detected and a corresponding control signal is transmitted over the conductor STR–1H1 to the connector 40. The connector 40 responds to this seizure tone control signal by opening a voice switch 41 in the MX1 time position so that dial tone modulated MX1 pulses are supplied to the send conductors 20. These dial tone modulated MX1 pulses are transmitted through the voice switch 50 to the line circuit 210 wherein the dial tone frequencies are demodulated and are transmitted to the subset at the substation B. This subset is provided with facilities which respond to the transmission of a dial tone signal thereto by terminating transmission of the seizure tone initiated when the subscriber comes off-hook. At the same time the connector 40 responds to the seizure tone control signal by terminating transmission of a ringback signal through the voice switch 45 so that all supervisory tone signal transmission in the MX1 time position is terminated and the subscribers at the substations A and B can thereafter converse through their respective voice switches over highway No. 1 in the MX1 time position channel thereof.

In the event that the called line is busy, the connector 40 opens a voice switch 43 so that busy tone modulated MX1 pulses are transmitted to the receive conductors 21 and are supplied by way of the voice switch 27 to the line circuit 111 wherein the busy tone signal is demodulated and supplied to the subscriber at substation A to inform him that the called line is busy.

When the calling party hangs up, his subset is arranged to transmit a release signal which is multiplexed by the voice switch 26 in the MX1 time position and is supplied over the conductors 20 and through the voice switch 44 to the first selector 36. This release signal is then detected and a corresponding control signal is transmitted by way of a conductor RL–1H1 to the release circuit 56, In the release circuit 56 this control signal is employed to develop a release pulse which is supplied to the first selector 36, the connectors 38 and 40 and the line links 1HW1A so that the calling line identity and digit registration flip-flops in this equipment are reset to their normal value so that the MX1 channel is available for another call. In a similar manner, if the called party hangs up first his subset develops a release signal which is multiplexed by the voice switch 48 to the receive conductors 21 and passes through the voice switch 54 to the release circuit 56. The circuit 56 also responds thereto by developing a release pulse which is supplied to the first selector 36, the connectors 38 and 40 and line links 1HW1A so that this equipment is readied for another call.

Figure 3:
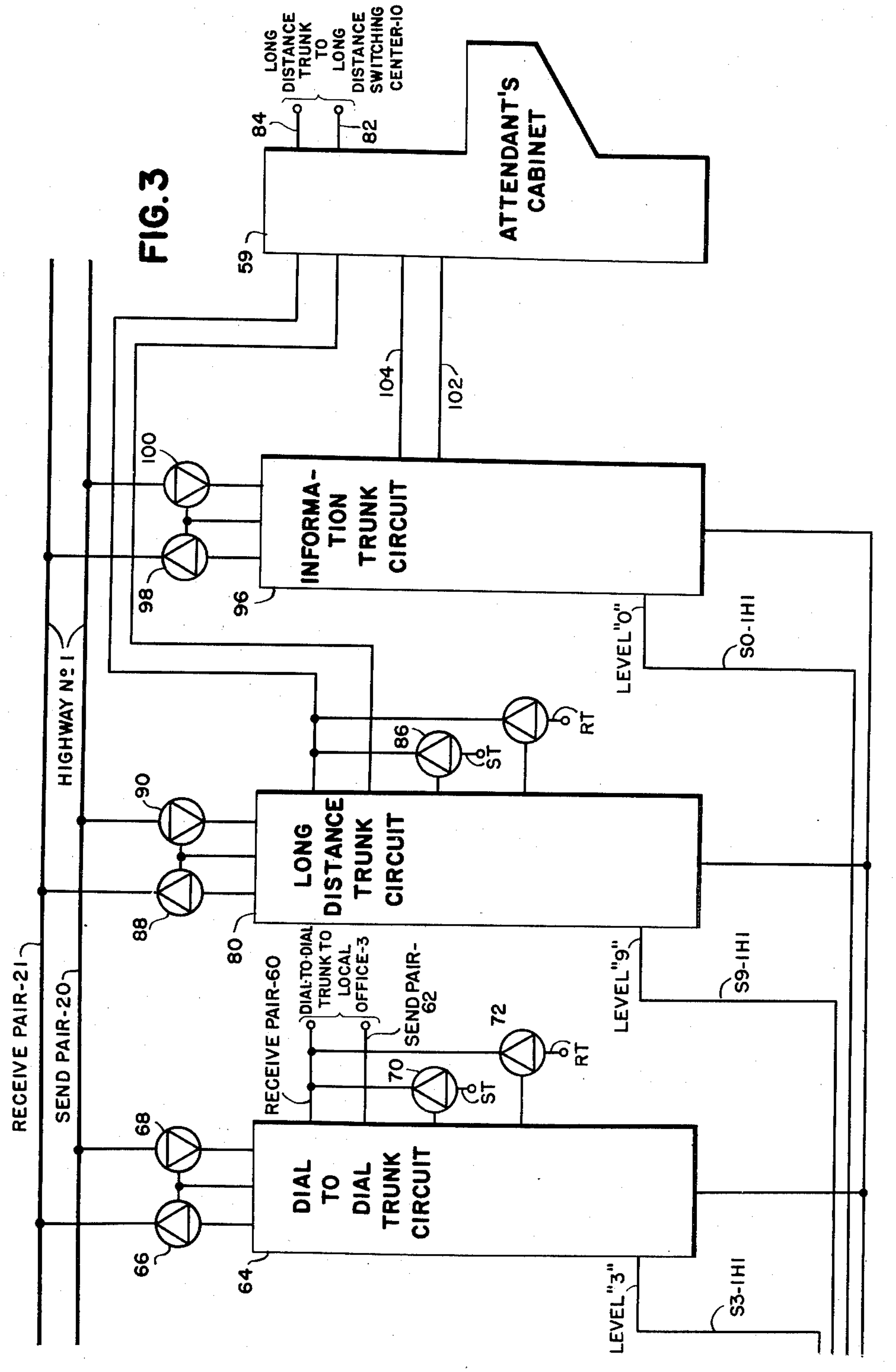

In the local office 1 facilities are also provided for establishing a call to another local office over the illustrated dial-to-dial trunks, establishing a call to a long distance switching center over the illustrated local-to-long-distance trunks and facilities are also provided for connection to an attendant's cabinet 59 in the local office 1. More particularly, if a first digit of "3" to "8," inclusive, is dialed by the calling subscriber, a line link is assigned in the manner described above and, assuming that the line link 1HW1A is assigned, the first digit is registered in the first selector 36. One of the dial-to-dial trunks between the local office 1 and the local office 3 is illustrated in Fig. 3 as comprising a receive pair of conductors 60 and a send pair of conductors 62, this dial-to-dial trunk line being connected to a dial-to-dial trunk circuit 64 in local office 1. Assuming that a call is placed from the local office 1 to a subscriber in the local office 3, after the digit "3" is registered in the first selector 36, this selector is arranged to supply succeeding digits over the conductor S3–1H1 to the trunk circuit 64. This trunk circuit responds by enabling a pair of voice switches 66 and 68 which are connected to the receive pair 21 and the send pair 20, respectively, of highway No. 1 so that these voice switches are opened in the MX1 time position channel. When the voice switches 66 and 68 are opened the trunk circuit 64 functions to open a seizure tone voice switch 70 for a brief interval of time so that a seizure tone is supplied to the receive pair of conductors 60 of the dial-to-dial trunk, this seizure tone signal being transmitted to local office 3 and employed therein to cause seizure of an idle time position channel in local office 3 for completion of the call to the called subscriber therein. Accordingly, when the second and succeeding digits are dialed by the subscriber at the substation A the resulting dial frequency modulated MX1 pulses on the send conductors 20 are transmitted through the voice switch 68 and are demodulated and supplied to the receive pair of conductors 60 of the illustrated dial-to-dial trunk line to the local office 3. In the local office 3 the second and succeeding digits are registered in selector and connector stages in a manner similar to that described above in connection with local office 1 so that a two-way telephonic connection is established between these local offices.

If the calling subscriber at local office 1 hangs up to terminate the call a release tone control signal is transmitted to the release circuit 56 by way of the first selector 36 in the manner described above in connection with a local call and this release circuit controls the dial-to-dial trunk circuit 64 so that this circuit is reset to its normal condition for the handling of another call to the local office 3. As the dial-to-dial trunk circuit 64 is being reset, it opens a release tone voice switch 72 for a brief interval of time so that a release tone signal is applied to the receive conductors 60 of the dial-to-dial trunk line and this release tone is transmitted to the local office 3 where it causes the release of the associated linkage in a manner similar to the release tone initiated by the calling subscriber at the substation A. On the other hand, if the called subscriber at the local office 3 hangs up to terminate the call, the release tone developed by his subset will be transmitted from local office 3 over the send conductors 62 of the dial-to-dial trunk line, through the voice switch 66 and the voice switch 54 to the release circuit 56 so as to reset the circuits controlled thereby in the local office 1.

When the calling subscriber in the local office 1 dials a first digit of "9," which signifies a long distance call to an operator at the long distance switching center 10 (Fig. 1) this first digit is registered in the first selector 36 in the manner described above and the selector 36 provides an enabling potential over the conductor S9–1H1 to a number of long distance trunk circuits in parallel, one of which is indicated at 80 in Fig. 3, the long distance trunk circuit 80 being connected through the attendant's cabinet 59 to the send conductors 82 and receive conductors 84 of a four-wire long distance trunk line extending to the long distance switching center 10. When the long distance trunk circuit 80 is thus enabled, it opens a seize tone voice switch 86 for a brief interval of time so that a seize tone is transmitted over the receive conductors 84 to the long distance switching center 10 to cause seizure of the connecting linkage at this office. At the same time a pair of voice switches 88 and 90 are connected to the receive conductors 21 and the send conductors 20, respectively, of highway No. 1 so as to provide two-way signal transmission between the calling subscriber and the long distance switching center 10. In this latter office the operator is given oral instructions for the completion of a call and thereafter completes the call to the desired location.

All of the local subscribers in local office 1 also have access to the attendant's cabinet 59 by dialing a first digit of "0." When this occurs the digit "0" is registered in the first selector 36 and this selector supplies an enabling potential over the conductor S0–1H1 to a plurality of information trunk circuits, one of which is illustrated at 96 in Fig. 3. When the trunk circuit 96 is thus enabled it opens the voice switches 98 and 100 which are connected to the receive conductors 21 and the send conductors 20, respectively, of highway 1, so that a two-way signal transmission path is established by way of the send pair 102 and receive pair 104 of the information trunk to the attendant's cabinet 59.

Figure 2:
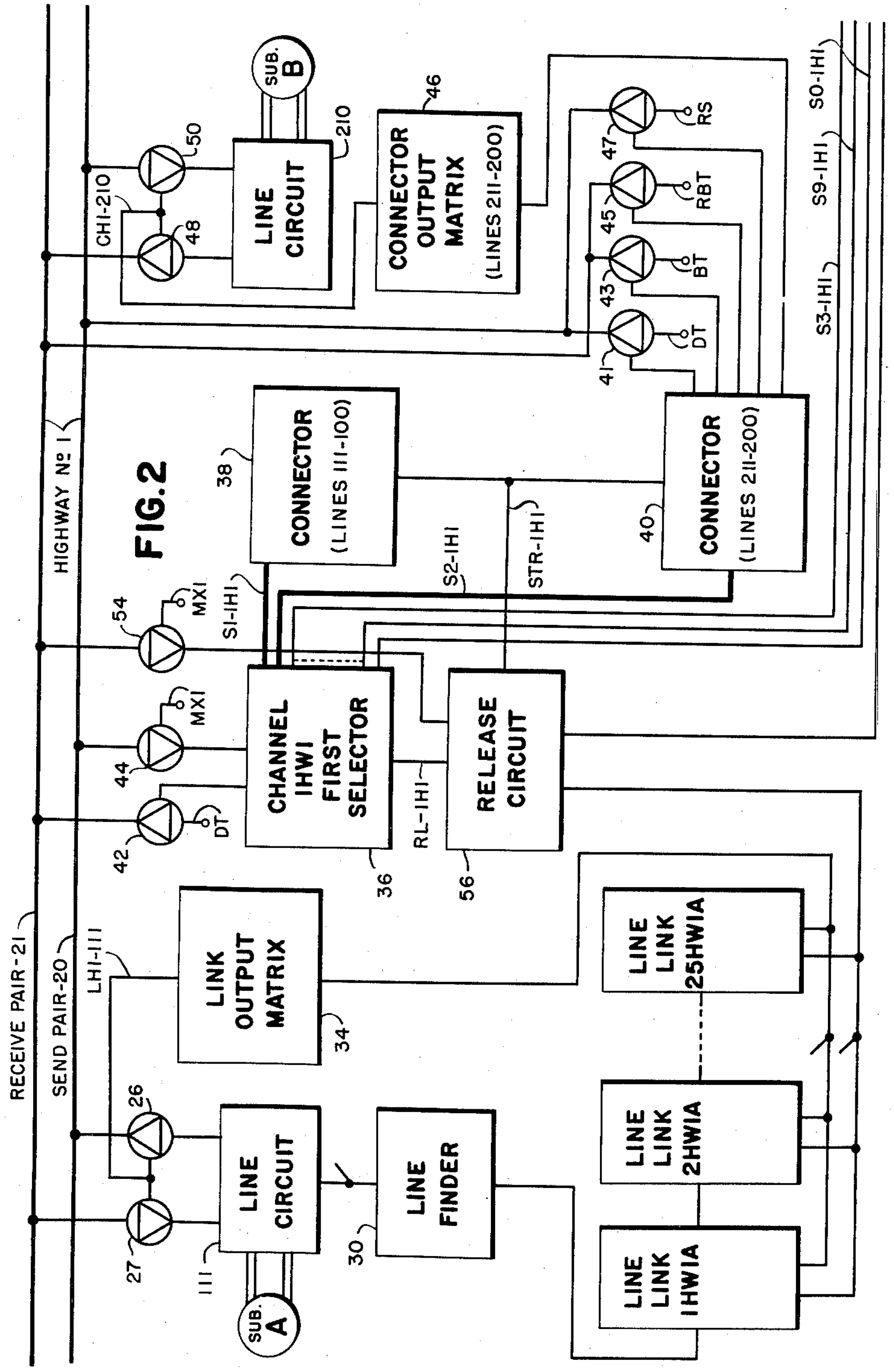

In the preceding description of the general block diagram shown in Figs. 2 and 3 a number of the functions performed by the illustrated circuit components have been either omitted or described quite generally in order to simplify the description and promote an understanding of the basic principles of the invention. In Figs. 4 to 25, inclusive, of the drawings, there is shown in more detailed block diagram form the facilities at the local office 1 and in these figures two pulse multiplex highway networks have been shown to illustrate the manner in which calls may be handled simultaneously on different highways, it being understood that as many pulse multiplex highways may be employed as desired to accommodate the desired traffic within the office and between offices. More particularly, in Figs. 4 to 25, inclusive, an additional pulse multiplex highway identified as highway No. 2 is illustrated together with the associated equipment necessary to establish twenty-five simultaneous calls thereover.

Both highway No. 1 and highway No. 2 employ the same time position channels, separation of the individual conversations being provided by employing individual voice switches, output matrices and other circuit components for each highway. In order to establish the individual time position channels for each highway, there is provided a common multiplex pulse generator 140 which is arranged sequentially to provide multiplexing or sampling pulses on the output conductors MX1, MX2–MX25, inclusive, these multiplexing pulses preferably having a duration of approximately three microseconds separated by a guard interval of approximately two microseconds and the twenty-five pulse time position frame being repeated at a repetition rate of approximately 8000 cycle per second.

Figure 4:
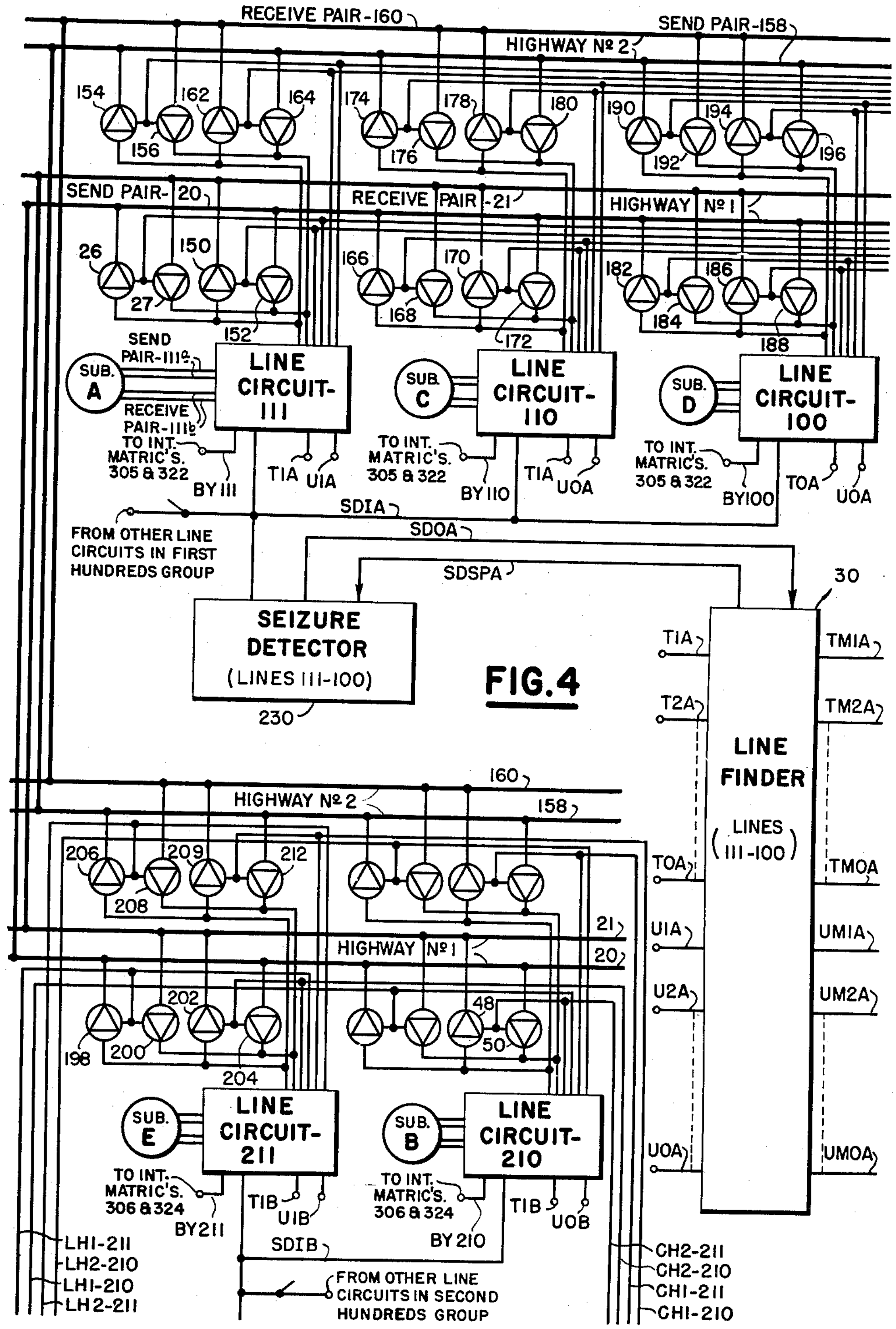

In the multihighway system shown in Figs. 4 to 25, inclusive, different pairs of voice switches are employed depending upon whether the associated line is a calling line or a called line and duplicate sets of voice switches are provided for each highway. Thus, when the line associated with line circuit 111 is a calling line, the voice switches 26 and 27 are employed whereas when this line is a called line the voice switches 150 and 152 are employed. In this connection it is pointed out that when the associated line is a called line the send pair of conductors of the pulse multiplex highway is employed to receive signals from the calling line and the receive pair of conductors is employed to transmit signals back to the calling line. Thus, the terminology "send" and "receive" applied to the conductors 20 and 21 of highway No. 1 refers to the calling line rather than to the called line. The line circuit 111 is also provided with a pair of voice switches 154 and 156 which are connected to the send pair 158 and the receive pair 160 of the pulse multiplex highway No. 2, respectively, and a pair of called line voice switches 162 and 164 which are connected respectively to the receive conductors 160 and send conductors 158 of highway No. 2. In Fig. 4 the additional line circuits 110 and 100 in the first hundreds level of the local office 1 have been illustrated, the line circuit 110 having associated therewith the calling voice switches 166 and 168 and the called voice switches 170 and 172 associated with highway No. 1 and also having the calling voice switches 174 and 176 and the called voice switches 178 and 180 connecting the line circuit to highway No. 2. In a similar manner the line circuit 100 is provided with the calling voice switches 182 and 184 and the called voice switches 186 and 188 connecting the line circuit to highway No. 1 and is also provided with the calling line voice switches 190 and 192 and the called voice switches 194 and 196 connecting the line circuit to highway No. 2.

Two of the line circuits serving lines in the second hundreds group are illustrated in Fig. 4 as the line circuits 211 and 210, the line circuit 211 having the calling voice switches 198 and 200 and the called voice switches 202 and 204 connecting this line circuit to highway No. 1 and also having the calling voice switches 206 and 208 and the called voice switches 210 and 212 connecting this line circuit to highway No. 2.

In order to identify a particular line as a calling line, each line is arbitrarily given an individual number, which in the illustrated embodiment corresponds to the number assigned to the associated line circuit, and the common line finder develops line identification pulses which can be combined to provide the individual numbers assigned to the lines. In the illustrated embodiment one line finder is provided for each hundred lines of the system and hence the line finder which is common to one hundred lines, such as the line finder 30, sequentially develops tens and units pulses which may be combined on a numerical basis to provide one hundred individual pulse combinations which identify the one hundred lines served thereby. More particularly, the line finder 30 is provided with a suitable counting chain arrangement for developing tens pulses sequentially on the illustrated conductors T1A, T2A–T0A and is also provided with counting chain facilities for sequentially developing units pulses on the units conductors U1A, U2A–U0A. The units pulses appearing on the conductors U1A, U2A–U0A are sequentially developed during the period when a tens pulse is produced on any one of the tens conductors T1A, T2A–T0A so that one hundred unique pulse combinations are provided. In this connection it is pointed out that the pulses produced on the tens and units conductors of the line finder 30 are not synchronized in any way with the multiplex pulses developed by the generator 140 for speech transmission over the pulse multiplex highways, the tens and units pulses developed by the line finder being employed solely to identify and mark calling lines of the system. Individual ones of the tens and units conductors are supplied to each line circuit of the system so as to provide a unique pulse combination therein representing the calling line identity of the line. More particularly the first tens conductor T1A and the first units conductor U1A are supplied to the line circuit 111, the first tens conductor T1A and the tenth units conductor U0A are supplied to the line circuit 110 and the tenth tens conductor T0A and the tenth units conductor U0A are supplied to the line circuit 100.

It will be recalled that the subset at substation A is arranged to develop a seizure tone signal, preferably of 1500 c.p.s., when the subscriber at substation A comes off-hook and this seizure signal is sent over the send pair of line conductors **111*a* to the line circuit 111. In this line circuit facilities are provided for transmitting this seizure tone signal to a common seizure detector 230 over the common seizure detector input conductor SDIA only when the corresponding tens and units pulses supplied to this line circuit coincide. Thus, it is only when the tens pulses appearing on the conductor T1A and the units pulses appearing on the conductor U1A coincide that a seizure tone signal is supplied over the conductor SDIA to the seizure detector 230. In a similar manner, if the subscriber at substation C comes off-hook it is only when the tens pulses on the conductor T1A and the units pulses on the conductor U0A coincide that a seizure tone signal is transmitted by way of the common input conductor SDIA to the seizure detector 230**.

Figure 5:
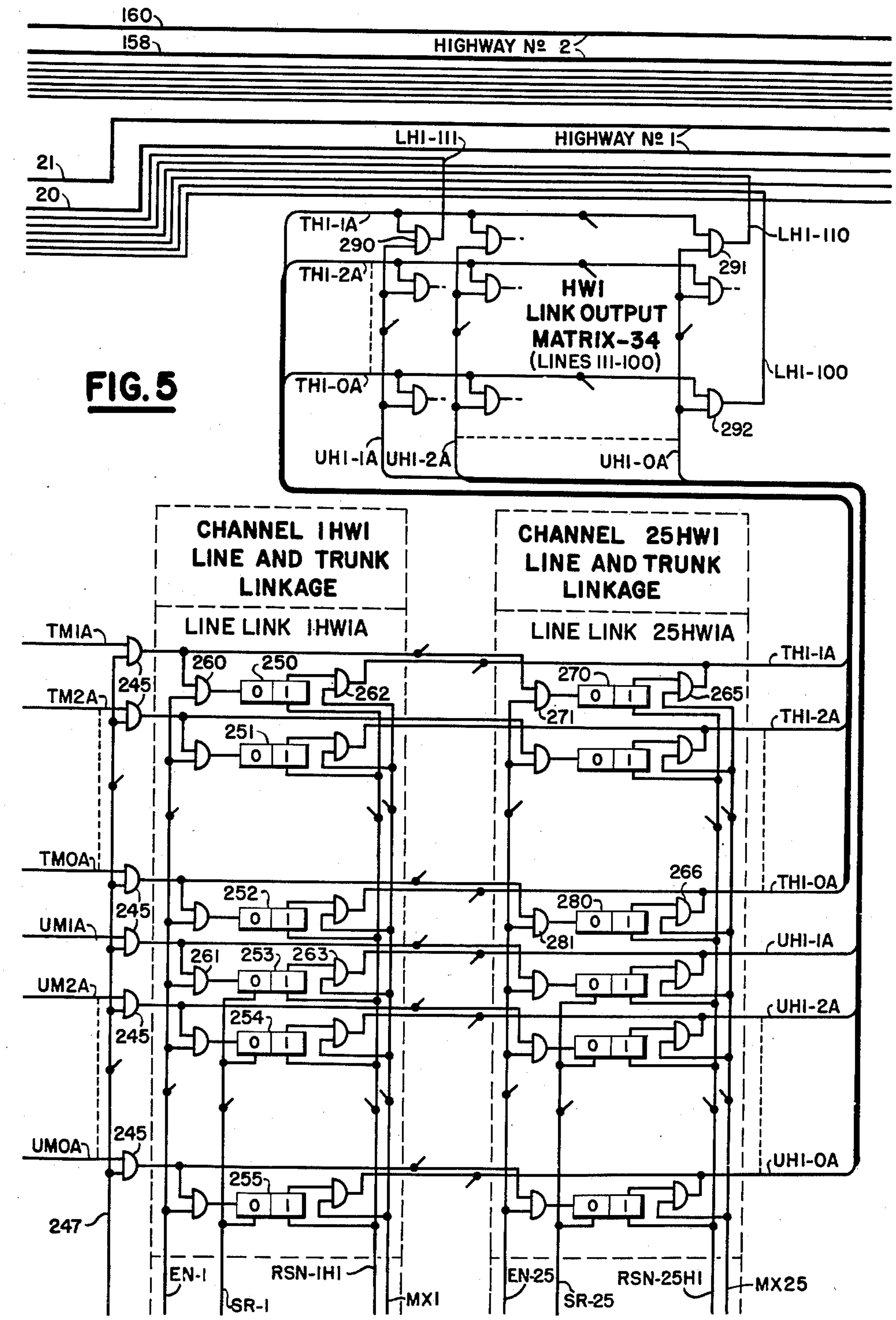
Figure 6:
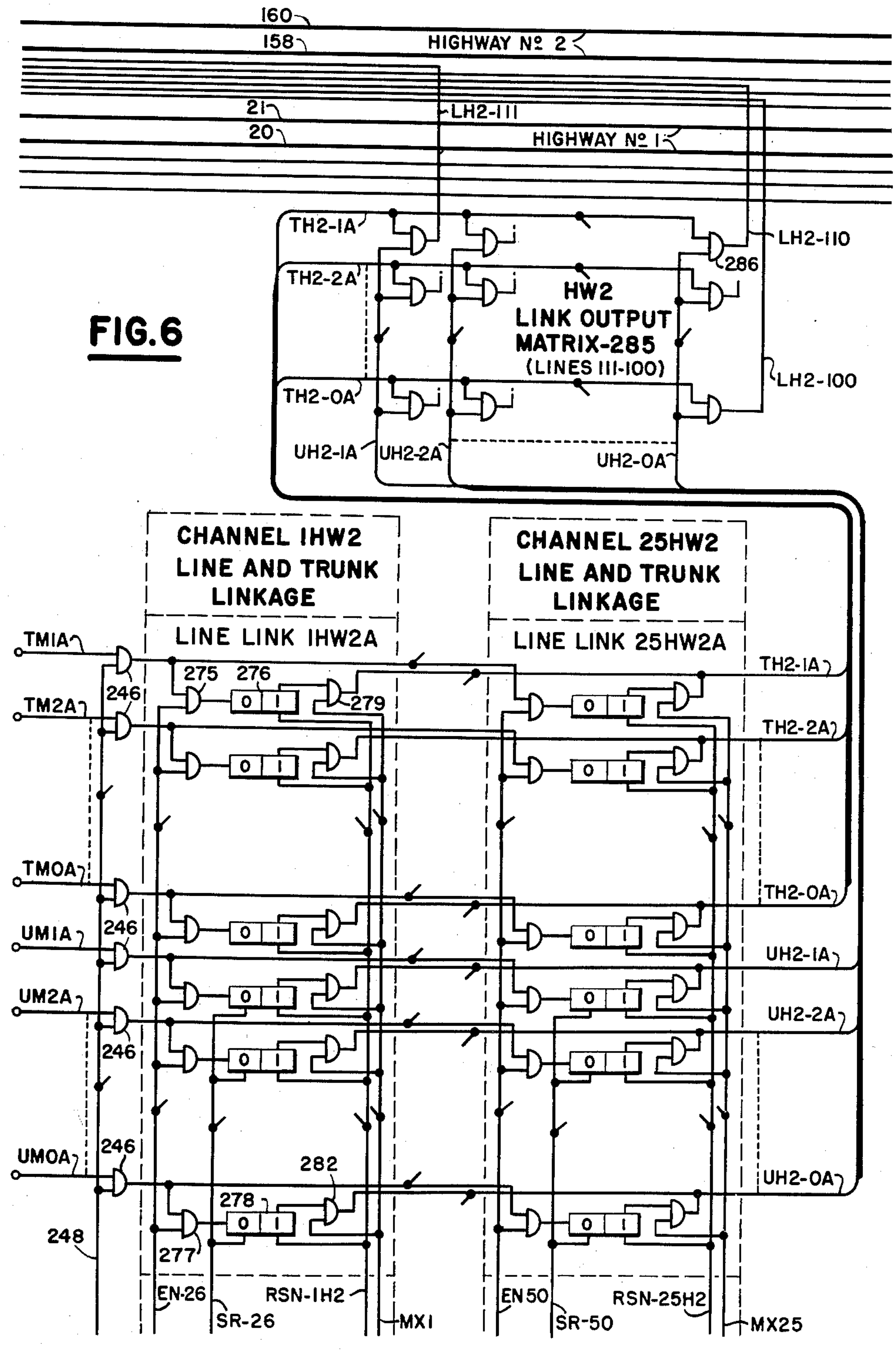
Figure 7:
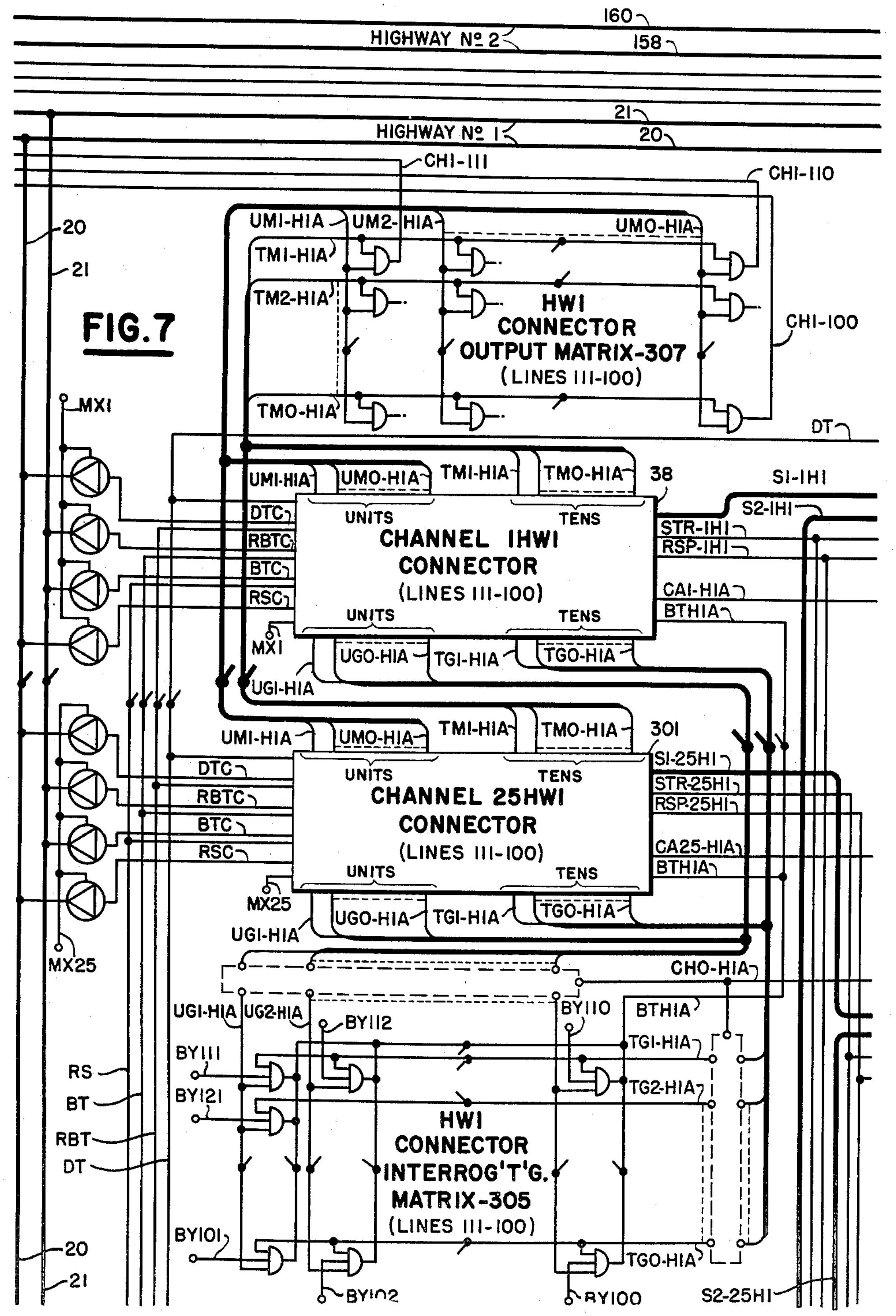

The seizure detector 230 includes an amplifier channel which is tuned to a harmonic of the 1500 cycle seizure tone signal and the detector 230 develops an output signal which is transmitted to the line finder 30 over the seizure detector output conductor SDOA whenever tens and units pulse coincidence occurs simultaneously with a calling condition on the associated line. The one hundred line circuits served by the line finder 30 are thus sequentially scanned by means of the above described tens and units pulses and whenever a calling condition is detected in one of the associated line circuits a control signal is supplied over the conductor SDOA to the line finder 30. This control signal is employed to mark one of a group of ten tens marking conductors TM1A, TM2A–TM0A and one of a group of ten units marking conductors UM1A, UM2A to UM0A, inclusive. Thus, when a calling condition exists on the line associated with line circuit 111, a marking potential is developed by the line finder 30 on the first tens marking conductor TM1A and a marking potential is developed on the first units marking conductor UM1A. The marking potentials developed on the tens and units marking conductors are supplied to a first group of twenty-five line links associated with the twenty-five time channels of highway No. 1, the first and twenty-fifth of which are illustrated in Fig. 5 of the drawings as line link 1HW1A and line link 25HW1A, and these marking potentials are also supplied to a second group of twenty-five line links associated with the twenty-five time channels of highway No. 2, the first and twenty-fifth of such line links being illustrated as the line link 1HW2A and the line link 25HW2A (Fig. 6).

In order to distribute the traffic uniformly between the two pulse multiplex highways, the allotter 32 is arranged to enable the two groups of twenty-five line links alternately so that a link in the group associated with highway No. 1 is assigned to the first call, a link in the group associated with highway No. 2 is assigned to the second call, etc. To this end, a first series of and gates 245 are provided for the highway No. 1 line links and a second series of and gates 246 are provided for the line links associated with highway No. 2. The tens and units marking conductors provide one input for each of the two series of and gates 245 and 246 and the first series of and gates 245 has as a common second input an enabling potential developed in the allotter 32 and transmitted to each of the gates 245 over the conductor 247. The second series of and gates 246 likewise have a second input provided by the allotter 32 by way of the common conductor 248. The allotter 32 is arranged to provide an enabling potential on either the conductor 247 or the conductor 248 so that the tens and units marking potentials are individually transmitted through the series of gates 245 or the series of gates 246.

A series of twenty flip-flop circuits are provided in each of the line links to which the tens and units marking potentials passed by the and gates 245 or 246 are individually impressed through input and gates, these latter gates being also controlled by the allotter 32. More particularly, in the line link 1HW1A, the flip-flops 250, 251 and 252 are provided for the illustrated tens marking conductors TM1A, TM2A and TM0A, and the flip-flop circuits 253, 254 and 255 are provided for the illustrated units marking conductors UM1A, UM2A and UM0A. The first tens marking potential is impressed upon the flip-flop 250 through an and gate 260, the and gate 260 having this tens marking potential as one input thereof and having an enabling potential supplied from the allotter 32 over the conductor EN–1 as the other input thereof. The first flip-flop circuit in each of the other line links associated with highway 1 is also arranged to be selectively supplied with the first tens marking potential through an and gate controlled by the allotter 32. Thus, in line link 25HW1A the flip-flop 270 is provided with an input and gate 271, one input of which is the first tens marking potential and the other input of which is an enabling potential supplied by the allotter 32 over the conductor EN–25. In a similar manner the units marking potentials passed by either the gates 245 or the gates 256 are supplied through input and gates to the corresponding flip-flop in each line link associated with a particular highway. For example, the units flip-flop 280 in line link 25HW1A is provided with an input and gate 281 to which the first units marking potential is supplied and also the enabling potential appearing on the conductor EN–25 from the allotter 32.

While the tens and units marking potentials are thus applied to all of the line links associated with a particular highway, the allotter 32 produces an enabling voltage on only one of the enabling conductors EN–1 to EN–25, inclusive, so that only one line link is conditioned at any given time to register the identity of a calling line. Assuming that an enabling potential is developed on the conductor EN–1, when the line finder 30 receives a seizure detector output signal during the period when the first tens and first units pulses coincide, i.e., the time position assigned to the line circuit 111, marking potentials are produced on the first tens marking conductor TM1A and on the first units marking conductor UM1A. The tens marking potential on the conductor TM1A passes through one of the and gates 245 and the gate 260 and sets the flip-flop circuit 250. Also, the units marking potential on the conductor UM1A passes through the corresponding and gate 245 and through the and gate 261 and sets the flip-flop 253. Accordingly, the tens and units identity of the calling line is registered in the line link 1HW1A.

As soon as one of the units flip-flops is set in the line link 1HW1A a set control potential is transmitted by way of the set-reset conductor SR–1, which is common to all of the units flip-flops in the line link 1HW1A, to the allotter 32 which responds to this set control potential by removing the enabling potential from the conductor EN–1 and applying an enabling potential to the next line link in the highway No. 1 group. At the same time the allotter 32 removes the enabling potential from the conductor 247 and applies an enabling potential to the conductor 248 so that the line link 1HW2A is then prepared to receive and register marking potentials which will identify the second simultaneously calling line in the first hundreds line group of the system. When a second calling line in the first hundreds line group is detected and tens and units marking potentials are produced these potentials are transmitted through the corresponding ones of the and gates 246 and through the input and gates to the corresponding tens and units flip-flops which are set to register the identity of this second calling line, it being understood that the line link 1HW2A will provide a conversation path over highway No. 2. Since the gates 245 are closed during this period due to the absence of an enabling potential on the conductor 247, the second line link in the first highway No. 1 group does not receive the tens and units marking potential identifying the second calling line. However, as soon as the second line is registered in line link 1HW2A the enabling potential on the conductor 248 is removed and an enabling potential is applied to the conductor 247 so that the second line link in the highway No. 1 group is then prepared to register the identity of the third simultaneously calling line in the first hundreds group of the system.

When the tens and units flip-flops in the line link 1HW1A are set in the manner described above to register the identity of the calling line 111 an output signal from each flip-flop is applied to one input of a multiplex output and gate, the other input of which comprises a multiplex pulse in the first one of the twenty-five time positions provided for each pulse multiplex highway. More particularly, when the tens flip-flop 250 is set, an output signal is derived therefrom and is applied to a multiplex output and gate 262, this gate having as its other input multiplex pulses which are produced on the conductor MX1 by the generator 140. In a similar manner, when the units flop-flop 253 is set an output potential derived therefrom and the MX1 pulses are applied to an output and gate 263.

The output and gates associated with a particular tens or units flip-flop in each of the twenty-five line links are connected in parallel to a corresponding tens output conductor which is supplied to the link output matrix associated with the same multiplex highway and serving the same subscriber lines. Thus, the output and gates associated with all of the highway No. 1 flip-flops controlled by the first tens marking conductor TM1A, including the output and gate 265 associated with the flip-flop 270 in the line link 25HW1A, are connected in parallel to the first tens output conductor TH1–1A. In a similar manner the output and gates associated with the highway No. 1 flip-flops controlled by the first units marking conductor UM1A, including the output and gate 266 associated with the flip-flop 280 in the line link 25HW1A are connected in parallel to the first units output conductor UH1–1A. These tens and units output conductors are connected to the link output matrix 34 associated with highway No. 1 and serving lines 111 to 100, inclusive.

The link output matrix 34 comprises a group of one hundred and gates individually corresponding to the lines served thereby, the outputs of these and gates being connected to the voice switches of the corresponding line circuits to control the same. These matrix and gates are arranged in rows and columns, the tens output conductors being applied as one input to the matrix and the units output conductors being applied as the other input thereto. More particularly, the tens output conductor TH1–1A is supplied as one input to the matrix and gate 290 which controls the voice switches 26, 27 associated with the line circuit 111 and the units output conductor UH1–1A is connected to provide the second input of this and gate. In a similar manner the tens output conductor TH1–1A and the units output conductor TH1–0A provide the inputs for the matrix outgate 291 which controls the voice switches 166, 168 associated with the line circuit 110 and the tens output conductor TH1–0A and the units output conductor UH1–0A control a matrix and gate 292 which in turn controls the voice switches 182, 184 associated with the line circuit 100.

When the multiplex pulses applied to one input of a particular matrix and gate appear in the same time position as the multiplexer pulses applied to the other input of this gate the gate is opened and multiplex pulses in this time position are supplied to the controlled voice switches. Thus, in the illustrated call in which the line link 1HW1A which is assigned the first time position is seized, the MX1 pulses which appear on the tens output conductor TH1–1A coincide with the MX1 pulses produced on the units output conductor UH1–1A so that the matrix and gate 290 is opened and MX1 pulses in the first time position are applied by way of the conductor LH1–111 to the voice switches 26 and 27, these voice switches are opened and establish a connection to the send and receive conductors of highway No. 1 in this time position.

Assuming now that the subscriber at substation C wishes to place a call while the call at substation A is in progress, when the tens and units pulses on the conductors T1A and U0A coincide, a seizure detector output is supplied to the line finder 30 and this line finder responds by producing marking potentials on the conductors TM1A and UM0A. These marking potentials do not pass through the gates 245 since these gates are closed after the identity of the first calling line is registered in line link 1HW1A. However, these marking potentials do pass through the corresponding ones of the gates 246 and are supplied to all of the twenty-five line links serving highway No. 2. Assuming that an enabling potential is supplied by the allotter 32 to the conductor EN–26 so that line link 1HW2A is enabled to register the identity of the second calling line, when the tens marking potential on the conductor TM1A is passed by the corresponding gate 246 the input and gate 275 associated with the first tens flip-flop 276 in line link 1HW2A is opened so that the flip-flop 276 is set to register the tens identity of the calling line. In the same manner, the units marking potential appearing on the conductor UN0A passes through the corresponding gate 246 and the input and gate 277 to the tenth units flip-flop 278 in line link 1HW2A so that this flip-flop is set. When the flip-flops 276 and 278 are thus set, the corresponding multiplex output and gates 279 and 282 associated respectively therewith are opened so that multiplex pulses in the first time position are transmitted to the corresponding tens and units output conductors TH2–1A and UH2–0A.

The tens and units output conductors of the twenty-five line links associated with highway No. 2 are supplied to a link output matrix 285 which serves the lines 111 to 100, inclusive, over highway No. 2 and comprises one hundred matrix and gates individually corresponding to these lines. The matrix 285 is generally similar to the matrix 34 and when MX1 pulses on the tens output conductor TH2–1A coincide with MX1 pulses on the units output conductor UH2–0A the matrix and gate 286 is opened so that MX1 pulses are transmitted by way of the conductor LH2–110 to the voice switches 174 and 176 associated with line circuit 110 so that the subscriber at substation C is connected to the send and receive conductors of highway No. 2 during the first time position. It will thus be evident that the same multiplex time positions are employed on the different pulse multiplex highways to provide simultaneous communication paths for different subscribers, so that in the illustrated embodiment a total of fifty simultaneous conversations is possible.

In order to complete calls initiated on the lines in the second hundreds line group there is provide a group of twenty-five line links for each highway, the first and twenty-fifth of the links serving highway No. 1 being shown as the links 1HW1B and 25HW1B and the first and twenty-fifth of the links serving highway No. 2 being shown as the links 1HW2B and 25HW2B. These groups of line links are likewise controlled by the allotter 32 and receive tens and units marking potentials from a line finder 240 which serves the second hundreds line group, the line finder 240 being identical to the line finder 30 which serves the first hundreds line group. The tens and units pulses developed by the line finder 240 on the conductors T1B, T2B to T0B, inclusive, and U1B, U2B to U0B, inclusive, are applied in different combinations to the line circuits of the one hundred lines in the second hundreds line group to establish the calling line identity thereof. A seizure detector 241 receives seizure signals from these line circuits over the conductor SDIB and supplies a control signal to the line finder 240 over the conductor SDOB under the control of a seizure detector start pulse from the line finder 240 over the conductor SDSPB. When the identity of a calling line in the second hundreds group is registered in one of the line links serving this hundreds group, the multiplex pulses corresponding thereto are supplied over the tens and units output conductors TH1–1B, TH1–2B, etc. and UH1–1B, UH1–2B, etc., to a link output matrix 242 the and gates of which control the highway No. 1 calling line voice switches of the lines in the second hundreds group, or, if a highway No. 2 link is seized the multiplex pulses therefrom are supplied over the tens and units output conductors TH2–1B, TH2–2B, etc., and UH2–1B, UH2–2B, etc., to a link output matrix 243 the and gates of which control the highway No. 2 calling line over switches of the lines in the second hundreds group.

Figure 8:
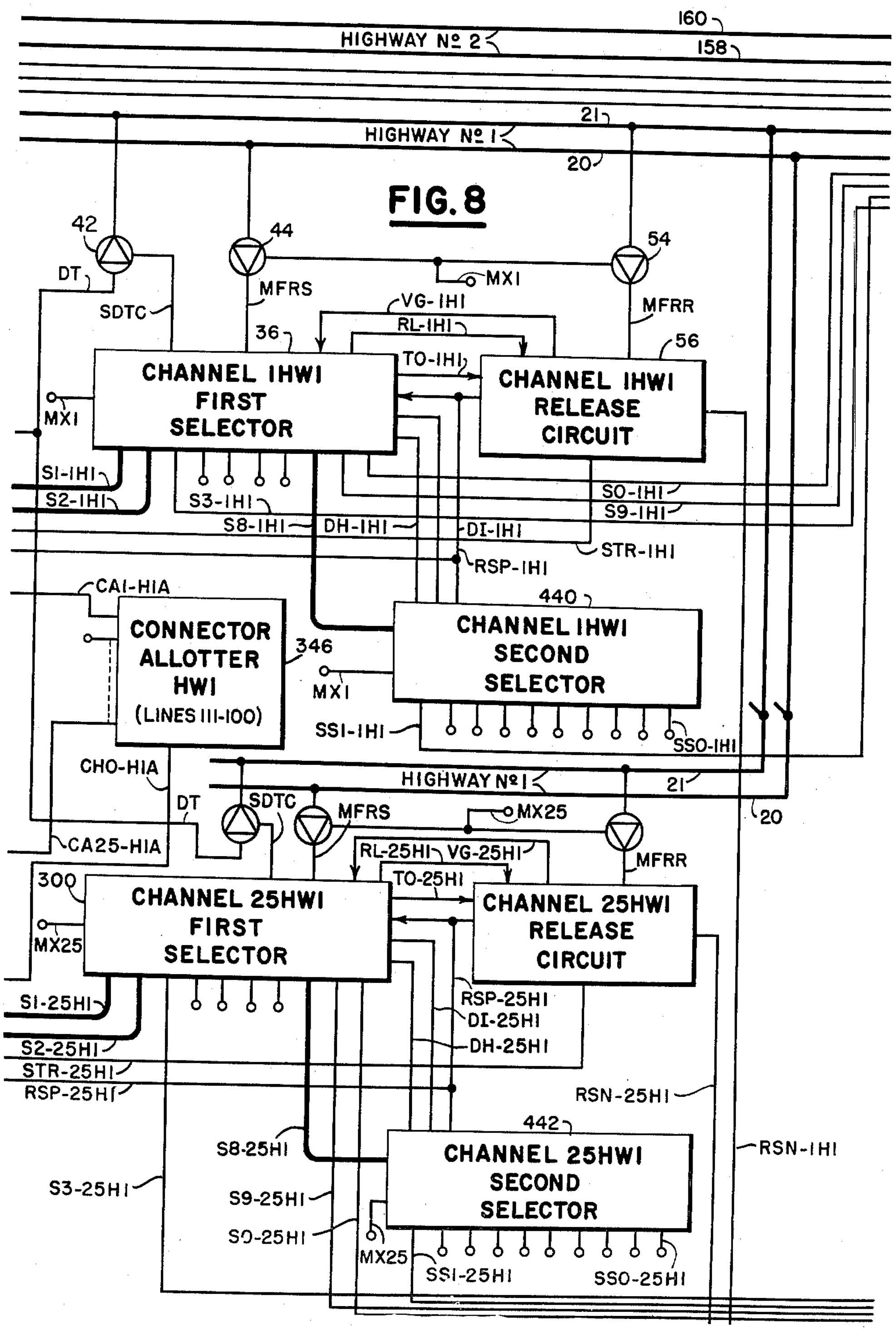
Figure 9:
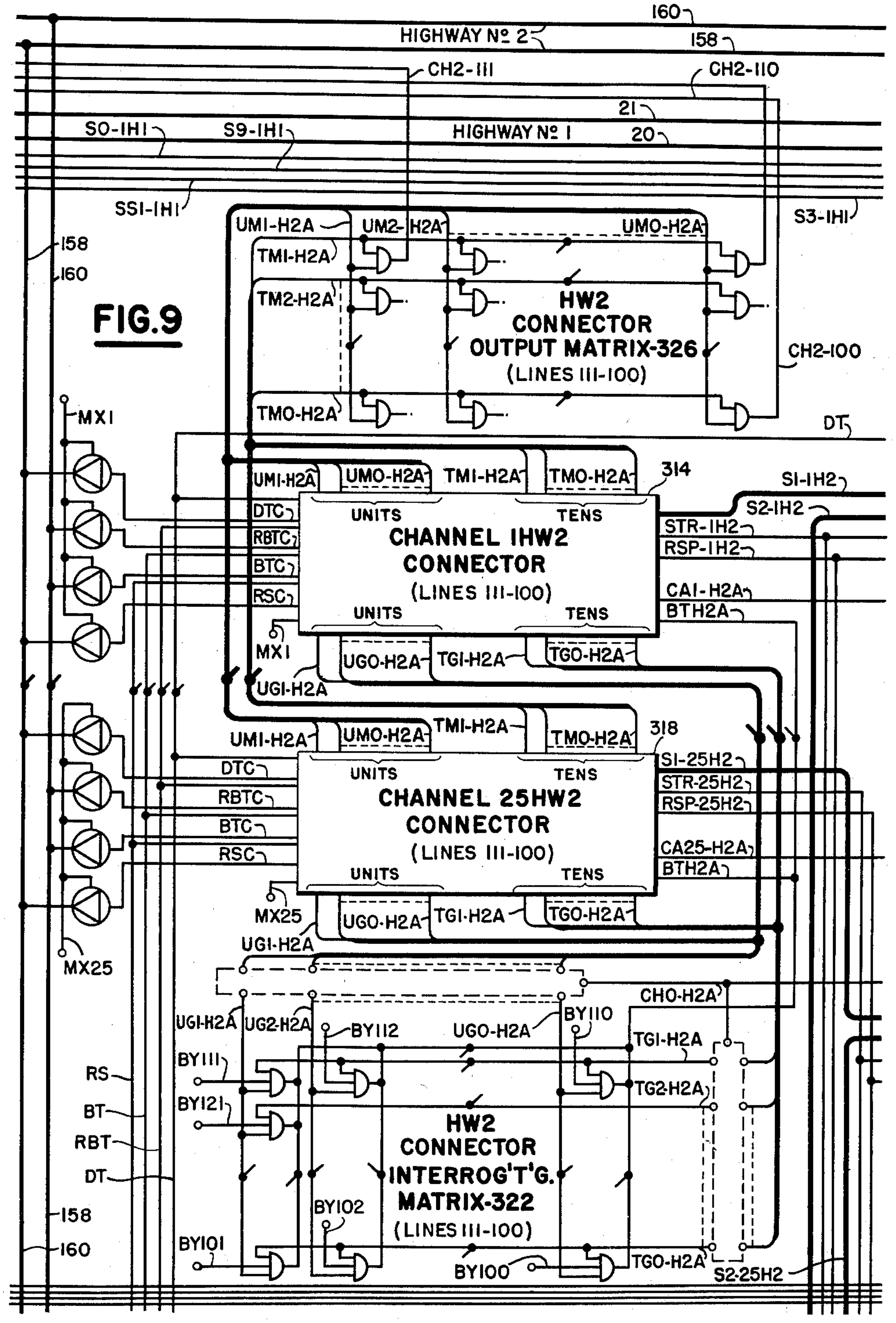

Considering now the equipment provided with each pulse multiplex highway to complete calls to different subscribers in the local office 1, a group of twenty-five first selectors are associated with highway No. 1, the first and twenty-fifth of which are shown in Fig. 8 of the drawings as the first selector 36 and the first selector 300, respectively. Associated with each of these first selectors is a connector serving the lines 111 to 100, inclusive, and a connector serving the lines 211 to 200, inclusive, it being recalled that in the illustrated embodiment the local office 1 has only two hundred local subscribers. Thus, the first selector 36 is connected to the connector 38 (Fig. 7) serving the lines 111 to 100, inclusive, by way of the conductor S1–1H1 and is also connected by way of the conductor S2–1H1 to the connector 40 (Fig. 19) serving the lines 211 to 200, inclusive. In a similar manner the twenty-fifth first selector 300 is connected to a connector 301 (Fig. 7) serving the lines 111 to 100, inclusive, over the conductor S1–25H1 and is also connected by way of the conductor S2–25H1 to a connector 302 (Fig. 19) serving the second hundred line group 211 to 200, inclusive.

In order to perform the busy test within each hundreds line group, a common connector interrogating matrix 305 is provided for the first hundreds line group and an interrogating matrix 306 is provided for the second hundreds line group, the interrogating matrix 305 cooperating with the connectors serving the first hundreds line group, such as the connectors 38 and 301 and the matrix 306 cooperating with the connector serving the second hundreds line group such as the connectors 40 and 302. A connector output matrix 307 serves to control the called line voice switches of the lines in the first hundreds line group and a connector output matrix 46 is provided to control the called line voice switches of the lines in the second hundreds group.

Figure 10:
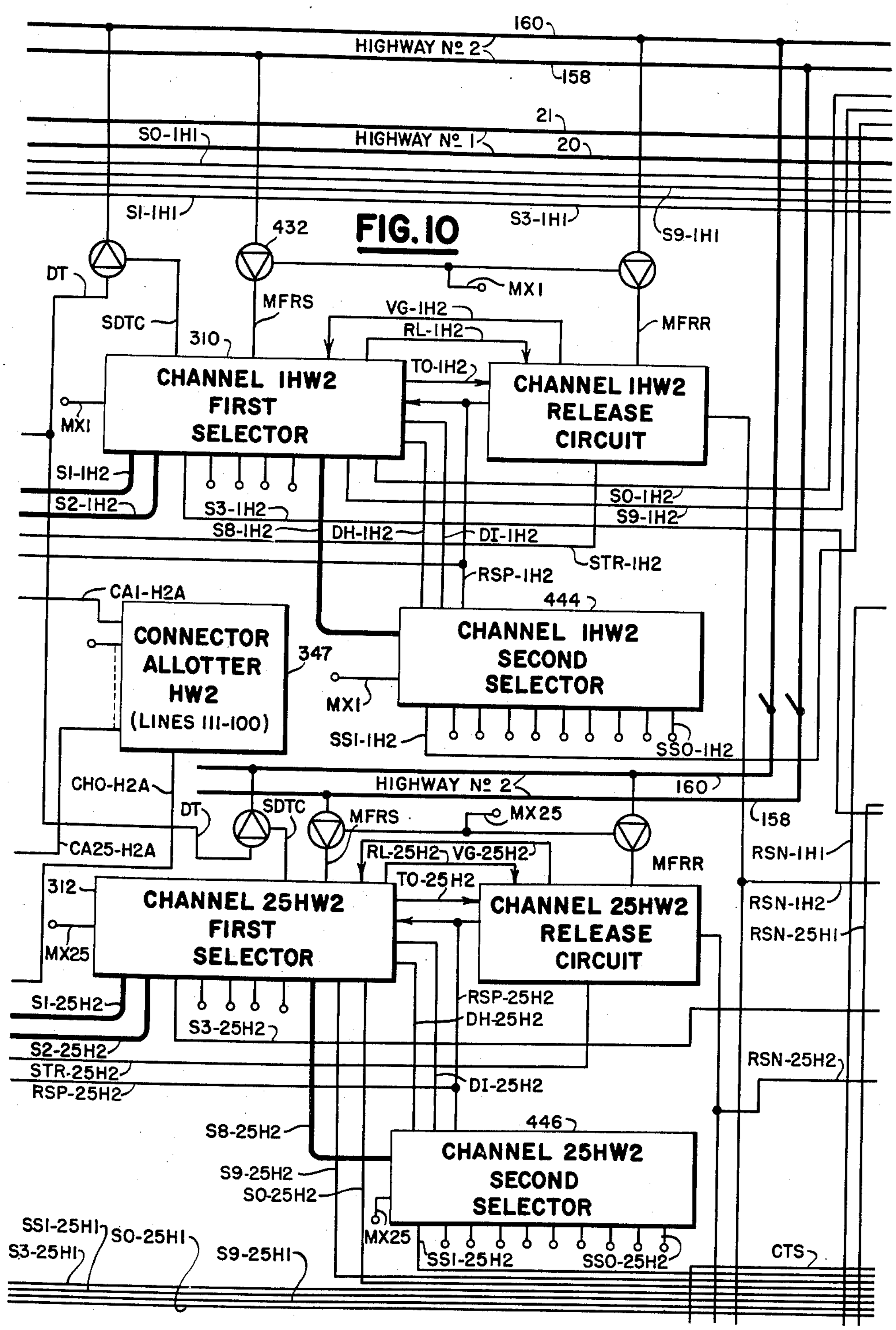
Figure 11:
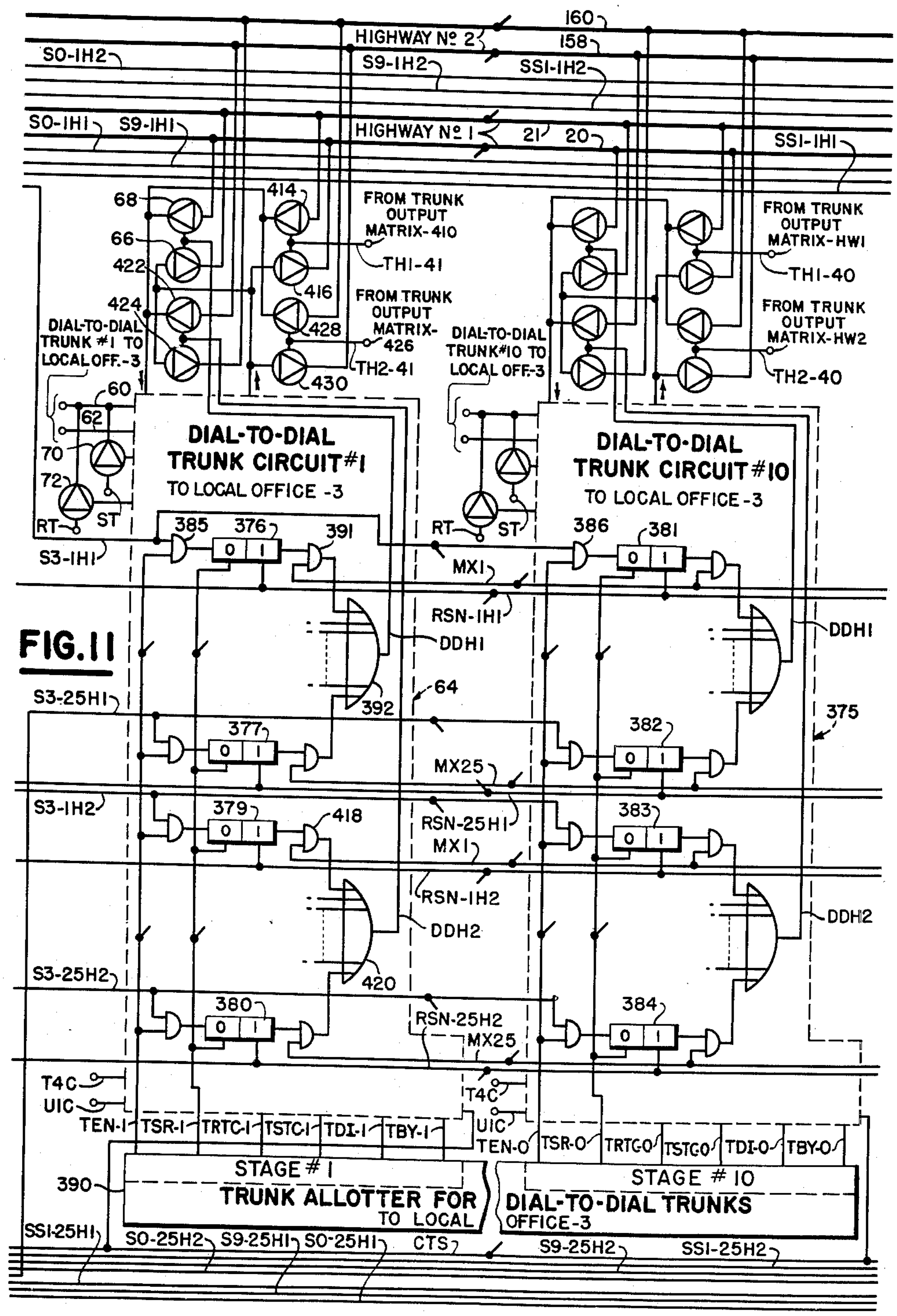
Figure 12:
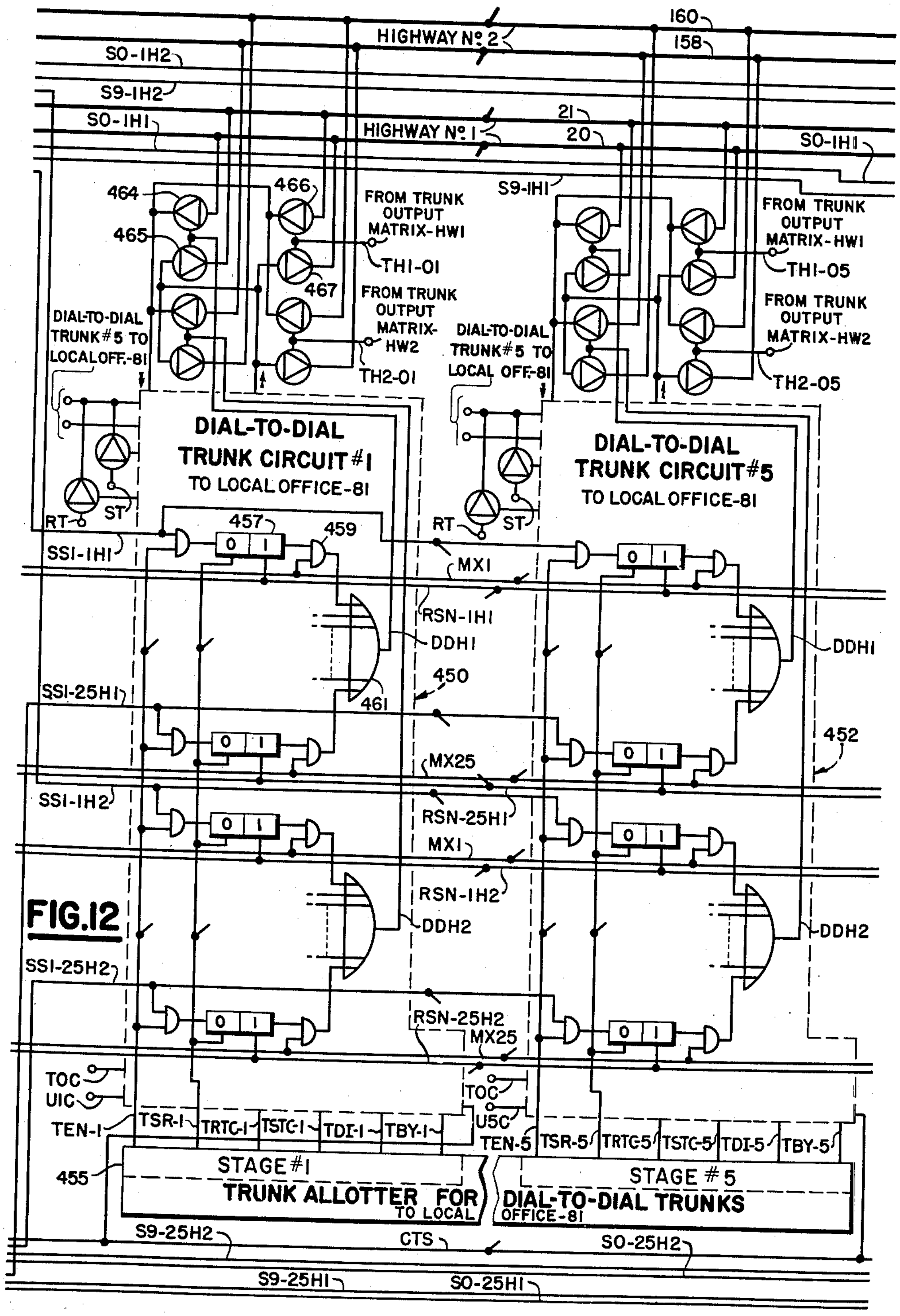
Figure 13:
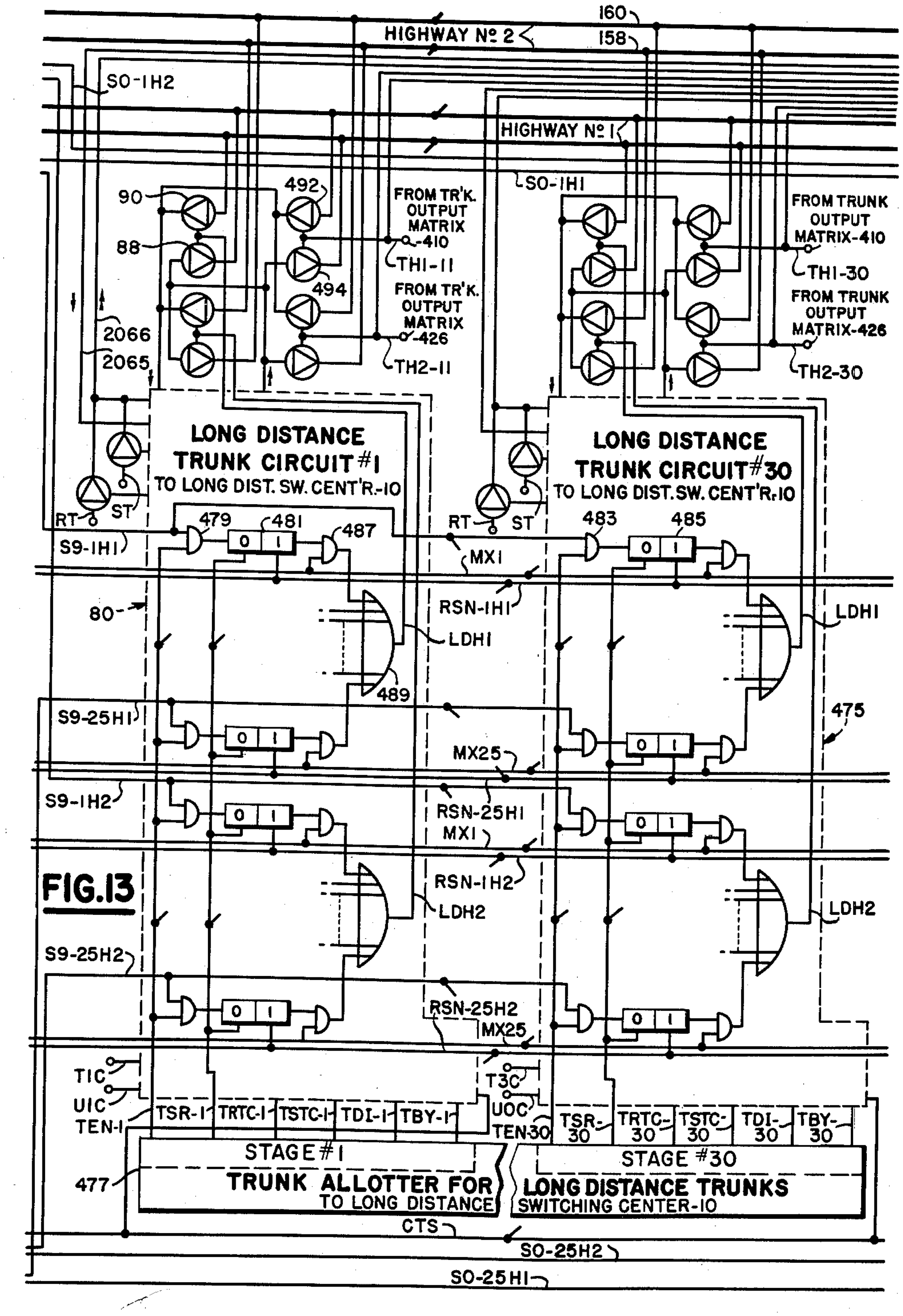
Figure 14:
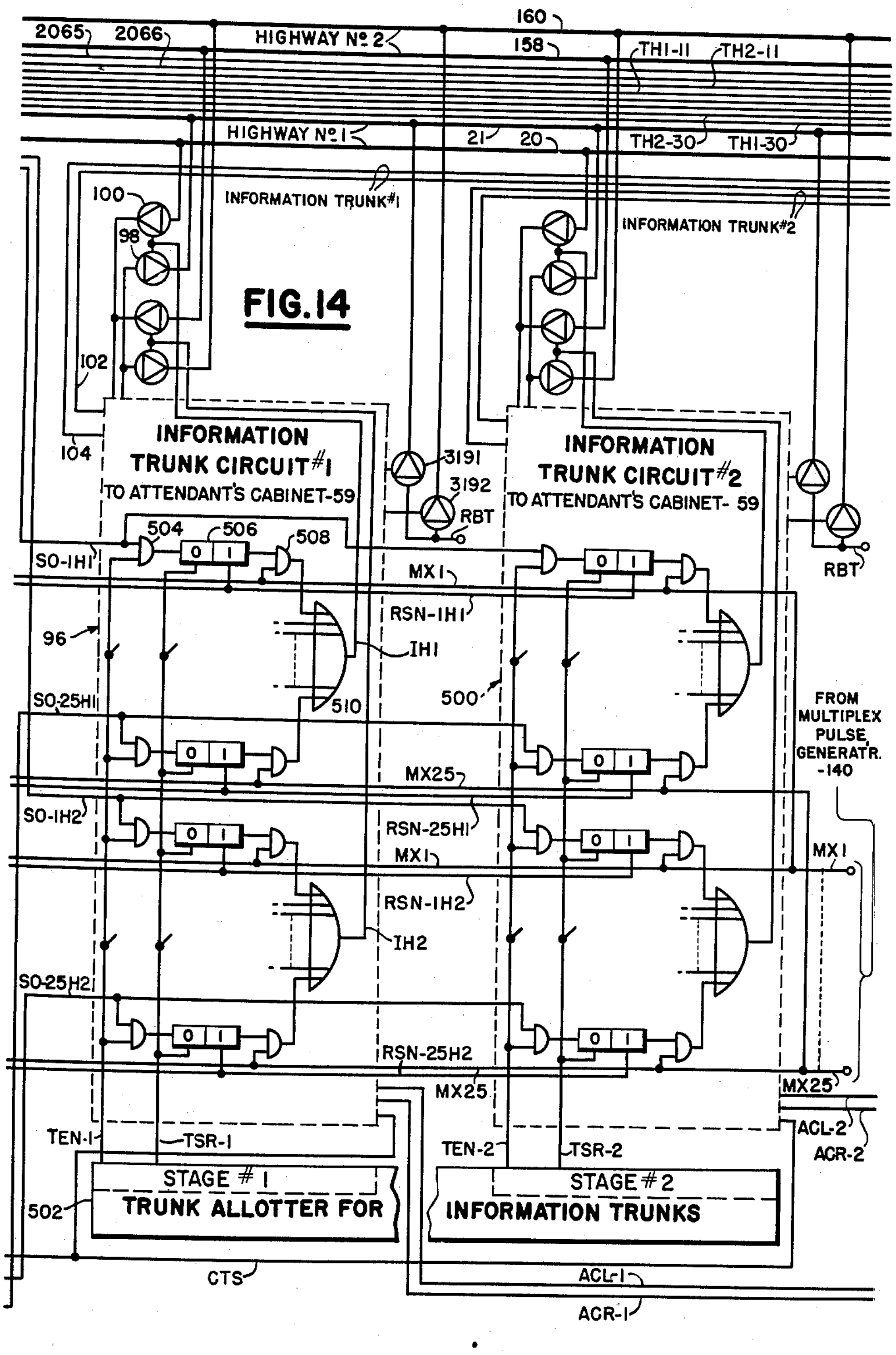
Figure 15:
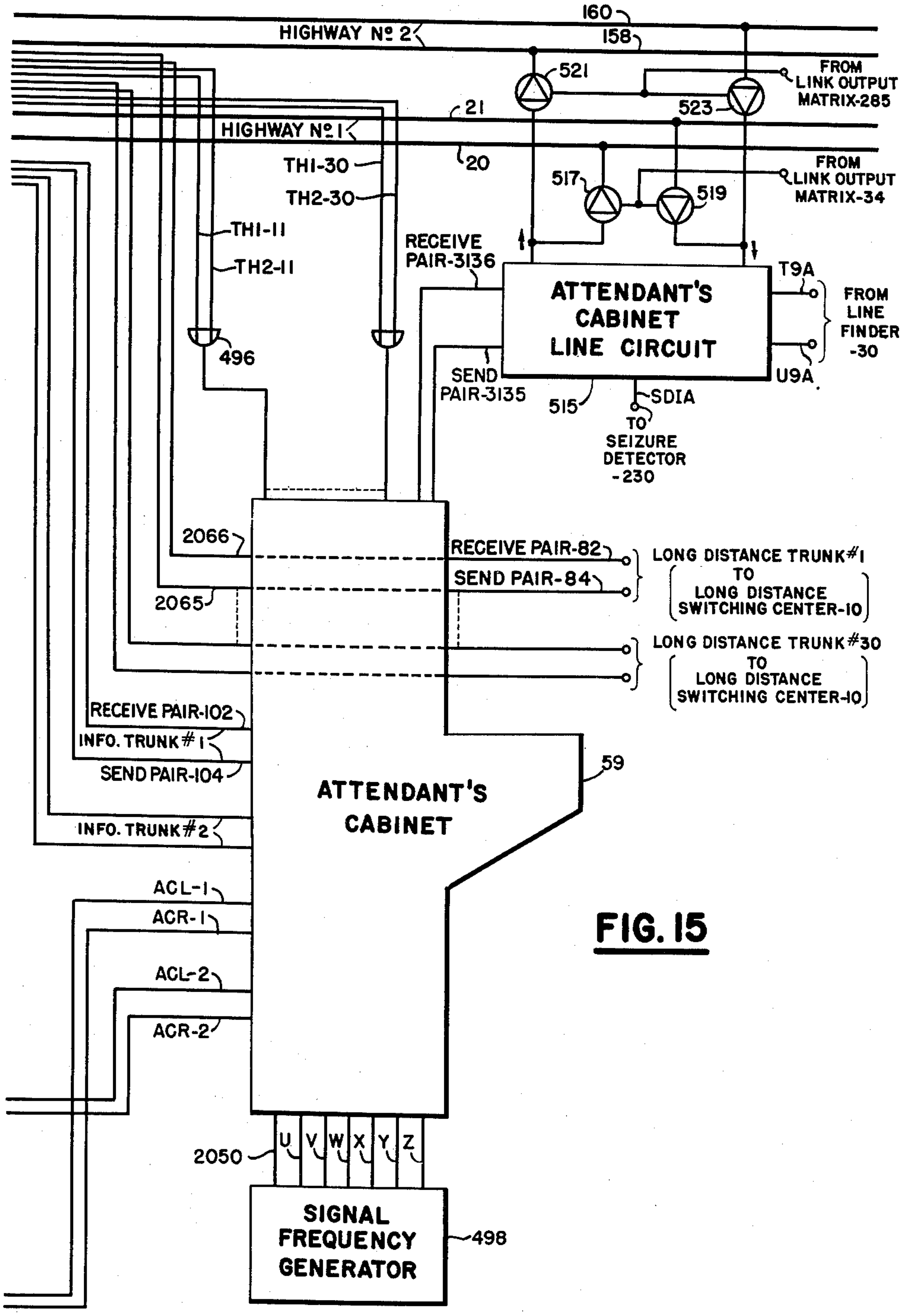
Figure 16:
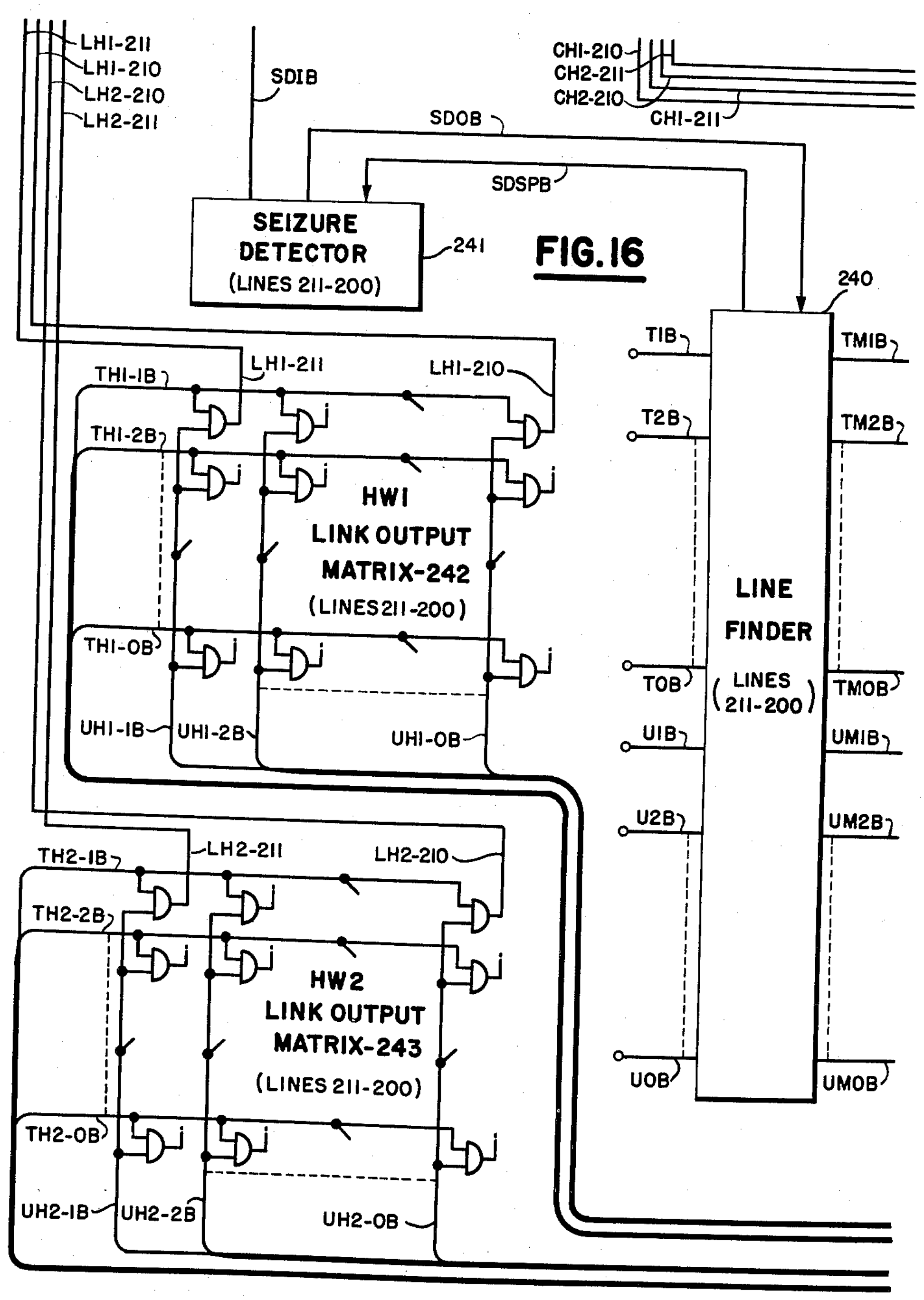
Figure 17:
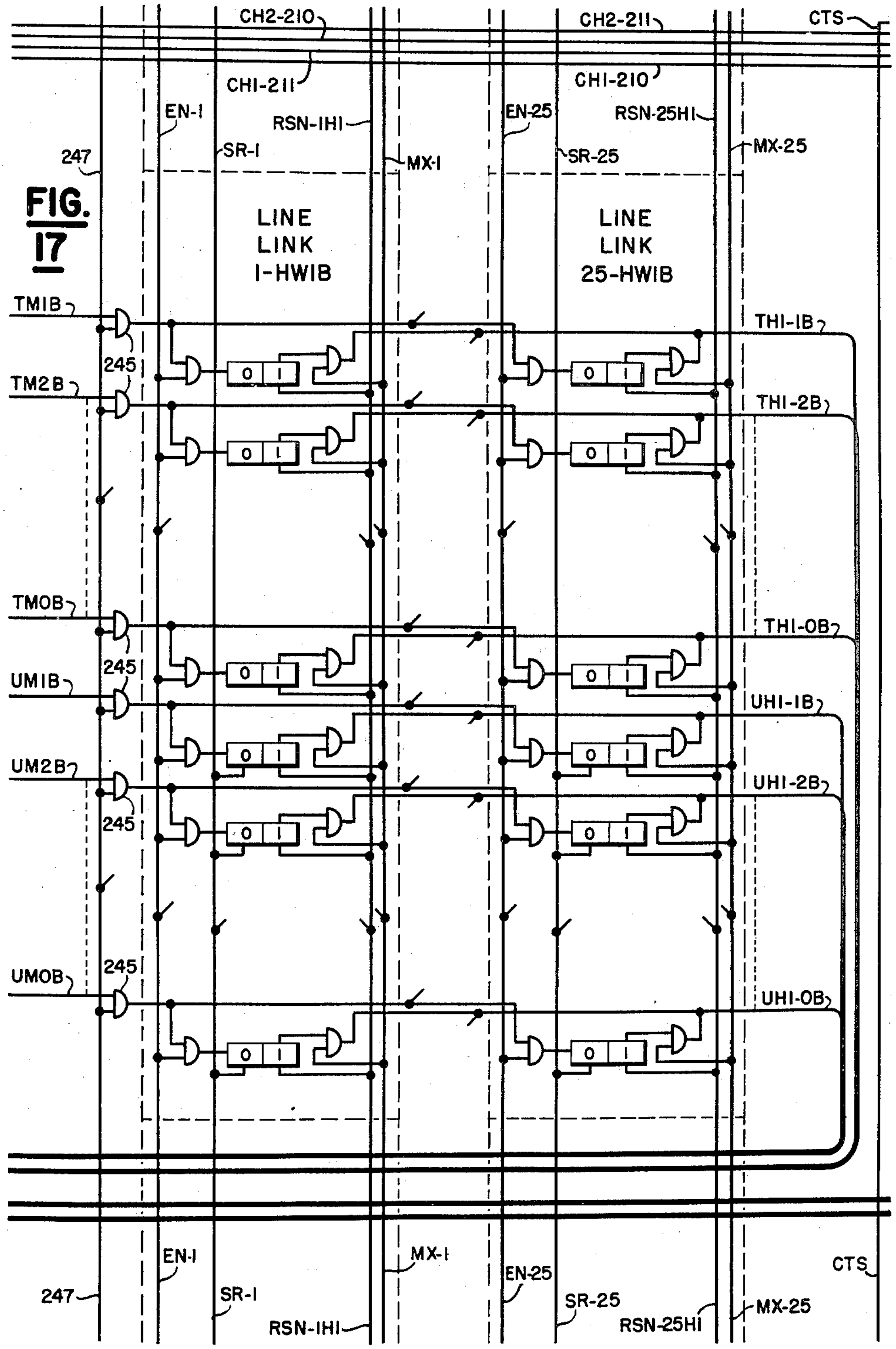
Figure 18:
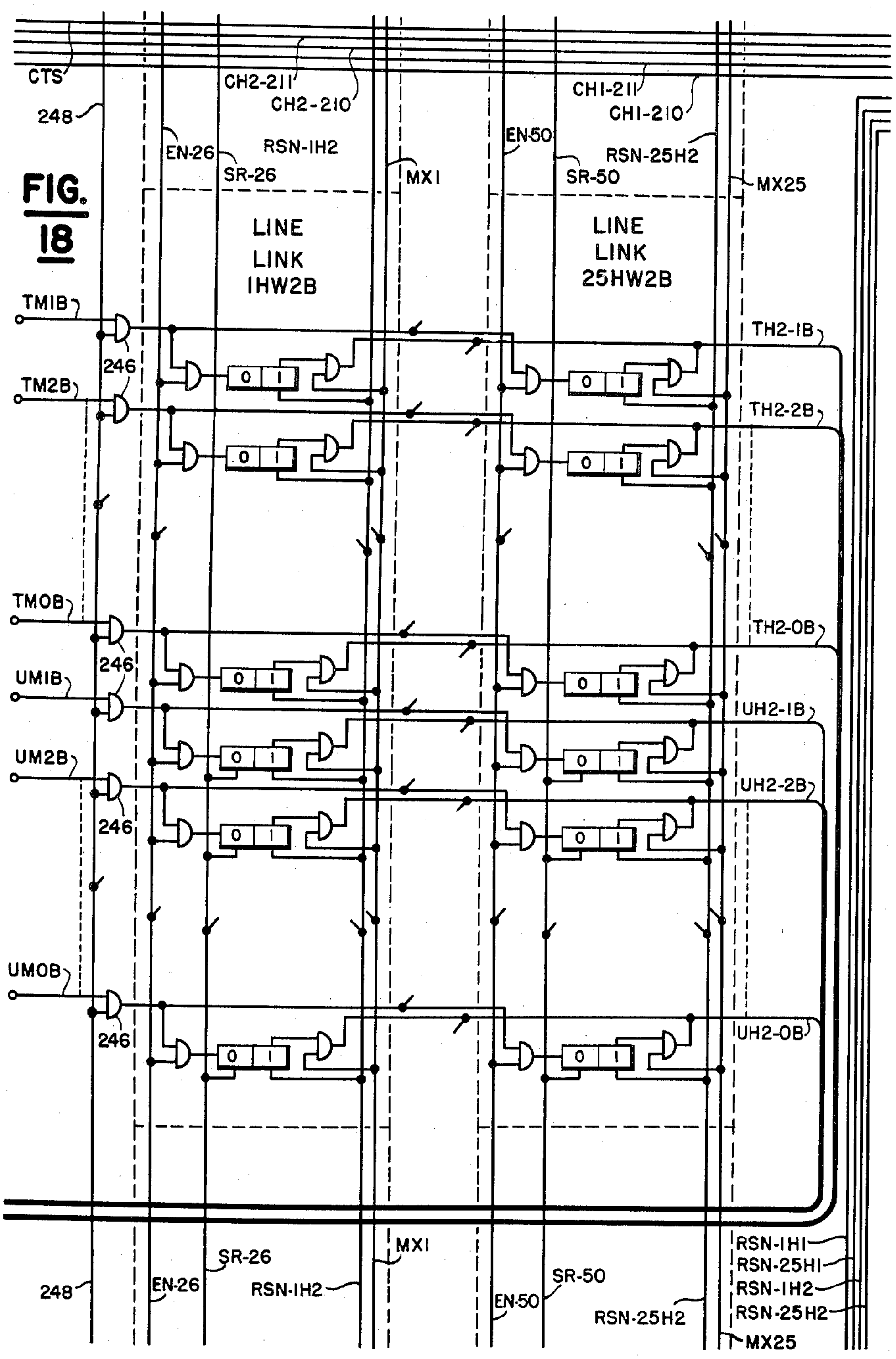
Figure 19:
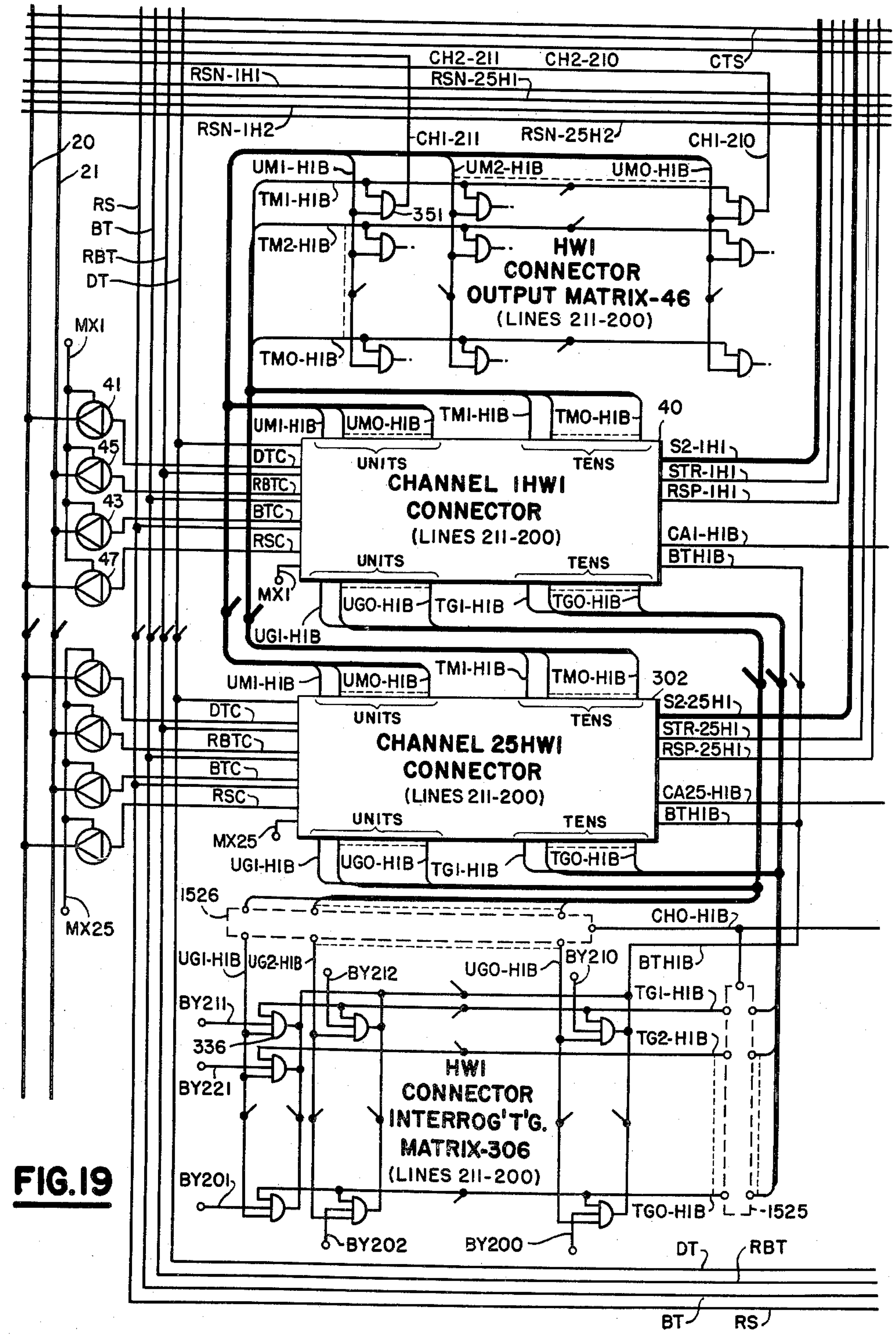
Figure 20:
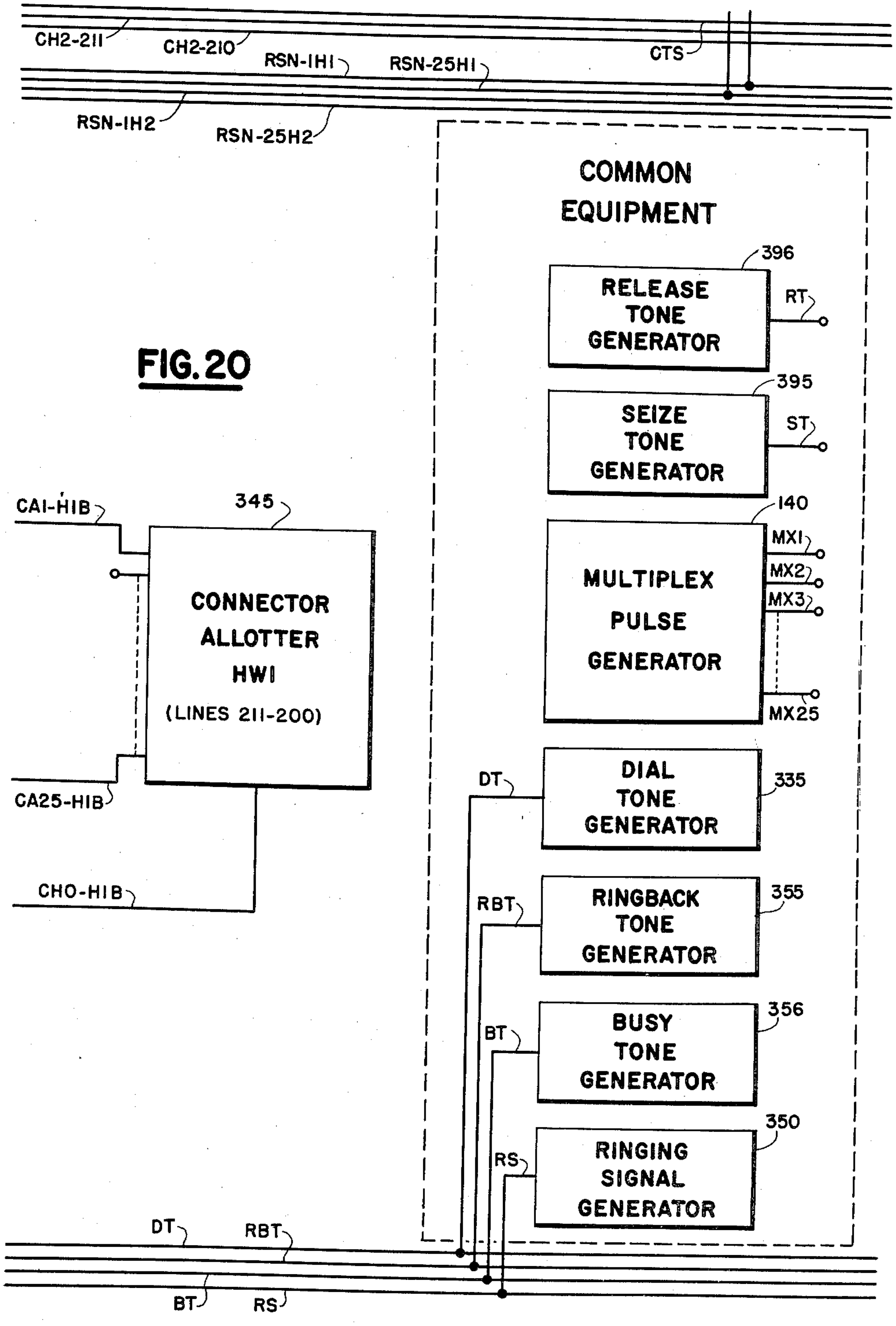
Figure 21:
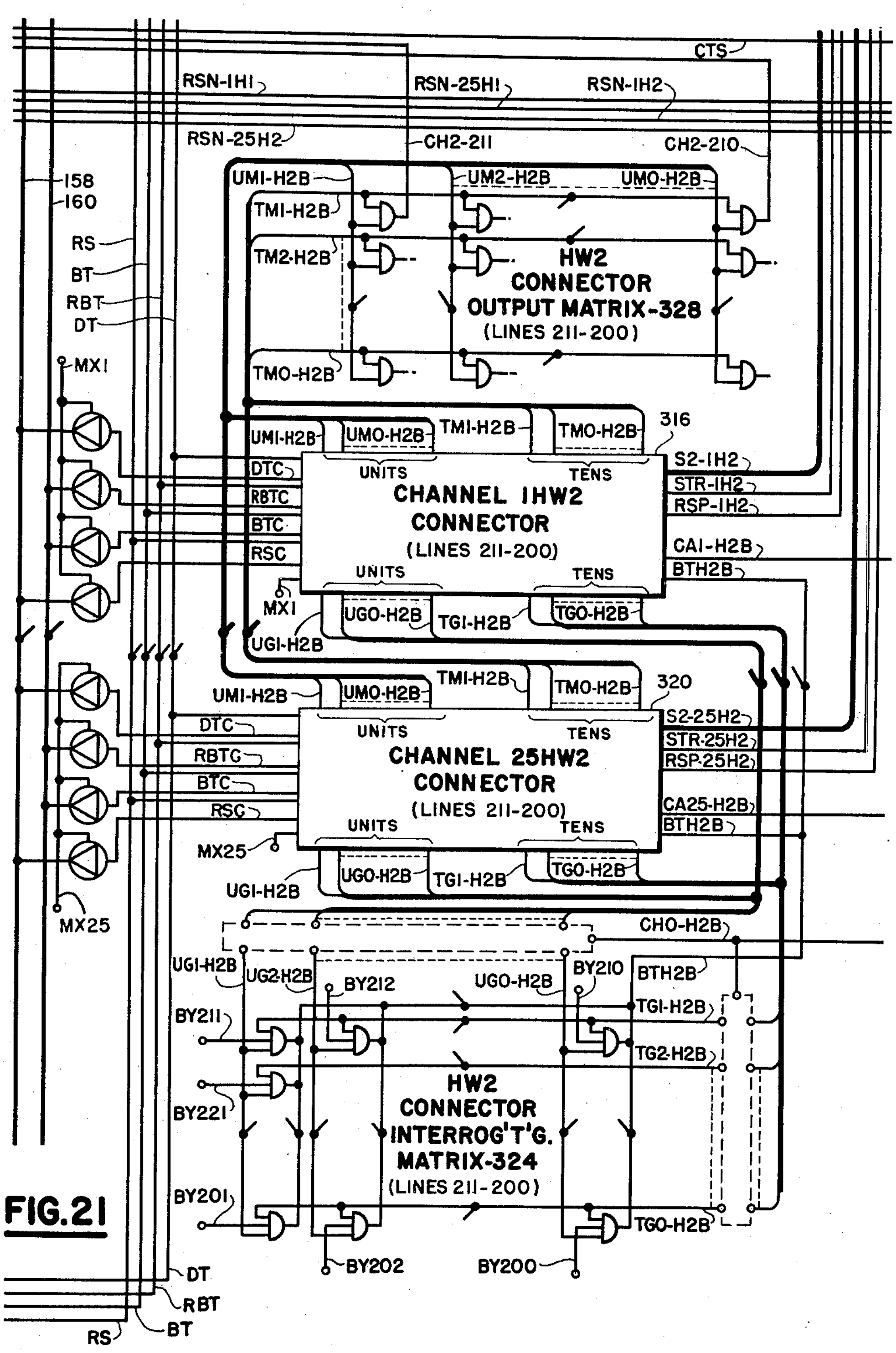
Figures 22, 63, 64, 65, 66, 67:
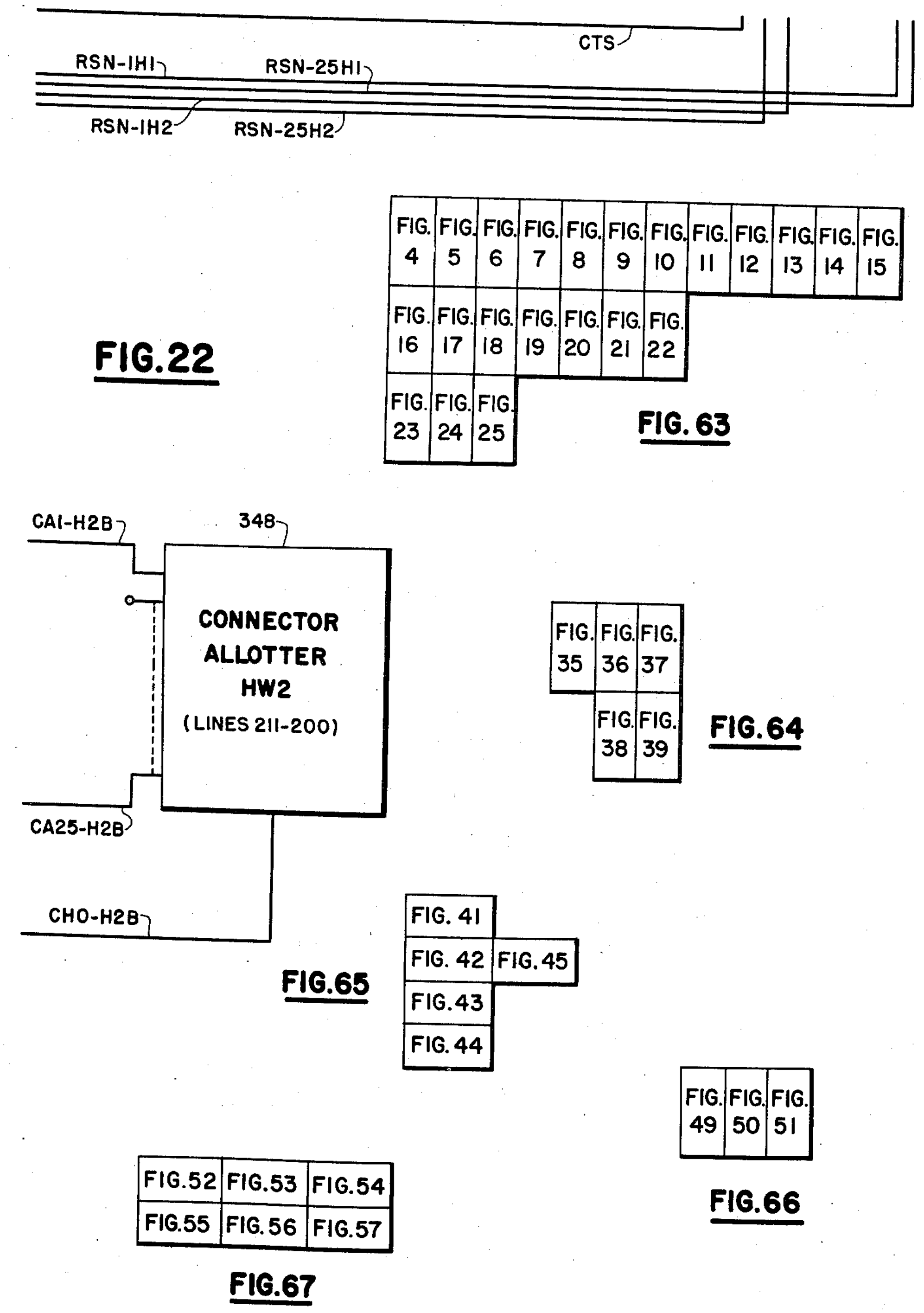
Figure 23:
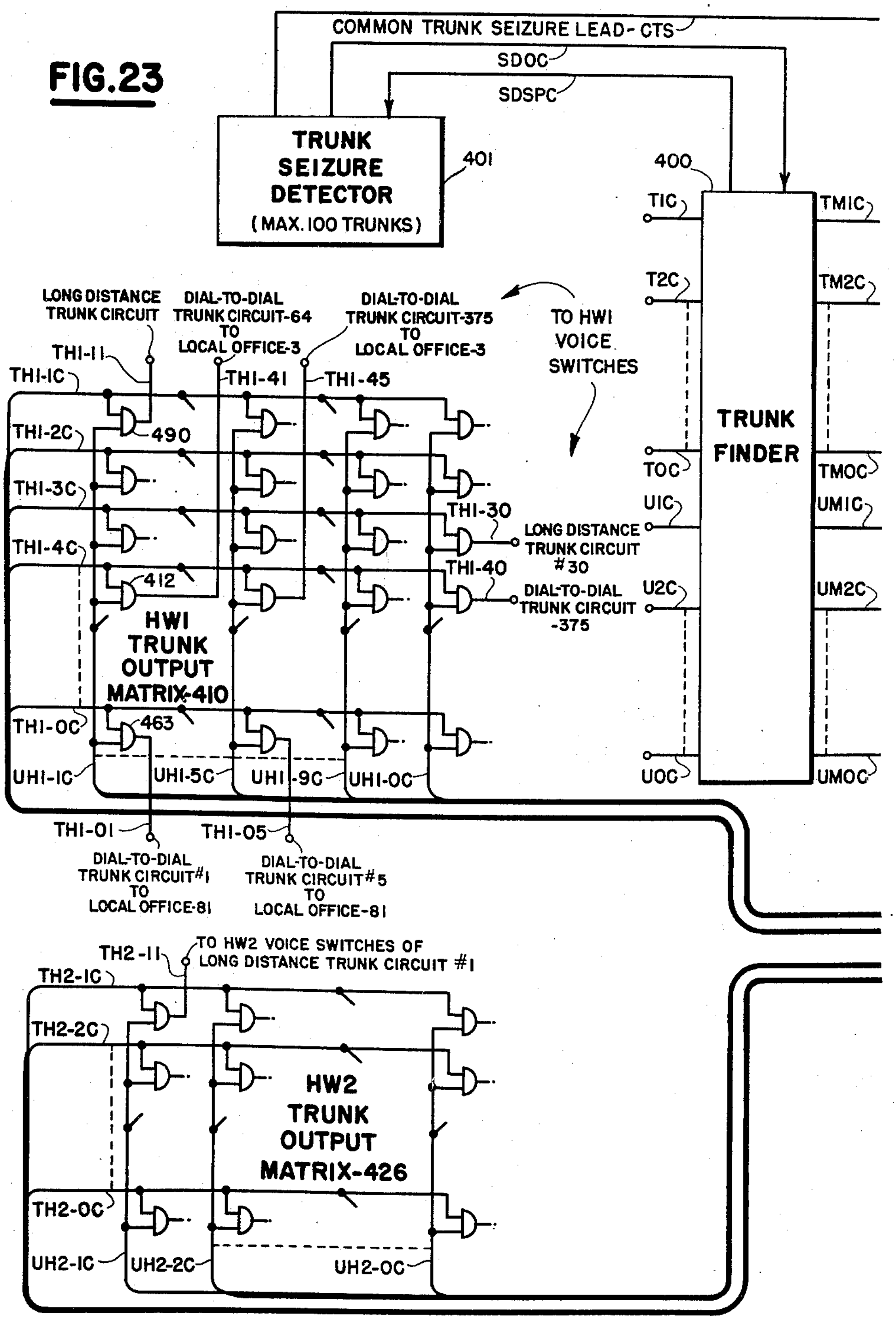

To complete calls over highway No. 2, there is provided a group of twenty-five first selectors of which the first and twenty-fifth are illustrated in Fig. 10 as the selector 310 and the selector 312, respectively. The first selector 310 is connected by way of the conductor S1–1H2 to a connector 314 (Fig. 9) serving the first hundreds group of lines and by way of the conductor S2–1H2 to a connector 316 (Fig. 21) serving the second hundreds line group. In a similar manner the selector 312 is connected by way of the conductor S1–25H2 to a connector 318 serving the first hundreds line group and by way of the conductor S2–25H2 to a connector 320 (Fig. 21)

serving the second hundreds line group. A common connector interrogating matrix 322 is provided for the connectors serving the first hundreds line group and a connector interrogating matrix 324 is provided for the connectors serving the second hundred lines group. A connector output matrix 326 is provided to control the called line voice switches of the lines in the first hundreds group which are connected to highway No. 2 and a connector output matrix 328 (Fig. 21) is provided to control the called line voice switches connected to highway No. 2 from the lines of the second hundreds line group.

Considering now the operation of the selector and connector stages of the system in completing a call and assuming that a call has been initiated at the substation A, the line link 1HW1A has been assigned to the calling line circuit 111 and the voice switches 26 and 27 opened in the MX1 time position as described heretofore, it will be recalled from the description of Figs. 2 and 3 that the first selector 36 is arranged to turn on a dial tone voice switch 42 in the MX1 time position which is permanently assigned to the selector 36. More particularly, a common dial tone generator 335 in the common equipment portion of the system is arranged to provide a dial tone signal which is transmitted over the conductors DT to all of the first selectors of the system. This dial tone signal is also supplied to all of the connectors of the system for reasons to be described in more detail hereinafter. The first selector 36 receives multiplex pulses in the first time position over the MX1 conductor and supplies these multiplex pulses over the selector dial tone conductor SDTC to open the voice switch 42 in the MX1 time position during periods when the first selector is idle. Accordingly, as soon as the calling voice switch 27 is opened the dial tone modulated MX1 pulses are transmitted by way of the line circuit 111 to the subscriber at the substation A who is thereby informed that dialing may be initiated.

Assuming that the subscriber at substation A wishes to call the subscriber at substation E in the second hundreds group when the first digit "2" is dialed the dial frequency combination developed at the subset A is transmitted to the voice switch 26 and since this voice switch is opened only in the MX1 time position MX1 pulses are applied to the send conductors 20 of highway No. 1 which are modulated by the dialing frequency combination representing the digit "2." These dial frequency modulated MX1 pulses are transmitted through the voice switch 44, which is continuously opened in the MX1 position, and over the multifrequency receiver send conductor MFRS to the first selector 36. The multifrequency receiver facilities in the selector 36 function to translate the dial frequency combination into the corresponding digit "2" and this digit is then registered in the first selector 36.

The multifrequency receiver facilities in the first selector 36 also respond to the dial frequency combinations representing the second and third digits "1" and "1" and sequentially and selectively apply control potentials to the individual conductors of the ten conductor cable S2–1H1 in accordance with the corresponding numerical digits. In the connector 40 these control potentials are registered as the second and third digits of the called line and after the called line number is stored a busy test is performed. To this end, each of the line circuits of the system is arranged to supply a busy test potential to the connector interrogating matrix serving the corresponding hundreds line group. More particularly, considering the line circuit 211, this line circuit is provided with facilities which respond to the multiplex pulses used to control the associated calling and called voice switches by changing the potential on the conductor BY211 which is transmitted to a three input and gate 336 in the interrogating matrix 306, a similar three input and gate being provided for each of the other ninety-nine lines in the second hundreds line group served by the matrix 306. This busy test potential on the conductor BY211 is normally negative with respect to ground. However, if the line circuit 211 is occupied as a calling line on highway No. 1 control pulses are supplied to the calling voice switches 198 and 200 in the time position assigned to the particular line link which is being used for the call and these control pulses are employed to change the busy test potential on the conductor BY211 to ground potential. If the subscriber at substation E is being called over highway No. 1 the voice switches 202 and 204 are controlled in a particular time position and the multiplex pulses used for such control of the voice switches 202 and 204 are likewise employed to change the busy test potential on the conductor BY211 to ground.

In order that all twenty-five connectors serving a particular hundreds line group may use a common interrogating matrix, there is provided a connector allotter which is arranged sequentially to enable these connectors to perform the busy test operation. More particularly, a connector allotter 345 is provided for the twenty-five connectors serving the second hundreds line group over highway No. 1 and this allotter is arranged to provide sequential allotting or enabling signals on the twenty-five output conductors CA1–H1B to CA25–H1B, inclusive. A similar connector allotter 346 is provided for the twenty-five connectors serving the first hundreds line group over highway No. 1 and the connector allotters 347 and 348 are provided for the connectors serving the first and second hundreds line groups, respectively, over highway No. 2.

When the second and third digits have been registered in the connector 40 and an allotter signal is transmitted to this connector over the conductor CA1–H1B, facilities are provided in this connector for transmitting tens and units gating potentials, representing the tens and units number designation of the called line over particular conductors of the tens and units gating cables TG–H1B and UG–H1B to the common connector interrogating matrix 306. Thus, if the called line is line 211, a tens gating potential is transmitted from the connector 40 over the conductor TG1–H1B to one input of the and gate 336 and a units gate potential is transmitted by way of the conductor UG1–H1B to another input of the gate 336, the third input of this gate being the busy test conductor BY211.

If the called line 211 is idle an output is derived from the and gate 336 which is connected by way of the common busy test conductor BTH1B, which is common to all one hundred and gates of the interrogating matrix 306, and is multipled to all of the connectors serving the second hundreds line group over highway No. 1. The transmission of an idle control potential over the conductor BTH1B to the connector 40 indicates that the called line is idle and switch-through occurs in this connector. When switch-through occurs in the connector 40 this connector supplies connector matrix pulses in the MX1 time position to the connector output matrix 307 over individual conductors of the tens and units matrix pulse cables TM–H1B and UM–H1B corresponding to the tens and units numerical designation of the called line. Thus, if the line 211 is called, the connector 40 transmits connector matrix pulses in the MX1 time position over the tens matrix pulse conductor TM1–H1B to one input of the and gate 351 in the connector output matrix 46 and also transmits connector matrix pulses in the MX1 time position over the units matrix conductor UM1–H1B to the other input of the gate 351.

The connector output matrix 46 is similar to the link output matrix 34 described heretofore and is provided with one hundred and gates individually corresponding to the lines in the second hundreds line group, the and gate 351 corresponding to the line 211. When the tens and units matrix pulses applied to any one of the and gates in the connector matrix 46 coincide this and gate is opened and supplied matrix output pulses in the corresponding time position to the called voice switches of the corresponding line circuit. Thus, when the gate 351 is opened matrix output pulses are transmitted in the MX1 time position over the conductor CH1–211 to the called voice switches 202 and 204 associated with the line circuit 211 so that these voice switches are opened in the MX1 time position. At the same time the connector 40 functions to transmit a ringing signal to the called line 211 and a ringback tone signal to the calling subscriber at substation A. More particularly, when switch-through occurs in the connector 40 a suitably modulated or interrupted ringing control signal which is derived from the ringing signal generator 350 in the common equipment portion of the system, is supplied by way of the ringing signal control conductors RSC to the ringing signal voice switch 47 which is continuously supplied with MX1 pulses. Accordingly, the voice switch 47 is opened in the MX1 time position and ringing control signal modulated MX1 pulses are coupled to the send conductors 20 of highway No. 1 and are transmitted through the voice switch 204 to the line circuit 211 wherein the ringing control signal is demodulated and is transmitted over the receive pair of line conductors to the subscriber's subset wherein an audible ringing signal is developed and energizes a transducer in the subset to inform the called subscriber that his line is being called.

The connector 40 also supplies a ringback tone voice switch 45 with a ringback tone signal over the conductors RBT, which is derived from the ringback tone generator 355 in the common equipment portion of the system, and the voice switch 45 is continuously opened by MX1 pulses so that ringback tone modulated MX1 pulses are transmitted to the receive conductors 21 of highway No. 1. These ringback tone signal modulated MX1 pulses are transmitted through the voice switch 27 to the line circuit 111 wherein the ringback tone signal is demodulated and is transmitted over the receive pair of line conductors H1*b* to the subscriber at substation A so that this subscriber is informed that the called line is being rung.

When the subscriber at substation E answers the call and comes off-hook his subset is arranged to transmit a seizure tone signal over the send line conductors to the line circuit 211 and this seizure tone signal is applied to the voice switch 202. The voice switch 202 is opened in the MX1 time position by means of the matrix output pulses transmitted to this voice switch over the conductor CH1–211 so that seizure tone modulated MX1 pulses are supplied to the receive conductors 21 of highway No. 1 and these seizure tone modulated MX1 pulses are transmitted through the voice switch 44, which is continuously opened in the MX1 time position, to the first selector 36.

The multifrequency receiver facilities in the first selector 36 respond to this seizure tone signal by transmitting a seizure tone removal signal over the conductor STR–1H1 to the connectors 38 and 40 associated with the first selector 36. In the connector 40 this seizure tone removal signal is employed to close the ringing control signal voice switch 47 and the ringback tone signal voice switch 45 so that ringing control signal transmission to the called subscriber and ringback tone signal transmission to the calling subscriber is terminated. However, at the subset of the called subscriber the seizure tone signal continues until this subset receives a dial tone signal. Accordingly, when a seizure tone removal signal is received by the connector 40 this connector functions to transmit a dial tone signal, which is derived from the dial tone generator 335, over the conductors DTC to the voice switch 41 which is continuously opened in the MX1 time position so that dial tone modulated MX1 pulses are applied to the send conductors 20 of highway No. 1. These dial tone modulated pulses are then transmitted through the voice switch 204 and the dial tone signal is demodulated and supplied over the receive pair of line conductors to the subset at substation E so that transmission of a seizure tone signal from this subset is terminated. When this occurs all tone signal transmission over highway No. 1 in the MX1 time position is terminated and a two-way multiplex transmission path is provided in the MX1 time position on highway No. 1 through the calling voice switches 26 and 27 associated with the line circuit 111 and the called voice switches 202 and 204 associated with the line circuit 211.

If the called line 211 is busy, no idle signal is transmitted from the line circuit 211 to the three input and gate 336 in the interrogating matrix 306. Accordingly, when the busy test is performed by the connector 40 switch-through is prevented due to the absence of an idle signal on the conductor BTH1B with the result that the ringing signal voice switch 47 and the ringback tone voice switch 45 are not supplied with their respective ringing control and ringback tone signals. However, the connector 40 functions to transmit a busy tone signal, which is derived from the busy tone generator 356 in the common equipment portion of the system over the conductors BTC to the voice switch 41 which is continuously opened in the MX1 time position so that busy tone modulated MX1 pulses are impressed upon the receive pair of conductors 21 of highway No. 1. These busy tone modulated MX1 pulses are then transmitted through the voice switch 27 to the line circuit 111 wherein the busy tone is demodulated and transmitted over the receive pair of line conductors to the substation A so that the calling subscriber is informed that the called line is busy. Also, the connector 40 does not transmit tens and units matrix pulses to the connector output matrix 46 so that the called voice switches 202 and 204 associated with the called line circuit 211 are not opened in the MX1 time position.

When the call is completed and the subscriber at either the substation A or the substation E hangs up, the subscriber's subset is arranged to provide a release tone signal of approximately ninety milliseconds duration. This release tone signal is transmitted by way of the send pair of line conductors to the associated line circuit. Assuming that the subscriber at substation A hangs up first, this release tone is transmitted to the voice switch 26 wherein it is modulated on the MX1 pulses controlling this voice switch so that release tone signal modulated MX1 pulses are impressed upon the send conductors 20 of highway No. 1. These release tone modulated MX1 pulses pass through the voice switch 44 to the multifrequency receiver facilities in the first selector 36 wherein they are detected and a corresponding control signal is transmitted by way of the conductor RL–1H1 to the release circuit 56. On the other hand, if the subscriber at substation E hangs up first a release tone signal is transmitted to the voice switch 202 wherein it is modulated on the MX1 pulses controlling this voice switch so that release tone signal modulated MX1 pulses are impressed upon the receive conductors 21 of highway No. 1. These release tone modulated MX1 pulses are transmitted through the voice switch 54, which is continuously opened in the MX1 time position, and over the multifrequency receiver receive conductor MSRR to the release circuit 56 which is provided with multifrequency receiver facilities which respond to the frequency combination representing the release signal.

The release circuit responds to this release tone signal or to the control signal transmitted over the conductor RL–1H1 by developing both a positive and a negative release pulse of approximately five hundred microseconds duration. The positive release pulse is transmitted by way of the conductor RSP–1H1 to the connectors 38 and 40 and functions to reset certain of the circuits therein. This positive release pulse is also transmitted to the first selector 36 to reset certain portions thereof. The negative release pulse developed by the release circuit 56 is transmitted by way of the conductor RSN–1H1 to the connectors 38 and 40 to reset certain of the circuits therein and is also transmitted by way of this conductor to the line link 1HW1A so that the flip-flops 250 and 253 which were employed to register the identity of the calling line 111 are reset to their original positions. When this occurs the line link 1HW1A functions to transmit a control potential over the set-reset conductor SR-1 to the allotter 32 to inform this allotter that the line link 1HW1A is again idle and may be used to register the identity of another calling line. Accordingly, all of the system components employed to establish a connection in the MX1 time position on highway No. 1 are reset to their idle condition to handle a succeeding call.

The selector 36 is also provided with timing circuit facilities which continuously function to transmit a control pulse to the release circuit 56 over the conductor T0-1H1 every three minutes during periods when the first selector 36 is not actively occupied with a call. More particularly, the transmission of speech signal frequencies through the voice switch 44 which are outside the range of frequencies used for dialing is employed in the first selector 36 to inhibit the timing circuit facilities thereof so that no control pulse is supplied over the conductor T0-1H1 to the release circuit 56. In a similar manner, if speech frequency signals outside the dialing range are present on the receive conductors 21 of highway No. 1 they pass through the voice switch 54 to the release circuit 56 and this circuit responds by providing a control signal on the conductor VG-1H1 which is transmitted to the timing circuit facilities in the first selector 36 and inhibits the same so that no control pulse is produced on the conductor T0-1H1. The release circuit 56 responds to a control pulse on the conductor T0-1H1 by developing positive and negative release pulses in the conductors RSP-1H1 and RSN-1H1, which function to release the associated equipment in the manner described heretofore.

In addition to the above described local call, the facilities of local office 1 shown in Figs. 4 to 25, inclusive, are also arranged to set up calls between the local office 1 and other ones of the local offices illustrated in Fig. 1 and are also arranged to set up calls through one or more long distance switching centers to other local offices. In addition, the attendant's cabinet 59 is provided in the local office 1 for completing incoming calls from the long distance switching center 10 and also to provide an information point for local subscribers within the local office 1.

Assuming that the subscriber at substation A wishes to place a call to the subscriber at substation B in local office 3, when the subscriber at substation A comes off-hook the line circuit 111 is associated with one of the line links in the manner described above and the voice switches 26 and 27 associated therewith are opened. Assuming that the line link 1HW1A is seized so that the voice switches 26 and 27 are opened in the MX1 time position, the subscriber hears a dial tone signal and is thus informed that dialing may be initiated. In order to establish a call to the local office 3 the subscriber in local office 1 is required to dial an arbitrarily assigned prefix digit, which may, for example be "3," which is used to gain access to one of a number of dial-to-dial four wire trunks extending between the local office 1 and the local office 3. When the subscriber dials a digit of "3," it being recalled that each digit is represented by a combination of voice frequency signals, this digit is transmitted through the voice switch 44 and is registered in the first selector 36 in the manner described heretofore in connection with a local call. The first selector 36 responds to the registration of the digit "3" by providing a single MX1 pulse on the conductor S3-1H1 which is connected to all of the dial-to-dial trunk circuits associated with the dial-to-dial trunks extending to the local office 3. In the illustrated embodiment the first and tenth ones of the dial-to-dial trunk circuits are shown in the drawings as the trunk circuits 64 and 375. Each of these dial-to-dial trunk circuits includes a series of fifty flip-flop circuits, one for each first selector of the system and the MX1 pulse developed in the seized first selector is impressed upon input and gates associated with a corresponding one of these flip-flop circuits in each of the trunk circuits. Thus, the trunk circuit 64 is provided with a first series of twenty-five flip-flop circuits corresponding to the twenty-five first selectors associated with highway No. 1, the first flip-flop 376 and the twenty-fifth flip-flop 377 thereof being illustrated in the drawings. The trunk circuit 64 is provided with a second series of twenty-five flip-flops, the first flip-flop 379 and the twenty-fifth flip-flop 380 thereof being shown in the drawings, this second group of flip-flops being provided for the group of twenty-five selectors associated with highway No. 2. In the trunk circuit 375 the flip-flop 381 is provided corresponding to the first selector 36, the flip-flop 382 is provided corresponding to the first selector 300, the flip-flop 383 is provided corresponding to the first selector 310 and the flip-flop 384 is provided corresponding to the first selector 312.

The MX1 pulse impressed upon the conductor S3-1H1 by the first selector 36 is supplied as one input to an input and gate 385 associated with the flip-flop 386 and to an input and gate 386 associated with the flip-flop 381, it being understood that this MX1 pulse would be applied to similar input and gates associated with the corresponding flip-flop circuits in the second to ninth trunk circuits which are not shown in the drawings.

A trunk allotter 390 is provided to allot different ones of the dial-to-dial trunk circuits serving local office 3 to the use of different calling lines. To this end the allotter 390 provides an enabling potential for only one of these dial-to-dial trunk circuits at a time and when the enabled trunk circuit is seized by a calling line the allotter 390 functions to supply an enabling potential to another trunk circuit to prepare it for use. More particularly, the allotter 390 normally provides an enabling potential on the trunk enabling conductor TEN-1 which is connected to one input of all of the input and gates in the trunk circuit 64. Accordingly, when an MX1 pulse is developed on the conductor S3-1H1, both inputs of the and gate 385 are present and this gate is opened so that the flip-flop 376 is set.

As soon as the flip-flop 376 is set in the trunk circuit 64 a control signal is transmitted over the trunk set-reset conductor TSR-1 to the trunk allotter 390 and this allotter responds thereto by removing the enabling potential from the conductor TEN-1 so that none of the other flip-flops in trunk circuit 64 can respond to multiplex pulses which may be supplied to the input and gates by other selectors. The allotter 390 also provides an enabling potential on the corresponding enabling conductor of the next trunk circuit. At the same time, the trunk circuit 64 is provided with facilities for developing a seizure tone control potential which is transmitted over the conductor TSTC-1 to the trunk circuit 64 and is employed to open a seizure tone gate 70 for a brief period so that a seizure tone signal is impressed upon the receive conductors 60 of the dial-to-dial trunk line extending to the local office 3. In the local office 3 this seizure tone signal is employed to seize one of the idle time positions provided on the pulse multiplex highways of this local office and to prepare the corresponding first selector to receive the subsequently dialed digits corresponding to the number of the called line in local office 3.

When the flip-flop 376 is set the trunk circuit 64 is thereafter connected to highway No. 1 in the MX1 time position. More particularly, the multiplex output and gate 391 associated with the flip-flop 376 receives MX1 pulses as one input thereof and when the flip-flop 376 is set this gate is opened and MX1 pulses are transmitted through a twenty-five input or gate 392 and are employed to control the trunk calling voice switches 66 and 68 over the dial-to-dial trunk control conductor DDH1. Accordingly, the voice switches 66 and 68 are opened in the MX1 time position and when the calling subscriber dials the number of the called line in local office 3 the resulting dial frequency modulated MX1 pulses on highway No. 1 are transmitted through the voice switch 68 and are supplied to the receive pair of conductors 60 of the first dial-to-dial trunk line extending to local office No. 3. Assuming that the line associated with substation B in local office 3 is assigned number 211, when the successive digits of "2," "1" and "1" are dialed by the calling subscriber the corresponding dial frequencies are transmitted over the receive conductors 60 of the dial-to-dial trunk to the local office 3 and are registered in this local office in a manner identical to that described heretofore in connection with the completion of a call to line 211 in local office 1, it being understood that a seizure tone signal has already been transmitted over the receive conductors 60 to local office 3 so that a first selector in the local office 3 is seized and prepared for use by the calling line in local office 1.

When the call is completed in local office 3 a two-way communication connection is provided between the calling subscriber in local office 1 and the called subscriber in local office 3, this path including the voice switches 26, 27 associated with the line circuit 111, the voice switches 66, 68 associated with the dial-to-dial trunk circuit 64, and the voice switches associated with the terminating trunk circuit and the called line in local office 3 In this connection it will be understood that the pulse time position employed in local office 1 to establish this communication path may be different from the pulse time position employed in the local office 3 since there is no interconnection or synchronism of the pulse time positions provided at each local office.

When the above described call to the local office 3 is completed, if the calling subscriber at substation A in local office 1 hangs up first a release tone is generated in his subset which is transmitted over the send pair of line conductors to the line circuit 111 and is transmitted by way of the voice switches 26 and 44 to the first selector 36 which responds thereto by supplying a control signal over the conductor RL–1H1 to the release circuit 56 so that the flip-flop circuits in the first selector 36, and the line link 1HW1A are reset to their idle positions. The negative release pulse developed by the release circuit 56 is also transmitted by way of the conductor RSN–1H1 to the flip-flop circuit 376 in the trunk circuit 64 so that this flip-flop circuit is also reset to its idle condition. When the flip-flop 376 is reset a reset control potential is supplied over the conductor TSR–1 to the trunk allotter 390 and this allotter functions to provide a release tone control signal over the conductor TRTC–1 to the trunk circuit 64 which is employed to open the release tone gate 72, which is supplied with a release tone signal over the conductor RT from the release tone generator 396 in the common equipment portion of the system. The release tone gate 72 is thus opened for a brief interval of time during which a release tone signal is impressed upon the receive pair of conductors 60 of the first dial-to-dial trunk line extending to the local office 3. This release tone signal is transmitted to this local office 3 wherein it is impressed upon the release circuit corresponding to the multiplex time position employed to complete the call in local office 3 so that the facilities associated with the call in local office 3 are likewise reset to their idle positions and all links are conditioned to set up another call.

Assuming now that a subscriber at local office 3, such as the subscriber at substation B, wishes to place a call to a subscriber at local office 1, the subscriber at substation B will dial the prefix digit assigned to local office 1 and will thereby gain access to a dial-to-dial trunk line extending between local office 3 and local office 1, in a manner identical to that described above in connection with the completion of a call in the opposite direction.

In order to assign a time position to a particular trunk circuit on a call incoming to this trunk circuit from another local office or from the long distance switching center 10, all of the dial-to-dial and long distance trunk circuits are arbitrarily assigned different numbers and a trunk finder 400 is provided, the trunk finder 400 being similar to the line finder 30 and being arranged to provide tens pulses on the conductors T1C, T2C, to T0C, inclusive, and units pulses on the conductors U1C, U2C to U0C, inclusive, individual ones of these conductors being connected to the corresponding trunk circuits in accordance with the numerical designation thereof. Thus, the ten trunk circuits associated with the dial-to-dial trunk lines between local office 1 and local office 3 are arbitrarily assigned the numbers 41 to 40, inclusive, and the fourth tens conductor T4C and the first units conductor U1C are connected to the trunk circuit 64. When a seizure tone signal is received from the local office 3 over the send pair 62 of the trunk line conductors, facilities are provided in the trunk circuit 64 for developing a seizure potential on the common trunk seizure conductor CTS when the tens pulse appearing on the conductor T04 coincides with the units pulse on the conductor U1C. This trunk seizure potential is transmitted by way of the conductor CTS to a common trunk seizure detector 401, which is similar to the seizure detector 230 described heretofore in connection with the first hundreds group of lines, and the trunk seizure detector 401 supplied an output potential over the conductor SDOC to the trunk finder 400 so that corresponding marking potentials are developed on the tens and units marking conductors of the trunk finder 400. Thus, if the trunk circuit 64, which is assigned number "41" has been seized on an incoming call, a marking potential is produced on the tens trunk marking conductor TM4C and on the units trunk marking conductor UM1C.

In order to associate a trunk circuit with any one of the twenty-five time positions on highway 1 a series of twenty-five trunk links are provided, the first and twenty-fifth of which are illustrated as the trunk links 1HW1C and 25HW1C. Also, to associate the trunk circuit with the twenty-five time positions of highway No. 2 a second set of twenty-five trunk links are provided, the first and twenty-fifth of which are illustrated as the trunk links 1HW2C and 25HW2C. These trunk links and the line links associated with each hundreds line group of the system are all controlled by the same enabling potentials developed by the line link and trunk link allotter 32. Accordingly, if the line link 1HW1A, for example, is seized by a calling line in the first hundreds group, as described heretofore, the enabling potential is removed from the conductor EN–1 so that the trunk link 1HW1C, which is also controlled by the enabling potential on the conductor EN–1, is not permitted to be seized at the same time. On the other hand, if the trunk link 1HW1C is seized by a trunk circuit on a call incoming to the local office 1, the corresponding line links 1HW1A and 1HW1B, in the first and second hundreds group are not permitted to be seized by calling lines in these groups. Accordingly, a particular time position cannot be seized by one of the trunk circuits on a call incoming to the local office 1 when the same time position is being used within the local office 1 for a locally initiated call. Assuming that an enabling potential is impressed upon the conductor EN–1, so that the trunk link 1HW1C is conditioned to receive an incoming trunk call, when the number of the seized trunk is marked by the trunk finder 400, the corresponding ones of the flip-flop circuits in the trunk link 1HW1C are set in a manner identical to that described in detail above in connection with the line link 1HW1A. In the illustrated incoming call which is terminated by the trunk circuit 64 which is assigned number 41, the fourth tens flip-flop in trunk link 1HW1C would be set and the first units flip-flop 405 of this trunk link would also be set.

When one of the units flip-flops in the trunk link 1HW1C is set a set control potential is transmitted over the conductor SR–1 to the allotter 32 and this allotter functions to remove the enabling potential from the conductor 247 so that the and gates 245 associated with the highway No. 1 linkage are closed and the tens and units marking potentials developed by the trunk finder 400 when the next trunk is seized on an incoming call cannot be transmitted to any of the trunk links serving highway No. 1. At the same time an enabling potential is impressed upon the conductor 248 by the allotter 32 so that the and gates 246 are prepared for the next tens and units marking potentials and an enabling potential is impressed upon the conductors EN–26 so that the first highway No. 2 trunk link 1HW2C is prepared for the next incoming call on one of the trunks.

Each of the flip-flop circuits in the trunk link 1HW1C is provided with a multiplex output and gate and MX1 pulses are supplied to all of these multiplex output and gates. Accordingly, when the tens and units flip-flops corresponding to the numerical designation of the seized trunk circuit are set, the MX1 pulses passed by the set tens and units flip-flops in the trunk link 1HW1C are transmitted by way of the corresponding tens and units output conductors to a trunk output matrix 410 comprising a group of two input and gates corresponding in number to the total number of two-way trunks provided in local office 1, these and gates being similar to those provided in the link output matrix 34 and connector output matrix 46 described heretofore. Specifically, when MX1 pulses are applied to the tens output conductor TH1–4C and MX1 pulses are simultaneously applied to the units output conductor UH1–1C the and gate 412 in the matrix 410 is opened so that MX1 pulses are transmitted over the conductor TH1–41 to the voice switches 414 and 416 which connect the dial-to-dial trunk circuit 64 to the receive conductors 21 and the send conductors 20, respectively, of highway No. 1. Accordingly, these voice switches are opened in the MX1 time position and succeeding digits which are dialed by the calling subscriber in local office 3 are transmitted over the send pair 62 of the dial-to-dial trunk line, and are impressed upon the voice switch 416 so that correspondingly modulated MX1 pulses are impressed upon the send conductors 20 of highway No. 1. The voice switch 44 associated with the first selector 36 is continuously opened in the MX1 time position and hence the dial frequency modulated pulses thus impressed upon the send conductors 20 of highway No. 1 through the dial-to-dial trunk circuit 64 pass to the first selector 36, the first digit is registered therein and the remaining digits are employed to establish a connection to the called line in a manner identical to that described above in connection with a local call originating within the office 1.

When a call originating in local office 1 and intended for one of the other local offices is assigned a time position on highway No. 2, the seized first selector supplies a signal multiplex pulse to one of the group of twenty-five flip-flop circuits serving highway No. 2 in each dial-to-dial trunk circuit. Thus, if the first selector 310 is seized, and a first digit "3" is dialed indicating a call to local office 3, an MX1 pulse is supplied over the conductor S3–1H2 to the first one of the flip-flops in the highway No. 2 group, which include the flip-flop 379 in trunk circuit 64 and the flip-flop 383 in trunk circuit 375. Assuming that the trunk circuit 64 is enabled by the allotter 390, the MX1 pulses passed by the output and gate 418 associated with the flip-flop 379 is passed through a twenty-five input or gate 420 and over the conductor DDH2 to control the voice switches 422 and 424 which connect the trunk circuit 64 to the send conductors 158 and receive conductors 160 of highway No. 2, respectively. Accordingly, succeeding digits dialed by the subscriber in local office 1 pass through the voice switch 422 and over the receive conductors 60 of the first dial-to-dial trunk line to the local office 3 wherein the first call is completed in the manner described above.

If a call incoming to the trunk circuit 64 is assigned a time position on highway No. 2 one of the trunk links serving highway No. 2 is seized by the trunk finder 400. Assuming that the trunk link 1HW2C is seized, and that the line 211 is called in local office 1, marking potentials are impressed upon the tens and units output conductors TH2–4C and UH2–1C which are supplied to a trunk output matrix 426 and are simultaneously applied to the and gate thereof corresponding to the trunk circuit 64. When this and gate is opened by the MX1 pulses supplied by trunk link 1HW2C these MX1 pulses are transmitted by way of the conductor TH2–41 from the trunk output matrix 426 to the voice switches 428 and 430 which connect the trunk circuit 64 to the receive conductors 60 and send conductors 158, respectively, of highway No. 2. Accordingly, the voice switch 430 is opened in the MX1 time position so that digits dialed by the calling subscriber in local office 3, which are transmitted over the send conductors 62 of the dial-to-dial trunk line, pass through the voice switch 430 to the send conductors 20 of highway No. 2 and are transmitted through the voice switch 432 to the first selector 310 so that the call can be completed in the manner described heretofore within local office 1.

While a group of only ten dial-to-dial trunks have been illustrated as connected between the local office 1 and the local office 3 in the illustrated embodiment, it will be understood that a larger number of trunks may be provided between these offices, any one of which can be reached by dialing "3" at the local office 1. A group of similar dial-to-dial trunk lines are provided between the local office 1 and each of the local offices 4, 5, 6, 7 and 81, and each of these trunk lines would have a dial-to-dial trunk circuit provided therefor in each local office similar to the trunk circuit 64 described heretofore. Thus, a group of ten dial-to-dial trunk circuits could be provided for local office 4 having the arbitrary numbers 51 to 50, inclusive, assigned thereto, a group of ten trunk circuits identified as circuits 61 to 60, inclusive, could be provided for local office 5, a group of ten trunk circuits identified as 71 to 70, inclusive, could be provided for local office 6 and a group of ten trunk circuits identified as 81 to 80, inclusive, could be provided for local office 7.

In some instances the number of local offices may be greater than the number of first selector levels in a particular local office. When this occurs it is necessary to provide a second selector stage in a local office so that other local offices may be identified by both a first and second prefix digit. To illustrate such an arrangement, a group of five dial-to-dial trunks are illustrated as extending from the local office 1 to a local office 81 which is reached by dialing successive prefix digits of "8" and "1." The first prefix digit is registered in the manner described in detail heretofore in the first selector which is seized by the calling line. In order to register the second prefix digit of "1" each first selector is provided with a second selector stage, associated with the eighth level of the first selector, in which the second prefix digit is registered. More particularly, the first selector 36 is connected by way of a ten conductor cable S8–1H1 to a second selector 440 and the first selector 300 is connected by way of the cable S8–25H1 to a second selector 442. In a similar manner the first selector 310 associated with highway No. 2 is connected by way of the conductor S8–1H2 to a second selector 444 and the twenty-fifth selector 312 associated with highway No. 2 is connected by way of the conductor S8–25H2 to a second selector 446. Each of these second selectors is provided with a series of ten output conductors identified as SS1 to SS0, inclusive, following which is the identification of the time position and highway associated therewith. Thus, the second selector 440 is provided with the output conductors SS1–1H1 to SS0–1H1, inclusive.

Assuming that a subscriber in local office 1 wishes to place a call to a subscriber in local office 81, and assuming further that the first selector 36 is seized on this call, the first digit "8" is registered in the first selector 36. The second digit "1" is employed in the second selector 440 to seize one of a group of trunk circuits associated with four wire dial-to-dial trunk lines extending to local office 81. In the illustrated embodiment a series of five such trunk lines are provided and the illustrated trunk circuit 450 is associated with the first of these trunk lines and the trunk circuit 452 is associated wtih the fifth of these trunk lines. When the second digit "1" is dialed, the first selector 36 supplies a control signal over the corresponding one of the conductors to the cable S8–1H1 to the second selector 440 and this selector in turn provides a control signal on the corresponding one of the output conductors SS1–1H1 to SS0–1H1, inclusive, which is transmitted to the first flip-flop circuit in each of the five trunk circuits serving the local office 81. These trunk circuits are controlled by a trunk allotter 455 which functions in the manner identical to the allotter 390 to enable the acsociated trunk circuits to handle successive incoming or outgoing calls to the local office 81. Assuming that the trunk circuit 450 is enabled by the allotter 455, the flip-flop 457 therein is set and MX1 pulses which are passed by the output and gate 459 thereof are transmitted through a twenty-five input or gate 461 and over the conductor DDH1 to the voice switches 464 and 465 so that the trunk circuit 450 is connected to the send conductors 20 and receive conductors 21 through these voice switches. A connection is then completed to the local office 81 in a manner identical to that described above in connection with the completion of a call to the local office 3.

The five trunk circuits serving the local office 81 are, in the illustrated embodiment, arbitrarily assigned the numbers 01 to 05, inclusive. Accordingly, on a call incoming to the local office 1 from local office 81, and assuming that the trunk link 1HW1C is seized on this incoming call, MX1 pulses are produced on the tens and units output conductors TH1–0C and UH1–1C which are simultaneously impressed upon the and gate 463 in the trunk output matrix 410 so that MX1 pulses are transmitted by way of conductor TH1–01 to the voice switches 466 and 467 so that the trunk circuit 450 is connected to the receive conductors 21 and send conductors 20 by the voice switches 466 and 467, respectively. The incoming call is thereafter completed to the called subscriber in local office 1 in a manner identical to that described above in connection with the completion of a call from local office 3. In this connection, it will be understood that a much larger number of trunks can be provided between the local office 1 and the local office 81 since the associated trunk circuits may be arbitrarily given numerical designations in the manner described heretofore. In the event that more than one hundred incoming trunks are provided in local office 1 a separate trunk finder and associated group of trunk links can be provided in a manner similar to the line finder and group of line links provided for the subscribers in the second hundreds level of local office 1. It will also be noted that calls can be established through the second selector stage to nine other local offices by dialing the nine other second prefix digits of "2" to "0," a group of similar dial-to-dial trunk circuits being provided for each one of the output levels of the second selector stage.

In the local office 1 facilities are also provided for establishing a connection to the operator in the long distance switching center 10 in response to the dialing of a prefix digit of "9" by the calling subscriber in the local office 1. The desired number is then given verbally to the operator in the long distance switching center 10 who completes the call. In the illustrated embodiment a group of thirty four-wire trunk lines are provided between the local office 1 and the long distance switching center 10, the illustrated trunk circuit 80 serving the first of these long distance trunk lines and the illustrated trunk circuit 475 serving the thirtieth one of these trunk lines. A trunk allotter 477 is provided for this group of thirty long distance trunk circuits and functions to provided enabling potentials on the conductors TEN–1 to TEN–30, inclusive, so as to allot these trunk circuits to successive incoming and outgoing calls. In other respects the allotter 477 is similar to the trunk allotters 390 provided for the dial-to-dial trunk circuits;

On an outgoing call to the long distance switching center 10 the calling subscriber dials a prefix digit of "9" which is registered in a first selector, such as the first selector 36 in the manner described heretofore. The first selector 36 then provides a single MX1 pulse on the conductor S9–1H1 which is applied to the first flip-flop circuit in each of the thirty long distance trunk circuits through the input and gates associated therewith. Thus, the MX1 pulse on the conductor S9–1H1 would be applied through the enabled input and gate 479 to the first flip-flop 481 in the trunk circuit 80 so that this flip-flop is set. When the flip-flop 481 is set MX1 pulses are transmitted through the multiplex output and gate 487 thereof to a twenty-five input or gate 489 and are supplied over the conductor LDH1 to the voice switches 88 and 90 which connect the trunk circuit 80 to the receive conductors 21 and send conductors 20, respectively, of highway No. 1. The trunk circuit 80 also functions in the manner described above in connection with the trunk circuit 64 to transmit a seizure tone signal over the conductors 2066, which are connected to the receive conductors 82 of the first long distance trunk line to the long distance switching center 10 through the attendant's cabinet 59, so that a line terminating unit is seized at the switching center 10 and the call is automatically routed to the attendant's position in the long distance switching center 10. This attendant then keys the number of the desired subscriber and completes the call in the manner described in detail in the above identified copending application.

The thirty long distance trunk circuits are arbitrarily assigned different numbers and in the illustrated embodiment these trunk circuits have been assigned the numbers 11 to 30, inclusive. On a call incoming to the local office 1 on the first trunk line from the long distance switching center 10 the seizure tone signal transmitted over the send conductors 84 of the first trunk line is transmitted through the attendant's cabinet 59 and over the conductors 2065 to the trunk circuit 80 which responds by producing a trunk seizure potential on the common conductor CTS which is transmitted through the trunk seizure detector 401 to the trunk finder 400. Assuming that the trunk link 1HW1C is enabled by the allotter 32, the tens and units identity of the trunk circuit 80, i.e., "11" is registered in the trunk 1HW1C and the MX1 pulses produced on the tens output conductor TH1–1C and the units output conductor UH1–1C are supplied to the corresponding and gate 490 in the trunk output matrix 410.

When the MX1 pulses coincide on these two conductors the and gate 490 is opened and MX1 pulses are transmitted by way of the conductor TH1–11 to the voice switches 492 and 494 which connect the trunk circuit 80 to the receive conductors 21 and send conductors 20, respectively, of highway No. 1. At the same time the MX1 pulses on the conductor TH1–11 are transmitted through a two input or gate 496 to the local attendant's cabinet 59 with the result that an operator's lamp is lit to inform the attendant that the trunk circuit 80 has been seized on an incoming call. The attendant at the cabinet 59 is provided with switching facilities for connection to the long distance switching center side of each long distance trunk line and is then verbally given the number of the desired line in local office 1 by the operator at the long distance switching center 10. The attendant at the cabinet 59 is provided with a key set with which he can select the particular dialing frequency combinations from a signal frequency generator 498 which supplies the dial tone frequencies over the conductors, U, V, W, X, Y and Z to the attendant's cabinet 59, these generators being of any suitable configuration, as will be readily understood by those skilled in the art. Accordingly, after the attendant has received verbal instructions as to the number of the called line he switches to the exchange side of the long distance trunk and keys the successive desired digits so that the corresponding dial frequency combinations are transmitted over the conductors 2065 and through the voice switch 494 to the send conductors 20 of highway No. 1. The first, second and third digits of the called subscriber are then registered in a first selector and connector stages and the call completed in the manner described heretofore.

If the called party in local office 1 wishes to recall the attendant at the cabinet 59 so that a call from the long distance switching center 10 may be directed to a different subscriber in the local office 1, the called party presses a recall button which is provided on his subset, as described in detail in the above identified copending applications S.N. 761,045, so that the recall combination of frequencies is transmitted through his line circuit to the receive conductors 21 of highway No. 1 modulated on the multiplex pulses assigned to the particular call. Assuming that the MX1 time position is being used, the recall signal modulated MX1 pulses are transmitted through the voice switch 492 and over the conductors 2066 to the attendant's cabinet 59 wherein facilities are provided which respond to the transmission of a recall frequency combination by the called party by lighting an operator's recall lamp associated with each particular long distance trunk line. Accordingly, the attendant at cabinet 59 is informed that a particular called subscriber requires the attendant to complete the call to a different called subscriber and throws his switch to connect him to the local exchange side of the long distance trunk. The new number is then given verbally to the attendant at cabinet 59 who completes the call to the desired different called line in a manner identical to the completion of a call to the original called subscriber.

The local office 1 is also provided with facilities for establishing a connection from any one of the local subscribers in this office to the attendant's cabinet 59 when the calling subscriber dials a prefix digit of "0." When this occurs the seized first selector, such as the selector 36, registers the digit "0" and provides a single MX1 pulse on the conducor S0–1H1 which is supplied to the corresponding flip-flop circuit in each of two information trunk circuits 96 and 500. An information trunk allotter 502 is provided to allot the trunk circuits 96 and 500 to different calling subscribers and provide an enabling potential on either the conductor TEN–1 or TEN–2 to enable the corresponding trunk circuit. Assuming that the trunk circuit 96 is enabled, the MX1 pulse on the conductor S0–1H1 is passed through the input and gate 504 to the first flip-flop 506 therein and when the flip-flop 506 is set MX1 pulses which are impressed upon the output and gate 508 are transmitted to a twenty-five input or gate 510 the output of which is supplied by way of the conductor IH1 to open the voice switches 98 and 100 in the MX1 time position. When the flip-flop 506 is set a set potential is supplied over the conductor TSR–1 to the trunk allotter 502 and this allotter responds thereto by removing the enabling potential from the conductor TEN–1 and applying an enabling potential to the conductor TEN–2. At the same time the trunk circuit 96 functions to supply a control potential over the attendant's cabinet lamp conductor ACL–1 to the attendant's cabinet 59 so that a lamp is lit at the cabinet 59 corresponding to the first information trunk. When the flip-flop 506 is set the MX1 pulses supplied to the voice switches 98 and 100 are also employed to open a voice switch 3191 so that ringback tone modulated MX1 pulses are supplied to the receive conductors 21 of highway No. 1 and are transmitted to the calling line circuit to inform the calling subscriber that a connection is being established to the attendant's cabinet 59. Thus the calling subscriber hears ringback tone even though the attendant is being informed of the incoming call by the lighting of a lamp. The operator then establishes connection to the send and receive conductors 102 and 104 of the first information trunk so that a two-way communication connection is provided through the voice switches 98 and 100 to the calling subscriber. When a connection is thus established in the attendant's cabinet 59 a reset signal is transmitted from the cabinet 59 by way of the attendant's cabinet release conductor ACR–1 back to the trunk circuit 96 which is employed to terminate transmission of the control signal over the conductor ACL–1 and termination of the ringback tone signal to the calling subscriber so that the two-way communication path between the calling subscriber and the attendant is unimpeded and the desired information may then be given.

In the event that the attendant at the cabinet 59 wishes to initiate a call himself, there is provided an attendant's cabinet line circuit 515 which is provided with the voice switches 517 and 519 which connect the line circuit 515 to the send and receive conductors, respectively, of highway No. 1 and with the voice switches 521 and 523 which connect the line circuit 515 to the send and receive conductors, respectively, of highway No. 2. The voice switches 517 and 519 are controlled from the link output matrix 34 and the voice switches 521 and 523 are controlled from the link output matrix 285. In the illustrated embodiment the line circuit 515 is assigned number 99 and hence is supplied with tens pulses over the conductor T9A and units pulses over the conductor U9A from the line finder 30. However, since the attendant is reached through the above described information trunks no called line voice switches are provided for the line circuit 515 and no idle signal is supplied therefrom to the interrogating matrices.

DETAILED DESCRIPTION OF THE SYSTEM

All of the transistors used in the system are of the junction type and all of the transistors have been given the conventional notation of an arrow superimposed on the emitter electrode. The direction of the arrow, of course, designates whether the particular transistor is of the NPN or PNP junction type. An NPN junction transistor is identified by an arrow which points away from the base electrode while a PNP junction transistor is identified by an arrow which points toward the base electrode. Insofar as the base and emitter of the transistor are concerned the transistor is biased for conduction whenever the N-type material is negative with respect to the P-type material. Thus, a PNP junction transistor is biased for conduction whenever the base is negative with respect to the emitter, and an NPN junction transistor is biased for conduction whenever the base is positive with respect to the emitter. Power for the transistors of the system is provided by a plus twelve volt supply, indicated by a plus sign inside a circle and a minus twelve volt supply, indicated by a minus sign inside a circle. Also, it is pointed out that references to plus and minus values of potential are made with respect to ground potential.

*Line circuit 111*

Figure 26:
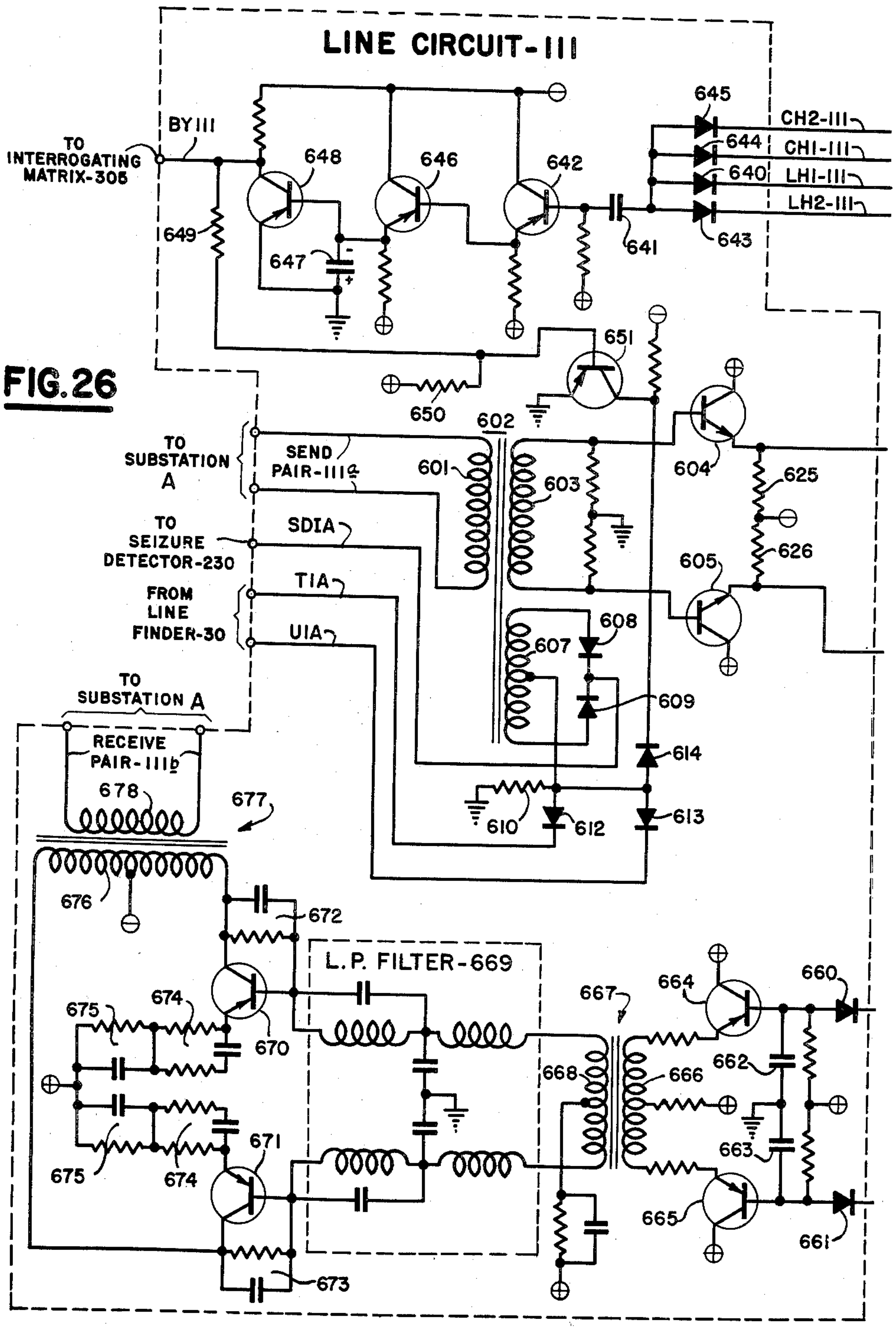
Figure 27:
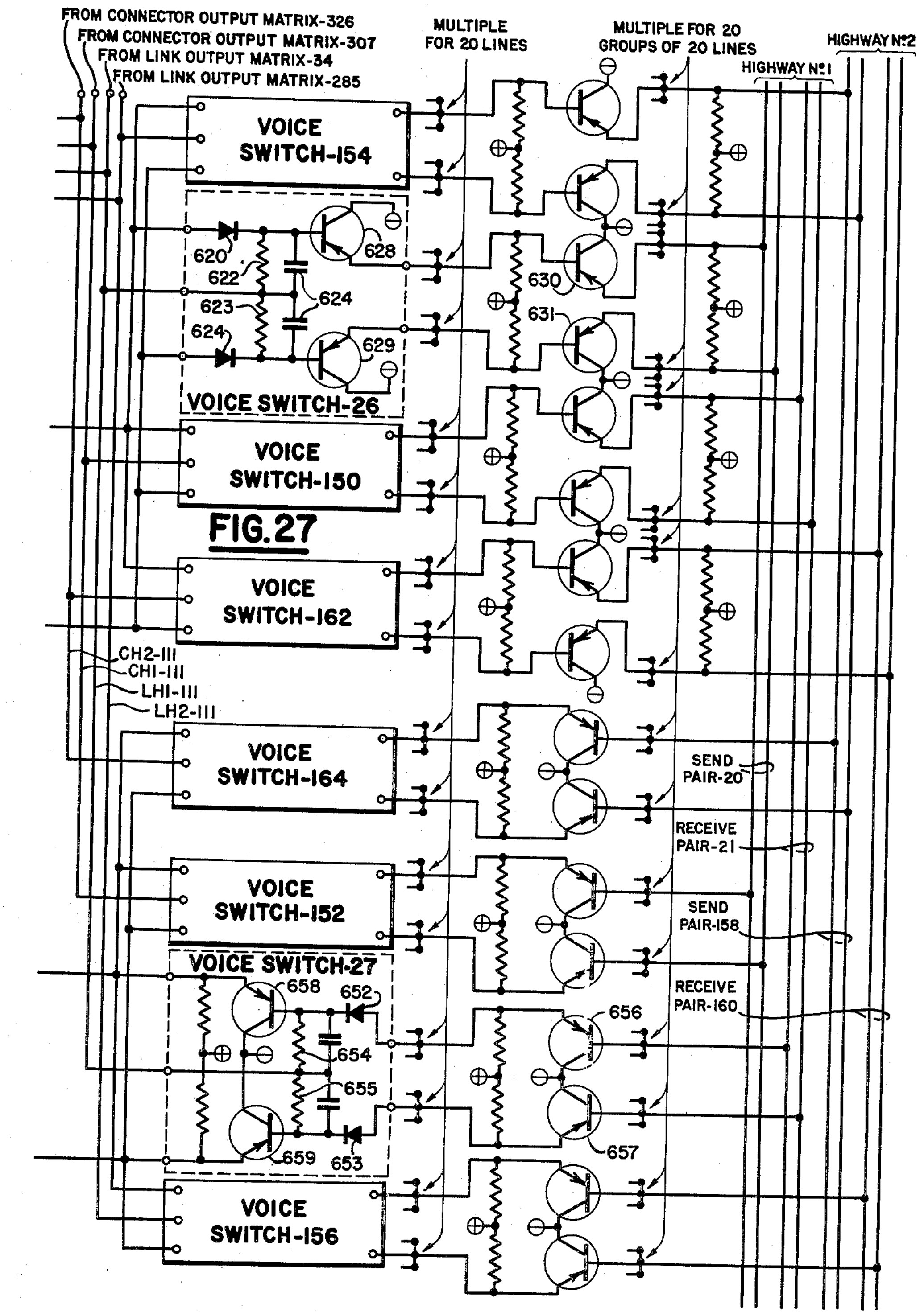

The line circuit 111 and its associated voice switches is shown in detail in Figs. 26 and 27, it being understood that the line circuits associated with other lines of the system and the attendant's cabinet 59 are identical to the line circuit 111 except for the different tens and units pulses applied to each line circuit to identify the same to the associated line finder.

The operation of the line circuit 111 when the subscriber at the associated substation initiates a call will first be described. When a call is initiated by the subscriber a voice frequency seize signal is transmitted from the subset over the send pair of line conductors **111*a* to the primary winding 601 of an input transformer 602. This seize signal appears across the secondary winding 603 of the transformer 602 and is coupled through the push-pull connected emitter follower transistors 604 and 605 to the voice switch 26 which is employed to connect the line circuit 111 to the send conductors 20 of highway No. 1. This seize tone signal is also supplied to the voice switch 150 which is associated with the receive conductors 21 of highway No. 1, to the voice switch 154 which is associated with the send conductors 158 of highway No. 2 and to the voice switch 162 which is associated with the receive conductors 162 of highway No. 2. However, until the identity of the calling line is registered in one of the line links, all of these voice switches are closed so that the seize signal is not transmitted to either pulse multiplex highway. The seize tone signal is also coupled to another secondary winding 607 of the transformer 602, a pair of oppositely connected diodes 608 and 609 being connected between the ends of the winding 607. The center tap of the winding 607 is connected through the resistor 610** to ground.

Normally the diodes 608 and 609 are reverse biased so as to prevent the transmission of any signal developed across the winding 607 to the seizure detector input conductor SDIA. However, when the tens and units pulses from the line finder 30 coincide the diodes 608 and 609 are biased to conduction so that if a seize signal appears across the winding 607 at this time this seize signal is applied to the conductor SDIA. More particularly, the tens conductor T1A is connected to the cathode of a diode 612 the anode of which is connected to the center tap of the winding 607 and the units conductor U1A is connected to the cathode of a diode 613, the anode of which is also connected to this center tap. The anode of a third diode 614 is also connected to the center tap of the winding 607, the cathode of the diode 614 being connected to the line busying section of the line circuit 111, as well be described in more detail. The diodes 612, 613 and 614 form a three input and gate for positive signals and the cathode of the diode 614 is connected to ground potential during periods when the line circuit 111 is idle and is hence non-conducting. The tens and units conductors T1A and U1A are normally at a minus potential but rise to ground potential during the respective tens and units pulses. When either of the diodes 612 or 613 is conducting a minus 12 volt potential is applied to the center tap of the transformer 607 so as to provide reverse bias for the diodes 608 and 609 and prevent the transmission of signals developed across the winding 607 to the conductor SDIA. However, when a tens pulse on the conductor T1A coincides with a units pulse on the conductor U1A the potential at the center tap of the winding 607 rises to ground so that the diodes 608 and 609 are rendered conductive. If a seizure signal is developed across the winding 607 during tens and units pulse coincidence this signal is then transmitted to the seizure detector 230 by way of the conductor SDIA.

It will be recalled from the general description of the system that when a seize signal is supplied to the seizure detector 230 a line link is assigned to the calling line and multiplex pulses in the time position assigned to the seized line link are employed to open the voice switches which connect the line circuit 111 to the corresponding pulse multiplex highway. Assuming that the line link 1HW1A is seized and the flip-flops therein corresponding to the line circuit 111 are set, MX1 pulses are transmitted over the tens output conductor TH1–1A and the units output conductor UH1–1A to the and gate 290 in the link output matrix 34 so that MX1 pulses are transmitted by way of the conductor LH1–111 to the voice switches 26 and 27. The voice switch 26 is shown in detail in Fig. 27 of the drawings, and includes a pair of switching diodes 620 and 621 the anodes of which are connected to the emitter electrodes of the transistor 604 and 605, respectively. The control conductor LH1–111 from the link output matrix 34 is connected through the resistor 622 to the cathode of the switching diode 620 and through the resistor 623 to the cathode of the diode 621, a pair of condensers 624 being connected across the resistors 622 and 623 to act as speed-up condensers and preserve the switching wave forms. The conductor LH1–111 is normally a positive potential and falls to a negative potential during the multiplex pulses supplied to this conductor from the and gate 290 in the matrix 34. Accordingly, the diodes 620 and 621 are normally reverse biased, since the cathodes of these diodes are connected to the conductor LH1–111, and the anodes of these conductors are connected to the emitters of the transistors 604 and 605, by an amount sufficient to block the highest amplitude voice signal which appears across the resistors 625 and 626, this amplitude being preferably in the order of 1.1 volts peak to peak for zero dbm voice or signal level. However, during the multiplex pulse intervals the potential on the conductor LH1–111 falls to a negative value so that the diodes 620 and 621 are opened and pass any signals which are developed across the output resistors 625 and 626 of the transistors 604 and 605. The signals thus passed by the diodes 620 and 621 are applied to the base electrodes of a pair of push-pull connected emitter follower transistors 628 and 629, the outputs of which are passed through a second pair of emitter follower transistors 630 and 631 which act as buffer stages, the outputs of the transistors 630 and 631 being connected to the send pair of conductors 20 of highway No. 1. The outputs of the transistors 628 and 629 serve as first multiple points for similar voice switches of nineteen other lines and the outputs of the transistors 630 and 631 serve as multiple points for twenty groups of twenty lines so that a relatively large number of voice switches may thus be connected to the send conductors 20. In this connection it will be understood that at other points in the system wherein a number of voice switches are connected to a send or receive pair of conductors on either pulse multiplex highway, similar multiple points with their associated buffer stages are preferably employed.

At the same time that the multiplex pulses are applied to the voice switch 26 over the conductor LH1–111 these multiplex pulses are also applied to the line busying section of the line circuit 111. More particularly, these multiplex pulses are transmitted through a diode 640 and through a condenser 641 to the base electrode of an emitter follower transistor 642. The other control conductor from the link output matrix 285 associated with highway No. 2 is also connected through a diode 643 and the condenser 641 to the transistor 642 and the control conductors from the connector output matrices 307 and 326 are connected through the diodes 644 and 645, respectively, to this transistor. Accordingly, when multiplex pulses appear on any one of these matrix conductors they are transmitted through the transistor 642 and a tandem connected emitter follower transistor 646 and are applied to an integrating condenser 647 so as to provide a control potential across the condenser. Since the multiplex pulses on any of the matrix conductors are negative going, a negative control potential is developed across the condenser 647 whenever the line circuit 111 is occupied as either a calling or called line and a corresponding ground potential is derived from the succeeding transistor 648 which is supplied by way of the conductor BY111 to the corresponding three input and gate of the interrogating matrix 305 which serves the first hundreds line group. The collector potential of the transistor 648 is also supplied by way of the voltage divider 649 and 650 to the base electrode of an inverter transistor 651 the emitter of which is connected to ground and the collector of which is connected to the cathode of the diode 614. The transistor 651 is normally conducting when the line circuit 111 is idle so that the cathode of the diode 614 is at ground and a plus signal is provided for this input of the three input and gate 612, 613 and 614. However, as soon as multiplex pulses are supplied to one of the voice switches thereby indicating that the line circuit 111 has been seized and associated with one of the pulse multiplex highways, the transistor 651 is rendered nonconductive so that a negative potential is applied to the cathode of the diode 614 and this diode is rendered conductive. When this occurs a negative potential is supplied to the center tap of the winding 607 so that the diodes 608 and 609 are reverse biased even when the tens and units pulses on the conductors T1A and U1A coincide. The seize signal which is transmitetd over the conductor SDIA to permit the association of a line link with a calling line is thus terminated so that no other line link will be associated with the line circuit 111 while it is occupied with a call.

As will be recalled from the general description of the system, MX1 pulses which are modulated with a dial tone signal, are continuously impressed upon the receive conductors 21 of highway No. 1 from the dial tone voice switch 42 which is controlled by the first selector 36. Accordingly, when MX1 pulses are impressed upon the conductor LH1–111 in the manner described above, these pulses are supplied to the voice switch 27 which is connected to the receive conductors 21 so that a corresponding dial tone signal is transmited to the calling subscriber. More particularly, the voice switch 27, which is shown in detail in Fig. 27 of the drawings, includes a pair of switching diodes 652 and 653 and the multiplex pulses impressed upon the conductor LH1–111 are supplied through the resistors 654 and 655 to the cathodes of these diodes. The receive conductors 21 of highway No. 1 are connected through a pair of emitter follower transistors 656 and 657, which act as buffer stages, to the anodes of the switching diodes 652 and 653, the inputs of the transistors 656 and 657 serving as multiple points for twenty groups of twenty lines and the output circuits of the transistors 656 and 657 serving as multiple points for twenty lines. Since the potential on the conductor LH1–111 is normally at a positive value the switching diodes 652 and 653 are normally reverse biased so as to prevent the transmission of signals therethrough. However, when multiplex pulses are impressed upon the conductor LH1–111 the potential on this conductor falls to a negative value and the diodes 652 and 653 are rendered conductive so that signals which appear on the conductors 21 during this interval are transmitted through a pair of balanced emitter follower transistors 658 and 659. The multiplex signals thus transmitted through the transistors 658 and 659 are integrated in balanced integrating circuits which include the diodes 660 and 661 and the integrating condensers 662 and 663 so that the original modulation on the multiplex pulses is recovered. The integrated signals are then applied to the base electrodes of a pair of balanced emitter followers 664 and 665 which supply output signals to the center tapped winding 666 of a coupling transformer 667.

In order to remove the multiplex pulse components from the demodulated signal the signals developed across the output winding 668 of the transformer 667 are transmitted through a low pass filter 669 and are applied to the base electrodes of a pair of balanced push-pull connected output amplifier transistors 670 and 671 which provide sufficient amplification to raise the demodulated signals to the desired level necessary to energize the receiver at the subscriber's subset. Voltage feedback networks 672 and 673 are connected between the collector and base electrodes of the transistors 670 and 671, respectively, to provide stabilization and linear amplification of the demodulated signal. In addition, the emitter circuit of each of the transistors 670 and 671 is provided with time constant networks 674 and 675 which provide current feedback and tend to flatten the amplifier response curve and eliminate peaks therein. The amplified demodulated signal at the collectors of the transistors 670 and 671 is applied to a center tapped winding 676 of an output transformer 677, the secondary winding 678 of which is connected to the subscriber's subset by way of receive pair of line conductors 111*b*. Accordingly, when the voice switch 27 is opened in the MX1 time position dial tone modulated multiplex pulses appearing on the conductors 21 in this time position are transmitted through the switching diodes 652 and 653 and the transistors 658 and 659. These multiplex pulses are then demodulated in the above described integrating circuit and the demodulated dial tone signal is amplified in the transistors 670 and 671 and is supplied through the transformer 677 to the subscriber at substation A to inform him that dialing may be initiated.

When the subscriber at substation A is called, the voice switches in the line circuit 111 which are controlled by the corresponding connector output matrix and gate are opened to establish the desired connection. Assuming that MX1 pulses are applied to the conductor CH1–111 from the connector output matrix 307 on a call incoming to the line circuit 111, these MX1 pulses function to open the voice switches 150 and 152 in a manner identical to that described above in connection with the voice switches 26 and 27. When the voice switch 152 is opened in the MX1 time position ringing signal modulated MX1 pulses which are impressed upon the send conductors 20 of highway No. 1 under the control of the connector which is being used to complete the call, pass through the voice switch 152 and are integrated in the line circuit 111 as described above. The demodulated ringing signal is transmitted over the receive conductors 111*b* to the substation A and is employed to trigger an oscillator in the subset which in turn actuates a permanent magnet loudspeaker in the subset to inform the subscriber at substation A that he is being called. At the same time the voice switch 150 is opened so that when the subscriber at substation A comes off-hook and a seize signal is developed at his subset this seize signal is transmitted through the coupling transformer 602, the transistors 604 and 605 and the voice switch 150 to the receive conductors 21 of highway No. 1. This seize tone signal, it will be recalled from the general description, is employed in the associated connector stage to remove the ringing signal modulated MX1 pulses from the conductors 20 of highway No. 1. At the same time this connector functions to provide dial tone modulated MX1 pulses on the conductors 20 which pass through the voice switch 152, are demodulated, and transmitted to the subscriber at substation A to actuate facilities in his subset so that the seize tone signal developed thereby is terminated.

If one of the line links associated with highway No. 2 is seized when the line 111 is calling, the voice switches 154 and 156 will be controlled by the multiplex pulses appearing on the conductor LH2–111 so that the line circuit 111 is connected to the send and receive conductors 158 and 160 of highway No. 2. In a similar manner when the line is called over highway No. 2 the voice switches 162 and 164 are controlled by the multiplex pulses appearing on the conductor CH2–111.

*Seizure detector 230*

Figure 28:
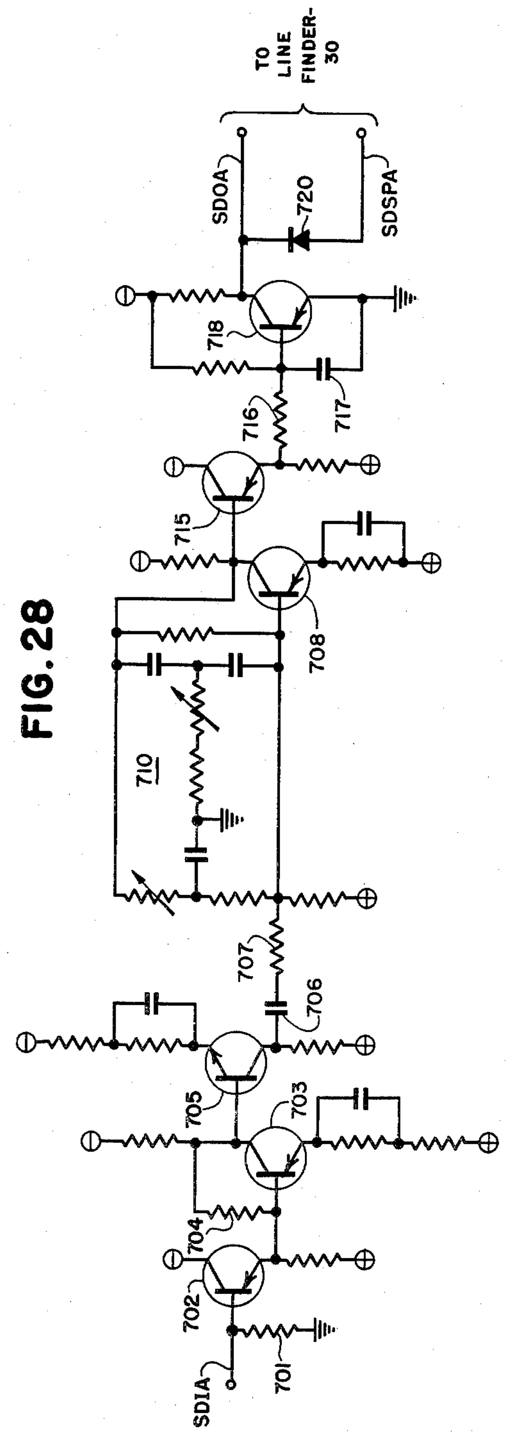

The seizure detector 230 is shown in detail in Fig. 28 of the drawings. It will be recalled from the general description of the system that the seizure detector 230 is provided with a seize signal from any one of the one hundred line circuits in the first hundreds group over the common seizure detector input conductor SDIA and functions to provide corresponding control pulse to the line finder 30 over the output conductor SDOA. In order to prevent an output from the seizure detector 230 during periods when the line finder 30 is switching to another line, an inhibiting pulse or seizure detector stop pulse is transmitted from the line finder 30 to the seizure detector 230 over the conductor SDSPA, this inhibiting pulse occurring during the switching time of each of the units pulses which the finder produces on the conductors U1A, U2A to U0A, inclusive.

Referring to Fig. 28 the input conductor SDIA is connected to ground through a resistor 701 and the 1500 cycle seize signal developed across the resistor 701 is transmitted through an emitter follower transistor 702 to the base electrode of an amplifier transistor 703. A bias resistor 704 is connected between the collector and base electrode of the transistor 703 to provide compensation for variation in $I_{co}$ with temperature in the transistor 703. The amplified seize signal developed at the collector of the transistor 703 is supplied to the base electrode of a transistor 705 which is connected to operate as a limiter for both positive and negative excursions of the amplified seize signal. The limited signal developed at the collector of the transistor 705 is coupled through a condenser 706 and a series resistor 707 to the base electrode of an amplifier transistor 708.

In order to provide selective amplification of the seize signal, a twin T filter network indicated generally at 710 is connected between the collector and base electrode of the transistor 708. The filter 710 is tuned to the second harmonic of the 1500 cycle seize signal and accordingly there is provided highly selective feedback within the transistor 708 for the second harmonic component of the seize signal. The selectively amplified seize signal component which appears at the collector of the transistor 708 is coupled through an emitter follower transistor 715 and is integrated in a network including the series resistor 716 and the shunt condenser 717 which are connected in the base electrode circuit of an output transistor 718.

When a second harmonic component of the seize signal is applied to the transistor 708 this component is coupled through the twin T feedback network 710 to the base electrode of the transistor 708 so as to provide an increase in the output current of the normally non-conducting transistor 708. This positive going signal turns the transistor 715 off so that a positive control potential corresponding to the seize signal is developed across the condenser 717 which tends to turn off the normally conpotential on the output conductor SDOA.

However, in order that the output pulse from the seizure detector 230 does not occur during the period when the line finder 30 is switching from one line to another, a seizure detector start pulse is transmitted from the line finder 30 to the seizure detector 230 over the conductor SDSPA. The conductor SDSPA is connected to the anode of a control diode 720 in the detector 230 the cathode of this diode being connected to the output conductor SDOA. The conductor SDSPA is normally held at ground potential in the line finder 30 so that the output conductor SDOA is also held at ground potential and a negative signal is thereby prevented from being transmitted from the seizure detector 230 to the line finder 30 even though a seize signal has been applied to the detector 230 and a control potential developed across the capacitor 717 thereof. However, at approximately the midpoint of the line finder switching cycle, i.e., at approximately the midpoint of each of the units pulses produced by the line finder, a negative seizure detector start pulse is applied to the conductor SDSPA which has the effect of rendering the diode 720 non-conductive. If, at the same time, a seize signal is detected by the seizure detector 230 so that the transistor 718 is non-conductive, the potential on the conductor SDOA goes negative since the transistor 718 is then non-conductive. The negative fall in potential on the conductor SDOA is then employed in the line finder 30 to provide marking potentials on the corresponding tens and units marking conductors of this finder. However, if no seize signal is applied to the seizure detector 230 during the period when the diode 720 is rendered non-conductive by the seizure detector start pulse, the transistor 718 will remain conductive and hold the conductor SDOA at ground potential even though the diode 720 is not conducting so that no control signal is transmitted to the line finder 30. The seizure detector 230 thus provides a seizure pulse to the line finder 30 only at substantially the midpoint of a particular units pulse interval and hence the seize signal developed by one calling line circuit cannot be employed to seize more than one line link for a single call.

*Line finder 30*

Figure 29:
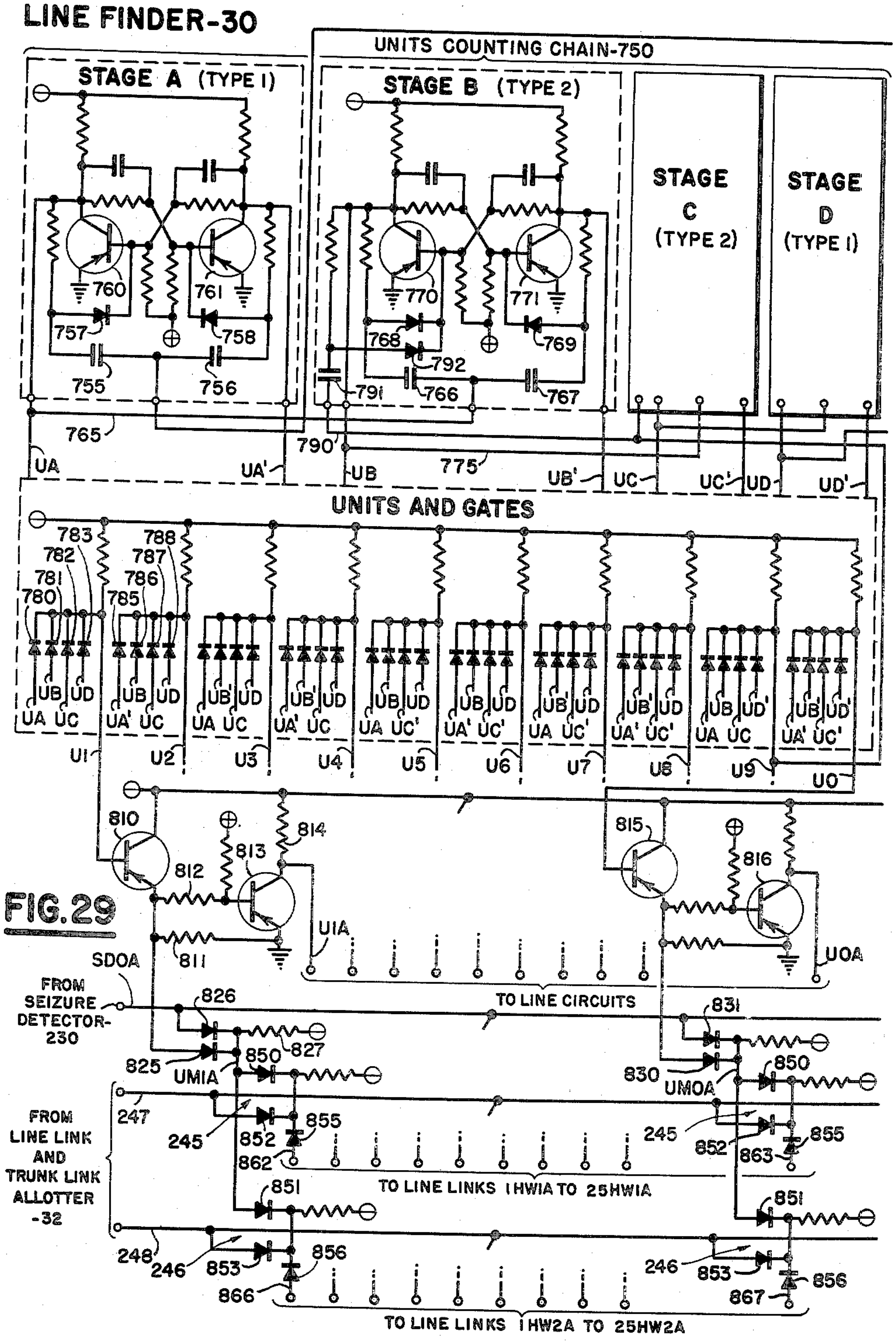
Figure 30:
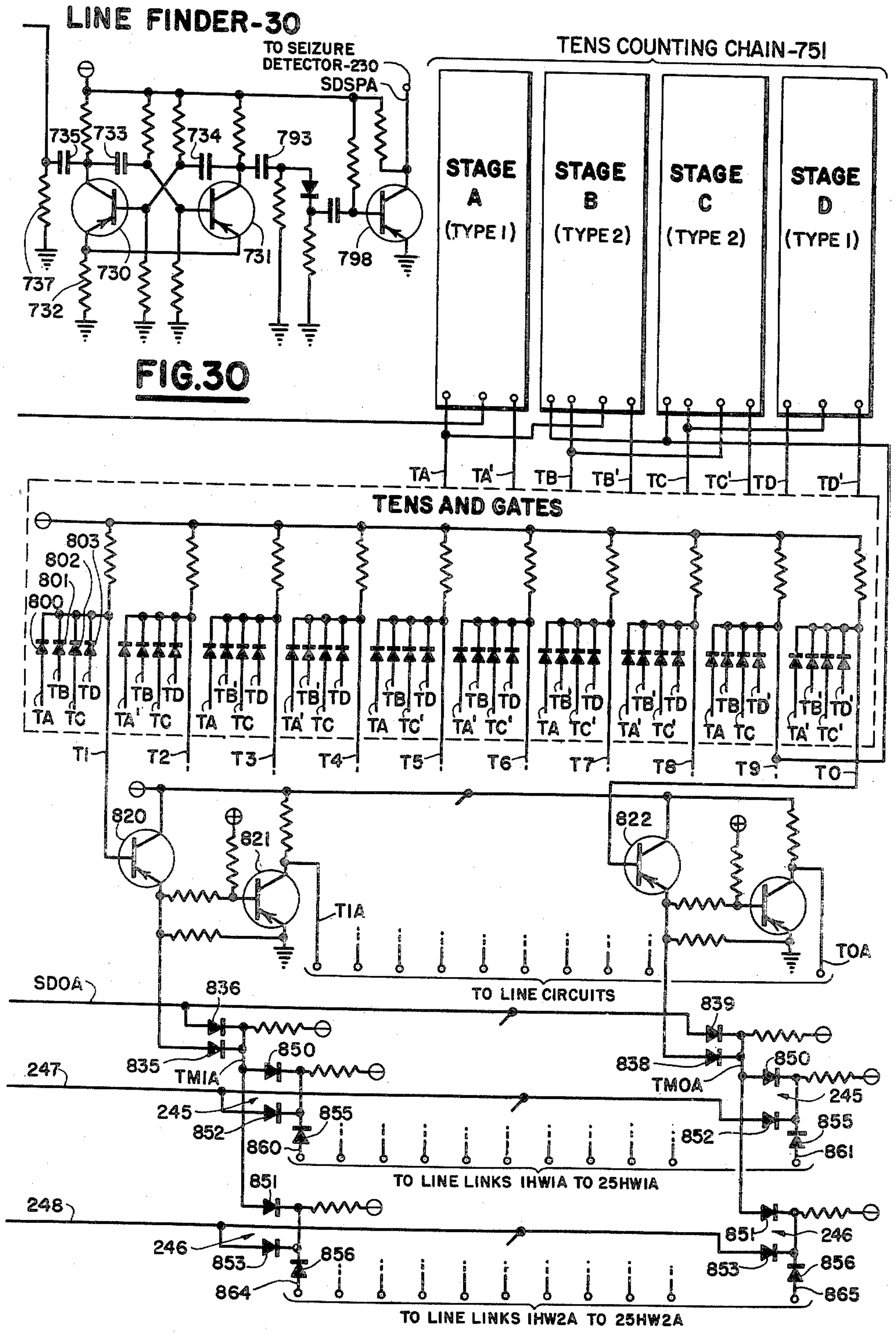

The line finder 30 is shown in detail in Figs. 29 and 30 of the drawings. It will be recalled from the general description of the system that the line finder 30 receives a seizure pulse from the seizure detector 230 when a call is initiated by any one of the subscribers in the first hundreds group and provides marking potentials on the tens and units marking conductors of this finder in response to the seizure pulse which are supplied to the line links which register the identity of the calling line.

In order to establish tens and units pulses which may be employed to identify different lines in the first hundreds group, the line finder 30 includes a free running multivibrator comprising the transistors 730 and 731. The emitters of the transistors 730 and 731 are connected together and through a resistor 732 to ground so that a common emitter type of free-running multivibrator is provided. Preferably, this multivibrator has a free running repetition rate of 500 cycles per second. The collector of the transistor 730 is coupled through a condenser 733 to the base electrode of the transistor 731 and the collector electrode of the transistor 731 is coupled through a condenser 734 to the base electrode of the transistor 730 to provide the required cross-coupling for multivibrator action, as will be readily understood by those skilled in the art.

The square wave developed at the collector of the transistor 730 is differentiated in a condenser 735 and resistor 737 and the waveform produced across the resistor 737 is employed to drive a four-stage units counting chain 750, the last stage of the counting chain 750 being employed to drive a four-stage tens counting chain 751. Each of the counting chains 750 and 751 is a four-stage binary connected counting chain each stage of which provides two square wave outputs of opposite polarity. Thus, stage A of the units counting chain 750 provides positive and negative square waves on the output conductors UA and UA' thereof, stage B provides square waves of opposite polarity on the output conductors UB and UB' thereof, stage C provides outputs on the conductors UC and UC' thereof, and stage D provides oppositely polarized outputs on the conductors UD and UD' thereof. The stages of the counting chain 750 and 751 are of two types, stages A and D of units counting chain 750 being of the type identified as type 1, stage A of which is shown in detail in the drawings, and stages B and C of the units counting chain 750 being of the other type identified as type 2, stage B of which is also shown in detail in the drawings, it being understood that stages C and D of the units counting chain and all four stages of the tens counting chain 751 are identical to the type 1 or type 2 stages shown in detail in the drawings.

The counting chain drive pulses produced across the resistor 737 are coupled through the condensers 755 and 756 in stage A of the units counting chain 750 to the steering diodes 757 and 758 thereof. The steering diodes 757 and 758 serve to route the positive drive pulse to the base electrode of the conducting one of the transistors 760 and 761 which comprise the flip-flop circuit of stage A. Accordingly, each time a drive pulse is applied to stage A of the counting chain 750 the flip-flop circuit 760, 761 is triggered so as to reverse the polarity of output thereof. The output conductors UA and UA' of stage A are connected respectively to the collector electrodes of the transistors 760 and 761. Accordingly, the conductor UA is at ground potential when the transistor 760 is conducting and goes negative when the transistor 760 is rendered non-conductive by switching of the flip-flop. In a similar manner, the conductor UA' is at ground potential when the transistor 761 is conducting and goes negative when the transistor 761 is turned on. It will thus be evident that oppositely polarized square waves are produced on the conductors UA and UA' at a repetition rate of approximately 250 cycles per second, it being understood that one complete cycle of the flip-flop 760, 761 requires two drive pulses from the free-running multivibrator 730, 731.

The output derived from the collector of the transistor 760 is coupled by way of the conductor 765 to the input of stage B of the counting chain 750 and is coupled through the condensers 766 and 767 to the steering diodes 768 and 769 which control the switching action of the flip-flop transistors 770 and 771. In a similar manner the waveform developed at the collector of the transistor 770 is applied by way of the conductor 775 to the input of stage C of the counting chain 750 and the output of the corresponding transistor in stage C is employed to drive stage D of this counting chain.

The output of the individual stages of the units counting chain 750 are combined in individual four input and gates to provide a series of ten successive units pulses on the illustrated units conductors U1, U2, U3 to U0 inclusive. Thus, the conductor UA is connected to the anode of a diode 780, the conductor UB is connected to the anode of a diode 781, the conductor UC is connected to the anode of a diode 782 and the conductor UD is connected to the anode of a diode 783, the diodes 780, 781, 782 and 783 comprising a four input and gate for negative signals. When the potentials on all four of the conductors UA, UB, UC and UD are negative at the same time this four input and gate is opened and a negative potential is produced on the conductor U1 for the duration of the negative potential developed on conductor UA by the highest frequency stage A of the counting chain 750. In a similar manner the conductors UA', UB, UC and UD are applied to the diodes 785, 786, 787 and 788, respectively, which form a second four input and gate and during the period when a negative potential exists on all four of these conductors simultaneously a negative units pulse is produced on the conductor U2. In this connection it will be noted that the actual wires employed to connect the outputs of the stages of the units counting chain 750 to the illustrated four input and gates are not shown in the drawing to simplify the complexity of the schematic diagrams.

Since only ten units pulses are required whereas the four-stage binary counting chain 750 would normally produce sixteen sequential outputs, a control pulse is derived from the ninth units conductor U9 which is supplied by way of the conductor 790 to stages B and C of the counting chain 750. In stages B and C this control pulse is coupled through a condenser 791 to a diode 792 so that the flip-flop circuits of stages B and C are triggered at the end of the negative pulse produced on the units conductor U9. Accordingly, all four stages of the counting chain are set to a position corresponding to the sixteenth position of the binary counter at the end of the ninth pulse and at the end of the tenth pulse all four stages are reset to their original positions to provide an output on U1. Units pulses are thus sequentially produced on the ten conductors U1, U2 to U0, inclusive, although driven from the four-stage binary chain 750.

In order to provide a seizure detector start pulse at approximately the midpoint of each of the units pulses produced on the conductors U1, U2, etc., a signal is derived from the multivibrator 730, 731 which is oppositely polarized from the signal used to drive the counting chain 750. To this end, the signal at the collector of the transistor 731 is differentiated in a condenser 793 and the differentiated waveform which is of the opposite phase to the waveform produced across the resistor 737, is applied to the base electrode of a transistor 798 the collector of which is connected to the conductor SDSPA. The transistor 798 is normally conducting so that the conductor SDSPA is normally at ground potential. However, each time a positive differentiation pulse is coupled to the base electrode of the transistor 798 this transistor is rendered non-conductive so that the potential on the conductor SDSPA goes negative.

The tens counting chain 751 is identical to the units counting chain 750 and comprises four binary connected counting stages, stage A and stage D being of the type 1 described in connection with the units counting chain 750 and stages B and C being of the type 2 described in connection with the counting chain 750. The tens counting chain 751 is driven from the UD output conductor of the stage D of the units counting chain 750 so that stage A of the tens counting chain 751 is triggered once for each complete cycle of the units counting chain 750. The four stages of the counting chain 751 are provided with oppositely polarized outputs in a manner identical to the units counting chain 750. Thus, stage A of the counting chain 751 provides the output TA and TA' similar to the outputs UA and UA' of stage A in the units counting chain 750. The eight outputs of the tens counting chain 751 are supplied to a series of ten four input and gates designated as tens and gates, the outputs from each being supplied to the tens conductors T1, T2, T3 and T0, inclusive. The first one of these tens and gates is shown in the drawings as comprising the diodes 800, 801, 802 and 803 which are respectively connected to the conductors TA, TB, TC and TD of the tens counting chain 751.

The outputs from the tens and units and gates are employed to provide two different output signals for the line finder 230. The first output signal comprises the tens and units pulses which are produced on the conductors T1A, T2A to T0A, inclusive, and U1A, U2A to U0A, inclusive, individual ones of these conductors being connected to the different line circuits to establish the calling line identity thereof. In addition, tens and units marking potentials are provided on particular ones of the conductors TM1A, TM2A to TM0A, inclusive, and UM1A, UM2A to UM0A, inclusive, when a seizure pulse is supplied from the seizure detector 230. To this end, each of the tens and units conductors, such as the units conductor U1, is connected to the base electrode of an emitter follower transistor 810 and appears across the emitter resistor 811 thereof. The negative pulse appearing across the resistor 811 is coupled through a resistor 812 to the base electrode of an inverter transistor 813 so as to produce a positive going pulse across the resistor 814 connected between the collector of the transistor 813 and minus 12 volts. The transistor 813 is normally non-conducting so that the potential on the conductor U1A connected to the collector of the transistor 813 is normally at a minus value. However, when the transistor 810 conducts during the units pulse period the potential on the conductor U1A rises to ground potential for the duration of the units pulse.

In a similar manner each one of the other nine units conductors is connected to an emitter follower and inverter combination, the tenth units conductor U0 being supplied to an emitter follower transistor 815, the output of which is connected to an inverter transistor 816 so as to provide a positive going units pulse on the conductor U0A. The tens conductors T1, T2 to T0, inclusive, are also individually connected to emitter follower and inverter combinations, the first tens conductor T1 being connected to the base electrode of a transistor 820, the output of which is connected to an inverter transistor 821 so as to provide positive going tens pulses on the conductor T1A, it being understood that nine other similar circuits are connected to the other nine tens conductors so as to provide sequentially appearing tens pulses on the conductors T1A, T2A to T0A, inclusive, the tenth tens conductor T0 being connected to a transistor 822 the output of which is connected through an inverter to the conductor T0A.

In order to provide tens and units marking potentials which may be supplied to the line links of the system, the tens and units pulses produced across the respective emitter followers 810, 815, etc., are connected to one input of a two input marking and gate the other input of each marking and gate being the seizure pulse supplied from the seizure detector 230. More particularly, the negative units pulse produced across the resistor 811 is connected to the anode of a diode 825 which forms one input of a two input and gate, the other input of which is a diode 826, the anode of which is connected to the conductor SDOA from the seizure detector 230, the cathodes of both of the diodes 825 and 826 being connected through the resistor 827 to minus twelve volts. In a similar manner the output from the emitter follower 815 associated with the tenth units conductor U0, is supplied to a diode 830 and a diode 831 is connected to the seizure detector output conductor SDOA. In the tens pulse section, the output from the emitter of the transistor 820 is supplied to a diode 835 and a diode 836 is connected to the conductor SDOA and the transistor 822 associated with the tenth units conductor T0 is connected to a diode 838, a diode 839 being connected to the conductor SDOA. The tens and units pulses are continuously supplied to the respective inputs of these two input marking and gates. However, it is only when a negative seizure pulse is produced on the conductor SDOA which is supplied to all of these marking and gates that a particular tens marking and gate and a particular units marking and gate are opened. Thus, assuming that the tens and units identity of the calling line is "11," i.e., the line circuit 111 in the first hundreds group, when a negative seizure pulse is produced on the conductor SDOA this pulse will coincide with a units pulse applied to the diode 825 and a tens pulse applied to the diode 835 since the seizure pulse itself results from coincidence of the corresponding positive tens and units pulses on the conductors U1A and T1A which are supplied to the line circuit 111 and are employed in this line circuit to develop the seize signal as described in detail above in connection with this line circuit. Accordingly, the marking and gate comprising the diodes 825 and 826 is opened so that a negative marking potential is applied to the conductor UM1A for the duration of the seizure pulse supplied to the diode 826. In a similar manner the marking and gate comprising the diodes 835 and 836 is opened so that a negative marking potential is supplied to the conductor TM1A for the duration of the seizure pulse which is supplied to the diode 836.

It will be recalled from the general description of the system that two series of and gates 245 and 246 are provided between the tens and units marking conductors and the line links associated with each pulse multiplex highway and these and gates are controlled by the allotter 32 so that the pulse multiplex highways are used alternately to distribute traffic equally therebetween. More particularly, each of the units marking conductors, such as the conductors UM1A, is connected to a diode 850 which forms one input of an and gate 245 and is also connected to a diode 851 which forms one input of an and gate 246. The conductor 247 from the allotter 32 is connected to a diode 852 which provides the other input of the first and gate 245 and the conductor 248 from the allotter 32 is connected to a diode 853 which provides the other input of the first and gate 246. Accordingly, when an enabling potential is produced on the conductor 247, which is supplied to all of the and gates 245 in parallel, the units marking potential on the conductor UM1A is transmitted through the and gate 245, through an isolating diode 855 and over a conductor 862 to one flip-flop in each of the twenty-five line links associated with highway No. 1. On the other hand, when an enabling potential is produced on the conductor 248 by the allotter 32 the marking potential on the conductor UM1A passes through the and gate 246 comprising the diodes 851 and 853 through an isolating diode 856 and over a conductor 866 to one flip-flop in each of the twenty-five line links associated with highway No. 2. In a similar manner each one of the other nine units marking conductors and all ten tens marking conductors are supplied to the corresponding flip-flop circuits in the line links associated with either highway No. 1 or highway No. 2 depending upon the presence of an enabling potential on either of the conductors 247 or 248. Thus, the marking potential on the conductor UM0A is supplied to the conductor 863 when an enabling potential appears on the conductor 247 or to the conductor 867 when an enabling potential appears on the conductor 248. In a similar manner, the marking potential on the conductor TM1A may be applied to the conductor 860 or to the conductor 861 and the marking potential on the conductor may be applied to the conductor 861 or to the conductor 865.

*Line and trunk links*

It will be recalled from the general description of the system that the line links, which are associated with each pulse multiplex highway and are employed to register the identity of the calling line and assign a pulse multiplex time position thereto under the control of the allotter 32, are all identical and each comprises a group of twenty flip-flops corresponding to the tens and units marking conductors of the line finder serving the particular hundreds line group. The trunk links associated with each pulse multiplex highway, which are employed to register the identity of any two-way trunk on a call incoming thereto and to assign this trunk a pulse multiplex time position, are identical to the line links employed to serve the first and second hundreds line group. Accordingly, only the first and twenty-fifth line links 1HW1A and 25HW1A associated with highway No. 1 are shown in detail in Fig. 31 of the drawings, it being understood that the other line links and trunk links shown in the block diagram of Figs. 4 to 25, inclusive are identical thereto.

Figure 31:
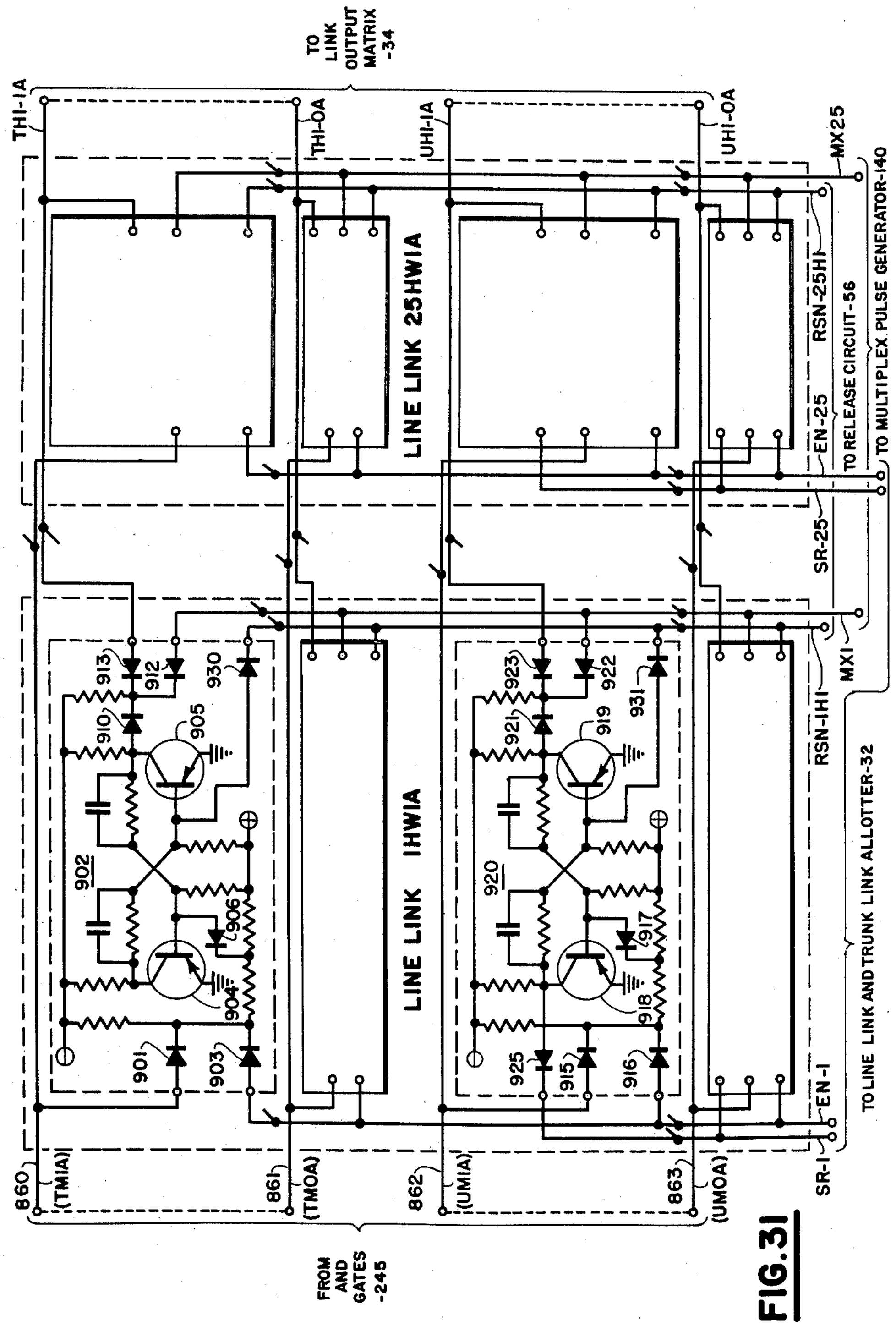

Referring to Fig. 31 the first tens and units flip-flop circuits and their associated input and gates and multiplex output and gates are shown in detail in the line link 1HW1A, the tenth tens and units flip-flops in this link being shown in block diagram form, it being understood that eight other flip-flops are provided for both the tens and units marking potentials which are intermediate to the illustrated marking conductors. More particularly, the tens marking potential which appears on the conductor TM1A and which is transmitted through one of the and gates 245, is transmitted by way of the conductor 860 to a diode 901 which forms one input of the input and gate for the first flip-flop stage 902 in the line link 1HW1A. The other input of this input and gate is provided by the enabling lead EN-1 from the allotter 32 to a diode 903. The flip-flop 902 includes the cross connected transistors 904 and 905, the collector of each of these transistors being connected to the base electrode of the opposite transistor in a conventional flip-flop circuit configuration with the transistor 905 normally conducting. Assuming that the line link 1HW1A is allotted by the allotter 32 to the next call so that the potential on the conductor EN-1 is at a minus value, when a negative tens marking potential is produced on the conductor 860 the diodes 901 and 903 are both reverse biased so that a negative signal is transmitted through a diode 906 to the base of the transistor 904. When the base of the transistor 904 is thus driven negative the flip-flop 902 is set and the transistor 904 is rendered conductive, while at the same time the transistor 905 is rendered non-conductive. When the transistor 905 is rendered non-conductive a diode 910, which forms one input of a two-input multiplex output and gate for negative signals, is reverse biased and when a multiplex pulse in the MX1 time position appears on the conductor MX1 the second diode 912 of this multiplex output and gate is also reverse biased. The MX1 conductor is at ground potential except during the MX1 time position, at which time this conductor falls to a minus value. Accordingly, during an MX1 pulse the diode 912 is also reverse biased so that a negative multiplex pulse is transmitted through a diode 913 and by way of the tens output conductor TH1–1A to the link output matrix 34. In this connection it will be noted that the first tens flip-flop circuits in all twenty-four other line links including the line link 25HW1A, are also connected to the output conductor TH1–1A. However, none of these other flip-flop circuits is set in response to a marking potential on the conductor 860 since the allotter 32 functions to provide an enabling potential for only one line link at a time.

Assuming that a units marking potential is produced on the conductor 862 at the same time, this negative marking potential is applied to a diode 915 and the enabling potential on the conductor EN–1 is applied to a diode 916, the diodes 915 and 916 forming a two input and gate for negative signals. When this occurs a negative signal is transmitted through a diode 917 to the base electrode of a transistor 918, which together with the transistor 919 constitutes the first units flip-flop 920 in the line link 1HW1A. When a negative pulse is thus applied to the base electrode of the transistor 918 the flip-flop circuit 920 is set and the transistor 918 is rendered conductive, while at the same time the transistor 919 is rendered non-conductive. The diodes 921 and 922 form the multiplex output and gate associated with the flip-flop circuit 920 so that an MX1 pulse is transmitted through the diode 923 to the output conductor UH1–1A when the flip-flop circuit 920 is set in response to a negative marking potential on the conductor 862. In this connection it will be understood that marking potentials may be produced on any one of the other tens and units marking conductors in the event that a different calling line is seized and the corresponding tens and units flip-flop circuits will be set in the line link 1HW1A and MX1 pulses will be impressed upon the corresponding tens and units output conductors connected to these flip-flop circuits.

When any one of the units flip-flop circuits, such as the flip-flop circuit 920, is set in the line link 1HW1A the potential on the set-reset conductor SR–1 changes from a minus value to ground potential due to the conduction of the normally non-conducting transistor, such as the transistor 918, in the unit flip-flop circuit which is set. The collector of the transistor 918 is connected through a diode 925 to the conductor SR–1 and the collector of each of the corresponding transistors in the other nine units flip-flop circuits in the link 1HW1A are connected through a similar diode to this conductor. This change in potential on the conductor SR–1, when one of the units flip-flop circuits is set in a particular line link, is employed in the allotter 32 to remove the enabling potential from the conductor EN–1 and to supply an enabling potential to one of the other line links to enable this next line link to identify the next calling line.

When the call involving the line link 1HW1A is terminated the release circuit 56 functions to provide a negative release pulse on the conductor RSN–1H1 and this negative release pulse is employed to reset the tens and units flip-flop circuits which were set in the line link 1HW1A when the call was initiated. More particularly, the conductor RSN–1H1 is coupled through a diode such as the diode 930 to the base electrode of the transistor 905 and functions to reset the flip-flop circuit 902 to its original condition. At the same time this negative release pulse is transmitted through the diode 931 to the base electrode of the transistor 919 so that the units flip-flop circuit 920 is also reset to its original condition. When the units flip-flop circuit 920 is thus reset to its original condition the potential on the reset conductor SR–1 changes from ground potential back to a minus value due to the fact that the transistor 918 is again rendered non-conductive when the flip-flop circuit 920 is reset. This change in potential on the conductor SR–1 from ground to a minus value is employed in the allotter 32 to condition the allotter stage assigned to the line link 1HW1A so that this stage is prepared to enable the line link 1HW1A during the next cycle of the allotter 32, as will be understood from the following detailed description of the allotter 32.

*Line link and trunk link allotter 32*

Figure 32:
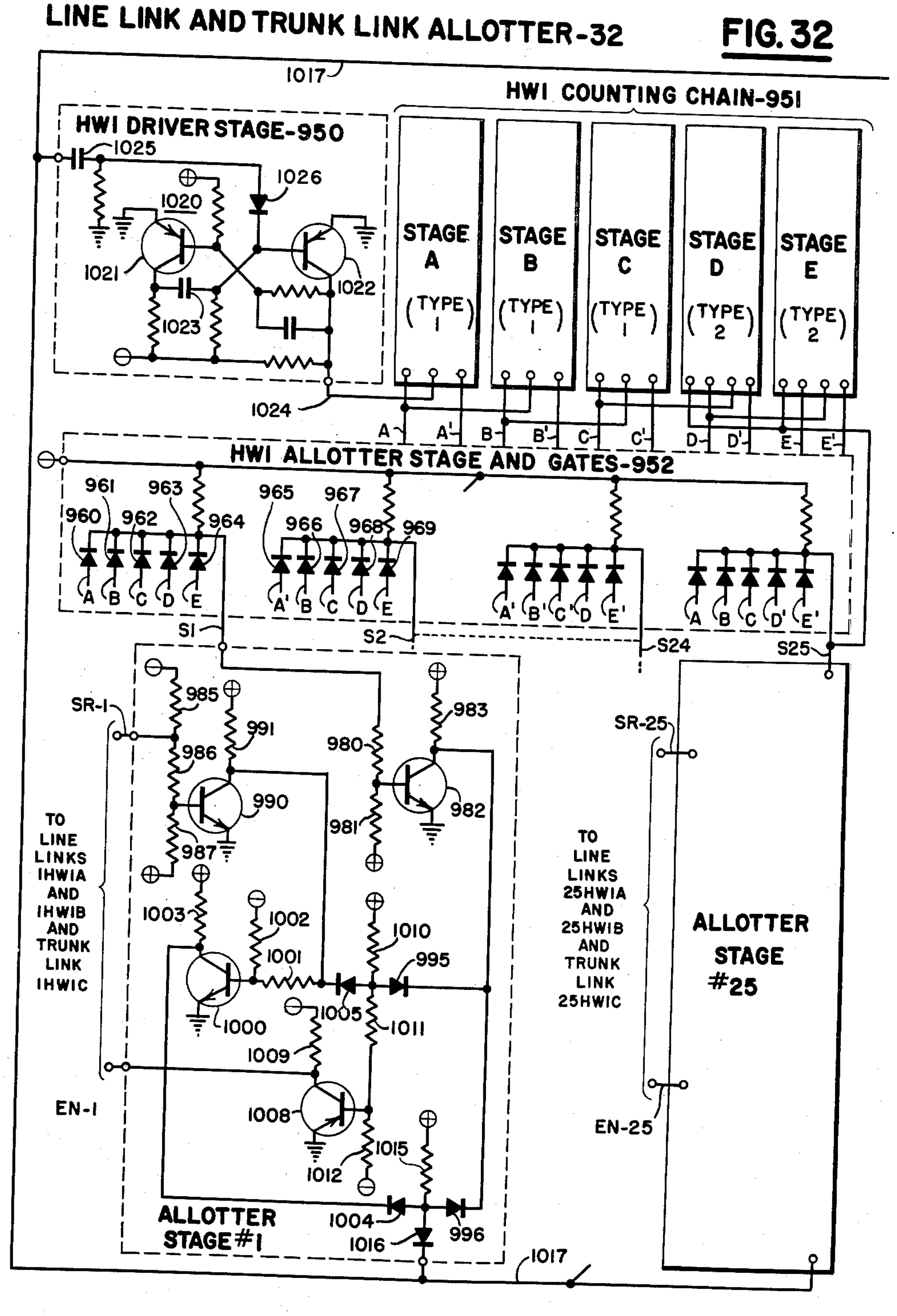
Figure 33:
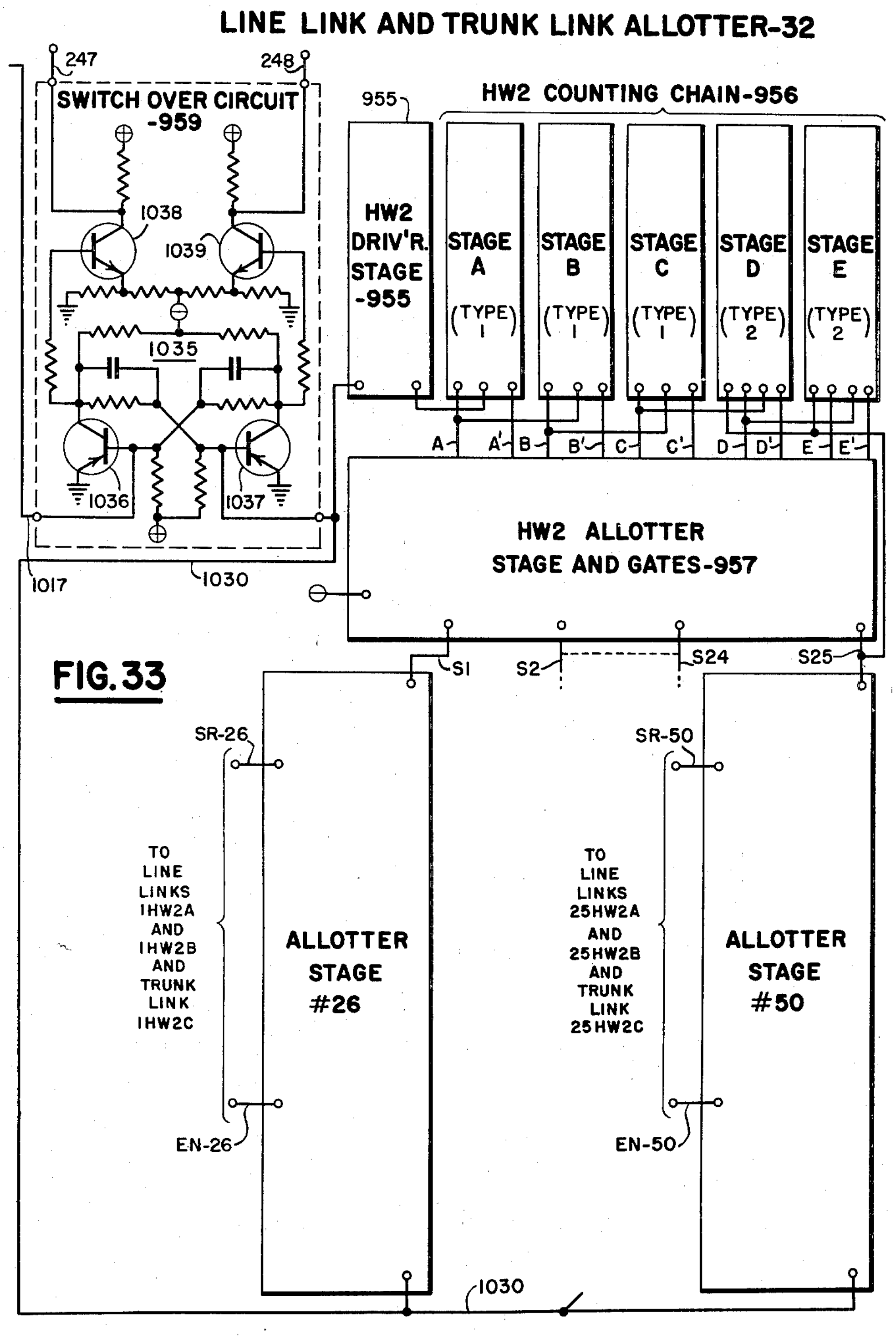

The line link and trunk link allotter 32 is shown in detail in Figs. 32 and 33 of the drawings. It will be recalled from the general description of the system that the allotter 32 is provided for the purpose of allotting the line links and trunk links to the use of different calling lines and for incoming calls to different trunks.

Generally considered, the allotter 32 includes a series of twenty-five stages identified as allotter stage #1 to allotter stage #25, inclusive, for the twenty-five line links in each hundreds line group associated with highway No. 1, a highway No. 1 driver stage 950 which is employed to control a five stage highway No. 1 counting chain 951, and a series of twenty-five allotter stage and gates 952 which provide individual control potentials for the allotter stages No. 1 to No. 25, inclusive. The allotter 32 also comprises a second group of twenty-five stages, identified as allotter stages Nos. 26 to 50, inclusive, a highway No. 2 driver stage 955 which is employed to drive a five stage binary connected highway No. 2 counting chain 956 and a series of twenty-five highway No. 2 allotter stage and gates 957 which provide individual control potentials for the twenty-five allotter stages Nos. 26 to 50, inclusive. A switch-over circuit 959 is provided to allot successive calls to different pulse multiplex highways so that traffic is equally distributed therebetween.

Considering first the counting chain 951 and the associated allotter and gates 952, it is pointed out that this counting chain comprises five binary connected stages A, B, C, D and E. Stages A, B and C are of the type 1 described in detail heretofore in connection with the type 1 stage A in the units counting chain 750 of the line finder 30. Stages D and E are of the type 2 described in detail heretofore in connection with the type 2 stage B of the units counting chain 750 in the line finder 30. However, the counting chain 951 is not stepped at a predetermined frequency but instead is driven from highway No. 1 driver stage 950 and is stepped only when one of the controlled links is seized by a calling line or trunk, as will be described in more detail hereinafter. The five stage binary counting chain 951 would normally provide thirty-two different output combinations but since only twenty-five allotter stages are controlled thereby stages D and E are strapped to recycle after the twenty-fifth drive pulse from the driver stage 950. Each of the stages in the counting chain 950 is arranged to provide oppositely polarized potentials on the output conductors thereof. Thus, stage A provides oppositely polarized voltages on the conductors A, A', the stage B provides oppositely polarized voltages on the conductors B, B' thereof, etc. The output potentials of the different stages in the counting chain 951 are combined in five input and gates to provide sequentially on the conductors S1 to S25, inclusive, a negative control potential. More particularly, the conductor A is connected to a diode 960, the conductor B is connected to a diode 961, the conductor C is connected to a diode 962, the conductor D is connected to a diode 963 and the conductor E is connected to a diode 964, these diodes forming a five input and gate for negative signals. Only when the potential on all five of the conductors A, B, C, D and E is negative will this gate be opened and a negative potential produced on the output conductor S1 extending to allotter stage No. 1. The second allotter stage and gate comprises the diodes 965 to 969, inclusive, which are connected respectively to the conductors A', B, C, D and E and when the first drive pulse from the driver stage 950 is transmitted to stage A of the counting chain 951 the flip-flop circuit in stage A is reversed so that the potentials on the conductors A', B, C, D and E are all negative and a negative control potential is produced on the conductor S2 while at the same time the potential on the conductor S1 returns to ground potential. As successive pulses are received from the drive stage 950 successive negative control potentials are developed on the conductors S3 to S25, inclusive. When the potential on the conductor S25 rises positively this potential change is strapped back to stages D and E of the counting chain 951 so that the flip-flop circuits therein are reset to the condition necessary for energization of the first allotter stage, as will be readily understood by those skilled in the art.

Considering now the details of the allotter stage No. 1, and assuming that a negative control potential is developed on the conductor S1 and the links 1HW1A, 1HW1B and 1HW1C are idle so that the potential on the conductor SR–1 is at a minus value, the conductor S1 is connected through a voltage divider comprising the resistors 980 and 981 to plus twelve volts and the base electrode of a transistor 982 is connected to the junction of the resistors 980 and 981. The transistor 982 is of the NPN type, the emitter of this transistor is connected to ground and the collector thereof is connected through a resistor 983 to plus twelve volts. When the potential on the conductor S1 is negative the transistor 982 is held non-conductive so that the collector of this transistor is at plus twelve volts. The collector of the transistor 982 is connected to a diode 995 and to a diode 996.

A voltage divider including the resistors 985, 986 and 987 is connected from minus twelve volts to plus twelve volts and the SR–1 conductor is connected to the junction of the resistors 985 and 986. The junction of the resistors 986, 987 is connected to the base electrode of an NPN type transistor 990, the emitter of which is connected to ground and the collector of which is connected through a resistor 991 to plus twelve volts. When the conductor SR–1 is at a minus value the resistors 985, 986 and 987 are so arranged that the transistor 990 is non-conducting. When the transistor 990 is non-conducting a positive potential is impressed upon the base electrode of a transistor 1000 through the voltage divider 1001 and 1002 which is connected from the collector of the transistor 990 to minus twelve volts, the transistor 1000 being of the NPN type, the emitter thereof being connected to ground and the collector thereof being connected through a resistor 1003 to plus twelve volts. When the transistor 990 is non-conducting the transistor 1000 is biased so that it is normally conducting and the collector potential of this transistor is at ground potential. This collector is connected to a diode 1004 which together with the diode 996 acts as a two input and gate for positive signals. However, when the potential on the conductor SR–1 is negative the cathode of the diode 1004 is held at ground potential through the transistor 1000 so that the and gate 996, 1004 is closed.

In order to develop an enabling potential on the conductor EN–1, a transistor 1008 is provided which is of the PNP type, the emitter of this transistor being connected to ground and the collector thereof being connected through a resistor 1009 to minus twelve volts. A voltage divider including the resistor 1010, 1011, 1012 is connected from plus twelve volts to minus twelve volts and the base electrode of the transistor 1008 is connected to the junction of the resistors 1011 and 1012. The transistor 1008 is controlled by the transistor 982 through the diode 995. However, when the conductor S1 is at a negative potential so that the transistor 982 is non-conducting, the diode 995 is reverse biased and the resistors 1010, 1011 and 1012 are so chosen that the transistor 1008 is non-conductive under these conditions. Accordingly, the potential on the conductor EN–1, which is connected to the collector of the transistor 1008, is a minus value so that the line links 1HW1A, 1HW1B and the trunk link 1HW1C are all enabled.

Assuming that the line link 1HW1A is seized and one of the units flip-flops therein is set corresponding to the units identity of the calling line, when this occurs the potential on the conductor SR–1 changes from a minus value to ground, as described in detail heretofore in connection with the line link 1HW1A. When the potential on the conductor SR–1 rises to ground, the transistor 990 is rendered conductive so that the potential at the collector thereof falls to ground potential. This in turn causes the transistor 1000 to be rendered non-conductive through the voltage divider network 1001 and 1002, and when the transistor 1000 is rendered non-conductive the diode 1004 is also reverse biased. Since the diode 996 was already reversed biased due to non-conduction of the transistor 982, the potential across the output resistor 1015 of the and gate 996, 1004 is permitted to rise positively and this positive potential increase is transmitted through an isolating diode 1016 to the common control conductor 1017 for all of the twenty-five allotter stages associated with highway No. 1. This positive potential increase on the conductor 1017 is supplied to the highway No. 1 driver stage 950 and also to the switchover circuit 959.

In the driver stage 950 a one-shot multivibrator is provided to develop drive pulses for the counting chain 951 which are delayed with respect to the positive control signal produced on the common conductor 1017 so that sufficient time is provided for the line busying section of the line circuit 111 to block transmission of a seize signal over the conductor SDIA to the seizure detector 230 before the chain 951 is stepped and the next line link is allotted so that one calling line cannot seize several line links. More particularly, the driver stage 950 comprises a one-shot multivibrator 1020 which includes the transistors 1021 and 1022. The collector circuits of the transistors 1021 and 1022 are interconnected to the base electrode of the opposite transistor to provide a conventional multivibrator arrangement in which the transistor 1022 is normally conducting. When a positive control signal is produced on the conductor 1017 this signal is transmitted through the condenser 1025 and the diode 1026 to the base electrode of the transistor 1022 and triggers the multivibrator 1020 so that the transistor 1022 is turned off and the transistor 1021 is turned on. When the transistor 1022 is turned off a negative pulse is produced at the collector of the transistor 1022 the duration of which is dependent upon the time constant of the condenser 1023 connected between the collector of the transistor 1021 and the base electrode of the transistor 1022 and the associated resistive circuit components. The trailing edge of this negative pulse is employed as a drive pulse for driving stage A of the counting chain 951. When this drive pulse is coupled by way of the conductor 1024 to the input of stage A the flip-flop in this stage is triggered to its opposite condition so that the potentials on the conductors A and A' are reversed. As a result, the five input and gate which includes the diodes 960 to 964, inclusive, is closed so that the potential on the conductor S1 rises to ground potential. At the same time the potentials applied to all of the diodes 965 to 969, inclusive, in the second allotter and gate are negative so that this gate is opened and a negative potential is produced on the second conductor S2.

When the potential on the conductor S1 rises to ground the transistor 982 is rendered conductive so that the collector potential thereof falls to ground potential and the diode 996 is rendered conductive and thus blocks the output gate comprising the diodes 996 and 1004 of the first allotter stage so that the postive potential impressed on the conductor 1017 when the diode 1004 was reverse biased is removed.

As soon as the potential on the conductor SR–1 rises to ground in response to link seizure and the transistor 990 is rendered conductive, the diode 1005 is rendered conductive so that the voltage applied to the base electrode of the transistor 1008 becomes more negative and the transistor 1008 is rendered conductive. As a result, the voltage on the conductor EN–1 rises to ground potential and thus prevents any of the other flip-flops in the line links 1HW1A and 1HW1B and the flip-flops in the trunk link 1HW1C from being set in response to another calling line or trunk.

At the end of the call the potential on the conductor SR–1 returns to a negative value so that the transistor 990 is rendered non-conductive with the result that the transistor 1000 is rendered conductive and the cathode of the diode 1004 is grounded. When the transistor 990 is rendered non-conductive the diode 1005 is reverse biased which, in the absence of the diode 995, would tend to render the transistor 1008 non-conductive and produce a negative enabling potential on the conductor EN–1. However, an enabling potential is not desired on the conductor EN–1 until a negative control potential is produced on the conductor S1 indicating that the allotter stage No. 1 is to be used for the next call. Accordingly, even though the potential on the conductor SR–1 falls to a negative value at the end of the call no negative enabling potential is produced on the conductor EN–1 because the diode 995 continues to conduct and holds the junction of the resistors 1010 and 1011 at ground potential even though the diode 1005 is reverse biased. In this connection it will be recalled that when the conductor S1 is at ground potential the transistor 982 is conducting so that the collector potential thereof is at ground potential and this ground potential is applied to the cathode of the diode 995 so as to hold this diode conductive irrespective of the reverse biasing of the diode 1005.

When the counting chain 951 has been stepped through a complete cycle a negative control potential is again impressed upon the conductor S1 and the transistor 982 is rendered non-conductive. When this occurs the diode 995 is reverse based so as to permit the transistor 1008 to be rendered non-conductive with the result that the potential on the conductor EN–1 falls to a negative value, thereby providing a negative enabling potential to the line links and trunk link controlled by allotter stage No. 1. At the same time the diode 996 is reverse biased but since the diode 1004 remains conducting during periods when the SR–1 conductor is negative no positive control potential is applied to the common conductor 1017 to step the counting chain 951. Accordingly, the allotter stage No. 1 remains enabled until the next call, at which time the SR–1 conductor rises to ground potential, as described above.

In the event that the link controlled by allotter stage No. 1 is still handing the call when the counting chain 951 is stepped through a complete cycle and a negative control potential is again impressed upon the conductor S1, this allotter stage is arranged to apply positive potential to the common control conductor 1017, so that the counting chain is stepped to the next allotter stage, without disturbing the other funtcions of the allotter stage while handling the call. Thus, if a negative control potential is impressed upon the conductor S1 while the associated link is occupied with a call and the conductor SR–1 is at ground potential, the diode 995 becomes reverse biased when the transistor 982 is rendered non-conductive but the diode 1005 remains conducting so that the transistor 1008 is held in a conducting state and no negative enabling potential is produced on the conductor EN–1. However, when the conductor SR–1 is at ground potential the diode 1004 is reverse biased so that the presence of a negative potential on the conductor S1, which reverse biases the diode 996 has the effect of producing a positive control potential which is coupled through the diode 1016 to the conductor 1017 and is applied to the driver stage 950. Accordingly, when allotter stage No. 1 is occupied with a call and a negative potential is produced on the conductor S1 the counting chain 951 is stepped to the next idle allotter stage before the counting chain is stopped.

The twenty-five allotter stages provided for the links associated with highway No. 2, which are identified as allotter stages Nos. 26 to 50, inclusive, function in a manner identical to that described in detail above in connection with allotter stage No. 1 to control their associated links. As the link associated with each one of these allotter stages is seized a positive control potential is impressed upon the common control conductor 1030 of allotter stages Nos. 26 to 50, inclusive, and is supplied by way of this conductor to the highway No. 2 driver stage 955 which is identical to the driver stage 950 described in detail above. Accordingly, the counting chain 956 is stepped to the next one of these allotter stages in the same manner as described heretofore.

It will be recalled from the general description of the system that the two groups of line links are alternately enabled so as to distribute traffic equally between the two multiplex highways. This alternate use of the two groups of links is achieved by the switchover circuit 959 which functions to provide a control potential on either the conductor 247 or 248 which control respectively the and gates 245 which supply marking potentials to the links associated with highway No. 1 or the and gates 246 which supply marking potentials to the links associated with highway No. 2. Accordingly, even though an enabling potential is provided on the conductor EN–2, for example, when the link controlled by allotter stage No. 1 is seized, the links controlled by allotter stage No. 2 cannot be seized by a calling line or trunk until a control potential is produced on the conductor 247 by the switchover circuit 959. In a similar manner, even though an enabling potential is produced on the conductor EN–27 when the link controlled by allotter stage No. 26 is seized, the links controlled by allotter stage No. 27 cannot be seized until a control potential is produced on the conductor 248 by the switchover circuit 959.

The switchover circuit 959 receives the positive potentials supplied to both driver stages 950 and 955 and responds to each of these positive potentials by transferring a control potential from one of the conductors 247, 248 to the other conductor. To this end, the circuit 959 includes a flip-flop circuit 1035 comprising the transistors 1036 and 1037 which are cross connected in a conventional flip-flop circuit arrangement and the collector potentials of these transistors is supplied to D.C. amplifier transistors 1038 and 1039, respectively. Assuming that the transistor 1036 is conducting, the collector of this transistor is at ground potential and the transistor 1038 is biased in the forward direction so that a negative control potential is produced on the conductor 247 and the gates 245 are conditioned to transmit marking potentials to the links associated with highway No. 1. Assuming that a link controlled by allotter stage No. 1 is then seized by a calling line, when this occurs a positive control potential is produced on the conductor 1017 which is supplied by way of this conductor to the base electrode of the transistor 1036 so as to render this transistor non-conductive and cause the flip-flop circuit 1035 to be triggered to the opposite condition thereof in which the transistor 1037 is conductive. When this occurs the potential on the conductor 247 is returned to ground due to the fact that the transistor 1038 is rendered non-conductive and the loading on the conductor 247 by the resistors of the and gates 245. At the same time, the potential on the conductor 248 falls to a negative value so that a negative control potential is impressed upon all of the and gates 246 and they are conditioned to transmit marking potentials to the links associated with highway No. 2. Accordingly, the next calling line seizes a link controlled by allotter stage No. 26 and when the identity of this line is registered a positive potential is produced on the conductor 1030 which is supplied to the base electrode of the transistor 1037 so that the flip-flop circuit 1035 is flipped back to its original condition in which a negative potential is produced on the conductor 247 and the potential of the conductor 248 rises to ground so that the gates 245 are enabled and the gates 246 are closed. This process continues as successive calling lines are assigned to different links associated with the two multiplex highways so that traffic is equally distributed therebetween.

*Output matrices*

It will be recalled from the general description of the system that a link output matrix is provided for each pulse multiplex highway and each hundreds line group and a connector output matrix is also provided for each highway and each hundreds line group. All of these matrices are identical and the link output matrix 34 is shown in detail in Fig. 34 of the drawings, it being understood that the link output matrices 285, 242 and 243 and the connector output matrices 46, 328, 307 and 326 are all identical to the illustrated matrix 34 insofar as the circuitry thereof is concerned.

Figure 34:
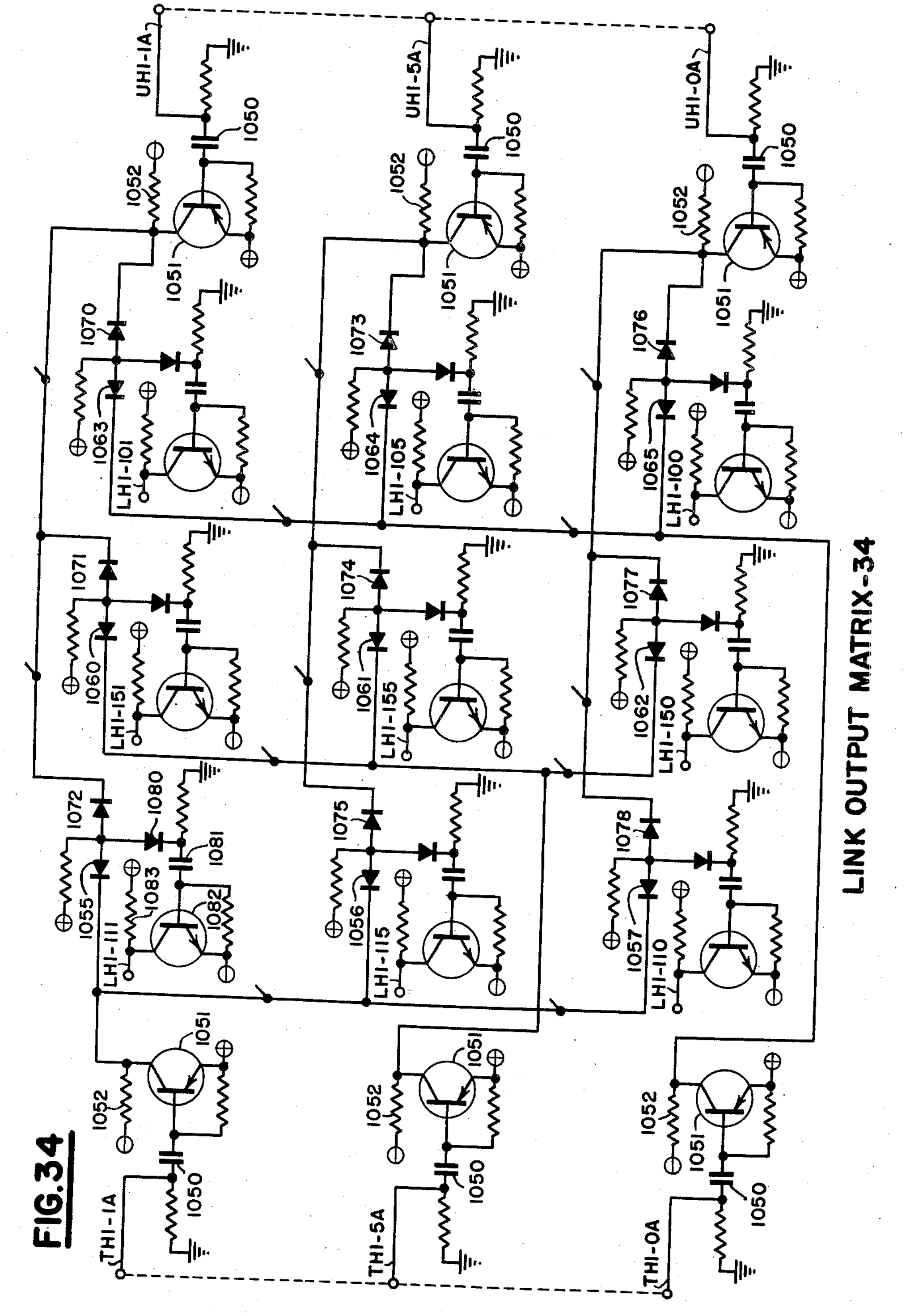
Figure 35:
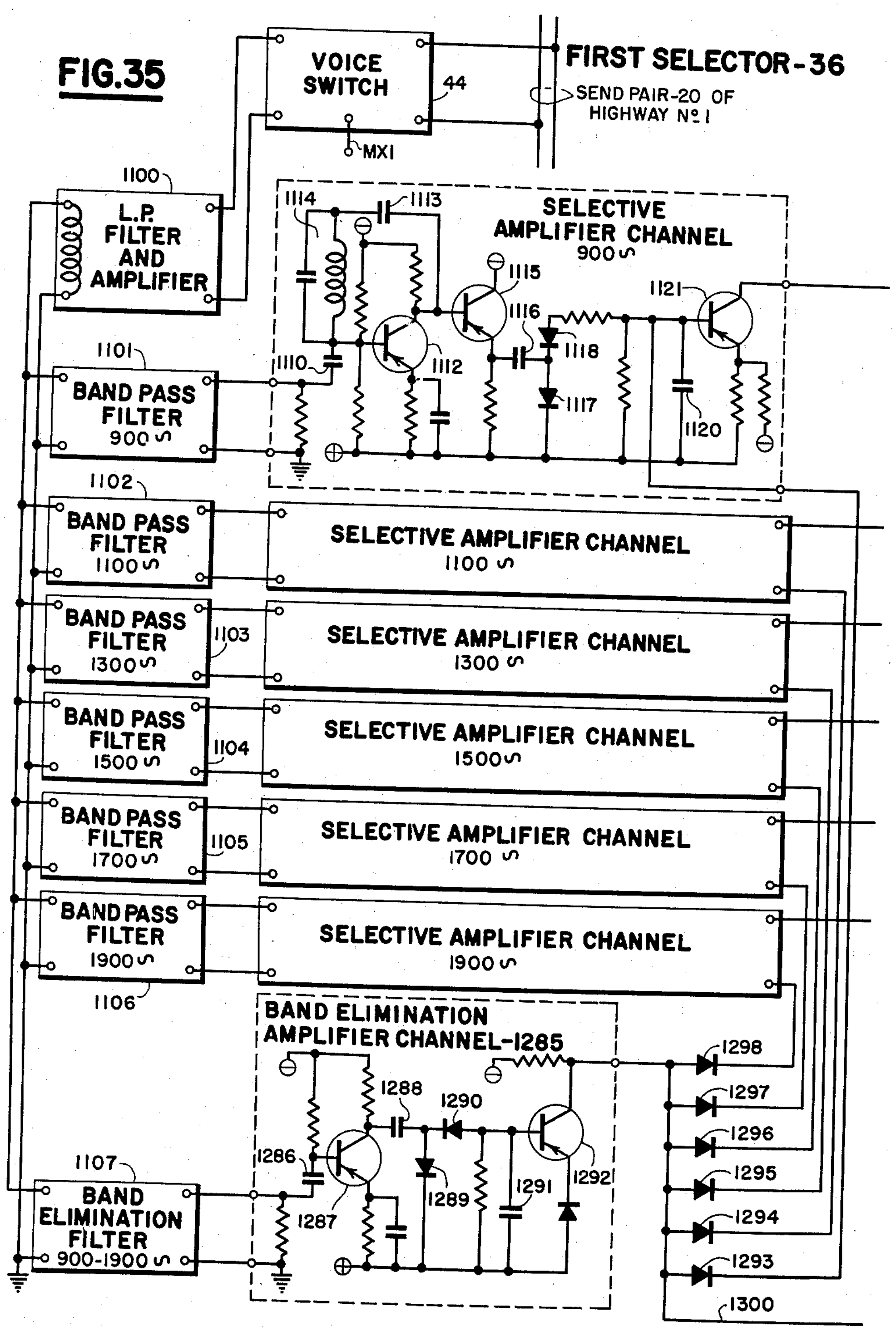
Figure 36:
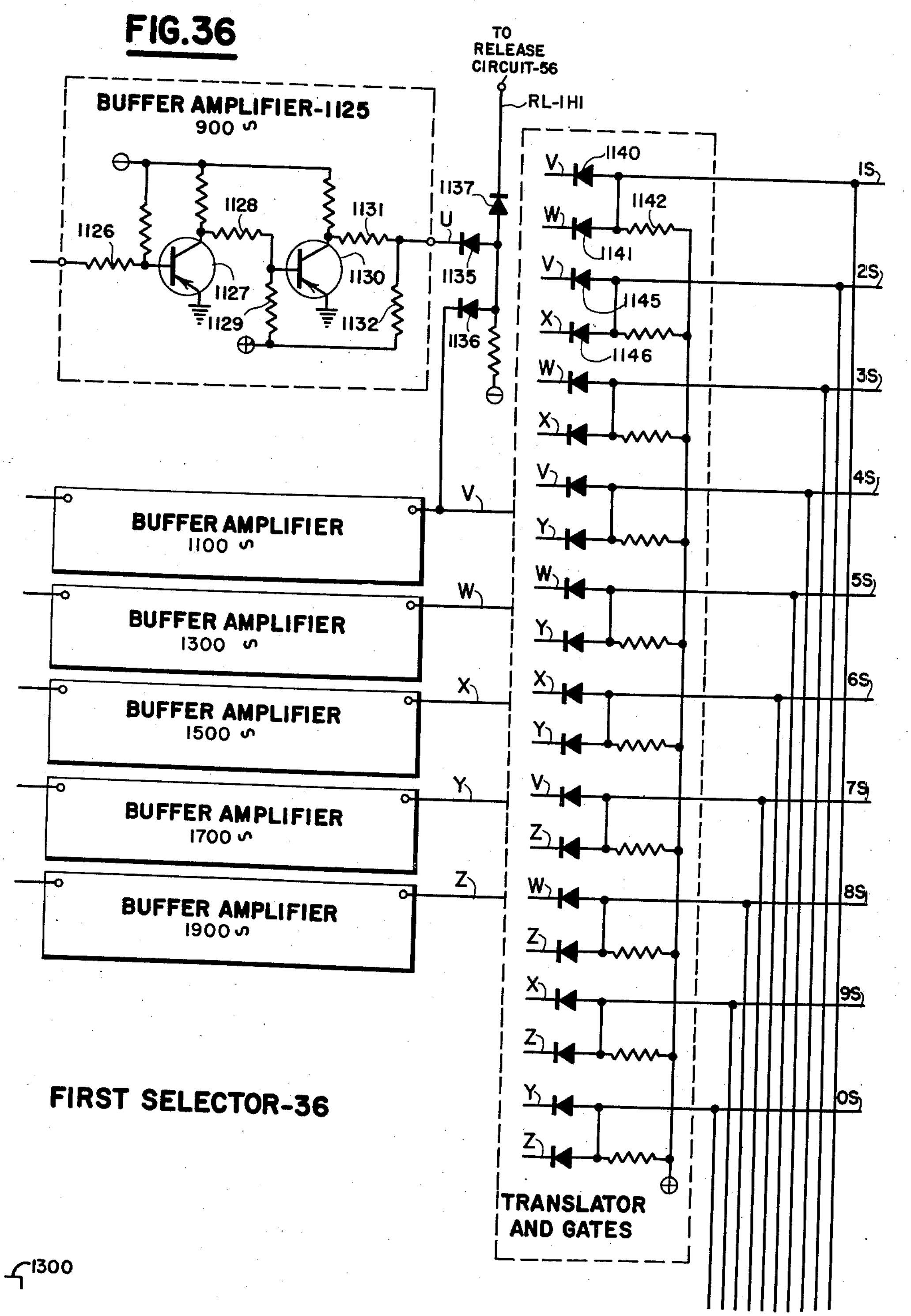
Figure 37:
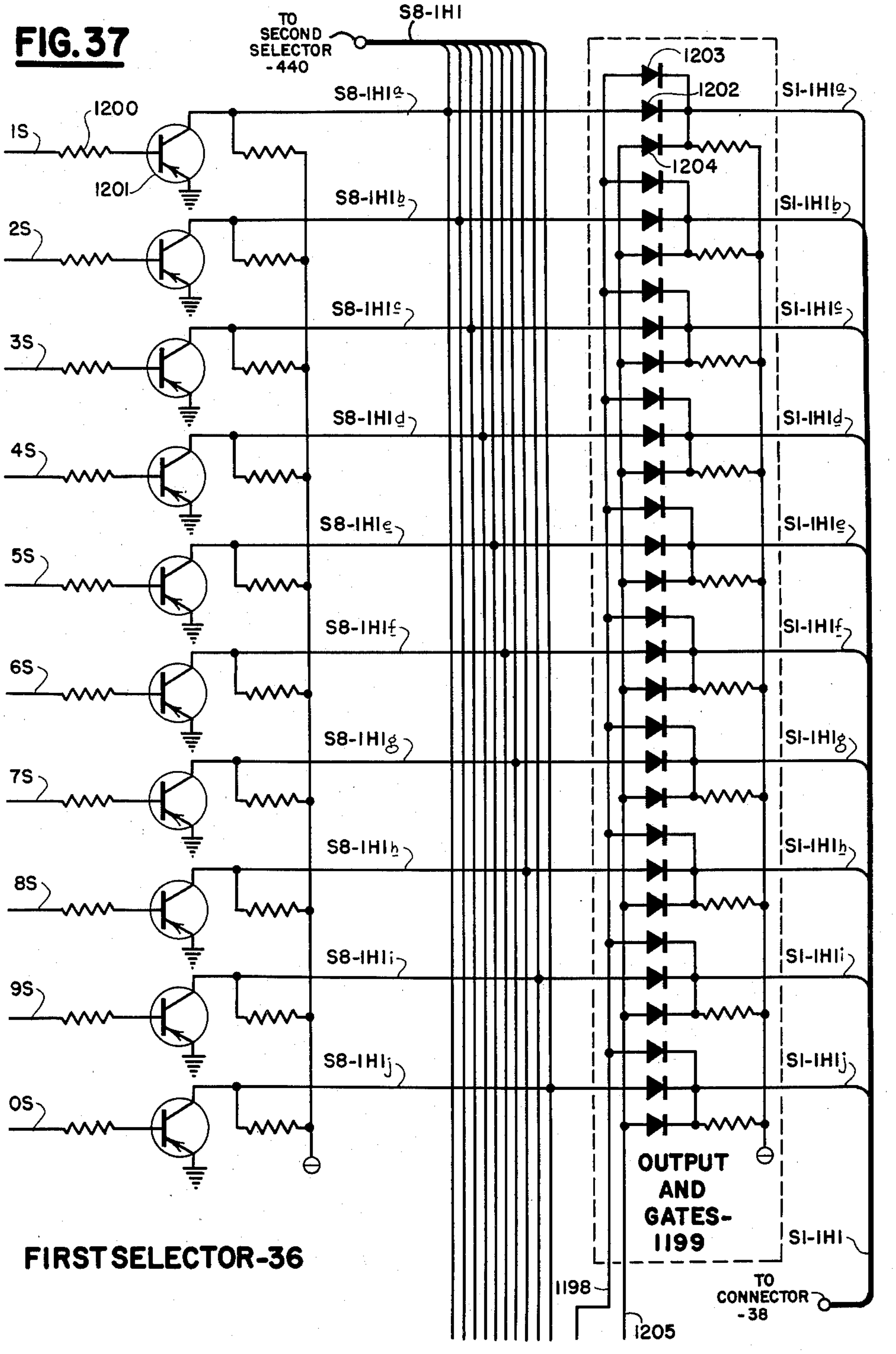
Figure 38:
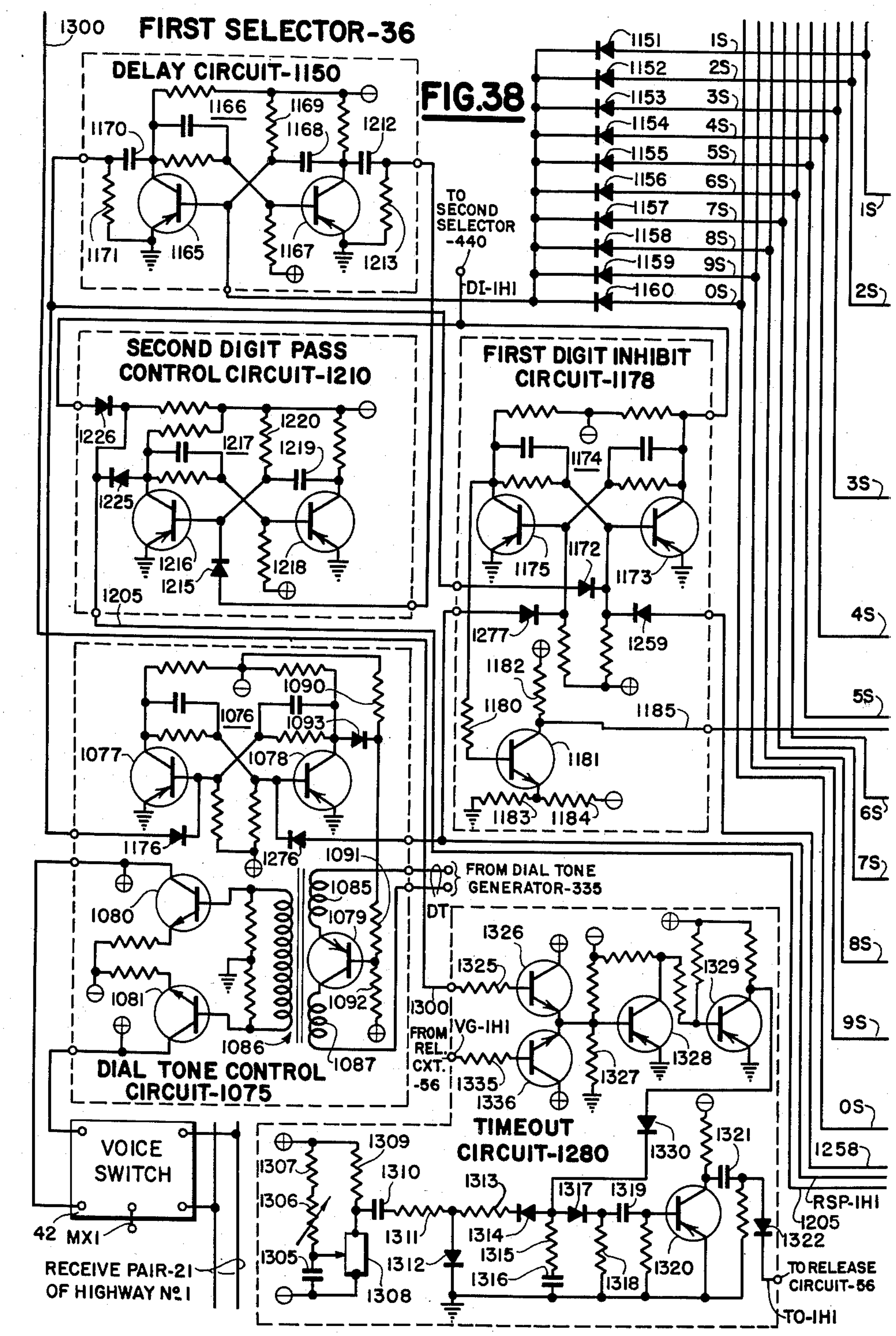
Figure 39:
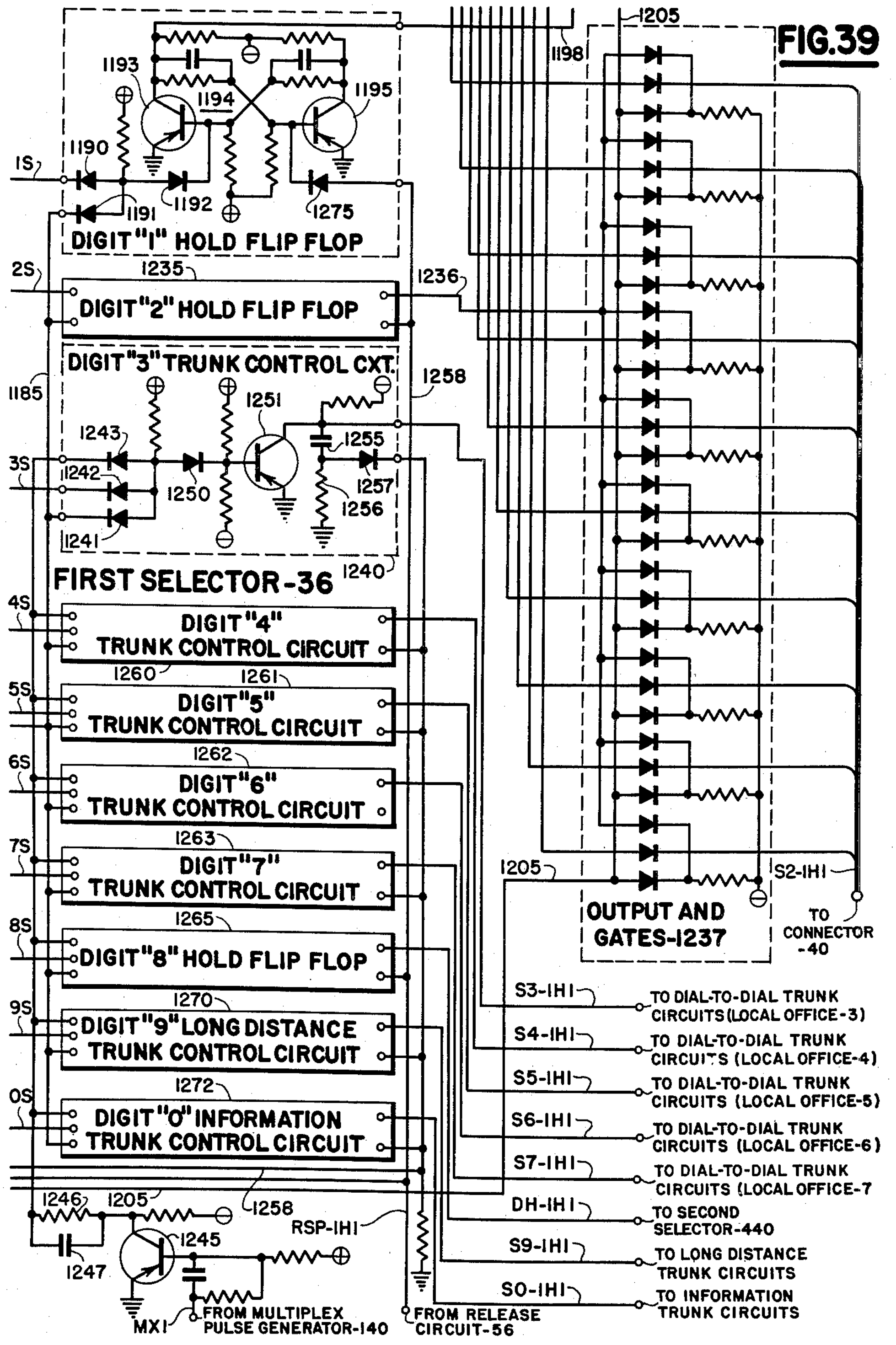

Each link output matrix is provided with a series of one hundred and gates corresponding to the individual lines served by this matrix and an output amplifier is provided for each and gate so that the voice switches which are controlled thereby are correctly actuated. In Fig. 34 only the first, fifth and tenth ones of the tens and units output conductors from the twenty-five line links associated with highway No. 1 are shown together with the and gates commonly controlled by their conductors, it being understood that the matrix 34 actually comprises one hundred and gates to which the tens and units output conductors from the controlling line links are connected. It will be recalled from the general description of the system that negative multiplex pulses in any one of the twenty-five time positions may be applied to the tens and units output conductors TH1–1A, TH1–2A to TH1–0A and UH1–1A, UH1–2A to UH1–0A, inclusive, from any one of the twenty-five associated line links. Since twenty-five links are connected to each tens and units output conductor, it is necessary to provide amplification for these pulses before they are impressed upon the matrix and gates. Also, it is necessary to shift the D.C. potential of the input signal on the tens and units output conductors so that the multiplex pulses supplied to the voice switches can vary from a positive to a negative potential to provide positive blocking of the switching diodes in these voice switches. To this end, the negative multiplex pulses produced on any one of the tens and units output conductors are supplied through a condenser 1050 to the base electrode of an inverter transistor 1051 and appear as positive multiplex pulses across a resistor 1052 connected to the collector of the transistor 1051.

The positive multiplex output of each of these transistors is supplied to one input of each one of a group of ten and gates which serve lines having the corresponding tens and units designation. Thus, the output of the transistor 1051 associated with the first tens output conductor TH1–1A is supplied to a group of ten diodes the first, fifth and tenth of which are shown at the diodes 1055, 1056 and 1057, the positive multiplex output corresponding to the fifth tens conductor TH1–5A is supplied to a group of ten diodes the first, fifth and tenth of which are shown as the diodes 1060, 1061 and 1062 and the tenth tens conductor TH1–0A is connected by way of its associated transistor 1051 to a group of ten diodes, the first, fifth and tenth of which are shown as 1063, 1064 and 1065.

In a similar manner the first units conductor UH1–1A provides positive multiplex pulses by way of its associated transistor 1051 to a group of ten diodes, the first, fifth and tenth of which are shown as the diodes 1070, 1071 and 1072, the fifth units conductor UH1–5A provides positive multiplex pulses for ten diodes, the first, fifth and tenth of which are shown as the diodes 1073, 1074 and 1075, and the tenth units conductor UH1–0A provides positive multiplex pulses for the last group of ten diodes, the first, fifth and tenth of which are shown as the diodes 1076, 1077 and 1078.

When multiplex pulses in the same time position are simultaneously applied to both diodes of a particular and gate this and gate is opened. Thus, assuming that MX1 pulses are applied to the conductor TH1–1A and are also applied to the conductor UH1–1A, positive pulses corresponding to these MX1 pulses are simultaneously impressed upon the diodes 1055 and 1072 so that both diodes are reverse biased and the potential at the junction of these diodes is permitted to rise to a positive value for the duration of the MX1 pulse. The resultant pulse is transmitted through a diode 1080 and a coupling condenser 1081 to the base electrode of an inverter amplifier transistor 1082 the emitter of which is connected to minus twelve volts and the collector of which is connected to plus twelve volts through a resistor 1083. Accordingly, the positive pulse impressed upon the base electrode of the transistor 1082 is inverted in polarity and appears as a negative going pulse at the collector of the transistor 1082 which swings between positive and negative values. The conductor LH1–111 which is employed to control the voice switches 26 and 27 associated with the line circuit 111 is connected to the collector of the transistor 1082 so that these negative going MX1 pulses are transmitted by way of the conductor LH1–111 to the voice switches 26 and 27 and function to open these voice switches in the manner described in detail above in connection with the line circuit 111. In this connection it will be understood that a number of other multiplex pulses in different time positions may be present on the tens conductor TH1–1A and the units conductor UH1–1A. However, multiplex pulses in the same time position will not occur on both of these conductors simultaneously, except for the above mentioned MX1 pulses, because each line link provides multiplex pulses to both tens and units output conductors simultaneously corresponding to the identity of only one line. Thus, if the second line link 2HW1A is seized by line 112, multiplex pulses in the MX2 time position assigned to line link 2HW1A will be produced on the first tens conductor TH1–1A and will also be produced on the second units conductor UH1–2A. However, the MX2 pulses on the conductor TH1–1A do not function to open the and gate 1055, 1072 since no MX2 pulses are simultaneously applied to the diode 1072 from the units conductor UH1–1A. Accordingly, each and gate is opened only by multiplex pulses corresponding to the tens and units identity of a calling line which has seized one of the line links serving highway No. 1.

*First selector 36*

The first selector 36 is shown in detail in Figs. 35 to 39, inclusive, of the drawings. It will be recalled from the general description of the system that each first selector performs the functions of controlling the transmission of a dial tone signal to the calling subscriber, registering the first dialed digit, and routing the connection to the appropriate connector serving the particular hundreds line group of the called line. In addition, each first selector routes the call to either a dial-to-dial trunk circuit extending to one of the other local offices, one of the long distance trunk circuits to the long distance switching center 10 or to an information trunk extending to the attendant's cabinet 59.

Considering first the dial tone control facilities in the first selector 36, these facilities are indicated generally as the dial tone control circuit 1075 (Fig. 38) which includes a dial tone flip-flop circuit 1076 comprising the transistors 1077 and 1078, a dial tone control transistor 1079 and a pair of balanced push-pull emitter follower transistors 1080 and 1081. The dial tone signal developed by the dial tone generator 335 is transmitted by way of the conductors DT to the upper end of one winding 1085 of a coupling transformer 1086 and the bottom end of a second winding 1087 of the transformer 1086. The emitter of the control transistor 1079 is connected to the bottom end of the winding 1095 and the collector of the transistor 1079 is connected to the upper end of the winding 1087. A voltage divider including the resistors 1090, 1091 and 1092 is connected between minus twelve volts and plus twelve volts and the base electrode of the transistor 1079 is connected to the junction of the resistors 1091 and 1092.

During periods when the first selector 36 is not occupied with a call the transistor 1077 in the flip-flop circuit 1076 is held conducting and the transistor 1078 is held non-conducting, so that the collector of the transistor 1078 is at a minus value. The voltage divider network 1090, 1091 and 1092 is so chosen that under these conditions the transistor 1079 is held conductive so that a current path is completed through the windings 1085 and 1087 to the dial tone conductors DT. Accordingly, dial tone current flows through these windings so that a dial tone signal is coupled through the transformer 1086 and the transistors 1080 and 1081 to the input terminals of a voice switch 42, the output terminals of which are connected to receive conductors 21 of highway No. 1. However, at the end of the first digit dialed into the selector 36 in the manner described in detail hereinafter, the flip-flop 1076 is triggered so that the transistor 1077 is rendered non-conductive, and the transistor 1078 is rendered conductive with the result that the collector of the transistor 1078 rises to ground potential. When this occurs the diode 1093, which is connected between the collector of the transistor 1078 and the junction of the resistors 1090 and 1091, is rendered conductive and the base electrode of the transistor 1079 is increased positively by an amount sufficient to render this transistor non-conductive so that dial tone current flow through the windings 1085 and 1087 of the transformer 1086 is terminated.

The voice switch 42 may be identical to the voice switch 26 shown and described in detail in connection with the line circuit 111. However, the voice switch 42 is controlled by MX1 pulses which are continuously supplied thereto from the multiplex generator 140 so that the dial tone signal which is supplied to the voice switch 42 is modulated on MX1 pulses which are then impressed upon the receive conductors 21 of highway No. 1. Accordingly, as soon as a calling subscriber, such as the subscriber at substation A, is assigned a link and the voice switches 26 and 27 thereof are opened in the MX1 time position the dial tone modulated MX1 pulses appearing on the receive conductors 21 are transmitted through the voice switch 27 to the calling subscriber to inform him that dialing may be initiated. The transmission of this dial tone signal to the subset at substation A is employed to terminate transmission of the seize tone signal which originates at this subset when the subscriber comes off-hook.

When the calling subscriber dials the first digit the corresponding combination of dialing frequencies is supplied by way of the line circuit 111 to the voice switch 26 and, assuming that the line circuit 111 is controlled by the line link 1HW1A, these dialing frequencies are modulated on MX1 pulses which are impressed upon the send conductors 20 of highway No. 1. These dialing frequency modulated MX1 pulses are then transmitted to the voice switch 44, associated with the first selector 36. The voice switch 44 may be identical to the voice switch 27 described in detail heretofore in connection with the line circuit 111 except for the fact that the voice switch 44 is continuously controlled by multiplex pulses in the MX1 time position supplied from the multiplex pulse generator 140. Accordingly, the dialing frequency modulated MX1 pulses are passed through the voice switch 44 to a low pass filter and amplifier 1100 which may be identical to the low pass filter 466 and the associated amplifier described heretofore in connection with the line circuit 111.

The output of the low pass filter and amplifier 1100 is supplied to a 900 cycle band pass filter 1101, an 1100 cycle band pass filter 1102, a 1300 cycle band pass filter 1103, a 1500 cycle band pass filter 1104, and 1700 band pass filter 1105 and a 1900 cycle band pass filter 1106. In this connection it will be recalled from the general description of the system that the ten numerical digits are derived from various combinations of the frequencies 900, 1100, 1300, 1500, 1700 and 1900 c.p.s. In addition, the output of the filter and amplifier 1100 is supplied to a band elimination filter 1107 which functions to transmit therethrough only frequencies which occur outside the band from 900 cycles to 1900 cycles per second. The band elimination filter 1107 is employed as a so-called voice guard to prevent further extension of the call when the noise level outside the dialing frequency range exceeds a predetermined value, as will be described in more detail hereinafter.

Each of the filter circuits 1101 to 1106, inclusive, is provided with a frequency selective amplifier channel, these band pass filters and their associated amplifier channels forming the multifrequency receiver facilities in the first selector 36. More particularly, the output of the filter 1101 is coupled through the condenser 1110 to the base electrode of an amplifier transistor 1112 and the signal developed at the collector of the transistor 1112 is coupled through a condenser 1113 to a tuned circuit 1114 which is tuned to 900 cycles. The tuned circuit 1114 thus provides highly selective negative feedback from the collector to the base electrode of the transistor 1112 so that an amplified 900 cycle signal is developed at the collector of the transistor 1112 and is supplied to the base electrode of an emitter follower transistor 1115. The 900 cycle signal developed at the emitter of the transistor 1115 is coupled through the condenser 1116 to a rectifier circuit which includes the diodes 1117 and 1118 and the filter condenser 1120. When a 900 cycle signal is impressed upon the input of the band pass filter 1101 the alternating current signal developed at the emitter of the transistor 1115 is rectified so as to produce a negative going signal across the condenser 1120 which is supplied to the base electrode of an output transistor 1121 so that the collector of the transistor 1121 increases positively in response to this 900 cycle signal. In a similar manner the selective amplifier channels associated with each of the other band pass filters 1102 to 1106, inclusive, function to amplify the corresponding signal frequency and provide positive going control signals at the output thereof.

In order to provide sufficient amplification, a buffer amplifier is associated with each of the selective amplifier channels. Thus, a buffer amplifier 1125 is provided for the 900 cycle selective amplifier channel and the collector of the transistor 1121 is connected through the resistor 1126 to the base electrode of a transistor 1127 so that the 900 cycle signal appears in amplified form and inverted polarity at the collector of the transistor 1127. This amplified signal is coupled by way of the voltage divider network including the resistors 1128 and 1129 to the base electrode of a second buffer amplifier transistor 1130 so that a corresponding 900 cycle control signal is developed at the collector of the transistor 1130.

The collector of the transistor 1130 is connected through the resistors 1131 and 1132 to plus twelve volts and the output of the 900 cycle channel, which is identified as the conductor U, is taken from the junction of the resistors 1131 and 1132. Accordingly, when a 900 cycle signal is impressed upon the filter 1101 the potential of the conductor U increases positively. In a similar manner the output conductors V, W, X, Y and Z are provided corresponding to the band pass filters 1102 to 1106, inclusive.

In order to translate the dialing and supervisory frequency combinations of the six dialing frequencies into corresponding numerical digits, there is provided a series of ten translator and gates each of which is provided with two inputs from the conductors V, W, X, Y and Z corresponding to the particular dialing frequency combination of the numerical digit. More particularly, the first translator and gate comprises the diode 1140, the cathode of which is connected to the conductor V and the diode 1141, the cathode of which is connected to the conductor W, it being recalled from the general description of the system that the first digit "1" consists of a combination of these 1100 and 1300 cycle dialing frequencies. The anodes of the diodes 1140 and 1141 are connected through the resistor 1142 to plus twelve volts so that an and gate for positive signals is provided. Accordingly, it is only when the potentials on the conductors V and W simultaneously increase that both of the diodes 1140 and 1141 are rendered non-conductive so that a positively increasing signal is provided on the first output conductor identified as 1S. The second translator and gate comprises the diodes 1145 and 1146 the cathodes of which are respectively connected to the conductors V and X corresponding to the dialing frequency combination of 1100 cycles and 1500 cycles which identifies the numerical digit "2," the output of this and gate being supplied to the conductor 2S. In a similar manner eight other translator and gates are provided and supply corresponding positive control signals to the conductors 3S to 0S, inclusive.

When an output signal is developed on any one of the conductors 1S to 0S, inclusive, this control potential is impressed upon one input of a ten input or gate, the output of which is employed to control a delay circuit 1150. More particularly, a series of ten diodes 1151 to 1160, inclusive, are provided, the anodes to these diodes being connected to the conductors 1S, 2S to 0S, inclusive, respectively, and the cathodes of these diodes being all connected to the base electrode of one transistor 1165 of a delay multivibrator 1166 which includes a second transistor 1167.

Assuming that a first digit of "1" is dialed, when the translator and gate including the diodes 1140 and 1141 opens so that a positive potential is produced on the conductor 1S, this potential is coupled through the diode 1151 to the base electrode of the normally conducting transistor 1165 of the delay multivibrator 1166 so that this transistor is turned off and the transistor 1167 is rendered conductive. If the delay multivibrator 1166 were triggered with an A.C. coupled signal the multivibrator 1166 would return to its initial state after a time constant depending upon the values of the condenser 1168, which is connected from the collector of the transistor 1167 to the base electrode of the transistor 1165 and the resistor 1169 which is connected from the base electrode of the transistor 1165 to minus twelve volts. However, since the control signals developed in response to the dialing frequencies impressed upon the selective amplifier channels are direct coupled to the base electrode of the transistor 1165 the multivibrator 1166 remains in its triggered condition until the calling subscriber releases the button on his hand set at the end of the digit. More particularly, assuming that this first digit of "1" is dialed, as soon as the calling subscriber presses the button "1" on his hand set, corresponding 1100 cycle and 1300 cycle signals are produced which are rectified in the corresponding selective amplifier channels associated with the filters 1102 and 1103. The resulting control potentials are direct coupled through the remaining stage of the selective amplifier channels and the associated buffer amplifiers to the conductors V and W and accordingly, the translator and gate 1140, 1141 remains open for the duration of these 1100 and 1300 cycle signals, i.e., as long as the subscriber presses the "1" button of his hand set. Since the conductor 1S is connected to plus twelve volts during the entire period when the and gate 1140, 1141 is opened the transistor 1165 of the delay multivibrator 1166 is held in its triggered condition for this period. However, at the end of the first digit the potential on the conductor 1S falls to ground and the multivibrator 1166 is permitted to switch back to its initial state at the end of the time constant period determined by the condenser 1168 and the resistor 1169. As a result, a negative pulse is produced at the collector of the transistor 1165 which persists for slightly longer than the duration of the first digit and a corresponding pulse of positive polarity is produced at the collector of the transistor 1167.

The output of the delay circuit 1150 is employed to control the dial tone control circuit 1075 and also a first digit inhibit circuit 1178 which is in turn employed to control, in part, the registration of the first digit in the selector 36. More particularly, the negative pulse appearing at the collector of the transistor 1165 is differentiated in the circuit including the condenser 1170 and the resistor 1171 and the differentiated wave form is applied through a diode 1176 to the base of transistor 1077 so that the flip-flop 1076 is triggered and transmission of the dial tone signal to the calling subscriber is terminated. This wave form is also applied to a diode 1172 the cathode of which is connected to the base electrode of a transistor 1173 forming one-half of a flip-flop circuit 1174, the other half of which comprises a transistor 1175. The positive pulse produced at the end of the first digit is coupled through the diode 1172 to the base electrode of the transistor 1173 so that this normally conductive transistor is turned off and the transistor 1175 is rendered conductive so that the first digit inhibit flip-flop circuit 1174 is set. When the flip-flop circuit 1174 is set and the transistor 1175 is rendered conductive, the collector thereof rises to ground potential and this collector is connected through the resistor 1180 to the base electrode of an output transistor 1181, the collector of which is connected through the resistor 1182 to plus twelve volts and the emitter of which is connected to the junction of the resistors 1183 and 1184 connected from ground to minus twelve volts. The transistor 1181 is of the NPN type and when the base electrode thereof is brought to ground potential by conduction of the transistor 1175 the transistor 1181 is rendered conductive so that the potential at the collector thereof falls from a plus value to a minus value determined by the divider 1183, 1184.

The potential at the collector of the transistor 1181 is employed to enable the transmission of the digit control signals to the register and trunk connecting facilities of the first selector 36. More particularly, it will be recalled from the general description of the system that a first digit of either "1" or "2" is registered in the first selector and the call is routed accordingly to either the connector 38 or the connector 40, respectively. When a first digit of "3" to "7," inclusive, is dialed the first selector 36 functions to establish a connection to a corresponding group of dial-to-dial trunk circuits extending to the one of the other local offices. When a first digit of "8" is dialed, the first selector 36 registers this digit and then functions to route the call to the second selector 440 so that a connection can be established to any one of a number of groups of dial-to-dial trunks extending to the other local offices, such as the local office 81, i.e., an example of the use of second selector facilities in the system. When a first digit of "9" is dialed, the first selector 36 functions to establish the connection to a group of long distance trunk circuits extending to the long distance switching center 10 and when a first digit of "0" is dialed the first selector 36 functions to establish a connection to one of two information trunks extending to the attendant's cabinet 59.

When a first digit is dialed and a control potential on one of the conductors 1S, 2S to 0S, inclusive, is applied to the ten input or gate which controls the delay circuit 1150, this positive control potential is also applied to the registering or trunk circuit controlling facilities of the first selector 36. More particularly, when a positive control potential is developed on the conductor 1S, this potential is applied to the cathode of a diode 1190 which forms one input of a two input and gate for positive signals the other input of which is a diode 1191, the cathode of this diode being connected to the common control conductor 1185 from the first digit inhibit circuit 1178. Before any digits are received the potential on the conductor 1185 is at a plus value so that the diode 1195 is reverse biased but the diode 1190 is held conductive due to the fact that the conductor 1S is held at ground potential through the diodes 1140 and 1141 of the corresponding translator and gate. However, when a first digit of "1" is dialed the potential on the conductor 1S rises to a plus value so that the diode 1190 is also reverse biased and a positive signal is transmitted through the isolating diode 1192 to the base electrode of a transistor 1193 which forms one section of a digit hold flip-flop circuit 1194 the other half of which is comprised of a transistor 1195, so that the flip-flop circuit 1194 is set to register the dialing of a first digit of "1." When the flip-flop circuit 1194 is set the transistor 1193 is rendered non-conductive and the normally non-conducting transistor 1195 is turned on. Accordingly, the potential at the collector of the transistor 1193 changes from ground potential to a minus value when the flip-flop circuit 1194 is set and this change in collector potential is transmitted by way of the conductor 1198 to a series of ten output and gates indicated generally at 1199 which function to route the second dialed digit to the connector 38 over a particular one of the conductors of the ten conductor cable S1–1H1 in accordance with the numerical value of the second digit. Each of the output and gates 1199 comprises a three input and gate for negative signals, one input of which is controlled by the potential on the conductor 1198 from the digit "1" hold flip-flop circuit 1194. A second input for each of the output and gates 1199 is derived from the control conductors 1S, 2S to 0S, inclusive. More particularly, the conductor 1S is connected through the resistor 1200 to the base electrode of a transistor 1201 the emitter of which is connected to ground and the collector of which is connected by way of the conductor **S8–1H1*a* to the anode of a diode 1202 which forms the second input for the output and gate corresponding to a second digit of "1," the first input of this and gate comprising the diode 1203 the anode of which is connected to the conductor 1198. The third input for this and gate is provided by a diode 1204 the anode of which is connected to a conductor 1205 the potential of which is controlled by the first digit inhibit circuit 1178 and a second digit pass control circuit 1210 which latter circuit will be described in more detail hereinafter. Up until the time that the second digit is dialed, the potential on the conductor 1205 remains at ground so that the output and gate 1202, 1203 and 1204 remains closed. However, at the start of the second digit the second digit pass control circuit 1210 functions to control the potential on the conductor 1205 so that this potential falls to a minus value with the result that the output and gate 1202, 1203 and 1204 is opened, assuming that a second digit of "1" was dialed, and a negative signal is impressed upon the conductor S1–1H1*a* of the cable S1–1H1 and is supplied to the connector 38. On the other hand, if a second digit of "1" is not dialed the potential on the conductor S8–1H1*a* remains at ground due to conduction of the transistor 1201 so that the diode 1202 remains conductive and prevents a negative output signal from appearing on the conductor S1–1H1*a*. In a similar manner, the dialing of second digits of "2" to "0" will result in a corresponding rise in potential on the corresponding conductors S8–1H1*b* to S8–1H1*j* so that the corresponding output and gates is opened and a negative control signal is applied to the corresponding output conductor of the cable S1–1H1**.

Considering now the manner in which the second digit pass control circuit 1210 functions to control the output and gate 1199 at the beginning of the second digit, the positive pulse developed at the collector of the transistor 1167 in the delay circuit 1150 is differentiated in a circuit including the condenser 1212 and the resistor 1213 and the positive differentiated pulse coincident with the leading edge of the pulse developed at the collector of the transistor 1167 is applied through a diode 1215 to the base electrode of one transistor 1216 of a second digit pass multivibrator circuit 1217 the other section of which comprises a transistor 1218. The transistor 1216 is normally conducting so that the positive differentiated pulse which is passed through the diode 1215 functions to turn the transistor 1216 off and render the transistor 1218 conductive. However, the multivibrator 1217 is switched back to its initial condition at the end of a pulse interval determined by the time constant of the condenser 1219 and the resistor 1220, this time constant being preferably in the order of 200 to 300 microseconds. The collector of the transistor 1216 is connected to the anode of a diode 1225 which forms one input of a two input and gate for negative signals, the other input of this and gate being a diode 1226 the anode of which is connected to the collector of the transistor 1173 of the first digit inhibit flip-flop circuit 1174.

When a first digit is dialed into the first selector 36 the delay circuit 1150 is triggered and at the end of this first digit the first digit inhibit flip-flop 1174 is set. Coincident with the beginning of the first digit the delay circuit 1150 provides a positive triggering pulse which is coupled by way of the diode 1215 to the second digit pass multivibrator 1217 so that this multivibrator is triggered and the diode 1225 is reverse biased. However, the diode 1225 only remains reverse biased for 200 to 300 microseconds and then the multivibrator 1217 is switched back to its initial condition in which the diode 1225 is conducting and before the first digit is completed and the first digit inhibit flip-flop circuit 1174 is set. Accordingly, when the diode 1226 is reverse biased at the end of the first digit the diode 1225 is not reverse biased so that the potential of the conductor 1205 is held at ground either through conduction of the diode 1226 and the transistor 1173 at the beginning of the first digit or through the diode 1225 and the transistor 1216 after the multivibrator 1217 has been triggered back to its initial condition and continuing on after the end of the first digit.

When the second digit is dialed into the first selector 36 the control potential corresponding to this digit passes through one of the input diodes 1151 to 1160, inclusive, of the ten input or gate and triggers the delay circuit 1150 so that a positive pulse coincident with the beginning of the second digit is coupled through the diode 1215 and triggers the multivibrator 1217 again. Since the first digit inhibit flip-flop 1174 was set at the end of the first digit the diode 1226 is now reverse biased so that when the multivibrator 1217 is triggered at the start of the second digit and the diode 1225 is reverse biased the potential on the conductor 1205 falls to a minus value so that a particular one of the output and gates 1199 is opened corresponding to the second digit which is dialed, it being understood that the control potential developed on one of the conductors 1S, 2S to 0S, inclusive, by dialing the second digit is transmitted through the corresponding one of the amplifier transistors 1201 to the corresponding one of the output and gates 1199.

If it is assumed that the second digit of "1" is dialed, the potential on the conductor S8–1H1*a* falls to a minus value at the beginning of the second digit and due to the combined action of the second digit pass multivibrator 1217 and the first digit inhibit flip-flop 1174 the conductor 1205 is also at a minus value. Since it has been assumed that a first digit was dialed into the selector and the first digit hold flip-flop 1194 was set, the potential on the conductor 1198 is also at a minus value so that all three of the diodes 1202, 1203 and 1204 are reverse biased and the potential on the output conductor S1–1H1*a* changes to a minus value also. This change in potential on the conductor S1–1H1*a* is employed in the connector 38 to register the second or tens digit of the called line, as will be described in more detail hereinafter. When a third digit is dialed by the calling subscriber, the resulting combination of dialing frequencies is translated by the translator and gates to a corresponding control potential on one of the conductors 1S, 2S to 0S, inclusive, and a corresponding potential is applied through the corresponding amplifier 1201 to one of the output and gates 1199.

The potential on the conductor 1205 remains at a minus value only for the duration of the multivibrator on-time of the second digit pass multivibrator 1217, which is preferably of the order of 200 to 300 microseconds, and at the end of this period the potential on the conductor 1205 rises to ground. However, at the beginning of the third digit the delay circuit 1150 is again triggered in the manner described above so that a positive pulse coincident with the beginning of the third digit is transmitted through the diode 1215 to trigger the multivibrator 1217. Since the first digit inhibit flip-flop 1174 remains set after the first digit the diodes 1225 and 1226 are again reverse biased so that the potential on the conductor 1205 again falls to a minus value. The potential on the conductor 1198 remains at a minus value since the first digit hold flip-flop 1194 remains set for the duration of the call. Accordingly, the third digit may be passed through the corresponding one of the output and gates 1199 and is routed over the corresponding one of the conductors of the cable S1–1H1 to the connector 38 wherein it is employed to register the units digit of the called line.

In the illustrated embodiment the subscriber lines are divided into two groups of one hundred lines each and access to the second group of lines is obtained by dialing a first digit of "2" and establishing the connection through the connector 40 which serves this group of lines. To this end, the second conductor 2S from the translator and gates is connected to a second digit hold flip-flop circuit 1235 and its associated input and gate, the flip-flop 1235 being identical to the first digit hold flip-flop 1194. When the first selector 36 is first seized the potential on the conductor 1185 is at a plus value as described in detail heretofore, so that both inputs of the positive input and gate for the flip-flop 1235 are opened and this flip-flop is set to register the first digit "2." When the flip-flop 1235 is set a negative potential is transmitted by way of the conductor 1236 to a group of ten output and gates 1237 which are employed to establish a connection to the connector 40. The output and gates 1237 are identical to the output and gates 1199 with the exception that the upper diode of each three input and gate is controlled by the potential on the conductor 1236 from the second digit hold flip-flop 1235 whereas the upper diode of each one of the output and gates 1199 is controlled by the potential on the conductor 1198 from the flip-flop 1194. Accordingly, when the potential on the conductor 1205 becomes negative for a few hundred microseconds at the beginning of the second digit one of the output and gates 1237 is opened so that a negative potential is applied by way of one of the conductors S2–1H1 to the connector 40 and is employed therein to register the second digit. The flip-flop 1235 remains set for the duration of the call so that when the third digit is dialed the corresponding one of the output and gates 1237 is opened and a negative control potential is supplied over a corresponding one of the conductors of the cable S2–1H1 to the connector 40 so that the units digit of the called line can be registered and the call completed thereafter. In this connection it will be recalled that the potential on the conductor 1185 falls to ground from a positive value when the first digit inhibit flip-flop circuit 1174 is set at the end of the first digit. Accordingly, the input and gates associated with the flip-flops 1194 and 1235 are thereafter closed so that when the second and third digits are dialed and corresponding control potentials are produced on the conductors 1S to 0S, inclusive, none of the first digit hold flip-flops are set in response thereto.

In the event that the local office has a larger number of subscriber lines the succeeding levels of the first selector 36 would also be provided with first digit hold flip-flops similar to the flip-flops 1194 and 1235 and corresponding series of output and gates would be provided to the connectors which serve successive hundreds line groups. However, in the illustrated embodiment the levels 3 to 7, inclusive, of the first selector 36 are employed to select different dial-to-dial trunk circuits extending to different local offices. In order to establish a connection to a particular group of dial-to-dial trunks in accordance with the first dialed digit, there is provided a trunk control circuit associated with each of these levels in the first selector 36. The trunk control circuit does not function to register the first digit but instead functions to transmit a multiplex pulse in the time position assigned to the first selector to the corresponding group of trunk circuits and this MX pulse is seized by a particular idle trunk circuit and is employed to open the voice switches associated therewith so that the connection is extended from the pulse multiplex highway to the dial-to-dial trunk line extending to the remote office. More particularly, each trunk control circuit, such as the digit "3" trunk control circuit 1240, is provided with a three input and gate, one input of which comprises a diode 1241 the anode of which is connected to the control conductor 1185 from the first digit inhibit circuit 1178 and a second input of which is a diode 1242 the anode of which is connected to the third control conductor 3S from the translator and gates. The third input of this three input and gate is a diode 1243 to the anode of which there is supplied MX1 pulses from the multiplex generator 140. More particularly, the MX1 pulses are coupled to the base electrode of an amplifier transistor 1245 and appear as positive going pulses at the collector of this transistor. These MX1 pulses are transmitted through the parallel combination of a resistor 1246 and a condenser 1247 to the anode of the diode 1243 and to the corresponding input of all of the other trunk control circuits in the different levels of the first selector 36. Accordingly, for the duration of the positive going multiplex pulses impressed upon the diode 1243 all of the diodes 1241, 1242 and 1243 are reverse biased and a positive pulse is applied through the isolating diode 1250 to the base electrode of an inverter transistor 1251 so that a negative going MX1 pulse is produced at the collector of the transistor 1251. This negative MX1 pulse is transmitted by way of the conductor S3–1H1 to the dial-to-dial trunk circuits serving local office 3, such as the trunk circuits 64 and 375, and this pulse is employed to set the corresponding one of the flip-flop circuits in the idle one of these trunk circuits which is enabled by the allotter 390.

In order that only one negative MX1 pulse is applied to the conductor S3–1H1 so that only one trunk circuit will be seized on an outgoing call, the negative MX1 pulse appearing at the collector of the transistor 1251 is differentiated in a circuit including the condenser 1255 and a resistor 1256 and the positive differentiated pulse coincident with the trailing edge of this negative MX1 pulse is transmitted through a diode 1257 and by way of the conductor 1258 and through a further diode 1259 to the base electrode of the transistor 1173 in the first digit inhibit flip-flop 1174. Normally, the first digit inhibit flip-flop 1174 is not set until the end of the first digit when a positive differentiated pulse is derived from the delay circuit 1150 and is coupled to the base electrode of the transistor 1173 through the diode 1172. However, since the flip-flop 1174 controls the potential on the conductor 1185 which in turn controls the transmission of MX1 pulses through the input gate of the trunk control circuit 1240, if the first digit inhibit 1174 is not set until the end of the first digit a number of MX1 pulses would be transmitted through the transistor 1251 and over the conductor S3–1H1 to the dial-to-dial trunk circuits serving the local office 3 so that a number of these trunk circuits would be seized by a single outgoing call. However, the first MX1 pulse which is passed through the transistor 1251 provides the above described positive differentiated pulse which functions to set the first digit inhibit flip-flop 1174 before this flip-flop is normally set by the delay circuit 1150. When this occurs the potential on the conductor 1185 rises to a positive value so that the diode 1241 is held conductive and prevents the further transmission of MX1 pulses to the transistor 1251 and hence to the dial-to-dial trunk circuits serving local office 3. In this manner the transmission of a number of MX1 pulses to the conductor S3–1H1 is prevented and only one dial-to-dial trunk circuit is seized on an outgoing call.

In the fourth, fifth, sixth and seventh levels of the first selector 36 the trunk control circuits 1260, 1261, 1262 and 1263 are provided, respectively, these control circuits being identical to the trunk control circuit 1240 described in detail heretofore. When a first digit corresponding to any one of these levels is dialed, a control potential is produced on the corresponding one of the conductors 1S to 0S, inclusive, and an MX1 pulse is transmitted through the three input and gate of the corresponding trunk control circuit to the corresponding one of the conductors S4–1H1 to S7–1H1 and is routed to the corresponding group of dial-to-dial trunk circuits.

In the illustrated embodiment second selector facilities are provided in conjunction with level "8" of the first selector 36 to illustrate the manner in which second selector stages are handled in the system. Accordingly, in the eighth level of the selector 36 a digit "8" hold flip-flop 1265 is provided, this flip-flop circuit being identical to the digit hold flip-flop circuit 1194 and its associated two input and gate described in detail heretofore. The first, second and successive digits dialed into the first selector 36 are automatically supplied through the transistors 1201 to individual conductors of the cable S8–1H1 which extends to the second selector 440. However, the second selector 440 does not function to pass on control potentials corresponding to the dialed digits until it receives a control signal from the digit "8" hold flip-flop circuit 1265 by way of the conductor DH–1H1, as will be described in more detail hereinafter. After a first digit of "8" is dialed into the first selector 36 and the flip-flop 1265 is set, a control potential is supplied over the conductor DH–1H1 to the second selector 440. The first digit inhibit circuit 1178 also supplies a control potential over the conductor DI–1H1 to the second selector 440 when the flip-flop circuit 1174 is set at the end of the first digit. The second selector 440 is controlled by the potential on the conductor DH–1H1 so that a connection is established to one of the corresponding groups of trunk circuits served thereby in response to dialing of the second digit, as will be described in more detail in connection with this second selector.

In the illustrated embodiment the ninth level of the first selector 36 is assigned to long distance trunks extending to long distance switching center 10. To this end, a digit "9" long distance trunk control circuit 1270 is provided, this trunk circuit being identical to the trunk control circuit 1240 described in detail heretofore. When a first digit of "9" is dialed to the first selector 36 a control potential is produced on the conductor 9S and the trunk control circuit 1270 functions to provide a negative going MX1 pulse on the conductor S9–1H1 which extends to the long distance trunk circuits, such as the long distance trunk circuits 80 and 475 which extend the connection to the long distance switching center 10.

A trunk control circuit 1272 is also provided for level "0" of the first selector 36 and when a first digit of "0" is dialed into this first selector the trunk control circuit 1272 functions to provide a negative MX1 pulse on the conductor S0–1H1 so that one of the information trunk circuits is seized.

When the call is completed the release circuit 56 functions to develop a positive release pulse on the conductor RSP–1H1 and this pulse is supplied to all of the digit hold flip-flops in the first selector 36. More particularly, this positive pulse is coupled through a diode 1275 to the base electrode of the transistor 1195 and functions to reset the flip-flop circuit 1194 in the event that this flip-flop circuit was set during the call. In a similar manner the positive reset pulse is applied to the flip-flop circuits 1235 and 1265 to reset the same in the event that they were set during the call. Also, the positive reset pulse is supplied by way of the conductor RSP–1H1 and through a diode 1276 to transistor 1078 so as to reset the dial tone flip-flop circuits 1076 with the result that dial tone modulated MX1 pulses are again impressed upon the receive conductors 21 of highway No. 1. The positive release pulse is also impressed through a diode 1277 to the base electrode of the transistor 1175 so as to reset the first digit inhibit flip-flop 1174. The flip-flop circuits of the first selector 36 are thus reset to their original conditions and the first selector is then prepared to receive another call.

In order to prevent the prolonged association of the first selector 36 with a calling line when the subscriber fails to complete the call or with a completed call in the event that no speech frequencies are transmitted over the established connection for a prolonged period of time, there is provided a timeout circuit 1280. The circuit 1280 functions to provide a control pulse to the release circuit 56 every three minutes if the first selector 36 is not actively occupied with a call. However, if voice frequencies which are outside of the dialing frequency range of from 900 to 1900 cycles, appear on either the send conductors 20 or the receive conductors 21 of highway No. 1 the timeout circuit 1280 is controlled so that it does not send out a release pulse to the release circuit 56. More particularly, if voice frequencies outside of the dialing frequency range are present on the send conductors 20 of highway No. 1 at an undesirably high level, these frequencies are passed through the band elimination filter 1107 to a band elimination amplifier channel 1285, the output of which is employed to control the selective amplifier channels associated with each of the band pass filters 1101 to 1106, inclusive. Thus, the output signal from the band elimination filter 1107 is coupled through a condenser 1286 to the base electrode of a linear amplifier transistor 1287 and the amplified voice frequency signals appearing at the collector of the transistor 1287 are coupled through the condenser 1288 to a rectifier circuit which includes the diodes 1289 and 1290 so that a negative control potential is produced across the filter condenser 1291 when voice frequencies outside of the dialing frequency range are present on the conductors 20. The negative control potential thus produced across the condenser 1291 is applied to the base electrode of a transistor 1292 so that a positive going control signal is developed at the collector of this transistor. This positive control signal is coupled through a diode 1293 to the ungrounded side of the condenser 1120 in the 900 cycle selective amplifier channel. Accordingly, when voice frequency signals outside of the dialing frequency range of a predetermined level are present on the conductors 20, the diode 1293 is rendered conductive and provides a positive bias across the condenser 1120 which offsets the voltage developed across this condenser due to a 900 cycle signal. As a result, the 900 cycle selective amplifier channel is blocked. In a similar manner the diodes 1294 to 1298, inclusive, are provided for the other five selective amplifier channels and function to block each of these channels when voice frequencies outside of the dialing range appear on the conductors 20. Accordingly, dialing frequency signals which are intermixed with other voice frequency signals are not registered in the selector and connector stages of the system so that false registration of calls is avoided.

The positive control potential developed at the collector of the transistor 1292 is also supplied by way of the conductor 1300 to the timeout circuit 1280. In a similar manner the release circuit 56 is provided with a band elimination filter and amplifier channel similar to the filter 1107 in channel 1285 but associated with the receive conductors 21 of highway No. 1. These facilities function to provide a positive control potential on the conductor VG–1H1 which is tranmitted from the release circuit 56 to the timeout circuit 1280.

Considering first the manner in which the timeout circuit 1280 provides a timeout pulse every three minutes, a sawtooth oscillator is first employed to develop a recurring charging pulse. More particularly, a charging condenser 1305 is connected through a potentiometer 1306 and a resistor 1307 between plus and minus twelve volts and the junction and one base of a double base diode or unijunction transistor 1308 are connected across the condenser 1305. The condenser 1305 is charged from plus twelve volts until a voltage is developed thereacross which is sufficient to cause breakdown of the diode 1308 at which time the condenser 1305 is discharged and a pulse of current flows through the resistor 1309 connected to the other base of the diode 1308. This negative pulse is coupled through the condenser 1310 and the resistor 1311 to a Zener diode 1312 the cathode of which is connected to ground. The diode 1312 breaks down at a predetermined voltage so that negative pulses of uniform amplitude are produced which are coupled through the resistor 1313 and a diode 1314 to the series combination of a resistor 1315 and a storage condenser 1316 so that the condenser 1316 is charged a small increment each time a discharge pulse is produced across the resistor 1309. When the voltage across the condenser 1316 equals the breakdown voltage of a Zener diode 1317 this diode breaks down so that a negative pulse is produced across the resistor 1318 and is coupled through the condenser 1319 to the base electrode of a transistor 1320. There is thus produced at the collector of the transistor 1320 a positive going pulse which is coupled through the condenser 1321 and a diode 1322 to the conductor T0–1H1 and is transmitted to the release circuit 56. In the release circuit 56 this positive going pulse is employed to control the development of positive and negative release pulses on the conductors RSP–1H1 and RSN–1H1 so that all of the equipment controlled by the release circuit 56 is reset to its initial condition and is prepared to receive another call.

The frequency of the sawtooth oscillator and the breakdown voltage of the diode 1317 are so arranged that a pulse is transmitted to the release circuit 56 once every three minutes. However, if voice frequency signals outside of the dialing frequency range are present on the conductors 20 the potential on the conductor 1300 becomes positive and this potential is coupled through a resistor 1325 to the base electrode of an emitter follower transistor 1326 of the NPN type so that a corresponding positive control signal is developed across the resistor 1327 connected to the emitter of the transistor 1326. The positive signal developed across the resistor 1327 is amplified and inverted in the succeeding transistors 1328 and 1329 so that a positive going signal is developed at the collector of the transistor 1329 and this signal is coupled through a diode 1330 to the upper end of the resistor 1315. Accordingly, when the conductor 1300 goes positive the condenser 1316 is discharged through the resistor 1315, conducting diode 1330 and transistor 1329 to ground so that the Zener diode 1317 does not break down. Accordingly, the timeout circuit 1280 is prevented from sending a control pulse to the release circuit 56 during periods when voice frequency signals occur on the conductors 20. In a similar manner the release circuit 56 functions to provide a positive control potential on the conductor VG–1H1 when voice frequency signals outside the dialing frequency range are present on the receive conductors 21 and this signal is coupled through the resistor 1335 to the base electrode of a transistor 1336 of the NPN type, the emitter of which is connected to the emitter of the transistor 1326. Accordingly, when a positive signal is developed on the conductor VG–1H1 in response to the presence of voice frequency signals outside the dialing frequency range on the conductors 21, this signal is produced across the resistor 1327 and is amplified in the transistors 1328 and 1329 so as to prevent the condenser 1316 from charging negatively by an amount sufficient to break down the diode 1317 and hence no timeout pulse is supplied to the release circuit 56. On the other hand, if at any time after the call is established no voice signals are present on the conductors 20 and 21 for a period of three minutes the timeout circuit 1280 generates a pulse on the conductor T0–1H1 so that the release circuit 56 functions to release the equipment and prepare it for another call.

*Second selector 440*

Figure 40:
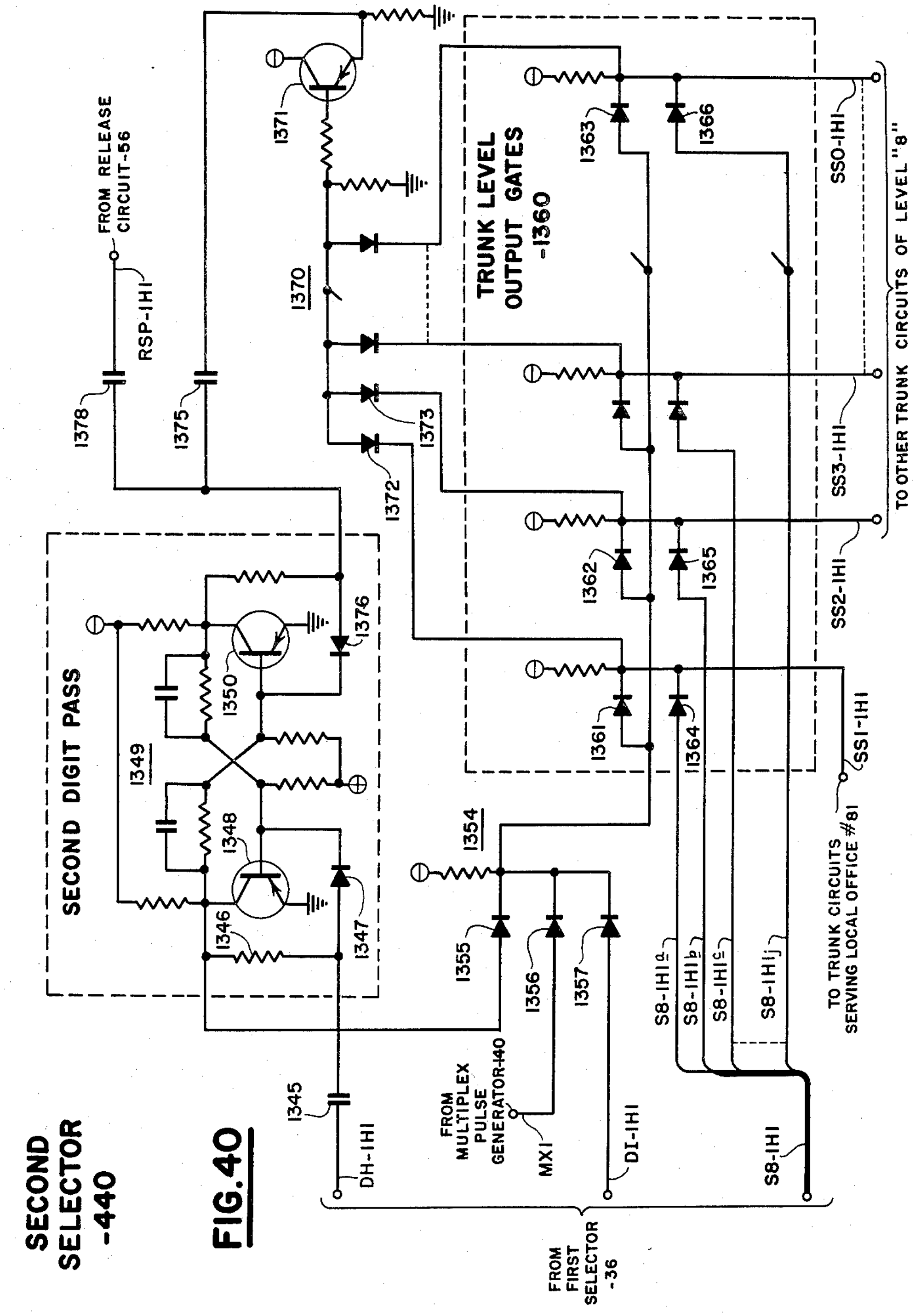
Figure 41:
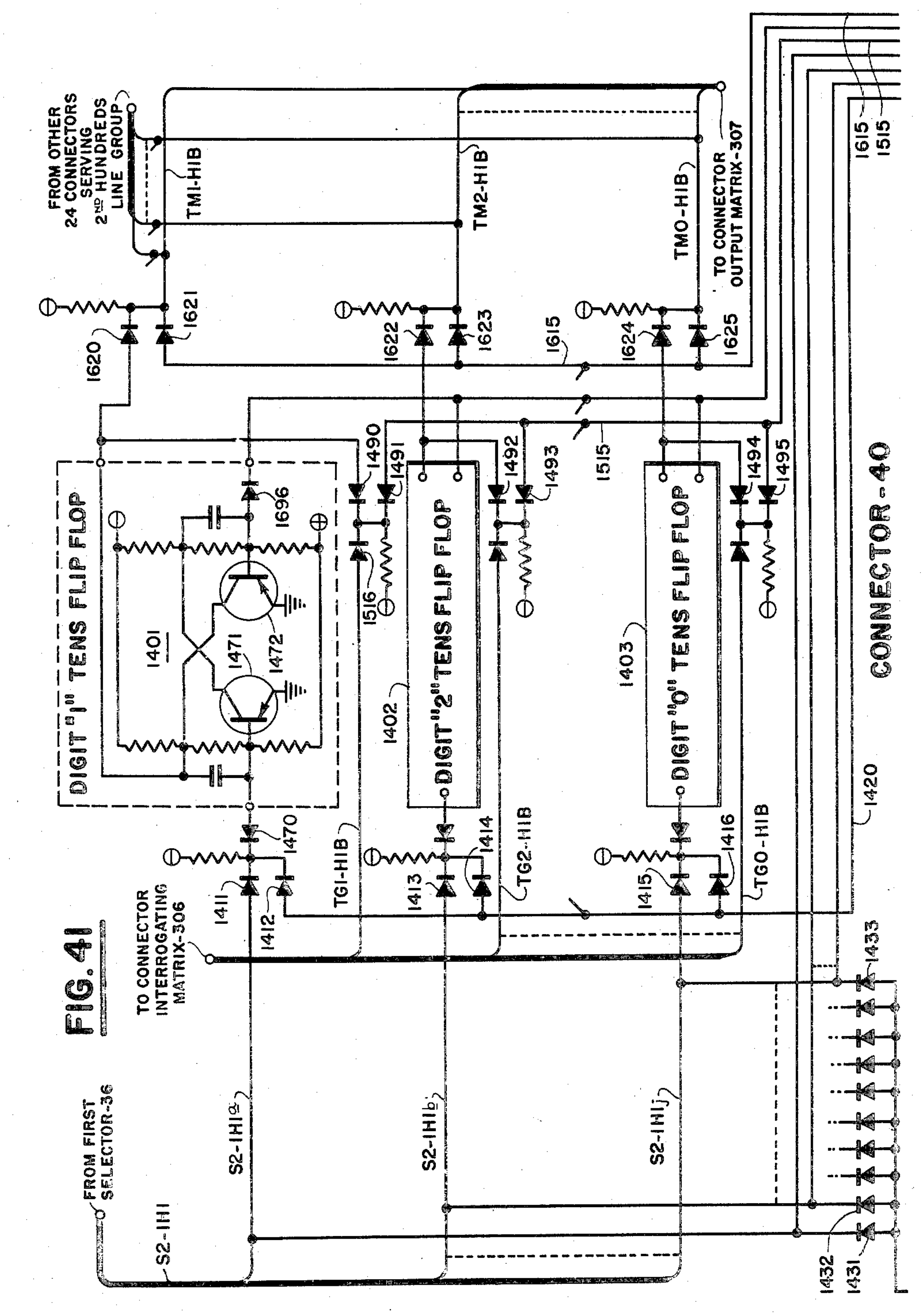
Figure 42:
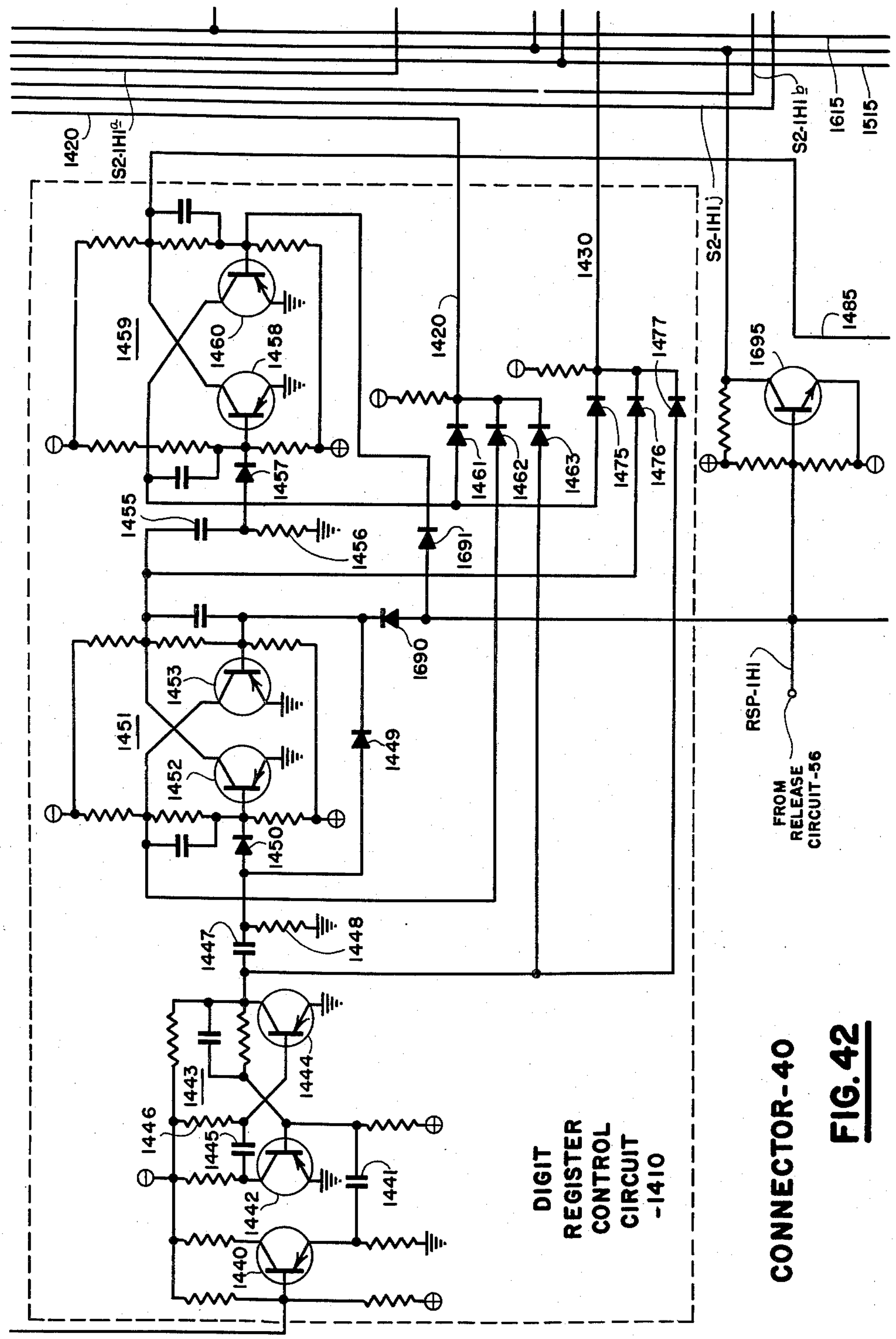
Figure 43:
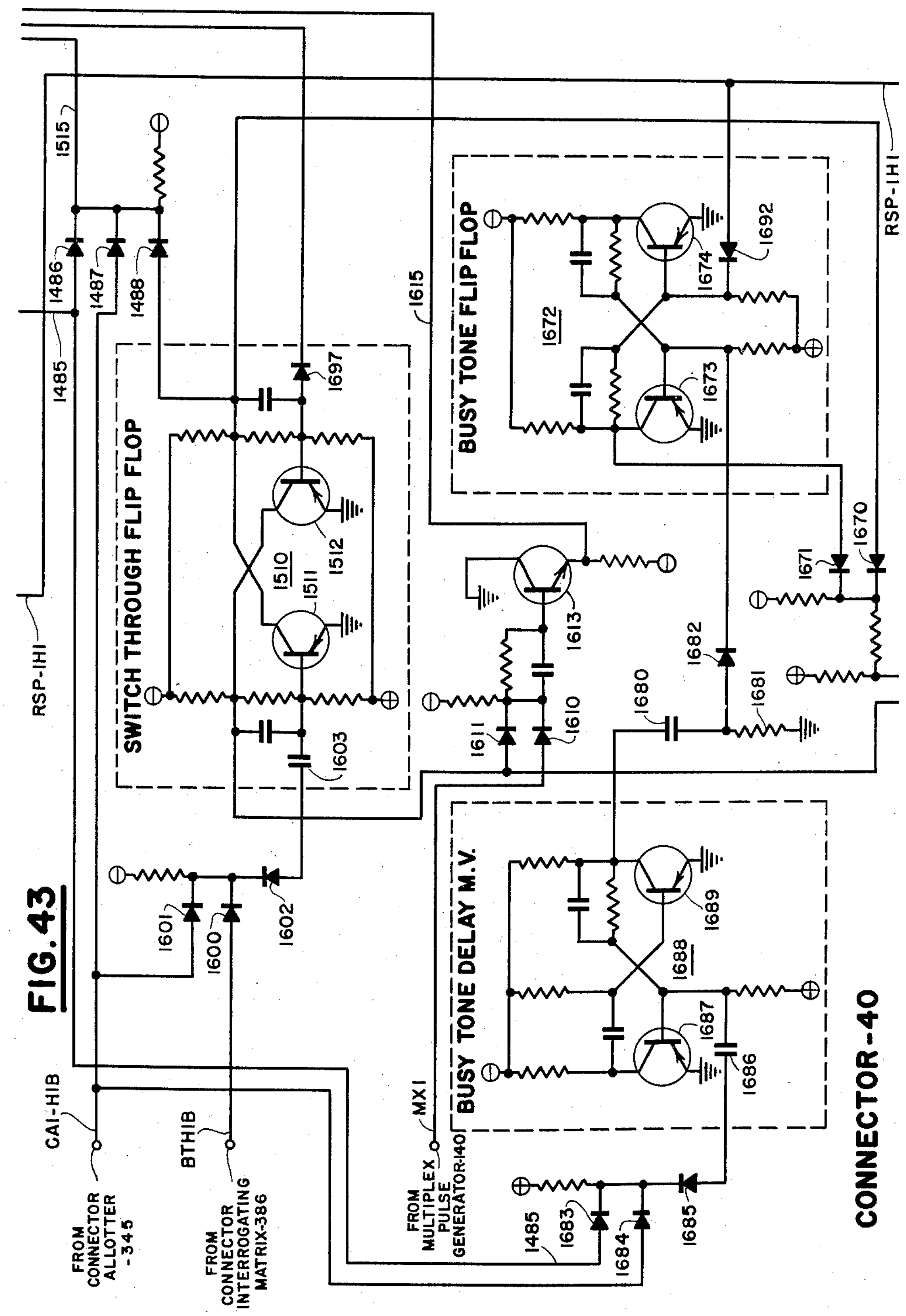
Figure 44:
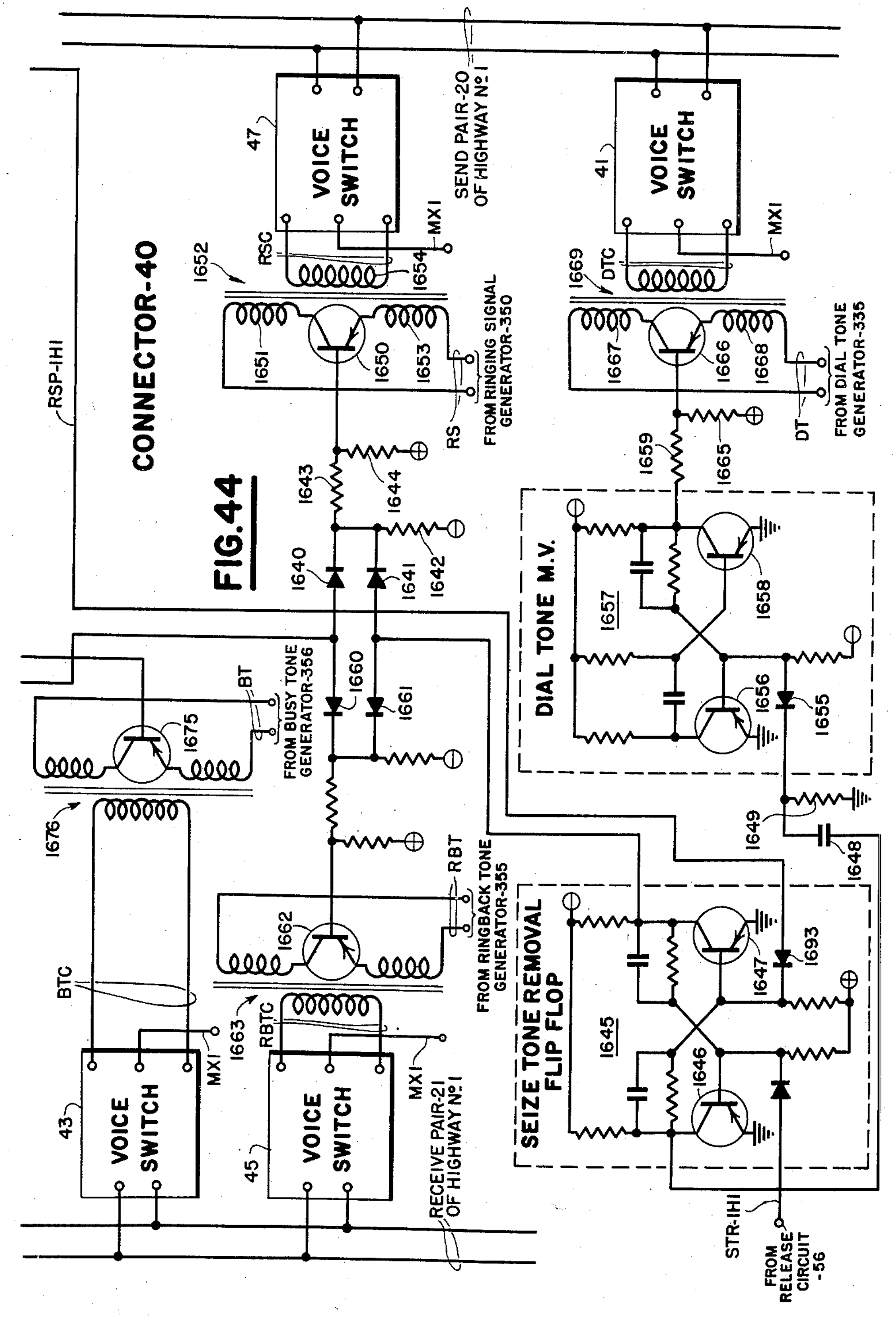
Figure 45:
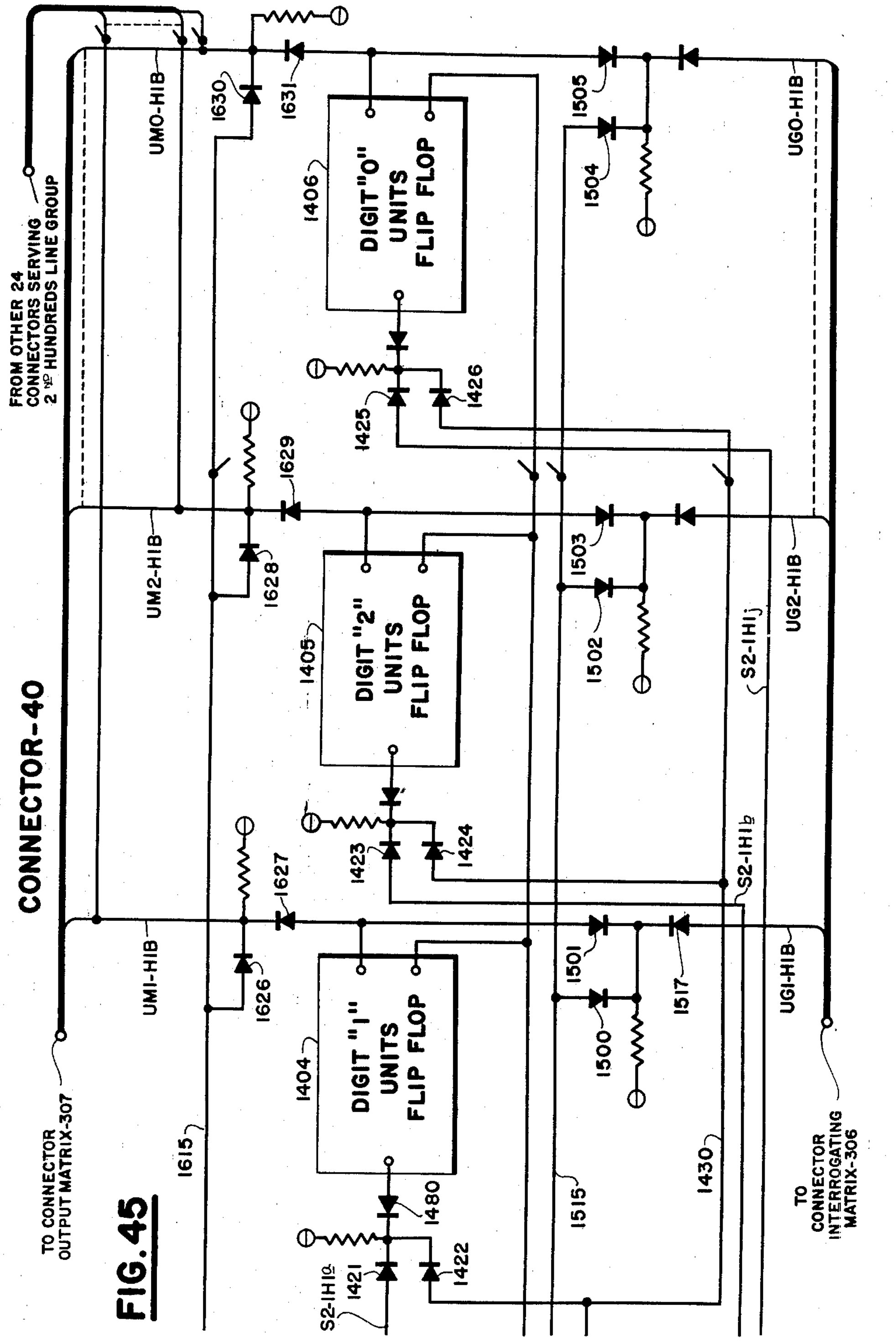

The second selector 440 is shown in detail in Fig. 40 of the drawings. It will be recalled from the general description of the system that the second selector 440 is provided to permit the selection of any one of a number of different trunk circuit groups in response to the dialing of a first digit of "8" and a second digit corresponding to the particular trunk group desired. For example, if the trunk circuits serving local office 81 are desired, the digits "8" and "1" are dialed.

Referring now to Fig. 40 of the drawings, when the digit "8" hold flip-flop 1265 is set in the first selector 36 in response to a first dialed digit of "8" the potential on the conductor DH–1H1 changes from a minus value to ground and this positive potential change is differentiated in a condenser 1345 and resistor 1346 and the positive differentiated pulse is transmitted through a diode 1347 to the base electrode of the conducting transistor 1348 of the second digit pass flip-flop circuit 1349 the other section of which is comprised of a transistor 1350 so that the flip-flop circuit 1349 is set. When the flip-flop circuit 1349 is set the collector potential of the transistor 1348 falls from ground to a minus value and this negative signal is impressed upon one input of a trunk level input gate 1354 which is a three input and gate for negative signals, the collector potential of the transistor 1348 being supplied to the anode of a diode 1355 which forms one input of the trunk level input gate 1354. The MX1 pulses developed by the generator 140 are supplied to the anode of a diode 1356 which forms a second input of the trunk level input gate and the conductor DI–1H1 is connected to the anode of a third diode 1357 which forms the third input of the trunk level input gate. The potential of the conductor DI–1H1 changes from ground to a minus value when the digit inhibit flip-flop circuit 1174 is set in the first selector 36 at the end of the first digit. Accordingly, at the end of the first digit the trunk level input gate 1354 is opened and a negative control signal is applied to a series of ten trunk level output gates 1360. The individual conductors of the cable S8–1H1 from the first selector 36 are connected to the second inputs of the trunk level output gates 1360. Thus, the output of the gate 1354 is supplied to the diodes 1361, 1362 and 1363 of the first, second and tenth ones of the output gates 1360 and the conductor S8–1H1*a* is connected to a diode 1364, the conductor S8–1H1*b* is connected to a diode 1365 and the conductor S8–1H1*j* is connected to the diode 1366 comprising the other inputs of the first, second and tenth ones of the output gates 1360. When a negative potential is supplied to both inputs of one of the output gates 1360 this gate is opened and a negative MX1 pulse is supplied to the corresponding group of trunk circuits. Thus, when negative signals are applied to both of the diodes 1361 and 1364 so that these diodes are reverse biased a negative MX1 pulse is supplied by way of the conductor SS1–1H1 to the trunk circuits serving the local office 81. In a similar manner, when both of the diodes 1362 and 1365 are reverse biased in response to the dialing of a second digit of "2" after the dialing of a first digit of "8", a negative MX1 pulse is supplied by way of the conductor SS2–1H1 to the trunk circuits serving a different local office (not shown) which would be identified by the prefix digits "8" and "2."

As soon as any one of the trunk level output gates 1360 is opened a negative signal is supplied to one input of a ten input or gate for negative signals 1370, the output of which is supplied to the base electrode of a transistor 1371. Thus, the first of the output gates 1360 is connected to the cathode of a diode 1372 forming the first input of the or gate 1370, the second output gate is connected to the cathode of a diode 1373, etc. Accordingly, when any one of the trunk level output gates 1360 is opened a negative MX1 pulse is repeated through the emitter follower transistor 1371 and is coupled through the differentiating condenser 1375 and the isolating diode 1376 to the base electrode of the transistor 1350 of the second digit pass flip-flop circuit 1349. The transistor 1350 is conducting after the flip-flop circuit 1349 has been set so that the positive differentiation pulse produced at the trailing edge of the MX1 pulse supplied to the or gate 1370 passes through the diode 1376 and resets the flip-flop circuit 1349 so that the transistor 1350 is rendered non-conductive and the transistor 1348 is rendered conductive. When this occurs the diode 1355 of the trunk level input gate 1354 is rendered conductive so as to close the input gate 1354 and prevent any of the trunk level output gates 1360 from responding to further digit signals applied to the conductors of the cable S8–1H1. The negative MX1 pulse applied to the conductor SS1–1H1 is employed to seize an idle one of the trunk circuits serving the local office 81 and succeeding digits are transmitted through the voice switches associated with this trunk circuit to this remote office to complete the call.

In order that the second digit pass flip-flop circuit 1349 may be reset even though the call is abandoned before the second digit is dialed, a positive release pulse is supplied by way of the conductor RSP–1H1 from the release circuit 56 and through the condenser 1378 to the diode 1376 so as to reset the flip-flop 1349. With this arrangement the second selector 440 may return to its initial condition even though the call is abandoned.

*Connector 40 and interrogating matrix 306*

The details of the connector 40 and matrix 306 are shown in Figs. 41 to 46, inclusive of the drawings. It will be recalled from the general description of the system that each of the connectors performs the functions of registering the tens and units digits of the called line after which the connector, in cooperation with the corresponding interrogating matrix, performs a busy test and switches through to a called line if it is idle. The connector then supplies a ringing signal to the send conductors of the associated pulse multiplex highway and concurrently supplies a ringback tone signal to the receive conductors of this highway. When the called line answers a seize tone is developed at the answering subset which is detected in the first selector which is associated with the connector and the connector responds thereto by transmitting a dial tone signal to the send conductors of the associated highway to terminate transmission of the seize tone signal from the called line subset. If the called line is busy the connector functions to transmit a busy tone signal to the receive conductors of the associated pulse multiplex highway and hence to the calling subscriber to inform him that the called line is busy.

Considering first the manner in which the tens and units digits are registered in the connector 40, it will be recalled from the description of the first selector 36 that when the second digit is dialed by the calling subscriber a negative control potential is produced on one of the conductors of the cable S2–1H1 corresponding to the dialed digit, this negative control signal persisting for the duration of the pulse developed by the second digit pass multivibrator 1217. In the connector 40 a series of ten flip-flop circuits are provided to register the tens digits, the first, second and tenth of these flip-flops being shown in the drawings as the flip-flops 1401, 1402 and 1403. Also a series of ten units flip-flops are provided to register the units digits, the first, second and tenth of these units flip-flops being shown as the flip-flops 1404, 1405 and 1406. All of the tens and units flip-flop circuits are identical and the digit "1" tens flip-flop circuit 1401 is shown in detail in Fig. 41 of the drawings.

An input and gate is provided for each of the tens and units flip-flop circuits and these inputs and gates are controlled by a digit register control circuit 1410. More particularly, an input and gate comprising the diodes 1411 and 1412 is provided for the tens flip-flop circuit 1401, a similar gate comprising the diodes 1413 and 1414 is provided for the flip-flop circuit 1402 and a similar and gate comprising the diodes 1415 and 1416 is provided for the tens flip-flop 1403. The bottom diodes 1412, 1414 and 1416 of these input and gates are all controlled by the digit register control circuit 1410 by way of the conductor 1420. In a similar manner the first units flip-flop circuit 1404 is provided with an input and gate comprising the diodes 1421 and 1422, the flip-flop 1405 is provided with a similar gate comprising the diodes 1423 and 1424 and the tenth units flip-flop 1406 is provided with an input and gate comprising the diodes 1425 and 1426. The bottom diodes 1422, 1424 and 1426 of these input and gates are all controlled from the digit register control circuit 1410 by way of the common conductor 1430.

Initially the conductors 1420 and 1430 are at ground potential so that all of the input gate circuits associated with the tens and units flip-flop circuits are closed. Accordingly, when a negative control signal is produced on one of the conductors of the cable S2–1H1 the corresponding tens flip-flop circuit is not immediately set to reigster the digit. However, the individual conductors of the cable S2–1H1 are each connected to one input of a ten input or gate the first, second and tenth inputs of which comprise the diodes 1431, 1432 and 1433, it being understod that the other seven conductors of the cable S2–1H1 are likewise connected to other diodes of this ten input or gate. Assuming that a negative control signal is produced on the conductor S2–1H1*a*, this control signal passes through the diode 1431 to the base electrode of an emitter follower transistor 1440 and the negative control signal developed at the emitter of this transistor is coupled through a condenser 1441 to the base electrode of a transistor 1442 which forms one section of a one-shot or biased multivibrator 1443, the other section of which is comprised of a transistor 1444. The transistor 1442 is normally non-conducting and hence the negative signal applied to the base electrode thereof triggers the one-shot multivibrator 1443 so that the transistor 1442 is rendered conductive and the transistor 1444 is rendered non-conductive for a period determined by the time constant of the condenser 1445 and the resistor 1446. When the multivibrator 1443 is thus triggered, a negative pulse is produced at the collector of the transistor 1444 which is differentiated in the condenser 1447 and the resistor 1448, the differentiated waveform being applied to the anodes of a pair of steering diodes 1449 and 1450 which are employed to trigger a first control flip-flop circuit 1451, which includes the transistors 1452 and 1453. The collector of the transistor 1452 is likewise connected through a differentiating circuit which includes the condenser 1455 and the resistor 1456 to the anode of a diode 1457 which is connected to the base electrode of a transistor 1458 which comprises one section of a second control flip-flop circuit 1459, the other section of which comprises the transistor 1460.

In order to open the input gates associated with the tens flip-flop circuits, a three input and gate for negative signals including the diodes 1461, 1462 and 1463 is provided, the anode of the diode 1461 being connected to the collector of the normally non-conductive transistor 1460 of the flip-flop circuit 1459, the anode of the diode 1462 being connected to the collector of the normally non-conducting transistor 1453 of the first control flip-flop circuit 1451 and the anode of the diode 1463 being connected to the collector of the transistor 1444 in the multivibrator 1443. Since the transistors 1453 and 1460 are normally non-conducting a negative signal is normally applied to the anodes of the diodes 1461 and 1462 so that these diodes are reverse biased. Accordingly, as soon as the first digit is dialed into the connector 40 and the multivibrator 1443 is triggered, the transistor 1444 is rendered non-conductive and a negative signal is applied to the diode 1463 so that this diode is also reverse biased and a negative control signal is then produced on the conductor 1420 which controls the input and gates associated with the tens flip-flop circuits. Accordingly, the diodes controlled by the potential on the conductor 1420 are reverse biased and the corresponding input gates are conditioned to respond to the digit signal appearing on one of the conductors of the cable S2–1H1.

Assuming that the first digit dialed into the connector 40 is "1," a negative control signal is impressed upon the conductor S2–1H1*a* and this negative control signal passes through the and gate comprising the diodes 1411 and 1412 and is coupled through an isolating diode 1470 to the base electrode of a transistor 1471 which forms one section of the digit "1" tens flip-flop circuit 1401, the other section of which is comprised of a transistor 1472. The transistor 1472 of the flip-flop 1401 is normally conducting and hence the negative control signal coupled through the diode 1470 to the base electrode of the transistor 1471 sets the flip-flop circuit 1401 so that the transistor 1471 is rendered conductive and the transistor 1472 is rendered non-conductive. The flip-flop 1401 then remains in this set condition for the remainder of the call.

When the multivibrator 1443 is triggered in response to the first digit dialed into the connector 40 a negative pulse is produced at the collector of the transistor 1444. The trailing edge of this pulse is differentiated in the condenser 1447 and resistor 1448 and the resulting positive differentiated pulse is transmitted through the diode 1450 to the base electrode of the normally conducting transistor 1452 of the first control flip-flop circuit 1451 so that this flip-flop circuit is set. When the flip-flop circuit 1451 is set the transistor 1453 is rendered conductive and the transistor 1452 is rendered non-conductive. When the transistor 1453 is rendered conductive the collector of this transistor rises to ground potential so that the diode 1462 is rendered conductive and the potential on the conductor 1420 rises to ground potential. When this occurs all of the input and gates associated with the tens flip-flop circuits are closed so that further digit signals on conductors of the cable S2–1H1 are prevented from setting any of the other tens flip-flop circuits.

In order to control the input and gates associated with the units flip-flop circuits, a three input or gate for negative signals is provided which includes the diodes 1475, 1476 and 1477. The anode of the diode 1475 is connected to the collector of the transistor 1460, the anode of the diode 1476 is connected to the collector of the transistor 1452 and the anode of the diode 1477 is connected to the collector of the transistor 1444. The transistor 1460 is normally non-conducting so that a negative signal is applied to the diode 1475 and each time that the multivibrator 1443 is triggered a negative pulse is produced at the collector of the transistor 1444 which is applied to the diode 1477. The diode 1476 is held in a conducting state due to conduction of the transistor 1452 of the first control flip-flop 1451 until the flip-flop 1451 is set at the end of the first digit. However, when the flip-flop 1451 is set at the end of the first digit the diode 1476 is also reverse biased. Accordingly, when a second digit is dialed into the connector 40, this digit passes through one of the inputs of the ten input or gate and through the transistor 1440 to trigger the multivibrator 1443 and as soon as the multivibrator 1443 is triggered the collector of the transistor 1444 falls to a minus value so that the diode 1477 is also reverse biased and the potential of the conductor 1430 then falls to a minus value. The potential on the conductor 1430 stays at a minus value until the multivibrator 1443 is switched back to its initial condition, at which time the diode 1477 conducts and the potential on the conductor 1430 returns to ground. During the interval when the conductor 1430 is at a minus value, all of the input and gates associated with the units flip-flop circuits are conditioned to receive the second digit signal which is impressed upon one of the conductors of the cable S2–1H1 from the first selector 36. Assuming that the second digit dialed into the connector 40 is "1" a negative control signal is again developed on the conductor S2–1H1*a* and is supplied to the diode 1421 so that both the diodes 1421 and 1422 are reverse biased and the negative control signal passes through the isolating diode 1480 to the input of the digit 1 units flip-flop circuit 1404 so that this flip-flop circuit is set to register the units digit of "1."

In order to close both of the and gates controlled by the conductors 1420 and 1430 at the end of the second digit, the second control flip-flop 1459 is provided which is controlled from the first control flip-flop 1451. When the flip-flop 1451 is set at the end of the first triggering cycle of the multivibrator 1443 the collector of the transistor 1452 falls to a minus value. This change in collector potential has no effect on the second control flip-flop 1459. However, when the multivibrator 1443 is triggered again the positive differentiation pulse produced at the end of the multivibrator cycle is coupled through the diode 1449 to the base electrode of the transistor 1453 and functions to reset the flip-flop 1451 to its original condition. When this occurs the collector of the transistor 1452 rises to ground potential. This potential increase at the collector of the transistor 1452 is coupled through the condenser 1455 and the diode 1457 to the base electrode of the transistor 1458 so that the second control flip-flop 1459 is set. When the flip-flop circuit 1459 is set the collector of the transistor 1460 rises to ground potential so that the diodes 1461 and 1475 are both rendered conductive. Accordingly, both of the three input and gates which control the potentials on the conductors 1420 and 1430 are thereafter closed so that no further signals can be applied to either the tens flip-flop circuits or the units flip-flop circuits and the digits registered therein remain for the duration of the call.

When both the tens and units digits have been registered, the connector 40, in conjunction with the interrogating matrix 306 performs a busy test to determine whether or not the called line is idle. More particularly, after the second digit has been dialed into the connector 40 the second control flip-flop circuit 1459 is set and the collector of the transistor 1458 falls to a minus value, this collector potential being applied by way of the conductor 1485 to the anode of a diode 1486 which forms one input of a three input and gate for negative signals the other two inputs of which comprise the diode 1487 and the diode 1488. This three input and gate is used as a master control gate to control the transmission of tens and units gating signals from the tens and units flip-flop circuits which have been set in the connector 40 to the common connector interrogating matrix 306. More particularly, a tens gating circuit is provided for each of the tens flip-flop circuits and a units gating circuit is provided for each of the units flip-flop circuits and one input of all of the tens and units gating circuits is controlled by the master control gate 1486, 1487 and 1488. Thus, an and gate comprising the diodes 1490 and 1491 is provided for the digit "1" tens flip-flop circuit 1401, the anode of the diode 1490 being connected to the collector of the transistor 1472 in the flip-flop circuit 1401. In a similar manner a tens gate comprising the diodes 1492 and 1493 is provided for the flip-flop 1492 and a tens gate comprising the diodes 1494 and 1495 is provided for the digit "0" tens flip-flop circuit 1403. The first units flip-flop circuit 1404 is also provided with a units gate comprising the diodes 1500 and 1501, the anode of the diode 1501 being connected to the collector of the normally conducting transistor of the flip-flop circuit 1404 in a manner similar to that shown in connection with the tens flip-flop 1401. Also, the second units flip-flop 1405 is provided with a units gate comprising the diodes 1502 and 1503 and the tenth units flip-flop 1406 is provided with a units gate comprising the diodes 1504 and 1505. The diodes 1491, 1943 and 1495 of the tens gates and the diodes 1500, 1502 and 1504 of the units gates are all controlled by the master control gate 1486, 1487 and 1488.

The connector allotter 345 functions sequentially to apply to the twenty-five output conductors thereof a negative allotter signal so that the group of twenty-five connectors may all use the common interrogating matrix 306. The conductor CA1–H1B from the connector allotter 345 is connected to the anode of the diode 1487 which forms the second input of the master control gate. A switchthrough flip-flop circuit 1510, comprising the transistors 1511 and 1512, is controlled by the connector allotter 345 and the common interrogating matrix 306 to provide switchthrough in the connector 40 in the event that the called line is idle. Normally, that is before switchthrough has been established in the connector 40, the transistor 1511 is non-conducting and the anode of the diode 1488 is connected to the collector of this transistor so that the diode 1488 is reverse biased before switchthrough in the connector 40. Also, after the second digit has been dialed into the connector 40 the potential on the conductor 1485 falls to a minus value so that the diode 1486 is reverse biased. Accordingly, when a negative allotter signal is produced on the conductor CA1–H1B the diode 1487 is also reverse biased and a negative output signal is supplied by way of the conductor 1515 to all of the tens and units gate circuits associated with the tens and units flip-flop circuits. However, only the particular tens and units gate circuits which are associated with the particular tens flip-flop and units flip-flops which have been set in the connector 40 are opened and function to transmit tens gating signals to the common interrogating matrix 306. Thus, assuming that the digit "1" tens flip-flop circuit 1401 has been set, when a negative signal is produced on the conductor 1515 by the master control gate the tens gate 1490, 1491 is opened and a negative tens gating signal is coupled through the isolating diode 1516 and is transmitted over the conductor TG1–H1B to the common interrogating matrix 306. In a similar manner, assuming that the digit "1" units flip-flop 1404 has been set, the units gate 1500, 1501 is opened and a negative units gating signal is coupled through the diode 1517 and over the conductor UG1–H1B to the common interrogating matrix 306. The negative tens and units gating signal persist on the conductors TG1–H1B and UG1–H1B for the duration of the negative allotter signal applied to the conductor CA1–H1B at the end of which allotter signal the diode 1487 is again rendered conductive so that the conductor 1515 is brought to ground potential and all of the tens and units gates controlled thereby are closed.

Figure 46:
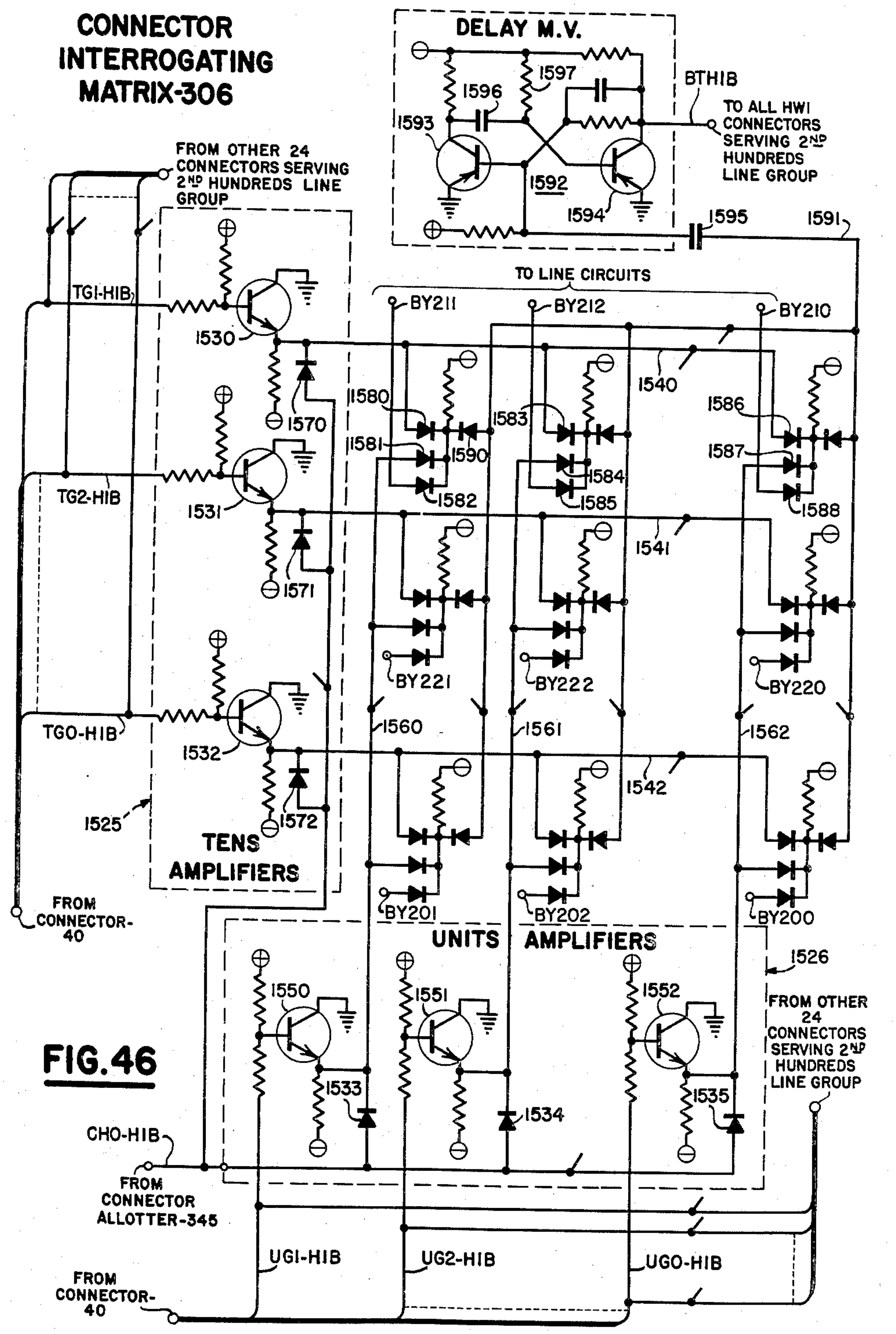

Referring now to the interrogating matrix 306 which is shown in Fig. 46 of the drawings, the negative tens gating signals produced by the connectors associated with the matrix 306 are amplified and inverted in a series of tens amplifiers 1525 the outputs of which are connected to the tens bus bars of the matrix 306 and the units gating signals which are produced by these connectors are amplified in a series of units amplifiers 1526 the outputs of which are supplied to the units bus bars of the matrix 306. More particularly, assuming that a negative tens gating signal is produced on the conductor TG1–H1B by the connector 40 in the manner described above, this signal is coupled to the base electrode of a transistor 1530, of the NPN type, the emitter of the transistor 1530 being connected to the first tens bus bar 1540 of the matrix 306. In a similar manner the tens gating signal supplied to the conductor TG2–H1B is coupled through the emitter follower transistor 1531 to the second tens bus bar 1541 of the matrix 306 and the tens gating signals supplied to the tenth conductor TG0–H1B are transmitted through the emitter follower 1532 to the tenth tens bus bar 1542. In a similar manner, the first units gating conductor UG1–H1B is connected to the base electrode of an emitter follower transistor 1550, the emitter of which is connected to the first units bus bar 1560 of the matrix 306, the second units gating conductor UG2–H1B is coupled through the emitter follower 1551 to the second units bus bar 1561 and the tenth units gating conductor UG0–H1B is connected through the emitter follower 1552 to the tenth units bus bar 1562.

In order to block the output from the tens and units amplifiers 1525 and 1526 during periods when the connector allotter 345 is switching from one connector to another, facilities are provided for blocking all of the tens and units amplifiers during this period. More particularly, the connector allotter 345 is arranged to supply a holdoff pulse to the conductor CH0–H1B during periods when the connector allotter 345 is switching an allotter signal from one connector to another and this positive holdoff pulse is applied through individual diodes to the output of each of the tens and units amplifiers so as to prevent the transmission of tens and units gating signals during the allotter switchover period. Thus, the conductor CH0–H1B is connected through the diode 1570 to the emitter of the transistor 1530, through the diode 1571 to the emitter of the transistor 1531 and through the diode 1572 to the emitter of the transistor 1532. Likewise, the conductor CH0–H1B is connected through the diodes 1533, 1534 and 1535 to the transistors 1550, 1551 and 1552 of the units amplifiers 1526.

The holdoff pulse produced on the conductor CH0–H1B persists only during the allotter switchover period and disappears as soon as the allotter 345 is providing a negative allotter signal to a particular connector. Accordingly, in the illustrated call the tens bus bar 1540 and the units bus bar 1560 fall to a minus value for the duration of the tens and units gating signals applied respectively to the conductors TG1–H1B and UG1–H1B.

The interrogating matrix 306 includes a group of one hundred three input and gates for negative signals which individually correspond to the lines of the second hundreds line group. These three input and gates are arranged corresponding to the tens and units designation of the associated line and the tens and units bus bars are individually connected to groups of ten of these three input and gates according to the tens and units designations of the associated lines. Thus, the first tens bus bar 1540 is connected to a group of ten three input and gates, which may be called interrogating matrix gates, the first of which comprises the diodes 1580, 1581 and 1582, the second of which comprises the diodes 1583, 1584 and 1585 and the tenth of which comprises the diodes 1586, 1587 and 1588, the bus bar 1540 being connected to the upper diode, such as the diodes 1580, 1583 and 1586 of each of these gates. In a similar manner the other nine tens bus bars are connected to ten horizontal rows of and gates the first, second and tenth of which are shown in connection with the second bus bar 1541 and the tenth bus bar 1542. The units bus bars are individually connected to a column of ten of these three input and gates, so that upon simultaneous development of a negative control signal on one of the tens bus bars and on one of the units bus bars a particular one of these gates will receive negative signals on two inputs thereof.

The third input of each of the one hundred gates in the interrogating matrix 306 is supplied from the line circuit associated with the individual line. Thus, the line circuit 211 is connected by way of the conductor BY211 to the anode of the diode 1582 of the matrix gate which is connected to the first tens bus bar 1540 and the first units bus bar 1560 through the the diodes 1580 and 1581, respectively. In a similar manner each of the other ninety-nine matrix gates is connected by way of the corresponding BY conductor to the line circuit of the corresponding line.

It will be recalled from the detailed description of the line circuit 111 that the busy-idle conductor of each of the line circuits is at a minus value during periods when the associated line is not occupied with a call and this conductor rises to ground potential as soon as the associated line is occupied with a call either as a calling or as a called line. For example, when the line circuit 211 is not occupied with a call and multiplex pulses are not supplied to any of the eight voice switches associated therewith the potential on the conductor BY211 is at a minus value. However, as soon as multiplex pulses are supplied to any of the voice switches associated with the line circuit 211 from one of the link output matrices or one of the connector output matrices, these multiplex pulses are employed to change the potential on the conductor BY211 to ground. Accordingly, when a negative control signal is applied to individual tens and units bus bars of the interrogating matrix 306 for the busy test, the corresponding matrix gate is opened only if the called line is idle. For example, if negative control signals are produced on the tens bus bar 1540 and the units bus bar 1560 so that the diodes 1580 and 1582 are reverse biased, this matrix gate will be opened only if the conductor BY211 is also at a minus value so that the diode 1582 is also reverse biased. If the called line is idle the conductor BY211 is at a minus value and a negative signal is then transmitted through an isolating diode 1590 to the conductor 1591 which is common to all of the other ninety-nine matrix gates through similar isolating diodes.

The negative signal thus produced on the conductor 1591 is employed to trigger a delay one-shot multivibrator 1592 which includes the transistors 1593 and 1594. More particularly, the negative potential produced on the conductor 1591 is coupled through a condenser 1595 to the base electrode of the transistor 1593 and triggers the multivibrator 1592 so that the transistor 1593 is rendered conductive and the transistor 1594 is rendered non-conductive. The multivibrator 1592 is held in this triggered condition for a period determined by the time constant of the condenser 1596 and the resistor 1597 after which the multivibrator 1592 is returned to its initial state.

The conductor BTH1B, which is supplied to all of the highway No. 1 connectors serving the second hundreds line group, is connected to the collector of the transistor 1594. Normally this transistor is conducting so that the potential of the conductor BTH1B is ground. However, when the multivibrator 1592 is triggered by a negative control signal appearing on the conductor 1591 the potential of the conductor BTH1B falls to a minus value for the duration of the multivibrator period. In this connection it will be understood that control signals may be produced on a particular tens bus bar and a particular units bus bar by any one of the twenty-five connectors serving the second hundreds line group. However, since only one connector is allotted to the matrix 306 at a particular time, the negative control signals from different connectors do not interfere with one another even though a common interrogating matrix is used for all connectors. It will also be noted that if the called line is busy the corresponding matrix gate will not be opened so that the potential on the conductor BTH1B remains at ground. For example, if the line 211 is busy, the potential on the conductor BY211 is at ground so that the diode 1582 is held conducting and the matrix gate 1580, 1581 and 1582 remains closed so that no negative control signal is impressed upon the conductor 1591 and the delay multivibrator 1592 is not triggered.

Considering now the manner in which the potential on the conductor BTH1B is employed on the connector 40 to establish switchthrough to the called line in the event that the called line is idle or to transmit busy tone to the calling subscriber if the called line is busy, the conductor BTH1B is connected to the anode of a diode 1600 which forms one input of a two input and gate for negative signals the other input of which comprises a diode 1601 the anode of which is connected to the allotter control conductor CA1–H1B from the connector allotter 345. If the called line is idle the conductor BTH1B will be at a minus value during the period when the allotter conductor CA1–H1B is also at a minus value so that both of the diodes 1600 and 1601 are reverse biased and a negative signal is transmitted through the isolating diode 1602 to the switchthrough flip-flop circuit 1510 so as to set this flip-flop circuit. This negative signal is coupled through a condenser 1603 to the base electrode of the transistor 1511 so that the flip-flop 1510 is set in which condition the transistor 1511 is conductive and the transistor 1512 is rendered non-conductive. A switchthrough condition is thus established in the connector 40 which then remains for the duration of the call.

When switchthrough is established in the connector 40, multiplex pulses in the time position assigned to this connector are then transmitted to the connector output matrix 46 so that the voice switches associated with the called line are opened and a ringing signal may be transmitted therethrough to the subset of the called subscriber. To this end, a two input and gate for negative signals comprising the diodes 1610 and 1611 is provided, the anode of the diode 1610 being connected to the MX1 conductor from the generator 140 and the anode of the diode 1611 being connected to the collector of the transistor 1512 in the switchthrough flip-flop circuit 1510. When switchthrough occurs the collector of the transistor 1512 falls to a minus value and when a negative MX1 pulse appears on the MX1 conductor both of the diodes 1610 and 1611 are reverse biased so that a negative signal is transmitted to the base electrode of an emitter follower 1613 for the duration of the MX1 pulse. There is thus produced at the emitter of the transistor 1613 a negative MX1 pulse each time a negative pulse is developed on the conductor MX1 and these negative MX1 pulses are supplied by way of the conductor 1615 to a series of twenty and gates individually associated with the tens flip-flop circuits and the units flip-flop circuits in the connector 40. More particularly, an output and gate comprising the diodes 1620 and 1621 is provided for the digit "1" tens flip-flop 1401, the anode of the diode 1620 being connected to the collector of the transistor 1472 and the anode of the diode 1621 being connected to the conductor 1615. In a similar manner the output gate comprising the diodes 1622 and 1623 is provided for the second tens flip-flop 1402 and the diodes 1624 and 1625 provide an output and gate for the tenth tens flip-flop 1403. The first units flip-flop 1404 is provided with an output gate comprising the diodes 1626 and 1627, the second units flip-flop 1405 is provided with an output gate comprising the diodes 1628 and 1629 and the tenth units flip-flop 1406 is provided with an output gate comprising the diodes 1630 and 1631. One input of each of these output gates, such as the diodes 1621, 1623, 1625, 1626, 1628 and 1630, is controlled by the negative MX1 pulses produced on the conductor 1615 when switchthrough occurs in the connector 40.

It will be recalled that when the tens and units digits are dialed into the connector 40 corresponding ones of the tens and units flip-flop circuits are set and remain set for the duration of the call. Assuming that the line "211" is called, the flip-flops 1401 and 1404 would be set and negative potentials would be impressed upon the diodes 1620 and 1627 so that the output gates of the flipflops 1401 and 1404 would both be opened in the MX1 time position each time an MX1 pulse is applied to the conductor 1615. Accordingly, negative MX1 pulses are transmitted by way of the tens matrix conductor TM1–H1B and by way of the units matrix conductor UM1–H1B to the connector output matrix 46. The connector output matrix 46 is identical to the link output matrix 34 described in detail heretofore and is provided with a group of one hundred and gates corresponding individually to the lines in the second hundreds line group. Accordingly, when negative MX1 pulses are applied to the conductors TM1–H1B and UM1–H1B the gate 351 of the connector output matrix 46 is opened and corresponding MX1 pulses are transmitted by way of the conductor CH1–211 to the voice switches 202 and 204 so that these voice switches are opened in the MX1 time position and connect the line circuit 211 to the receive and send conductors 21 and 20, respectively, of highway No. 1 for the pulse interval thereof.

When switchthrough is established in the connector 40 it is also necessary to transmit a ringing signal to the called subscriber and a ringback tone signal to the calling subscriber. To this end, a two input and gate for negative signals, comprising the diodes 1640 and 1641 is provided, this and gate being controlled by the switchthrough flip-flop 1510 and by a seize tone removal flip-flop circuit 1645, this latter flip-flop circuit includes the transistors 1646 and 1647. The transistor 1647 of the flip-flop 1645 is normally non-conducting so that the diode 1641 is normally reverse biased. Accordingly, when the switchthrough flip-flop 1510 is set and the collector of the transistor 1512 falls to a minus value the diode 1640 is also reverse biased so that a negative control signal is applied to the base electrode of a control transistor 1650 through a voltage divider network including the resistors 1642, 1643 and 1644 connected from minus twelve volts to plus twelve volts, so that the transistor 1650 is then rendered conductive. The collector of the transistor 1650 is connected to one winding 1651 of a coupling transformer 1652 and the emitter of the transistor 1650 is connected to another winding 1653 of this transformer. A ringing signal which is developed by the ringing signal generator 350 is supplied by way of the conductors RS to windings 1651 and 1653 and when the control transistor 1650 is rendered conductive this ringing signal is coupled through the output winding 1654 of the transformer 1652 to the voice switch 47 which is connected to the send conductors 20 of highway No. 1. The voice switch 47 is identical to the voice switch 26 described in detail heretofore in connection with the line circuit 111 with the exception that the voice switch 47 is continuously supplied with negative MX1 pulses from the generator 140 by way of the conductor MX1. Accordingly, the voice switch 47 functions to supply ringing signal modulated MX1 pulses to the send conductors 20 of highway No. 1. These ringing signal modulated MX1 pulses are transmitted through the voice switch 204, which is opened in the MX1 time position by the negative MX1 pulses applied to the conductor CH1–211 in the manner described heretofore, and the ringing signal is demodulated in the line circuit 211 and transmitted to the subset of the subscriber at substation E so as to actuate the ringing facilities provided at this subset.

In order to transmit a ringback tone signal to the calling subscriber there is provided a two input and gate for negative signals comprising the diodes 1660 and 1661 which are controlled in a manner similar to the diodes 1640 and 1641 and provide a negative control signal to the base electrode of a transistor 1662 so as to render this transistor conductive. The transistor 1662 controls the flow of ringback current from the conductors RB through a coupling transformer 1663 and when the transistor 1662 is rendered conductive a ringback tone signal is coupled through the transformer 1663 to the voice switch 45. The voice switch 45 is identical to the voice switch 47 and is supplied with MX1 pulses so that ringback tone signal modulated MX1 pulses are impressed upon the receive conductors 21 of highway No. 1. Assuming that the subscriber at substation A is calling, these ringback tone signal modulated MX1 pulses are transmitted through the voice switch 27 to the line circuit 111 wherein the ringback tone signal is demodulated and supplied to the subscriber at substation A to inform him that the called line is being rung.

When the subscriber at substation E answers the call his subset functions to transmit a seize tone signal to the line circuit 211 and this seize tone signal is modulated on MX1 pulses in the voice switch 204 and these modulated MX1 pulses are impressed upon the receive conductors 21 of highway No. 1. The subset of subscriber E will continue to transmit this seize tone signal until the subset receives a dial tone signal since the subset is controlled only by voice frequency signals transmitted thereto. Accordingly, it is necessary for the connector 40 to transmit a dial tone signal to the called subscriber so that the subset will terminate transmission of the seize tone signal and conversation will then be possible between the calling and called subscribers. To this end, the release circuit 56, which is connected to the receive conductors 21 through the voice switch 54, is provided with a separate band pass filter and amplifier channel for the 1500 cycle seize tone signal so that when seize tone modulated MX1 pulses are impressed upon the receive conductors 21 by the called subscriber these pulses pass through the voice switch 54 and are detected in the release circuit 56 to produce a positive going signal on the conductor STR–1H1 which is connected to the connectors 38 and 40. In the connector 40 the positive going signal on the conductor STR–1H1 is applied to the base electrode of the normally conducting transistor 1646 of the seize tone removal flip-flop circuit 1645 so that this flip-flop circuit is set and the transistor 1646 is rendered nonconductive while the transistor 1647 is rendered conductive. When the transistor 1646 is rendered non-conductive the collector potential thereof falls to a minus value and this negative going signal is differentiated in a circuit including the condenser 1648 and the resistor 1649 and the negative differentiation pulse is coupled through the diode 1655 to the base electrode of a transistor 1656 which forms one section of a dial tone multivibrator 1657, the other section of which is formed by a transistor 1658. The transistor 1658 is normally conducting and the collector thereof is at ground potential. This collector is connected through the resistors 1659 and 1665 to plus twelve volts and the base electrode of a control transistor 1666 is connected to the junction of the resistors 1659 and 1655. When the transistor 1658 is conducting the collector thereof is at ground so that the control transistor 1666 is non-conducting and prevents the flow of dial tone current from the dial tone generator 335 through the conductors DT to the windings 1667 and 1668 of a coupling transformer 1669. However, when the multivibrator 1657 is triggered by the application of a negative pulse to the base electrode of the transistor 1656 the transistor 1658 is rendered non-conductive so that the control transistor is turned on for the duration of the period of the one-shot multivibrator 1657. When the transistor 1656 is rendered conductive, a dial tone signal is coupled through the transformer 1669 to the voice switch 41. The voice switch 41 is identical to the voice switch 47 and provides dial tone modulated MX1 pulses which are supplied to the send conductors 20 of highway No. 1. These dial tone modulated MX1 pulses then pass through the voice switch 204 associated with the line circuit 211 and the dial tone signal is demodulated in the line circuit 211 and supplied to the subscribers subset so as to terminate the transmission of seizure tone from this subset.

In addition to terminating the transmission of a seize tone signal from the called subscriber subset, it is necessary to terminate transmission of the ringing signal to the called subset and the ringback tone signal to the calling subscriber. To this end, the collector of the transistor 1647 is connected to the diodes 1661 and 1641. Before the called line answers the transistor 1647 is non-conductive so that the end gates 1640, 1641 and 1660 and 1661 can be opened when switchthrough is established in the connector 40. However, when the called line answers and the seize tone removal flip-flop 1645 is set, the transistor 1647 is rendered conductive so that the collector thereof rises to ground potential and the diodes 1641 and 1661 are rendered conductive so as to close the corresponding and gates and bias the control transistors 1650 and 1662 against conduction so that the ringing signal is not applied to the voice switch 47 and the ringback tone signal is not applied to the voice switch 45. Accordingly, all supervisory voice frequency signals are removed from the send conductors 20 and the receive conductors 21 in the MX1 time position so that an unimpeded conversation path is provided between the calling and called subscribers.

If the called line is busy no switchthrough is established in the connector 40 and this connector must then function to provide a busy tone signal to the calling subscriber. More particularly, if the called line is busy the potential on the conductor BTH1B remains at ground so that the and gate comprising the diodes 1600 and 1601 is not opened and the switchthrough flip-flop 1510 is not set. The switchthrough flip-flop 1510 controls one input of a two input and gate comprising the diodes 1670 and 1671 the anode of the diode 1670 being connected to the collector of the transistor 1511 which is normally nonconducting in the switchthrough flip-flop circuit 1510. The other diode 1671 is controlled by a busy tone flip-flop circuit 1672 which comprises the transistors 1673 and 1674. The transistor 1674 of the flip-flop 1672 is normally non-conducting so that the collector potential of the transistor 1673 is normally at ground and the diode 1671 is normally conducting. If the called line is idle and the switchthrough flip-flop 1510 is set in the manner described heretofore the collector potential of the transistor 1511 thereof rises to ground potential so that the diode 1670 is rendered conductive and blocks any output from the and gate 1670, 1671. On the other hand, if the called line is busy the switchthrough flip-flop 1510 is not set and the diode 1670 remains reverse biased. Accordingly, when the busy tone flip-flop circuit 1672 is set the collector of the transistor 1673 falls to a minus value so that both of the diodes 1670 and 1671 are reverse biased and a negative control signal is applied to the base electrode of a control transistor 1675 which controls the transmission of a busy tone signal from the busy tone generator 356 by way of the conductors BT and through a coupling transformer 1676 to the voice switch 43. The voice switch 43 is identical to the voice switch 45 and is supplied with MX1 pulses so that busy tone modulated MX1 pulses are impressed upon the receive conductors 21 of highway No. 1. These busy tone modulated MX1 pulses pass through the voice switch 27 associated with the line circuit 111 and the busy tone signal is demodulated in this line circuit and supplied to the subscriber at substation A to inform him that the called line is busy.

The busy tone flip-flop circuit 1672 is controlled by the negative control signal produced on the conductor 1485 after the tens and units digits have been dialed into the connector 40 and the negative control signal applied to the conductor CA1–H1B by the conector allotter 345. To this end the conductor 1485 is connected to the anode of a diode 1683 and the conductor CA1–H1B is connected to the anode of a diode 1684, these diodes forming a two input and gate for negative signals. Accordingly, when the connector allotter 345 supplies a negative allotting signal to the conductor CA1-H1B and both the tens and units digits have been dialed into the connector 40 the diodes 1683 and 1684 are both reverse biased and a negative control signal is coupled through the isolating diode 1685 and a condenser 1686 to the base electrode of a transistor 1687 which forms one section of a busy tone delay multivibrator 1688, the other section of which comprises a transistor 1689. The transistor 1689 is normally conducting but when a negative signal is applied to the base electrode of the transistor 1687 the multivibrator 1688 is triggered and produces a negative pulse at the collector of the transistor 1689 of several hundred microseconds' duration. This negative pulse is differentiated in a circuit including the condenser 1680 and the resistor 1681 and the positive differentiation pulse which is produced at the end of the multivibrator delay interval is coupled through a diode 1682 to the base electrode of the transistor 1673 so that the busy tone flip-flop circuit 1672 is set. It will thus be seen that the busy tone flip-flop circuit is set irrespective of the idle or busy condition of the called line, since this flip-flop circuit is controlled only by the potentials on the conductors 1485 and CA1–H1B through the busy tone delay multivibrator 1688. However, the multivibrator 1688 provides a sufficient delay interval that if the called line is idle the switchthrough flip-flop 1510 will have been set before the busy tone flip-flop circuit 1672 is set so that the and gate comprising the diodes 1670 and 1671 is inhibited by the switchthrough flip-flop circuit 1510 before the busy tone flip-flop circuit is set and the diode 1671 is reverse biased. Accordingly, when the called line is idle the and gate 1670, 1671 remains closed and no busy tone signal is applied to the voice switch 43.

When either the calling or called subscriber hangs up, a release signal is developed by his subset and is transmitted through the associated line circuit to the voice switches controlled thereby. If the calling subscriber, such as the subscriber at substation A, hangs up first, the release signal developed by his subset is transmitted to the voice switch 26 and is modulated on MX1 pulses and applied to the send conductors 20 of highway No. 1. The release signal comprises the voice frequencies 900 cycles per second and and 1100 cycles per second and the release signal modulated MX1 pulses pass through the voice switch 44 and the low pass filter and amplifier 1100 in the first selector 36 to the band pass filters 1101 and 1102. The outputs of the corresponding buffer stages are combined in the and gate comprising the diodes 1135 and 1136 and a positive signal is coupled through the diode 1137 and by way of the conductor RL–1H1 to the release circuit 56 when the outputs of both the 900 cycle and the 1100 cycle channel are positive corresponding to the frequency components of the release signal. The release circuit 56 responds to the positive signal transmitted thereto over the conductor RL–1H1 by producing a positive release pulse on the conductor RSP–1H1 which is connected to the connectors 38 and 40. In the connector 40 the positive release pulse on the conductor RSP–1H1 is suppled through a diode 1690 to the first control flip-flop 1451 and through a diode 1691 to the second control flip-flop 1459 so that both of these flip-flop circuits are reset to their normal condition when the call is terminated. Also, the positive release pulse is supplied through a diode 1692 to the busy tone flip-flop 1672, and through a diode 1693 to the seize tone removal flip-flop 1645 so that these flip-flops are also reset to their normal condition.

The positive release pulse is applied to the base electrode of an inverter transistor 1695 and the release pulse developed at the collector of the transistor 1695 is applied to each of the tens and units flip-flop circuits so as to reset these flip-flop circuits to their normal condition, this release pulse being illustrated as applied through the diode 1696 to the digit "1" tens flip-flop circuit 1401 so as to reset this flip-flop to its normal condition. Accordingly, all of the flip-flop circuits in the connector 40 are returned to their initial conditions when the call is terminated so that the connector is conditioned to receive another call. The release pulse developed at the collector of the transistor 1695 is also supplied through a diode 1697 to the base electrode of the transistor 1512 in the switchthrough flip-flop 1510 so that this flip-flop is reset.

If the called subscriber hangs up first his subset likewise develops a release signal which is modulated on MX1 pulses and is applied to the receive conductors 21 of highway No. 1. These release signal modulated MX1 pulses are transmitted through the voice switch 54 to the release circuit 56 directly and the release circuit 56 responds thereto by providing a positive release pulse on the conductor RSP–1H1 which has the effect of resetting the flip-flop circuits in the connector 40 in the manner described heretofore. Accordingly, when either the calling or called subscriber hangs up the connector 40 is reset to permit it to handle another call.

*Collector-allotter 345*

Figure 47:
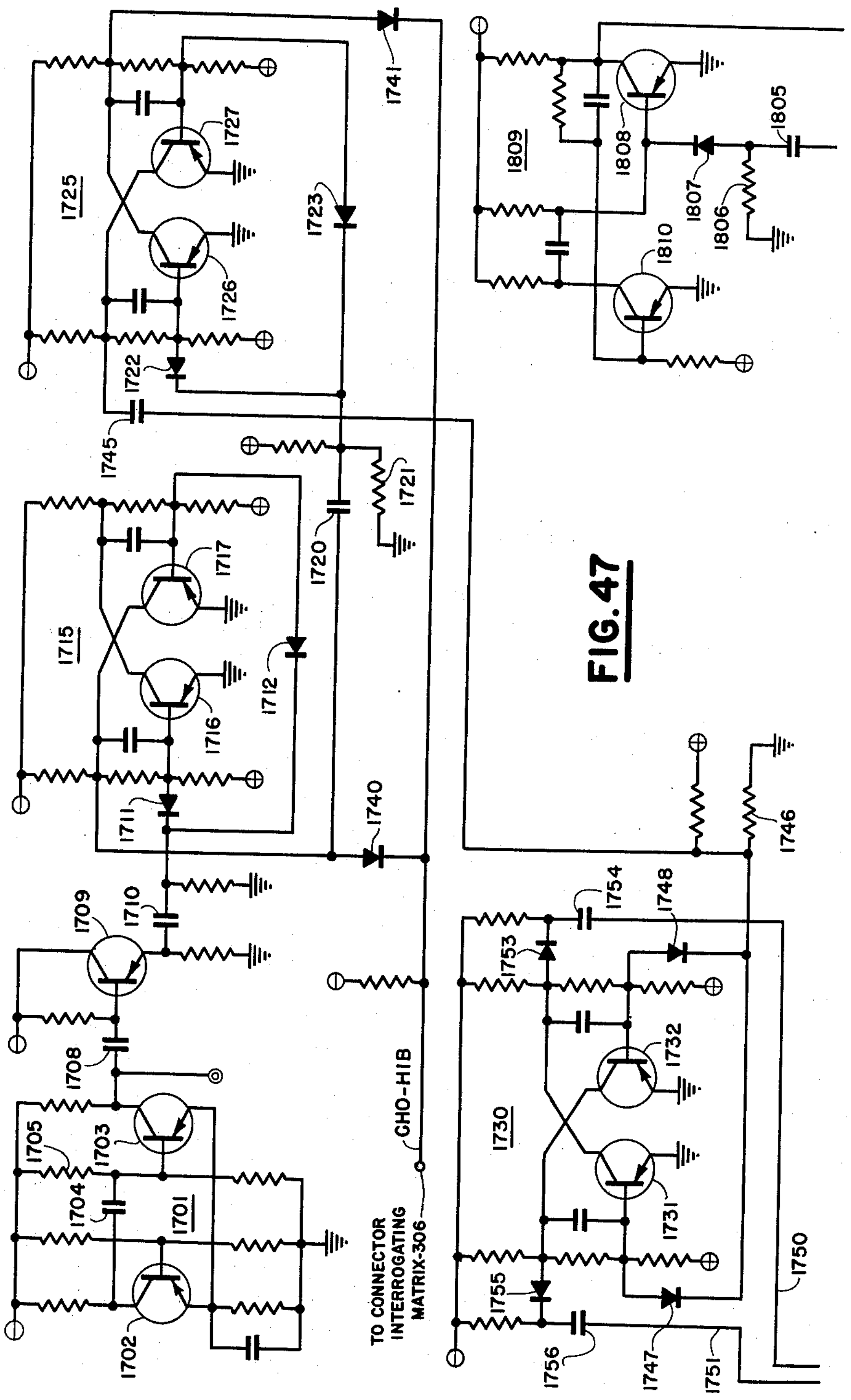
Figure 48:
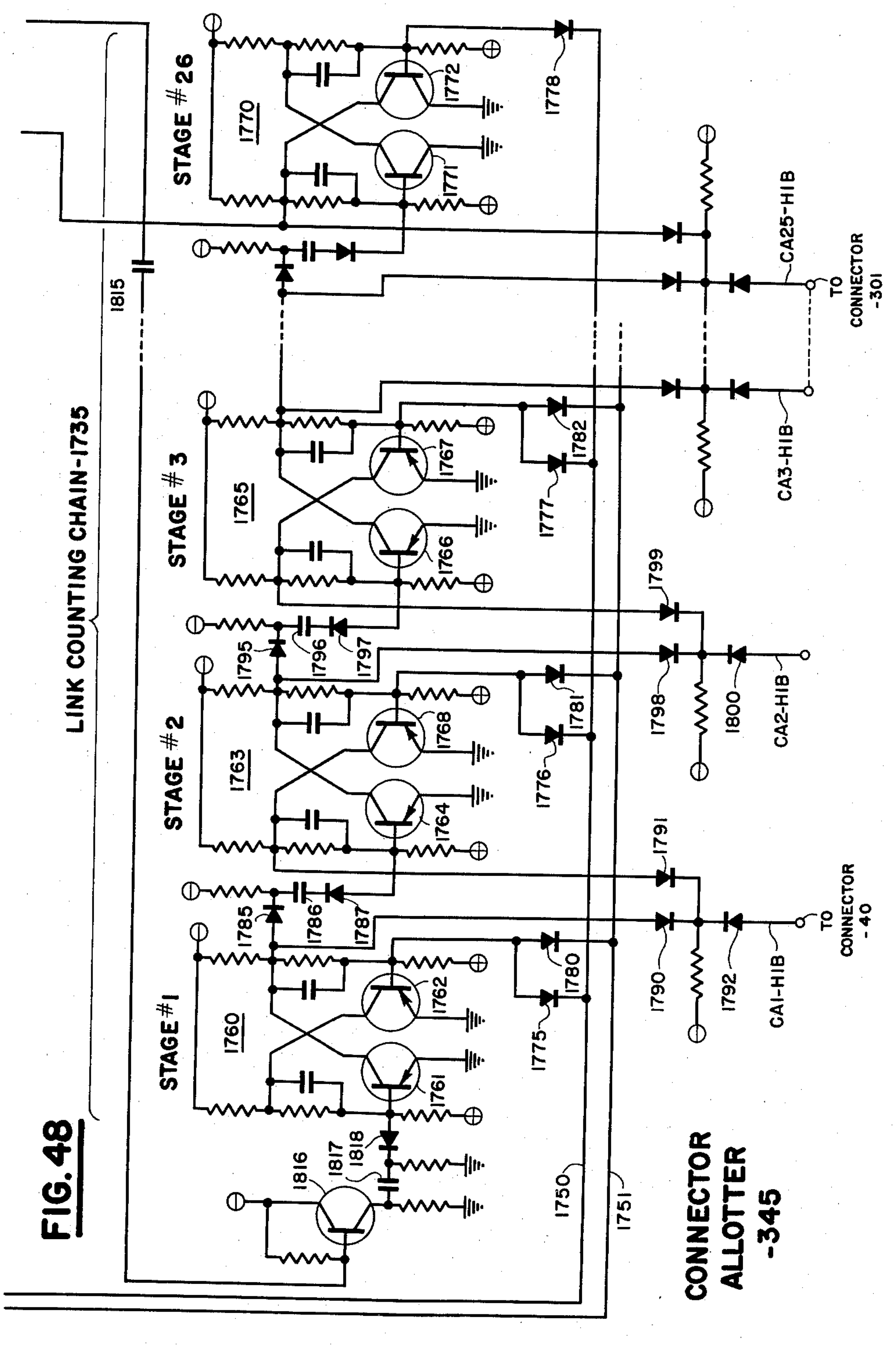

The connector-allotter 345 is shown in detail in Figs. 47 and 48 of the drawings. It will be recalled from the general description of the system that one of these allotters is associated with each group of twenty-five connectors serving a particular hundreds line group and pulse multiplex highway, the connector allotter 345 serving the connectors associated with the second hundreds line group and pulse multiplex highway No. 1. The connector-allotter 345 functions to provide sequential connector-allotter signals on the twenty-five output conductors CA1–H1B to CA25–H1B. The connector allotter 345 also functions to provide hold off pulses on the conductor CH0–H1B which are supplied to the common interrogating matrix 306, these control pulses being employed to control conduction of the amplifiers associated with the tens and units bus bars of the matrix 306 so that these amplifiers are opened only for a brief period at approximately the midportion of the allotter signal supplied to a particular connector so that no signals are applied to the tens and units bus bars of the matrix 306 during periods when the connector allotter 345 is switching from one connector to another.

In order to provide a timing source for the counting chain of the connector allotter 345, there is provided a free running multivibrator 1701 which includes the transistors 1702 and 1703 which are interconnected in a common emitter type of multivibrator, the free-running frequency of which is approximately 250 cycles per second as determined by the condenser 1704 and the resistor 1705. The multivibrator pulses produced at the collector of the transistor 1703 are coupled through a condenser 1708 to the base electrode of an emitter follower transistor 1709, the output of which is coupled through a condenser 1710 to the steering diodes 1711 and 1712 of a first holdoff flip-flop circuit 1715 comprising the transistors 1716 and 1717. The diodes 1711 and 1712 function to apply the multivibrator pulses alternately to the base electrodes of the transistors 1716 and 1717 so that the flip-flop circuit 1715 is switched back and forth at a repetition rate of 125 cycles per second. An output is derived from the collector of the transistor 1717 which is differentiated in the circuit including the condenser 1720 and the resistor 1721 and the negative differentiation pulses produced thereby are applied to the steering diodes 1722 and 1723 of a second holdoff flip-flop circuit 1725 comprising the transistors 1726 and 1727. The negative pulses passed by the steering diodes 1722 and 1723 thus function to switch the flip-flop 1725 at one-half the rate of the flip-flop 1715, i.e., at a frequency of 62.5 cycles per second.

In order to control the potential on the conductor CH0–H1B in relation to the negative allotter signals which are produced on the output conductors CA1–H1B to CA25–H1B of the connector-allotter 345, the output of the flip-flop 1725 is applied to a link driver flip-flop 1730, comprising the transistors 1731 and 1732, the link driver flip-flop 1730 being employed to drive a link counting chain 1735 and the outputs of the flip-flops 1715 and 1725 are also employed to develop a negative holdoff pulse on the conductor CH0–H1B. To this end, a two input and gate for negative signals is provided which comprises the diodes 1740 and 1741, the anode of the diode 1740 being connected to the collector of the transistor 1717 and the anode of the diode 1741 being connected to the collector of the transistor 1726.

Assuming that the transistors 1716 and 1726 are both conducting, when the first negative pulse from the multivibrator 1701 is applied through the diode 1712 to the base electrode of the transistor 1717 the flip-flop circuit 1715 is set and the transistor 1717 is rendered conductive so that the diode 1740 is held conductive and the conductor CH0–H1B is held at ground potential. On the next multivibrator pulse which is transmitted through the diode 1711, the flip-flop 1715 is reset and the negative pulse produced by the differentiation circuit 1720 and 1721 is applied through the diode 1723 to set the flip-flop 1725 in which condition the transistor 1726 is non-conductive so that the diode 1741 is reverse biased. At the same time the transistor 1717 is rendered non-conductive when the flip-flop circuit 1715 is reset so that both of the diodes 1740 and 1741 are reverse biased and a negative signal is produced on the conductor CH0–H1B. This negative signal continues until the flip-flop circuit 1715 is set by the next multivibrator pulse at which time the transistor 1717 is rendered conductive and the diode 1740 conducts so as to bring the potential of the conductor CH0–H1B back to ground.

The output from the collector of the transistor 1727 in the second holdoff flip-flop 1725 is coupled through a differentiation circuit including the condenser 1745 and the resistor 1746 to the steering diodes 1747 and 1748 so that the link driver flip-flop 1730 is switched at one-half the rate of the second holdoff flip-flop 1725, that is at a 31.25 cycles per second.

The link driver flip-flop 1730 provides oppositely phased control pulses on the output conductors 1750 and 1751 thereof which are employed to control the switching action of the individual stages of the link counting chain 1735. More particularly, the square wave developed at the collector of the transistor 1731 is coupled through a diode 1753 and a small condenser 1754 to the output conductor 1750 and the square wave developed at the collector of the transistor 1732 as coupled through the diode 1755 and a condenser 1756 to the output conductor 1751.

In the link counting chain 1735 a series of twenty-six counting stages are provided and the output for each connector is derived by combining the outputs of two adjacent stages. Thus, the outputs of the first and second stages are combined to provide a negative allotter signal on the conductor CA1–H1B to the first connector 40, the outputs of the second and third stages are combined to provide an output for the second connector, etc., the first, second, third and twenty-sixth stages of the chain 1735 being shown in detail in the drawings. The first stage comprises a flip-flop circuit 1760 which includes the transistors 1761 and 1762, the second stage includes a flip-flop circuit 1763 including the transistors 1764 and 1768, the third stage includes a flip-flop circuit 1765 comprising the transistors 1766 and 1767 and the twenty-sixth stage comprises a flip-flop circuit 1770 which includes the transistors 1771 and 1772. The output conductors 1750 and 1751 are both arranged to supply negative control pulses to the right hand transistor of each of the twenty-six stages of the counting chain 1735. Thus, the conductor 1750 is connected to the base electrode of the transistor 1762 through the diode 1775, to the transistor 1768 through the diode 1776, through the diode 1777 to the transistor 1767 and through the diode 1778 to the transistor 1772. In a similar manner the conductor 1751 is connected through the diodes 1780, 1781 and 1782 to the right-hand transistors of the first, second and third stages, the conductor 1751 being connected through similar diodes to all but the twenty-sixth stage of the counting chain 1735. Normally, the right-hand transistor of all but the first stage of the link counting chain 1735 is conducting and in the first stage the right-hand transistor is normally non-conducting. Since the output from both sections of the flip-flop 1730 is employed to drive the link counting chain 1735 negative control pulses are alternately produced on the conductors 1750 and 1751 at a combined repetition rate of 62.5 cycles per second, the control pulses produced on the conductor 1751 being employed to drive the odd stages of the counting chain 1735 and the pulses on the conductor 1750 being employed to drive the even stages of this chain.

Assuming that a negative pulse is produced on the conductor 1751, this pulse is coupled through the diode 1780 to the base electrode of the transistor 1762 so that this transistor is rendered conductive and the flip-flop 1760 is set. When this occurs the collector potential of the transistor 1761 falls to a minus value so that the diode 1785 is reverse biased and a negative pulse is coupled through a condenser 1786 and a diode 1787 to the base electrode of the transistor 1764 so that the stage #2 flip-flop 1763 is set. When the flip-flop 1760 is set the negative signal appearing at the colletcor of the transistor 1761 reverse biases a diode 1790 which forms one input of a two input and gate the other input of which comprises a diode 1791 the anode of which is connected to the collector of the transistor 1768. Accordingly, when the second flip-flop 1763 is also set and the collector potential of the transistor 1768 falls to a minus value the diode 1791 is also reverse biased so that a negative signal is coupled through the isolating diode 1792 to the conductor CA1–H1B and is supplied to the connector 40.

The next negative control pulse appears on the conductor 1750 and passes through the diode 1776 to the base electrode of the transistor 1768 and renders this transistor conductive so that the second stage flip-flop 1763 is reset to its initial condition. When this occurs the coupling diode 1795 is reverse biased and a negative signal is then coupled through the condenser 1796 and the diode 1797 to the base electrode of the transistor 1766 in the third stage flip-flop 1765 so that this flip-flop is set. When this occurs the output diodes 1798 and 1799 are both reverse biased so that a negative allotter signal is coupled through the isolating diode 1800 to the conductor CA2–H1B and is supplied to the second connector serving the second hundreds line group on highway No. 1. When the flip-flop 1763 is reset by the negative pulse appearing on the conductor 1750, the collector of the transistor 1768 rises to ground potential so that the diode 1791 is rendered conductive and the potential on the conductor CA1–H1B also rises to ground. Accordingly for each control pulse on either the conductor 1750 or the conductor 1751 the allotter signal is removed from the preceding output conductor and a similar allotter potential is applied to the next output conductor of the connector-allotter 345 so that the connectors of the group are sequentially supplied with allotter signals. When the twenty-sixth stage flip-flop 1770 is reset by the application of a negative pulse from the condutcor 1750 through the diode 1778 to the base electrode of the transistor 1772 the collector potential of the transistor 1772 rises from a minus value to ground and this positive potential increase is differentiated in the condenser 1805 and the resistor 1806, the positive differentiation pulse being coupled through a diode 1807 to the base electrode of a transistor 1808 which forms one section of a one-shot multivibrator 1809 the other section of which comprises a transistor 1810. The multivibrator 1809 is thus triggered and at the end of the delay interval provided by the one-shot multivibrator 1809 a negative signal is produced at the collector of the transistor 1808 which is coupled through a condenser 1815 to the base electrode of an emitter-follower transistor 1816 and the resulting negative control pulse produced at the emitter of the transistor 1816 is coupled through the condenser 1817 and a diode 1818 to the base electrode of the transistor 1761 in the first stage flip-flop 1760. This control pulse has the effect of resetting the first stage flip-flop 1760 so that the link counting chain 1735 is returned to its initial condition and is ready to go through another counting cycle. In this connection it will be understood that the one-shot multivibrator 1809 provides a sufficient delay that the input pulses produced on the conductors 1750 and 1751 are no longer applied to the transistor 1762 so that the flip-flop 1760 may be reset.

*Release circuit 56*

Figure 62:
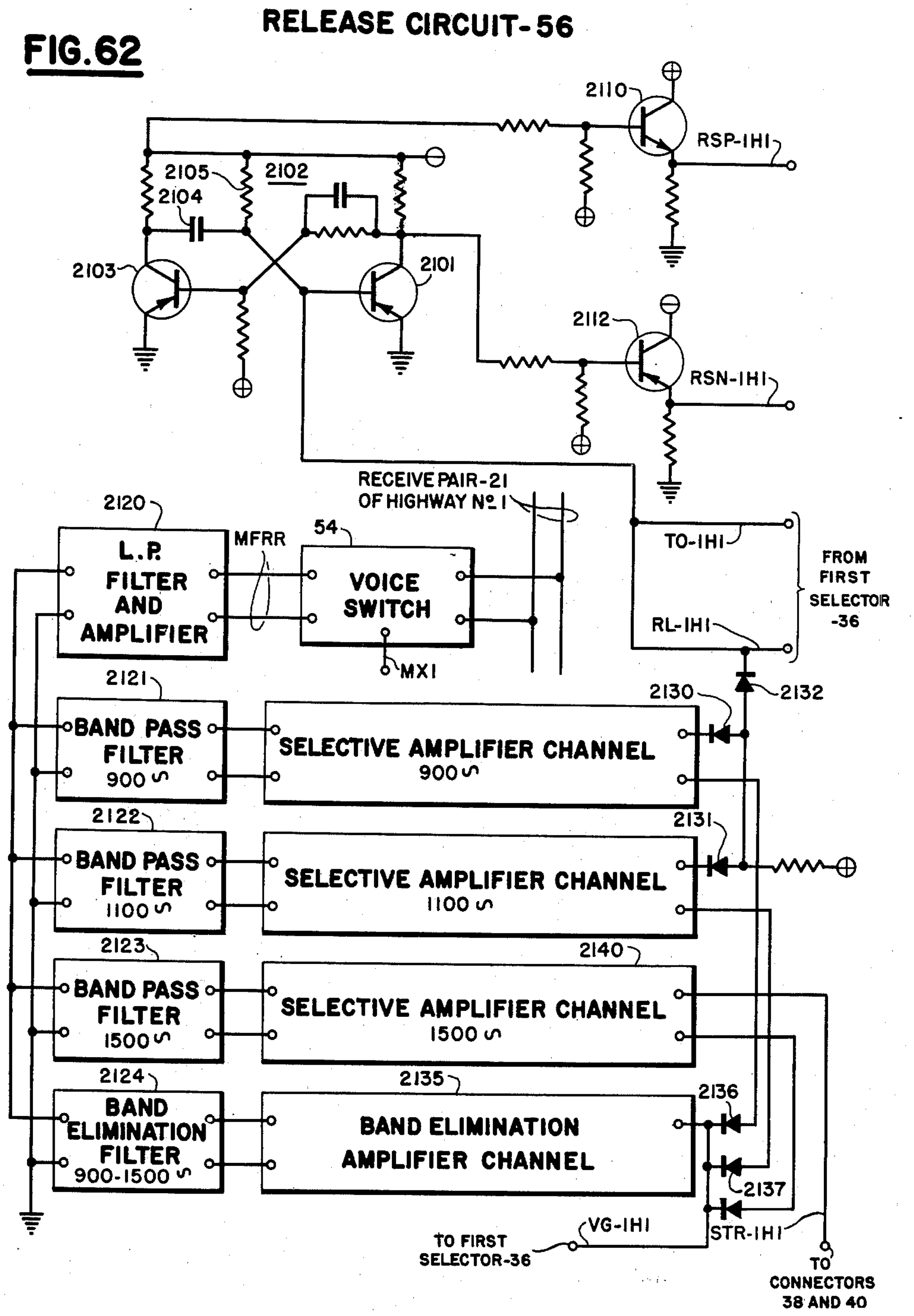
Fig. 62 is a schematic diagram of one of the release circuits employed in the system of Figs. 4 to 25, inclusive.

The release circuit 56 is shown in detail in Fig. 62 of the drawings. It will be recalled from the general description of the system that the release circuit 56 functions to provide both positive and negative release pulses in response to the transmission of a voice frequency release signal to either the send conductors 20 or the receive conductors 21 of highway No. 1. More particularly, assuming that a call is in progress in the MX1 time position on highway No. 1, if the calling party hangs up first release tone MX1 pulses are produced on the send conductors 20 when the calling party hangs up and these release tone modulated MX1 pulses are transmitted to the voice switch 44 wherein they are demodulated and the release tone signal, which comprises a combination of the voice frequencies 900 c.p.s. and 1100 c.p.s. are passed through their respective amplifier channels in the first selector 36 so that a positive control signal is supplied by way of the conductor RL–1H1 to the release circuit 56.

In the release circuit 56 the positive signal produced on the conductor RL–1H1 is applied to the base electrode of a transistor 2101 which comprises one-half of a release pulse multivibrator 2102 the other section of which is comprised of a transistor 2103, so that the transistor 2101 is rendered non-conductive and the multivibrator 2102 is triggered. When the multivibrator 2102 is triggered a positive pulse is produced at the collector of the transistor 2103 the duration of which is dependent upon the values of the condenser 2104 and the resistor 2105. Preferably, the duration of the multivibrator pulse produced at the collector of the transistor 2103 is approximately 500 microseconds and this positive release pulse is applied to the base electrode of an emitter follower transistor 2110. The emitter of the transistor 2110 is connected to the positive release pulse conductor RSP–1H1 which is supplied to the first selector 36, the connectors 38 and 40 serving the first and second hundreds line groups on highway No. 1, and the second selector 440 so that the flip-flop circuits in these system components may be reset to their initial values when the connection is released. If desired, a number of emitter followers may be provided to supply the positive release pulse to the different system components such as the first selector 36, the connectors 38, 40 and the second selector 440.

In order to provide a negative release pulse, the collector of the transistor 2101 is connected to the base electrode of an emitter follower transistor 2112 the emitter of which is connected to the negative release pulse conductor RSN–1H1. The negative release pulse produced on the conductor RSN–1H1 is supplied to the line links 1HW1A and 1HW1B, serving the first and second hundreds line groups respectively, and the trunk link 1HW1C so that the flip-flops which have been set in any one of these links to register the identity of a calling line or trunk may be reset to their original condition. The negative release pulse produced on the conductor RSN–1H1 is also supplied to the first flip-flop circuit in each of the dial-to-dial trunk circuits, in each of the long distance trunk circuits and in the information trunk circuits so that if the first flip-flop circuit in any one of the trunk circuits has been set the flip-flop will be reset to its original condition so that the trunk circuit may be employed for another call.

In order to provide a release pulse in the event that the called party hangs up first and a release tone signal is modulated on multiplex pulses appearing on the receive conductors of highway No. 1, the release circuit 56 is provided with multifrequency receiver facilities for detecting the release tone combination. More particularly, assuming that the called party hangs up first on a call involving the MX1 time position on highway No. 1, the release signal modulated MX1 pulses are transmitted through the voice switch 54 and over the conductors MFRR to a low pass filter and amplifier 2120 the output of which is connected to a 900 cycle band pass filter 2121, and 1100 cycle band pass filter 2122, a 1500 cycle band pass filter 2123, and a band elimination filter 2124 which passes only those frequencies up to 900 cycles and above 1900 cycles. Each of the filters 2121 to 2123, inclusive, is provided with a selective amplifier channel corresponding to the 900 cycle selective amplifier channel described in detail heretofore in connection with the first selector 36. The outputs of the 900 cycle selective amplifier channel and the 1100 cycle selective amplifier channel are applied to a two input and gate for positive signals comprising the diodes 2130 and 2131 and when both 900 and 1100 cycle signals are transmitted through the filters 2121 and 2122 the diodes 2130 and 2131 are both reverse biased and a positive signal is coupled through a diode 2132 to the base electrode of the transistor 2101 so that the multivibrator 2102 is triggered. Accordingly, there is produced a positive release pulse on the conductor RSP–1H1 and a negative release pulse on the conductor RSN–1H1 which are employed to release the MX1 time position equipment on highway No. 1 in the manner described immediately above.

In order that a release pulse will not be developed when 900 cycle and 1100 cycle components are present in normal speech transmission, there is provided the band elimination filter 2124 which supplies speech frequency signals outside of the dialing frequency range to a band elimination amplifier channel 2135, which may be identical to the band elimination channel 1285 described in detail heretofore in connection with the first selector 36. When speech frequencies outside of the dialing frequency range are present in the MX1 time position on receive conductors 21 a control potential is provided by the amplifier channel 2135 which is supplied through the diode 2136 to the blocking input terminal of the 900 cycle selective amplifier channel and through a diode 2137 to the blocking input terminal of the 1100 cycle selective amplifier channel. Accordingly, when the speech frequencies outside of the dialing frequency range exceed a predetermined level in the MX1 time position on the conductors 21 both the 900 cycle and the 1100 cycle channels are blocked so that the multivibrator 2102 is not triggered and no positive and negative release pulses are developed.

It will be recalled from the general description of the system that when a called party answers his subset develops a 1500 cycle seize signal which is supplied to the receive conductors 21 of highway No. 1, assuming that the call is established on this highway. The release circuit 56 functions to develop a seize tone removal signal in response to the seize signal produced when the called party answers, which may be employed in the connectors 38 and 40 to produce a dial tone signal, this dial tone signal being transmitted to the called party's subset to terminate transmission of the seize signal. More particularly, assuming that the MX1 time position on highway No. 1 is used, when the called party answers and seize tone modulated MX1 pulses are produced on the receive conductors 21 of highway No. 1, these seize tone modulated MX1 pulses are transmitted to the voice switch 54 wherein they are modulated and pass through the filter 2120 and the 1500 cycle bands pass filter 2123 to a 1500 cycle selective amplifier channel 2140. The channel 2140 may be identical to the corresponding component described in detail heretofore in connection with the first selector 36 and there is produced at the output terminal thereof a positive going control signal which is supplied by way of the conductor STR–1H1 to the connectors 38 and 40 in response to the seize signal produced when the called party answers. The control potential produced on the conductor STR–1H1 is then employed in either the connector 38 or the connector 40 to produce dial tone modulated MX1 pulses on the send conductors 20 of highway No. 1 so that a dial tone signal is transmitted to the called subscriber's subset and the seize signal developed by this subset when the called subscriber comes off-hook is thereby terminated.

As described heretofore in connection with the first selector 36, each first selector is provided with a timeout circuit which may be employed to release the connection after three minutes in the event that the call is not completed or no voice frequency signals are transmitted over the send and receive conductors of highway No. 1 in the MX1 time position for this length of time. When this situation occurs the first selector 36 functions to develop a positive going signal on the conductor TO–1H1 which is supplied to the base electrode of the transistor 2101 in the release circuit 56 so that the multivibrator 2102 is triggered and positive and negative release pulses are produced in the manner described in detail heretofore to effect release of the associated equipment.

In order that the timeout circuit 1280 in the first selector 36 can respond to the absence of voice frequency signals on the receive conductors 21 in the MX1 time position, the output of the band elimination amplifier channel 2135 in the release circuit 56 is also supplied by way of the conductor VG–1H1 to the timeout circuit 1280 in the first selector 36. Accordingly, if voice frequency signals outside the dialing frequency range are not present on the receive conductors 21 the timeout circuit 1280 responds thereto by developing a control signal on the conductor T0–1H1 which is transmitted back to the release circuit 56 to effect release of the associated equipment.

*Dial-to-dial trunk circuit 64 and trunk allotter 390*

Figure 49:
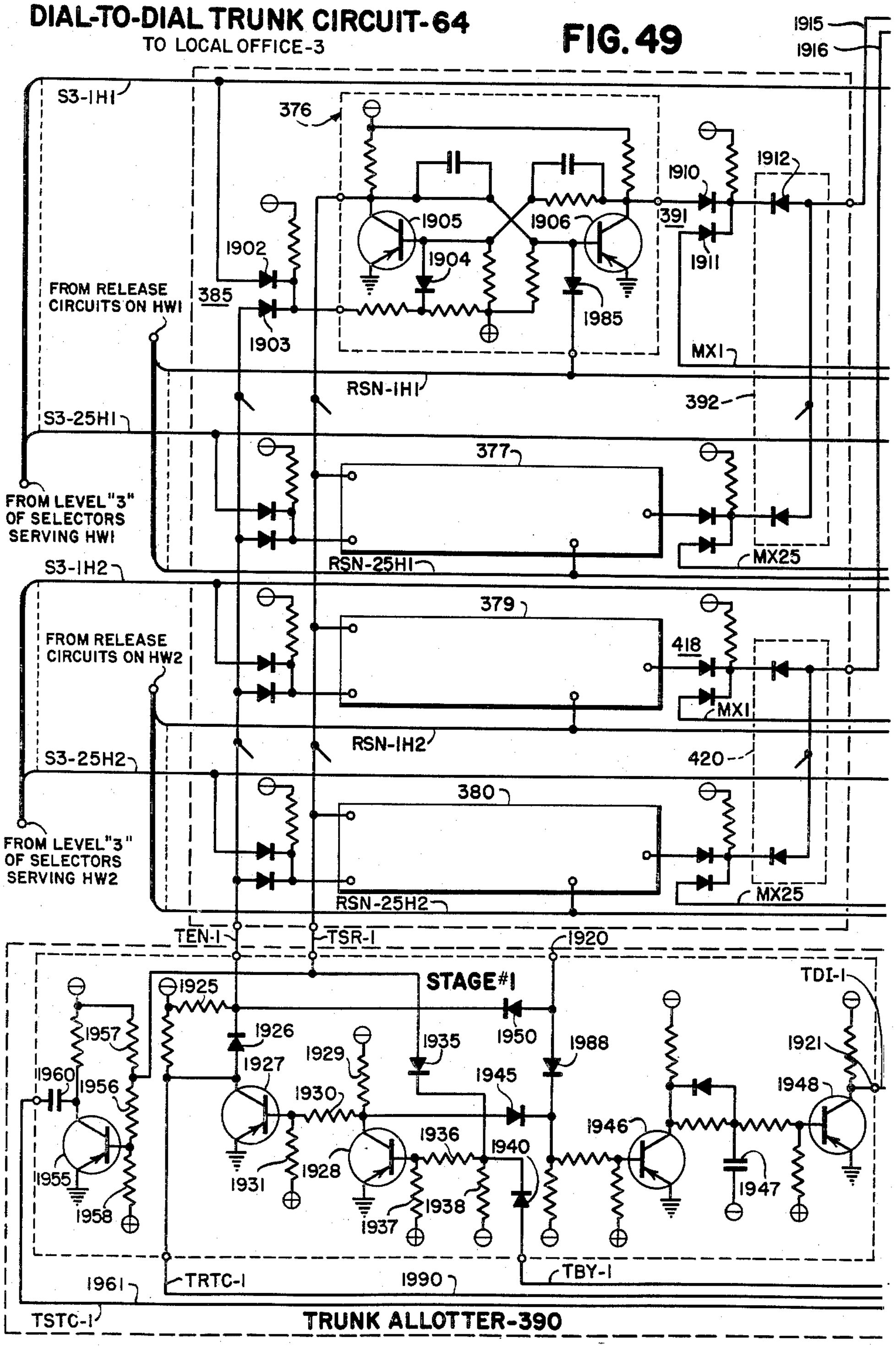
Figure 50:
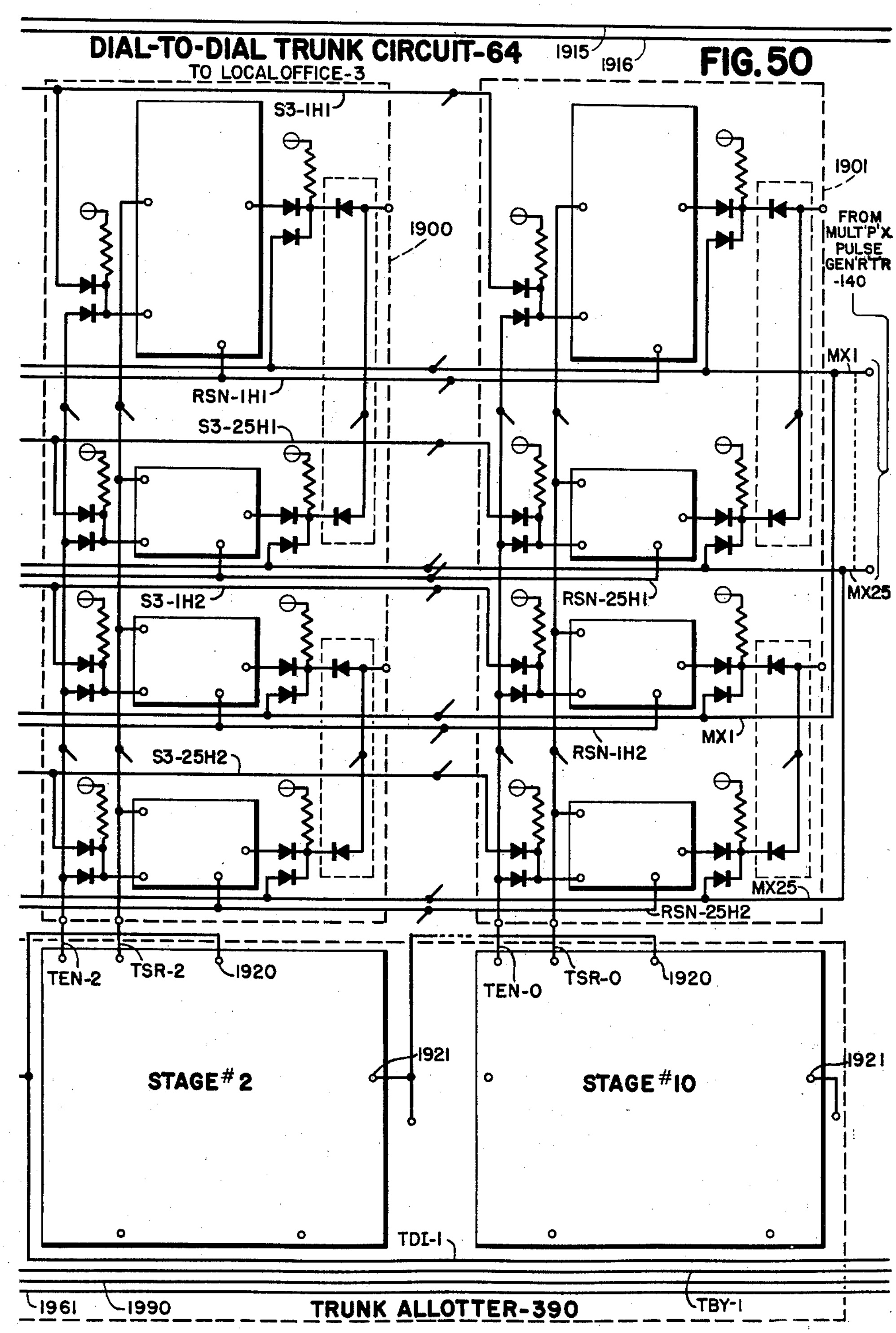
Figure 51:
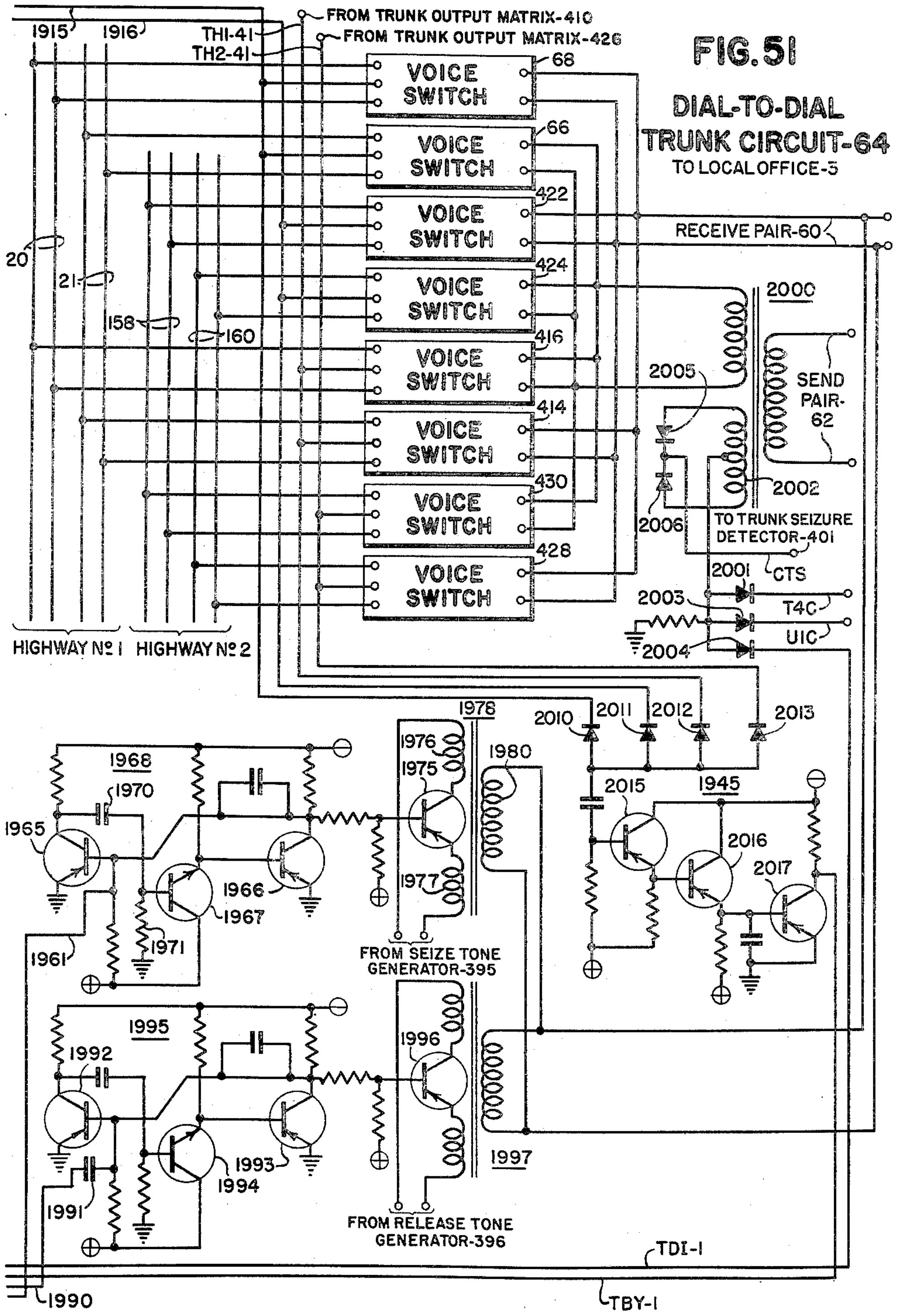
Figure 52:
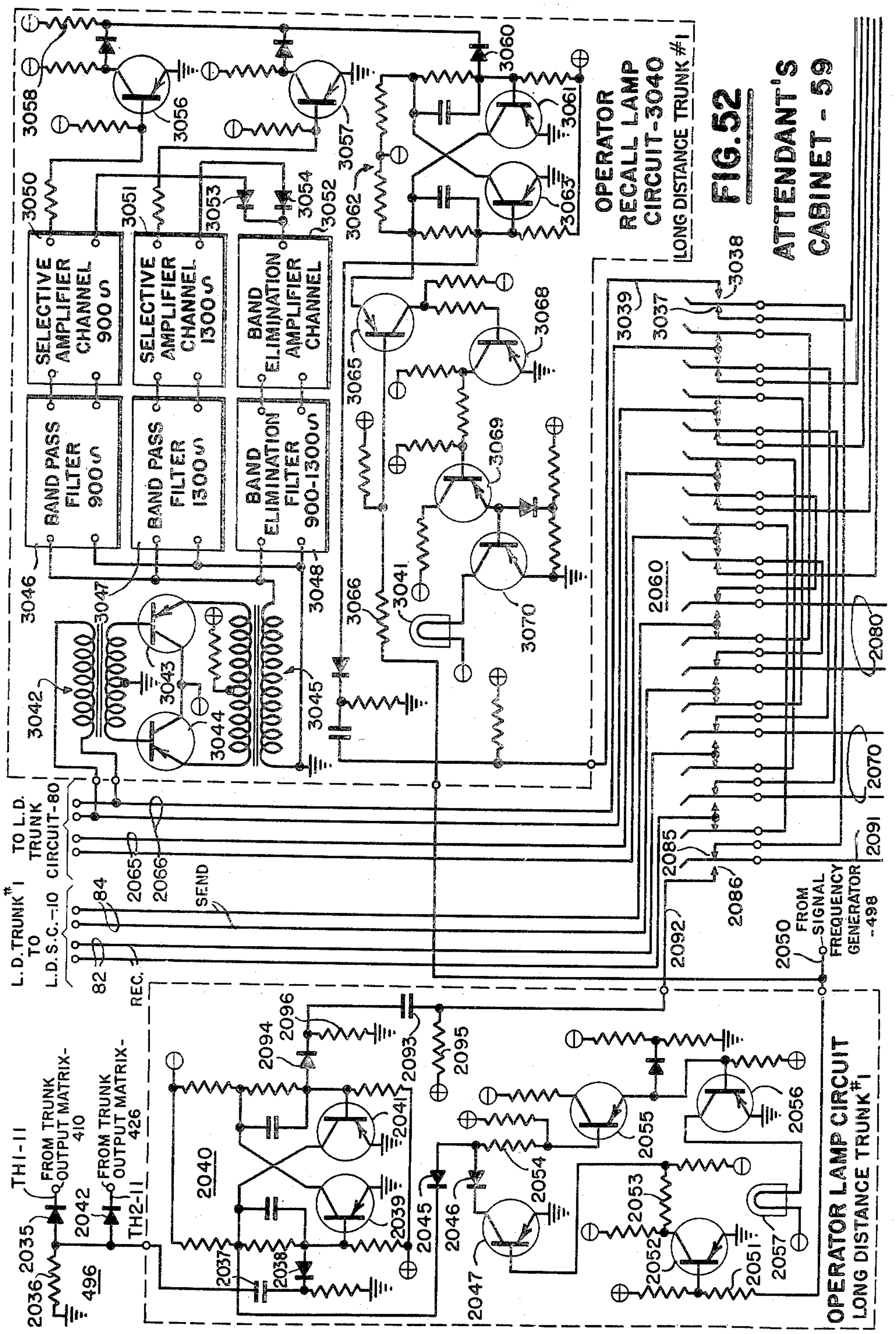
Figure 53:
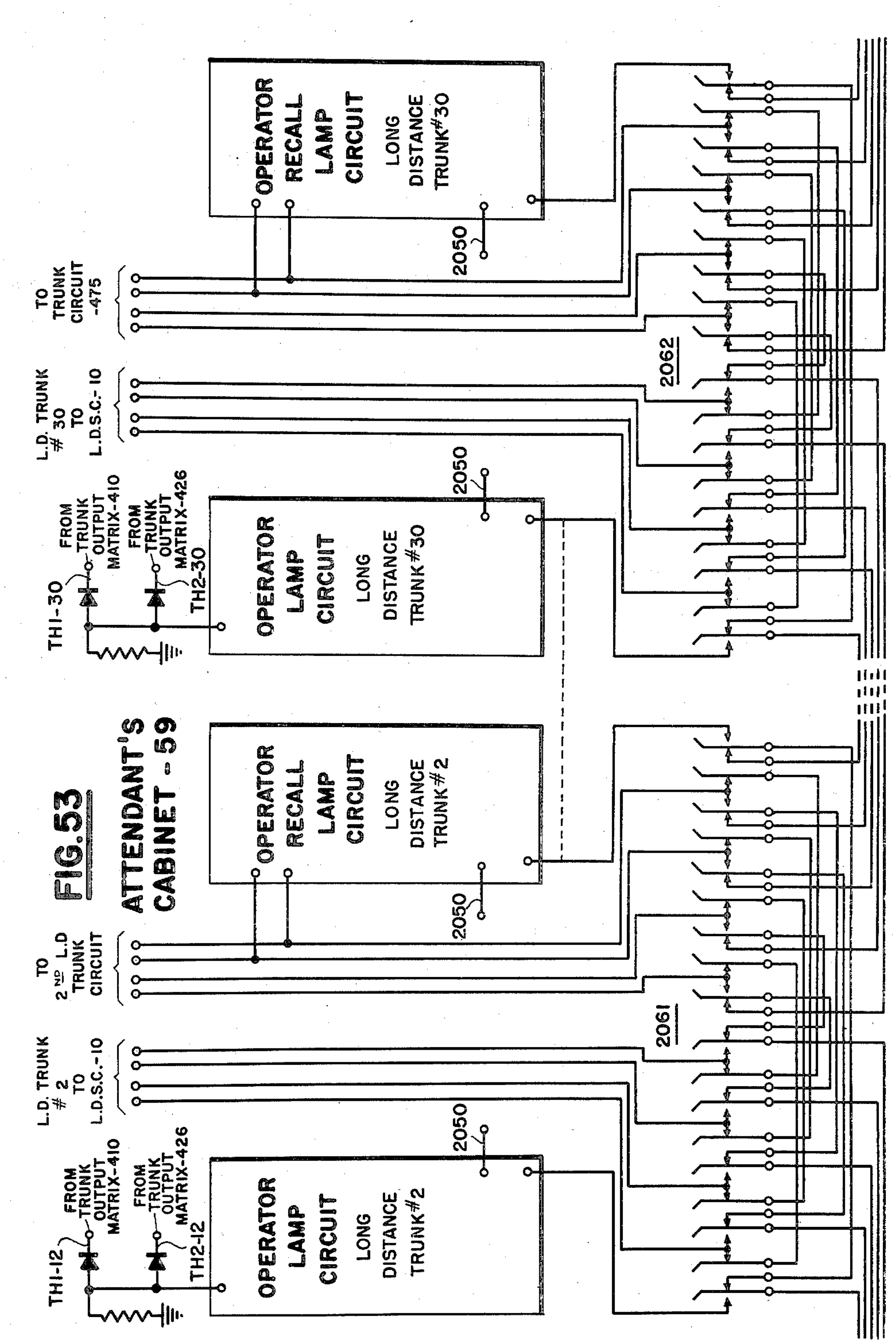
Figure 54:
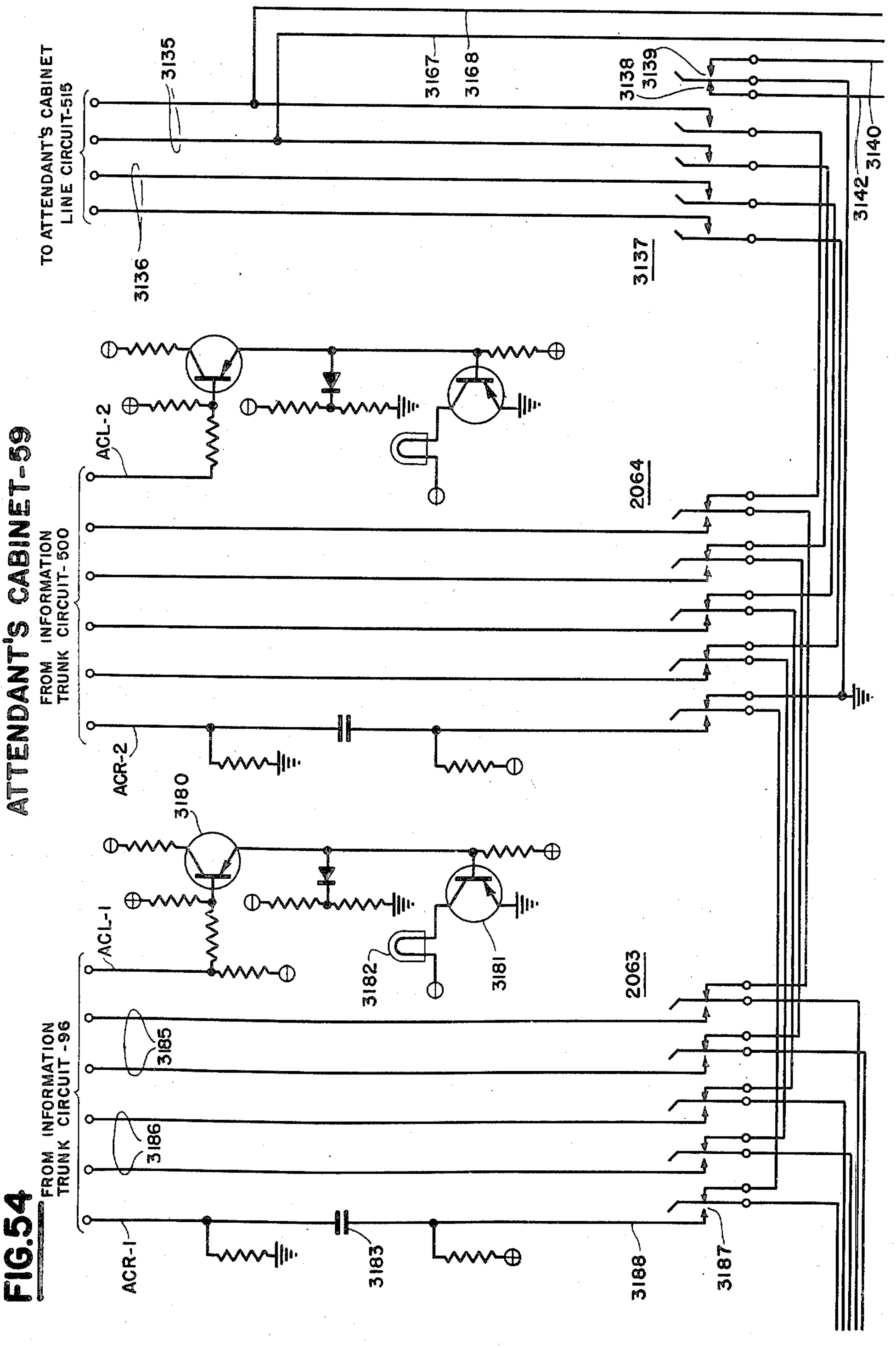
Figure 55:
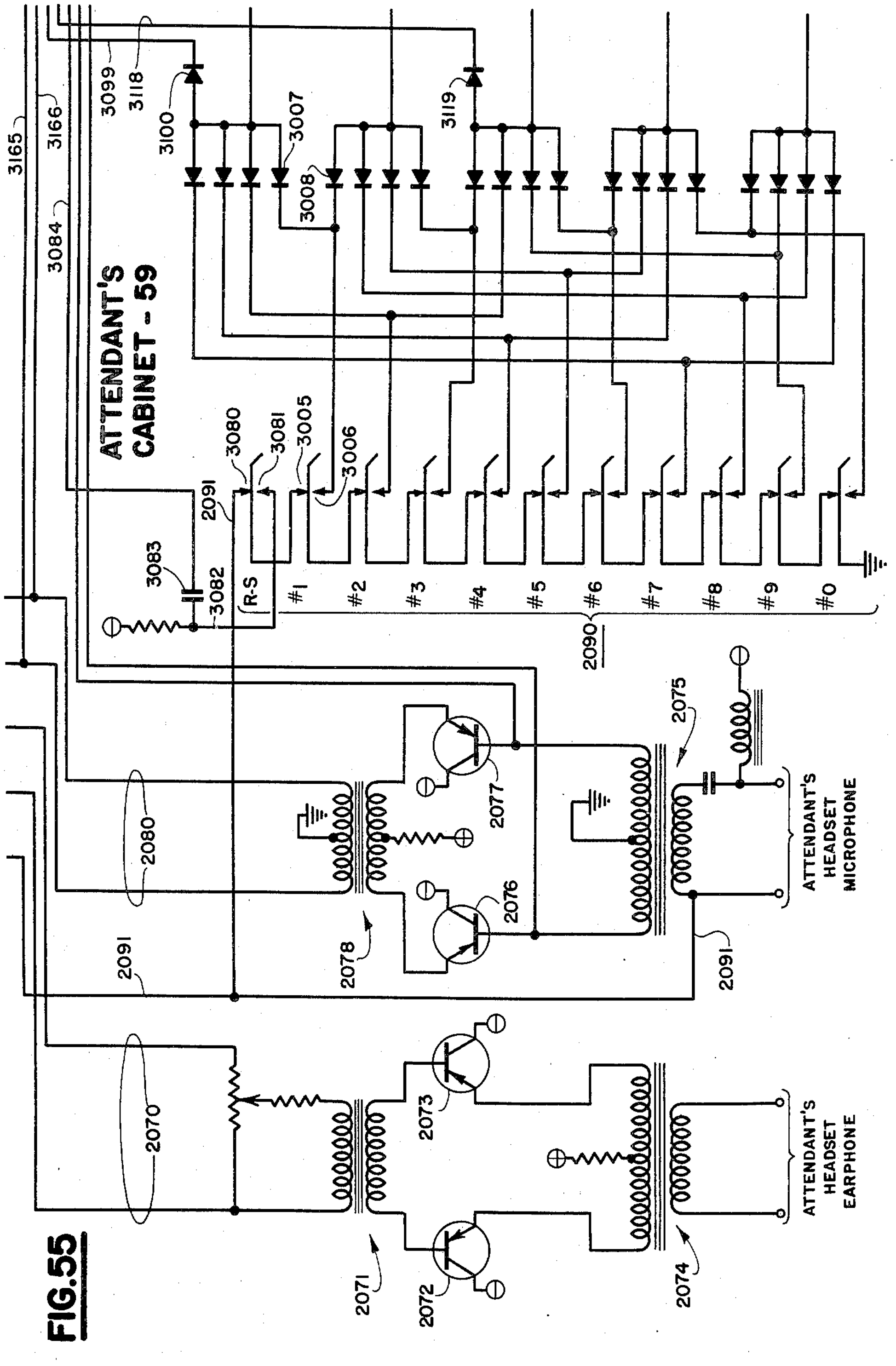
Figure 56:
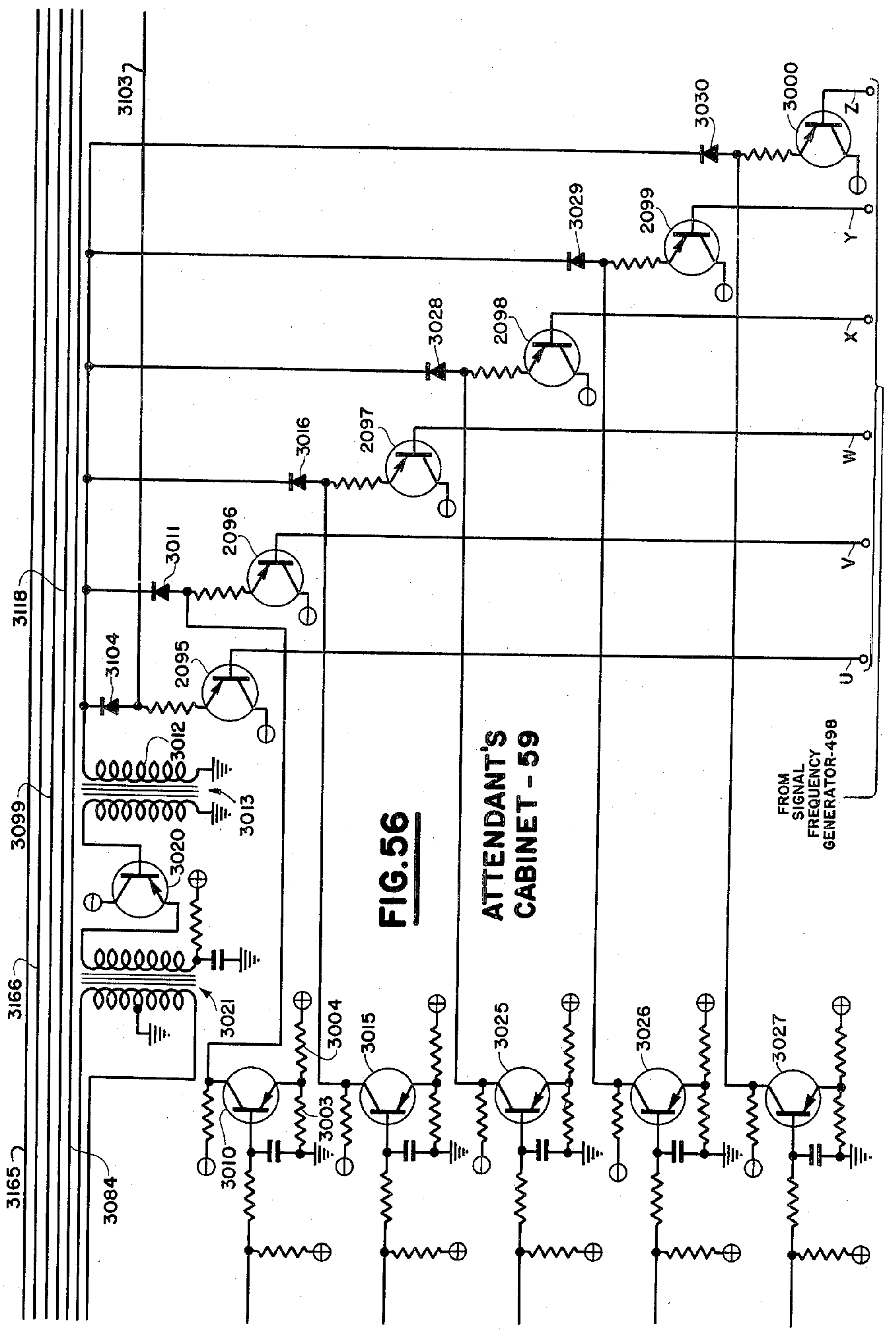
Figure 57:
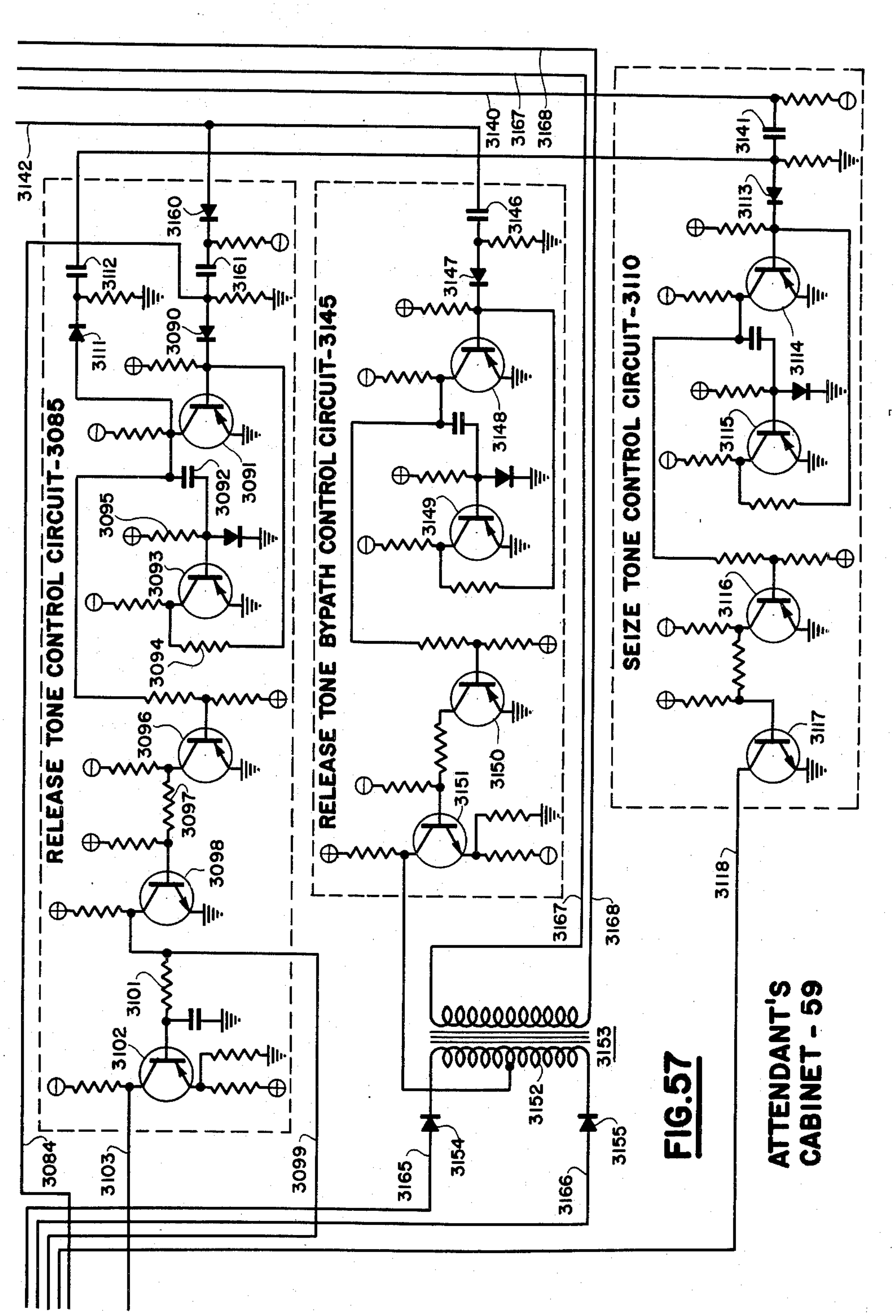

The dial-to-dial trunk circuit 64, which is employed to terminate one of the trunk lines extending to local office 3, is shown in detail in Figs. 49 to 51, inclusive, of the drawings, together with the trunk allotter 390. It will be recalled from the general description of the system that each of the dial-to-dial trunk circuits is employed to establish a connection from one of the pulse multiplex highways to a particular trunk line extending to another local office when a prefix digit assigned to the other office is dialed. Thus, when a prefix digit of "3" is dialed into the first selector this selector functions to provide a negative multiplex pulse to the trunk circuits associated with the trunk lines extending to local office "3." In a similar manner when prefix digits of "4" to "7," inclusive, are dialed into the first selector a negative multiplex pulse is supplied to different groups of trunk circuits corresponding to other local offices. When a prefix digit of "3" is dialed into the first selector 36 this selector functions to provide a negative MX1 pulse on the conductor S3–1H1 which is supplied to the trunk circuits, including the trunk circuit 64, which are associated with the trunk lines extending to local office 3.

Each of the dial-to-dial trunk circuits, including the circuit 64, includes a group of fifty flip-flop circuits which are individually controlled by the twenty-five selectors associated with highway No. 1 and the twenty-five selectors associated with highway No. 2. In Fig. 49 the first such flip-flop circuit 376 is shown in detail, the twenty-fifth, twenty-sixth and fiftieth flip-flops in this trunk circuit being indicated in block diagram form as 377, 379 and 380. In addition, the first, twenty-fifth, twenty-sixth and fiftieth flip-flops in the second dial-to-dial trunk circuit together with their associated input and output gates are shown generally by the block 1900 and the block 1901 designates the similar arrangement of the tenth dial-to-dial trunk circuit 375 serving local office 3.

The first selector 36, which serves highway No. 1, applies a negative MX1 pulse over the conductor S3–1H1 to the first flip-flop circuit in each of the dial-to-dial trunk circuits serving local office 3, including the flip-flop 376 in the trunk circuit 64. More particularly, the input and gate 385 associated with the flip-flop 376 comprises the diodes 1902 and 1903 the anode of the diode 1902 being connected to the conductor S3–1H1 and the anode of the diode 1903 being connected to the enabling conductor TEN–1 from the trunk allotter 390. The trunk allotter 390 provides a negative enabling potential on the conductor TEN–1 when the dial-to-dial trunk circuit 64 is to handle a call to local office 3. Accordingly, when a negative MX1 pulse is applied to the conductor S3–1H1 the and gate 385 is opened and this negative pulse is applied through a diode 1904 to the base electrode of a transistor 1905 which forms one section of the flip-flop 376, a transistor 1906 forming the other section of this flip-flop. The transistor 1905 is normally non-conducting and the negative MX1 pulse applied to the base thereof sets the flip-flop circuit 376 so that the transistor 1905 is rendered conductive and the transistor 1906 is rendered non-conductive.

When the transistor 1905 is rendered conductive the conductor TSR–1 which is connected to the collector of the transistor 1905 rises to ground and the trunk allotter 390 responds thereto by removing the enabling potential from the conductor TEN–1 and supplying an enabling potential to the conductor TEN–2 so that the and gates associated with the flip-flop circuits 1900 of the second dial-to-dial trunk circuit are enabled. When the flip-flop 376 is set and the transistor 1906 is rendered non-conductive the collector thereof falls to a minus value so that the diode 1910, which comprises one section of the and gate 391 is reverse biased. Accordingly, when a negative MX1 pulse appears on the MX1 conductor the diode 1911 is also reverse biased and a negative MX1 pulse is applied to a diode 1912 which forms one input of the twenty-five input or gate 392 provided for the twenty-five flip-flops serving highway No. 1. Accordingly, negative MX1 pulses are transmitted by way of the conductor 1915 (DDH1) to the voice switches 66 and 68. The voice switches 66 and 68 are similar to the voice switches 26 and 27 described in detail heretofore in connection with the line circuit 111 and connect the send and receive conductors of highway No. 1 to the receive conductors 60 and send conductors 62, respectively, of the first trunk line extending to local office No. 3. At the same time that the voice switches 66 and 68 are opened in the MX1 time position the trunk allotter 390 functions to control the transmission of a seize tone signal derived from the seize tone generator 395 so that the equipment terminating the trunk line in local office 3 can respond thereto by assigning an idle time position on one of the pulse multiplex highways thereto and condition the first selector which is assigned this time position to receive and register the next digit.

Considering first the manner in which the trunk allotter 390 functions to control the enabling of the dial-to-dial trunk circuits, the first stage of the allotter 390 is shown in detail in Fig. 49 of the drawings, the second and tenth stages of this allotter being shown in block diagram form in Fig. 50. The output of each of the trunk allotter stages is used to trigger the next succeeding stage. Accordingly, the input terminal 1920 of the first stage is not supplied with any signal although the output terminal 1921 of the first stage is connected to the corresponding input terminal 1920 of the second stage. The enabling conductor TEN–1 for the first dial-to-dial trunk circuit 64 is connected to minus twelve volts through a resistor 1925 and is connected through a diode 1926 to the collector of a transistor 1927 the emitter of which is connected to ground. Conduction of the transistor 1927 is controlled by a transistor 1928 the collector of which is connected through a resistor 1929 to minus twelve volts and through a resistor 1930 to the base electrode of the transistor 1927, this base electrode being connected through a resistor 1931 to plus twelve volts. The reset conductor TSR–1 for the first dial-to-dial trunk circuit 64 is connected through a diode 1935 and a resistor 1936 to the base electrode of the transistor 1928, this base electrode being connected through a resistor 1937 to plus twelve volts and the cathode of the diode 1935 being connected through a resistor 1938 to minus twelve volts. The cathode of a diode 1940 is also connected to the junction of the resistors 1936 and 1938, the anode of the diode 1940 being connected by way of the conductor TBY–1 to the trunk busying portion of the dial-to-dial trunk circuit 64.

During periods when the trunk circuit 64 is idle, the conductor TBY–1 is at a minus value and the conductor TSR–1 is at a minus value so that both of the diodes 1935 and 1940 are reverse biased and the transistor 1928 is conducting. However, as soon as one of the flip-flop circuits in the trunk circuit 64 is set, such as the flip-flop 376 associated with the conductor S3–1H1 from the first selector 36, the transistor 1905 of this flip-flop is rendered conductive and the potential on the conductor TSR–1 rises to ground so that the diode 1935 is rendered conductive and the transistor 1928 is rendered non-conductive. When the transistor 1928 is rendered non-conductive the base electrode of the transistor 1927 becomes negative so that the transistor 1927 is rendered conductive. When the transistor 1927 is rendered conductive the diode 1926 connected to the collector thereof is rendered conductive so that the potential on the conductor TEN–1 rises to ground potential and thereby blocks all of the input and gates to the flip-flops in the trunk circuit 64, such as the and gate 385 associated with the first flip-flop 376. Accordingly, none of the other flip-flops in the trunk circuit 64 can be set in response to negative multiplex pulses produced on any of the other S3 conductors since the input and gates associated with these flip-flops are closed.

When the transistor 1928 is rendered non-conductive by the change in the potential on the conductor TSR–1 the collector of the transistor 1928 falls to a minus value and a diode 1945 connected thereto is reverse biased so that a negative signal is applied to the base electrode of a normally non-conducting transistor 1946 and this latter transistor is rendered conductive. When the transistor 1946 is rendered conductive a positive signal is applied through a time delay circuit including a condenser 1947 to the base electrode of a normally conducting transistor 1948 so that the transistor 1948 is turned off and the collector potential thereof falls to a minus value from ground potential. The potential at the collector of the transistor 1948 is applied to the output terminal 1921 of the first stage and is connected to the input terminal 1920 of the second stage. This negative signal applied to the input terminal 1920 of the second stage is connected to the anode of a diode 1950 in the second stage the cathode of which is connected to the enabling conductor of the second trunk circuit, that is the conductor TEN–2. The output terminal 1921 of the first stage is normally at ground potential.

When the first stage of the trunk allotter 390 is conditioned to enable the first trunk circuit 64 the transistor 1948 thereof is conducting so that the diode 1950 in the second stage is rendered conductive and holds the conductor TEN–2 at ground potential so that the second trunk circuit is not also enabled. However, when one of the flip-flops in the trunk circuit 64 is set and the transistor 1948 is rendered non-conductive in the manner described above, the diode 1950 in the second stage is reverse biased so that the potential on the conductor TEN–2 falls to a minus value and thereby enables the and gates and associated flip-flop circuits 1900 of the second trunk circuit. When this second trunk circuit is seized the negative signal produced at the output terminal 1921 thereof is employed to control the next succeeding allotter stage so that its enabling conductor falls to a minus value and the third trunk circuit is enabled, etc.

When one of the flip-flops in the trunk circuit 64 is set and the potential on the conductor TSR–1 rises to ground potential, seizure tone control transistor 1955 in the first allotter stage is rendered non-conductive due to the fact that the conductor TSR–1 is connected through a resistor 1956 to the base electrode of the transistor 1955 and through a resistor 1957 to minus twelve volts, the base electrode of the transistor 1957 being connected through a resistor 1958 to plus twelve volts so that a voltage divider including these resistors is provided. When the transistor 1955 is rendered non-conductive the collector thereof falls to a minus value and this negative signal is coupled through a condenser 1960 and by way of a conductor 1961 to the base electrode of a transistor 1965 which together with a transistor 1966 and an emitter follower transistor 1967 comprises a one-shot multivibrator indicated generally at 1968. The collector of the transistor 1965 is connected through a condenser 1970 to the base electrode of the transistor 1967, this base electrode being connected to ground through the resistor 1971. The condenser 1970 and resistor 1971 have a relatively long time constant and the emitter of the transistor 1967 is connected to the base electrode of the normally conducting transistor 1966 of the multivibrator 1968. Accordingly, the multivibrator 1968 produces a negative pulse at the collector of the transistor 1966 which persists for approximately one second and this pulse is employed to render a control transistor 1975 conductive for this period. The transistor 1975 controls the flow of seize tone from the generator 395 through the windings 1976 and 1977 of a coupling transformer 1978 so that a seize tone signal is developed across the output winding 1980 of the transformer 1978 and is supplied to the receive conductors 60 of the trunk line extending to the local office 3. Accordingly, as soon as the trunk circuit 64 is seized on an outgoing call a seize tone signal is applied to the receive conductors 60 of the trunk line and is transmitted to local office 3 wherein this seize signal is employed to associate the terminating trunk circuit in local office 3 with a trunk link so that the call may be completed in a manner described hereinafter in connection with an incoming call to local office 1 over one of the dial-to-dial trunks. The equipment in local office 3 is thus prepared to receive the second, third and fourth digits corresponding to the called party in local office 3 and when the second digit is dialed the dial impulse modulated MX1 pulses which are produced on the conductors 20 of highway No. 1 are transmitted through the voice switch 68, and over the receive conductors 60 of the trunk line extending to local office 3. This digit is then registered in the first selector stage in local office 3 and the third and fourth digits are registered in the corresponding connector stage so that a connection is established to the called party in this local office.

When a call involving the trunk circuit 64 is completed and the calling party in local office 1 hangs up a release tone signal is supplied in the manner described heretofore to the release circuit 56 and this circuit functions to provide a negative release pulse on the conductor RSN–1H1. This negative release pulse is supplied to the first flip-flop circuit in each of the dial-to-dial trunk circuits and functions to reset any one of these flip-flop circuits which has been set at the beginning of the call. More particularly, the conductor RSN–1H1 is coupled through a diode 1985 to the base electrode of the transistor 1906 and turns this transistor on so that the flip-flop circuit 376 is reset to its original condition in which the transistor 1905 is non-conductive and the transistor 1906 is conductive. When the transistor 1905 is thus rendered non-conductive the potential on the conductor TSR–1 falls again to a minus value and the diode 1935 in the first trunk allotter stage is reverse biased so that the transistor 1928 is rendered conductive and the transistor 1927 is rendered non-conductive so that the potential on the conductor TEN–1 also falls to a minus value and the input gates associated with the flip-flop circuits in the trunk circuit 64 are again enabled so that the trunk circuit 64 is permitted to handle the next call.

When the transistor 1928 is thus rendered conductive, the transistor 1946 is rendered non-conductive and the transistor 1948 is rendered conductive so that the potential at the output terminal 1921 of the first allotter stage rises to ground potential. When this occurs the diode 1950 in the second allotter stage is again rendered conductive so that the potential on the conductor TEN–2 rises to ground potential and the flip-flop circuits 1900 of the second trunk circuit are no longer enabled. Accordingly, if a call involving the trunk circuit 64 is completed before the second trunk circuit is seized the second trunk circuit becomes disabled and the first trunk circuit 64 is reenabled to handle the next call. On the other hand, if during the period when the trunk circuit 64 is occupied by a call the second trunk circuit is also seized, the third trunk circuit is enabled by the negative potential supplied from the output terminal 1921 of the second stage to the input terminal 1920 of the third stage. If the trunk circuit 64 is now released during the period when the second trunk circuit is seized and the third trunk circuit is enabled, the potential on the conductor TSR–1 falls to a minus value with the result that the potential of the output terminal 1921 of the first stage rises to ground and this positive signal is applied to the input terminal 1920 of the second stage. In the second stage a diode 1988 is provided between the input terminal 1920 of the second stage and the cathode of the diode 1945 in the second stage so that the positive signal applied to the input terminal 1920 of the second stage renders the diode 1988 of the second stage conductive. When the second stage is occupied by a call the transistor 1946 thereof is conducting. However, when the diode 1988 in the second stage is rendered conductive the base electrode of the transistor 1946 in the second stage is made positive so that this transistor is turned off and the transistor 1948 in the second stage is turned on. However, conduction of the diode 1988 in the second stage does not affect the conduction of the transistors 1927 and 1928 in the second stage due to the fact that the diode 1945 in the second stage blocks the positive signal transmitted through the diode 1988 in the second stage. The output transistor 1948 of the second stage is thus rendered conductive even though the second stage is still occupied by a call and the positive signal applied from the output terminal 1921 of the second stage to the input terminal 1920 of the third stage has the effect of rendering the diode 1950 in the third stage conductive so that the potential on the conductor TEN–3 rises to ground and thus disables the flip-flop circuits associated with the third trunk circuit. This action will continue through any number of allotter stages which are occupied with calls so that when the first allotter stage is reenabled the last allotter stage which was previously enabled is thereafter disabled.

When the call is terminated and the flip-flop controlled by first allotter stage has been reset the potential at the collector of the transistor 1927 again falls to a minus value and this collector potential is applied by way of a conductor 1990 and through a condenser 1991 to control a release tone multivibrator 1995 comprising the transistors 1992, 1993 and 1994. The multivibrator 1995 is identical to the multivibrator 1968 and functions to turn on a control transistor 1996 for a period of approximately one second, during which period a release tone current from the release tone generator 396 is coupled through the transformer 1997 to the receive conductors 60 of the first trunk line extending to local office 3. Accordingly, when the call is completed and the calling party at local office 1 hangs up a release tone signal is transmitted by way of the conductors 60 to the local office 3 so as to effect the release of the equipment associated with a call in this local office in a manner similar to that described above in connection with the release of equipment in local office 1.

Considering now the manner in which the trunk circuit 64 functions to establish a connection to a called party in local office 1 on a call incoming to this local office, a seize signal is transmitted to the local office 1 over the send conductors 62 from the originating local office 3. This seize signal is coupled to a transformer 2000 which may be identical to the coupling transformer 602 provided in the line circuit 111. In the illustrated embodiment, the trunk circuit 64 is given an arbitrary numerical designation of "41" and accordingly tens pulses are supplied by way of the conductor T4C from the trunk finder 400 to the cathode of a diode 2001, the anode of the diode being connected to the center tap of a winding 2002 of the coupling transformer 2000. Also units pulses are supplied from the trunk finder 400 by way of the conductor U1C to the cathode of a diode 2003 the anode of which is connected to the center tap of the winding 2002. The center tap is also connected to the anode of a diode 2004 the cathode of which is connected to the output terminal 1921 of the first allotter stage of the trunk allotter 390.

When the trunk circuit 64 is idle and an enabling potential of a minus value is produced on the conductor TEN–1 the transistor 1948 in the first allotter stage is conducting so that the output terminal 1921 is at ground potential. Accordingly, when the tens and units pulses coincide on the conductor T4C and U1C the three input and gate comprising the diodes 2001, 2003 and 2004 is opened and the center tap of the transformer winding 2002 is grounded so that the diodes 2005 and 2006 connected across the winding 2002 are rendered conductive. When this occurs a seize tone signal is transmitted by way of the conductor CTS, which is common to all of the trunk circuits served by the trunk finder 400, to the trunk seizure detector 401. The trunk seizure detector 401 is identical to the seizure detector 230 described in detail heretofore and the trunk finder 400 is identical to the line finder 30 described in detail heretofore. Accordingly, marking potentials are produced on the tens and units marking conductors TM4C and UM1C and these marking potentials are supplied through either the and gates 245 or the gates 246 to the group of trunk links serving highway No. 1 or highway No. 2.

Assuming that trunk link 1HW1C is allotted by the line link and trunk link allotter 32, when marking potentials are produced on the conductors TM4C and UM1C the corresponding flip-flops in trunk link 1HW1C are set and MX1 pulses are transmitted by way of the output conductors TH1–4C and UH1–1C to the trunk output matrix 410. In this matrix these MX1 pulses are applied to the gate 412 so that negative MX1 pulses are transmitted by way of the conductor TH1–41 to the trunk circuit 64. In the trunk circuit 64 the conductor TH1–41 is connected to the voice switches 414 and 416 so that these voice switches are now opened in the MX1 time position. The voice switch 416 is connected to the send conductors 20 of highway 1 and the voice switch 414 is connected to the receive conductors 21 of this highway. Since the first selector 36 is continuously impressing dial tone modulated MX1 pulses on the receive conductors 21, as soon as the voice switch 414 is opened these dial tone modulated MX1 pulses pass through the voice switch 414, are demodulated, and the dial tone signal is applied to the receive conductors 60 of the trunk line extending to local office 3. This dial tone is thus transmitted to the calling subscriber at local office 3 to terminate transmission of seize tone from his subset and inform him that dialing may be initiated.

In order to disable the trunk circuit 64 on a call incoming thereto so that this trunk circuit will not be seized by an outgoing call from the local office 1, a trunk busying circuit 1945 is provided which is similar to the line busying circuit provided in line circuit 111 and described in detail heretofore. More particularly, the conductor 1915, which controls the voice switches 66 and 68 is connected to a diode 2010, the conductor 1916 is connected to a diode 2011, the conductor TH1–41 from the trunk output matrix 410 is connected to a diode 2012 and the conductor TH2–41 from the trunk output matrix 426 is connected to a diode 2013. When any one of the diodes 2010 to 2013, inclusive, is rendered conductive by the application of negative multiplex pulses to the corresponding conductor, this negative signal is coupled through the emitter follower transistors 2015 and 2016 to the output transistor 2017 so that the collector of this transistor rises from a minus value to ground. The collector of the transistor 2017 is connected by way of the conductor TBY–1 to the anode of the diode 1940 and when the transistor 2017 is rendered conductive the diode 1940 is also rendered conductive so that the transistor 1928 is rendered non-conductive, the transistor 1927 is rendered conductive and the potential on the conductor TEN–1 rises from a minus value to ground thus removing the enabling potential from the input and gates associated with the flip-flop circuits of the trunk circuit 64. Accordingly, as soon as a seize tone signal is received on the conductors 62 from the local office 3 the first allotter stage functions to remove the enabling potential from the conductor TEN–1 so that the flip-flop circuits of the trunk circuit 64 are not permitted to respond to control signals supplied to this trunk circuit from a first selector in local office 1 on an outgoing call. However, since the next trunk circuit is immediately enabled by the trunk allotter 390 in a manner described above, if an outgoing call is in progress at the same time that the trunk circuit 64 is seized, the outgoing call will seize the second trunk circuit and a connection will be established to its associated trunk line in a manner similar to that described above in connection with a call involving the trunk circuit 64.

On an incoming call to this trunk circuit the enabling potential on the conductor TEN–1 is removed by the above described trunk busying section 1945 without setting any of the flip-flop circuits of this trunk circuit. Accordingly, the potential on the conductor TSR–1 does not change and the transistor 1955 is not rendered non-conductive so that the multivibrator 1968 is not triggered and no seize tone signal is applied to the conductors 60 of the first trunk line as a result of this incoming call. However, when the incoming call is terminated the trunk circuit 64 is released either by the release signal generated by the called subscriber's subset in local office 1, which is supplied to the release circuit 56 so that the trunk link 1HW1C is reset and multiplex pulses are no longer supplied to the trunk busying section of the trunk circuit 64, or, if the calling party in local office 3 hangs up first, the release signal developed in the local office 3 may be transmitted over the send conductors 62 to the local office 1 and effect this release. In either event, when the trunk circuit 64 is released the transistor 1927 is rendered non-conductive so that the release tone multivibrator 1992, 1993 and 1994 is triggered and a release tone signal of one second duration is applied to the receive conductors 60 of the first trunk line. However, this release tone signal does not interfere with the release of the equipment in local office 3 and may serve to produce a release in the local office 3 in the event that the calling subscriber's subset in local office 3 fails to produce a release signal in the customary manner. It will also be noted that the transmission of a release tone between local offices is not required to terminate the connection since a release tone signal is generated in both offices when both subscribers hang up. Accordingly, fading in transmission between offices or other difficulties in transmission does not prevent connections from being terminated so that linkage cannot be tied up indefinitely.

*Long distance trunk circuit 80*

The long distance trunk circuits, such as the long distance trunk circuit 80, are identical to the dial-to-dial trunk circuit 64 described in detail heretofore. In the illustrated embodiment a group of thirty long distance trunks are employed to establish connections to the long distance switching center 10. On an outgoing call from the local office 1 to the long distance switching center 10 the calling subscriber is connected through the local attendant's cabinet 59 to a four wire, long distance trunk extending to the long distance switching center 10 although the operator at the local attendant's cabinet 59 can cut in on the call, as will be described in more detail hereinafter in connection with the circuitry of the cabinet 59. On an incoming call from the long distance switching center 10 to the local office 1, the long distance trunk circuit functions in a manner identical to the dial-to-dial trunk circuit to seize an idle trunk link so that the voice switches associated with the long distance trunk circuit are opened and establish a connection to one of the pulse multiplex highways in local office 1. However, on an incoming call a lamp is lit at the attendant's cabinet 59 and the operator then cuts in on the call and is verbally given the desired number in local office 1. The operator at the attendant's cabinet 59 then completes the call with her own key set to the called subscriber in local office 1, as will be described in more detail hereinafter, in connection with the attendant's cabinet 59.

*Trunk allotter 477*

The trunk allotter 477, which is provided to allot the long distance trunk circuit to succeeding incoming and outgoing calls to the long distance switching center 10, is identical to the trunk allotter 390 described in detail heretofore in connection with the dial-to-dial trunk circuit 64. The trunk allotter 477 is provided with a series of thirty series connected stages, each of which is identical to the first stage of the allotter 390 which has been described in detail heretofore. If desired an all links busy circuit may be connected to the last allotter stage in either the allotter 390 or the allotter 477 to provide an indication when all of the dial-to-dial trunks or long distance trunks are busy. This all trunks busy circuit may comprise a simple one-shot multivibrator circuit, such as the multivibrator 1443 in the connector 40, which is triggered from the output terminal 1921 of the last allotter stage and is provided with a peg counter in the collector circuit of the normally non-conducting transistor thereof which counts the number of times all of the trunks are simultaneously busy.

*Local attendant's cabinet 59*

The local attendant's cabinet 59 is shown in detail in Figs. 52 to 57, inclusive, of the drawings. It will be recalled from the general description of the system that the local attendant's cabinet 59 is provided to complete calls from the long distance switching center 10 to a called subscriber in the local office 1. Also, the attendant at this position terminates the information trunk circuits 96 and 500 and may be reached by dialing "0" to supply information in the customary manner. The attendant at cabinet 59 is provided with dialing facilities which respond to the dialing frequency signals generated by the signal frequency generator 498 so that the attendant can complete an incoming call. Also, the attendant can establish a connection to a new called subscriber in the event that the first subscriber has recalled the attendant and requested that the call be transferred. Also, a line circuit 515 is provided for the attendant which may be employed to initiate a call from the cabinet 59.

Considering first the manner in which a lamp is lit on the panel of the cabinet 59 in response to an incoming call from the long distance switching center 10, on such a call one of the long distance trunk circuits, such as the trunk circuit 80, functions to seize an idle trunk link, such as the trunk link 1HW1C and when the and gate of the trunk output matrix 410 corresponding to the trunk circuit 80 is opened negative MX1 pulses are applied by way of the conductor TH1–11 to the voice switches 492 and 494 so as to establish a connection from the long distance trunk line through the attendant's cabinet 59 and these voice switches to the send and receive conductors of highway No. 1. At this point in the call the long distance trunk line extends directly through the local attendant's cabinet 59 and the attendant is not connected thereto. However, the negative MX1 pulses which are produced on the conductor TH1–11 are also applied through the or gate 496 to the attendant's cabinet 59. More particularly, the conductor TH1–11 is connected to the cathode of a diode 2035 the anode of which is connected through a resistor 2036 to ground so that the negative MX1 pulse is repeated across the resistor 2036. When the diode 2035 is rendered conductive, the negative pulse appearing across the resistor 2036 is coupled through a condenser 2037 and a diode 2038 to the base electrode of a transistor 2039 which forms one section of an operator's lamp flip-flop circuit 2040 the other section of which comprises a transistor 2041. The transistor 2039 is normally non-conductive and when the base electrode thereof is made negative the flip-flop 2040 is set and the transistor 2041 is rendered non-conductive. When the transistor 2041 is rendered non-conductive the collector thereof falls to a minus value and this potential is applied to the cathode of a diode 2045 which forms one input of a two input and gate the other input of which comprises a diode 2046 the cathode of which is connected to the collector of a control transistor 2047. A lamp flashing voltage having on and off durations of approximately 300 milliseconds, is developed in the generator 498 and supplies this waveform by way of the conductor 2050 and through a resistor 2051 to a base electrode of a transistor 2052 so that the flashing waveform is reproduced at the collector of the transistor 2052 and is coupled through a resistor 2053 to the base electrode of the control transistor 2047. Accordingly, during the on intervals of the flashing waveform the transistor 2047 is rendered conductive and the diode 2046 is also rendered conductive so that a positive signal is coupled through a resistor 2054 to the base electrode of a driver transistor 2055. The emitter of the transistor 2055 is connected to the base electrode of an output transistor 2056 in the collector circuit of which is connected an indicating lamp 2057. Accordingly, when a negative multiplex pulse is supplied from the conductor TH1–11 to the diode 2035, or when a negative multiplex pulse is supplied from the conductor TH2–11 to the diode 2042 in the event that the call is established on highway No. 2, the lamp 2057 flashes to attract the attention of the attendant at cabinet 59 thereby informing him that an incoming call from the long distance switching center 10 must be completed.

The attendant at cabinet 59 is provided with a series of thirty-two-position key switches on for each of the long distance trunks extending to the long distance switching center 10. Thus, the key switch 2060 is provided for the first long distance trunk, the key switch 2061 is provided for the second long distance trunk and the key switch 2062 is provided for the illustrated thirtieth long distance trunk to long distance switching center 10. These key switches are normally in the position shown in the drawings in which the receive conductors 82 of the first long distance trunk are connected by way of the conductors 2065 to the long distance trunk circuit 80, and the send conductors 84 are connected by way of the conductors 2066 to the long distance trunk circuit 80, the conductors 2066 being equivalent to the receive conductors 60 of one of the dial-to-dial trunks extending to local office 3 and the conductors 2065 being equivalent to the send conductors 62 of this trunk.

In the cabinet 59 a pair of conductors 2070 are connected through a coupling transformer 2071 and a pair of emitter follower transistors 2072 and 2073 and a second coupling transformer 2074 to the attendant's headset earphones. Also, signals produced by the attendant's headset microphones are coupled through a transformer 2075, a pair of emitter follower transistors 2076 and 2077 and a coupling transformer 2078 to a second pair of conductors 2080. When the attendant's key switches are all in the illustrated mid-position the conductors 2070 and 2080 are not connected to any of the long distance trunks, the long distance trunk circuits or the information trunk circuits. However, when one of the key switches such as the key switch 2060 is thrown to the left, as viewed in Fig. 52, the send conductors 82 of the first long distance trunk are connected to the conductors 2070 and hence to the attendant's headset earphones and the receive conductors 84 of the first long distance trunk are connected to the conductors 2080 and hence to the attendant's headset microphone. Accordingly, a two-way communication connection is established between the first long distance trunk and the attendant's headset so that oral instructions can be given the attendant for completion of a call within the local office 1.

When the attendant moves the key switch 2060 to the left the contacts 2085 thereof are opened and the contacts 2086 are closed so that ground potential which extends through the individual switches of the operator's key set 2090 is extended by way of the conductor 2091, the contacts 2086, the conductor 2092, a condenser 2093 and a diode 2094 to the base electrode of the transistor 2041 in the operator's lamp flip-flop circuit 2040. The condenser 2093 is connected through a resistor 2095 to plus twelve volts and through a resistor 2096 to ground. Accordingly, when the conductor 2092 is grounded a negative signal is produced which is coupled through the diode 2094 to the base electrode of the transistor 2041 so that the flip-flop circuit 2040 is reset to its original condition in which the transistor 2041 is conductive. When the transistor 2041 is rendered conductive the diode 2045 is rendered conductive, and the transistors 2055 and 2056 are rendered non-conductive so that the lamp 2057 is no longer energized.

After the attendant receives oral instructions for completion of the call, the key switch 2060 is thrown to the right in which position the attendant's headset microphone is connected by way of the conductors 2080 to the conductors 2065 extending to the long distance trunk circuit 80 and the attendant's headset earphone is connected by way of the conductors 2070 through the switch 2060 to the conductors 2066 extending to the long distance trunk circuit 80. The attendant may now depress the desired keys of the key set 2090 in accordance with the number of the called line in local office 1 and the corresponding dial frequency combinations will be supplied by way of the conductors 2065 to the long distance trunk circuit 80 and through the voice switch 494 to the send conductors 20 of highway No. 1. More particularly, the generator 498 develops a 900 cycle signal on the conductor U, an 1100 cycle signal on the conductor V, a 1300 cycle signal on the conductor W, a 1500 cycle signal on the conductor X, a 1700 cycle signal on the conductor Y and a 1900 cycle signal on the conductor Z. These conductors are individually connected to the base electrodes of the transistors 2095, 2096, 2097, 2098, 2099 and 3000, respectively. Each of these transistors is controlled by a control transistor which is in turn controlled by a plural input or gate connected to the individual keys of the keyset 2090. Thus, when the No. 1 key of the key set 2090 is pressed the contacts 3005 are opened and the contacts 3006 thereof are closed so that ground is applied to the cathode of a diode 3007 and to the cathode of a diode 3008. The diode 3007 is thus rendered conductive so that the base electrode of a transistor 3010 is grounded. The emitter of the transistor 3010 is biased slightly positively by means of the voltage divider 3003 and 3004 so that the base electrode of the transistor 3010 becomes negative with respect to the emitter and the transistor is rendered conductive. A diode 3011 is connected to the collector of the transistor 3010 and is rendered conductive so as to connect the 1100 cycle signal appearing on the conductor V through the transistor 2096 and the diode 3011 to the primary winding 3012 of a coupling transformer 3013.

When the number one key of the keyset 2090 is depressed the cathode of the diode 3008 is also grounded so that this diode is rendered conductive and a negative signal is applied to the base electrode of a transistor 3015 so as to render this transistor conductive and apply a positive potential to the anode of a diode 3016 so that this diode is also rendered conductive and a 1300 cycle signal is supplied through the transistor 2097 and the diode 3016 to the winding 3012. This frequency combination which corresponds to a digit of "1" is coupled through the transformer 3013, a transistor 3020 and a second coupling transformer 3021 to the base electrodes of the transistors 2076 and 2077 so that this dial frequency combination is supplied by way of the conductors 2080, the switch 2060, and the conductors 2065 to the long distance trunk circuit 80. In the trunk circuit 80 this digital frequency combination is supplied to the voice switch 494 wherein the digital frequency combination is modulated on MX1 pulses and supplied to the send conductors 20 of highway No. 1. These digital frequency modulated MX1 pulses are then supplied to the first selector 36 which responsd thereto by registering the first digit in the manner described in detail heretofore. In a similar manner the other control transistors 3025, 3026 and 3027, which control respectively the diodes 3028, 3029 and 3030 associated with the conductors X, Y and Z, respectively, may be rendered conductive in accordance with the second and successive digits punched on the key set 2090 these successive digits being transmitted over the above described path and through the selector 36 to the connector serving the called line hundreds group so that a connection is completed to the called line. When the called party answers the attendant informs him that a long distance call from the switching center 10 is taking place and then throws the key switch 2060 to its mid-position so that the connection is routed directly to the trunk circuit 80 from the long distance switching center 10. In this connection, it will be noted that when any one of the keys of the keyset 2090 is depressed, ground is removed from the conductor 2091 so that the battery circuit for the attendant's headset microphone is broken. With this arrangement the attendant cannot inadvertently interfere with the dialing frequency signals by breathing or speaking into his microphone while one of the keys of the keyset 2090 is depressed.

I order to permit the attendant at cabinet 59 to be recalled by a called subscriber in local office 1 on an incoming call from the switching center 10 in the event that call is to be transferred to a different called subscriber, each of the subsets in local office 1 is provided with facilities for developing a recalled signal which comprises the combination of a 900 cycle signal and a 1300 cycle signal. Accordingly, when a called subscriber in local office 1 presses the recall button on his subset, multiplex pulses which are modulated with the recall frequency combination are impressed upon the pulse multiplex highway in the time position assigned to the particular call. Assuming that highway No. 1 and the MX1 time position are being used, these recall frequency modulated MX1 pulses are transmitted by way of the receive conductors 21 of highway No. 1 to the voice switch 492 wherein the recall frequency combination is demodulated and is transmited by way of the conductors 2066 to the attendant's cabinet 59. In the cabinet 59 an operator recall lamp circuit 3040 is provided which includes a multifrequency receiver and associated lamp control circuit which responds to the recall frequency combination impressed upon the conductors 2066 by lighting an operator's recall lamp 3041. More particularly, a coupling transformer 3042 is connected to the conductors 2066 and supplies the recall frequency combination to the base electrodes of a pair of push-pull connected transistors 3043 and 3044 the emitters of which are connected to the input windings of a coupling transformer 3045. The secondary winding of the transformer 3045 is connected to a 900 cycle band pass filter 3046, a 1300 cycle band pass filter 3047 and a band elimination filter 3048 which is tuned to transmit frequencies up to 900 cycles per second and greater than 1900 cycles per second therethrough. The band pass filters 3046 and 3047 are provided with amplifier channels 3050, 3051, respectively, which are tuned to the frequency passed by the corresponding filter, these selective amplifier channels being similar to the selective amplifier channels provided in the first selector 36 which have been described in detail heretofore. Also, the band elimination filter 3048 is provided with a band elimination amplifier channel 3052 which is similar to the band elimination amplifier channel 1285 described in detail heretofore in connection with the first selector 36. The amplifier channel 3052 is arranged to block the channels 3050 and 3051 during periods when frequencies outside the dialing frequency range are present on the conductors 2066 and exceed a predetermined level so that no false signals are produced in the outputs of the amplifier channels 3050 and 3051 in response to speech frequency signals. To this end, a diode 3053 is connected to the blocking input terminal of the channel 3050 and a diode 3054 is connected to the blocking input terminal of channel 3051, it being understood that these channels function in a manner identical to that described above in connection with the first selector 36.

The outputs of the channels 3050 and 3051 are applied respectively to the base electrodes of a pair of transistors 3056 and 3057 and the outputs of these transistors are combined in a resistor 3058. The output of each of the channels 3050 and 3051 rises positively when a signal of the selected frequency is passed therethrough and when a 900 cycle signal and a 1300 cycle signal are present on the conductors 2066 both of the transistors 3056 and 3057 are rendered non-conductive so that a negative signal is coupled through a diode 3060 to the base electrode of a transistor 3061 which forms one section of a recall lamp flip-flop circuit 3062 the other section of which is comprised of a transistor 3063. The transistor 3061 is normally non-conducting and hence the negative signal applied to the base electrode thereof renders this transistor conductive so that the flip-flop circuit 3062 is set. When the transistor 3061 is rendered conductive the collector thereof rises from a minus value to ground and this ground potential is applied to the emitter of a transistor 3065 to the base electrode of which is applied to the flashing waveform derived from the generator 498 by way of the conductor 2050 and a resistor 3066. Accordingly when the flip-flop 3062 is set a flashing waveform is coupled through an inverter transistor 3068, a driver transistor 3069 and an output transistor 3070 so as to energize the recall lamp 3041 at the panel of the attendant's cabinet 59. In this manner the attendant is informed that the called party involved in a call which is then in progress over the first long distance trunk wishes to have the call transferred to another subscriber in local office 1 or to a subscriber in another local office. Accordingly, the operator then throws the key switch 2060 to the right so that his headset is connected to the long distance trunk circuit 80 and then receives oral instructions regarding the new called line.

After these oral instructions have been received the attendant must be able to release the called line presently associated with the long distance trunk circuit 80 and then seize a new trunk link after which the number of the new called party can be dialed by the attendant by depressing the corresponding keys of the key set 2090. To this end, the operator is provided with a seize-release key on the key set 2090 which includes the normally closed contacts 3080 and the normally open contacts 3081. When the seize-release key is depressed the contacts 3081 are closed so that the potential on the conductor 3082 rises from a minus value to ground. This potential increase is coupled through a condenser 3083 and over a conductor 3084 to a release tone control circuit 3085.

The circuit 3085 functions to control the transmission of a release signal comprising a 900 cycle signal from the conductor U and an 1100 cycle signal from the conductor V to the receive conductors 21 of highway No. 1 so that the release circuit 56 will function to reset the flip-flops of the associated trunk link and release the associated first selector and connector stages assigned to the first called party. Also, the flip-flops in the long distance trunk circuit 80 will be reset but since the calling party and the attendant remain associated with the first long distance trunk extending to long distance switching center 10 no other calling party can interfere with the connection by the attendant to the second called partly in the local office 1 or another local office.

Considering now the manner in which the release tone control circuit 3085 functions to perform the above operations, the positive going signal produced on the conductor 3084 is coupled through a diode 3090 to the base electrode of a transistor 3091 which is normally conductive so that this transistor is turned off and the collector potential thereof falls to a minus value from ground. This falling collector potential is coupled through a condenser 3092 to the base electrode of a normally non-conductive transistor 3093 so that the transistor 3093 is rendered conductive and the collector potential thereof rises from a minus value to ground. This potential rise at the collector of the transistor 3093 is fed back through a resistor 3094 to the base electrode of the transistor 3091 so that the transistor 3091 is again rendered conductive. However, the time constant of the condenser 3092 and a resistor 3095 is such that the transistor 3091 remains conductive for a period of approximately one second. Accordingly, there is produced at the collector of the transistor 3091 a negative pulse which persists for approximately one second and this negative pulse is applied to the base electrode of a transistor 3096 so that this transistor is rendered conductive.

When the transistor 3096 is rendered conductive its collector potential is coupled through a resistor 3097 to the base electrode of a transistor 3098 so that this latter transistor is rendered conductive and the collector of the transistor 3098 falls to ground potential from a plus value. The collector potential of the transistor 3098 is coupled by way of the conductor 3099 and through a diode 3100 to the base electrode of the control transistor 3010 so that the diode 3011 is rendered conductive and an 1100 cycle signal is transmitted to the primary winding 3012 of the coupling transformer 3013. At the same time that the transistor 3098 is rendered conductive the collector potential thereof is coupled through a resistor 3101 to the base electrode of a transistor 3102 so that this latter transistor is rendered conductive and the collector potential thereof rises positively, this potential increase being coupled by way of the conductor 3103 to the anode of a diode 3104 so that a 900 cycle signal from the conductor U is also applied to the primary winding of the transformer 3013 through the transistor 2095 and the diode 3104. The 900 and 1100 cycle signals, which together constitute a release signal, are then coupled through the transistor 3020, the transformer 3021, the transistors 2076 and 2077, and the coupling transformer 2078, through the operator's key switch 2060, and over the conductors 2065 to the trunk circuit 80. This release frequency combination of signals is then employed to release all of the linkage originally employed to set up the call to the first called party.

When the release signal control pulse developed by the release tone control circuit 3085 is terminated the circuit 3085 functions to transmit a control pulse to a seize tone control circuit 3110 so that as soon as the linkage associated with the previously called party has been released a new trunk link, first selector, and connector stages will be associated with the long distance trunk circuit 80 to permit completion of the call to a new called line. More particularly, the negative release tone control pulse produced at the collector of the transistor 3091 is coupled through a diode 3111, a condenser 3112, and a diode 3113 to the base electrode of a transistor 3114 in the seize tone control circuit 3110. The circuit 3110 includes a transistor 3115 which is interconnected with the transistor 3114 to provide a seize tone control pulse at the collector of transistor 3114 in a manner substantially identical to that described above in connection with the transistors 3091 and 3093 of the circuit 3095. The negative seize tone control pulse produced at the collector of the transistor 3114 is then coupled through the transistors 3116 and 3117, over a conductor 3118 and through a diode 3119 to the base electrode of the control transistor 3025 so that the diode 3028 is rendered conductive and a 1500 cycle seize tone signal is transmitted from the conductor X through the transistor 2098 and the diode 3028 to the coupling transformer 3013, this seize tone signal being supplied over the same path as the above referred to release signal to the conductors 2065 extending to the long distance trunk circuit 80. However, in the long distance trunk circuit 80 this seize signal, which appears on the conductors 2065 thereof, is employed to produce a seizure pulse on the common trunk seizure conductor CTS which is supplied to the common trunk seizure detector 401 so that an idle trunk link is seized by the trunk finder 400 and the voice switches 492 and 494 are opened in the manner described in detail heretofore. When the voice switch 492 is opened the dial tone signal appearing on the receive conductors 21, which is modulated on MX1 pulses assuming that the trunk link 1HW1C is seized, is returned to the attendant at the cabinet 59 who then proceeds to dial the number of the new called party by pressing the corresponding keys of the key set 2090. When the new called party answers the attendant informs him that a long distance call is in progress and then throws the key switch 2060 to its mid-position so that a talking connection is completed from the long distance trunk to the new called party.

When the attendant sees the flashing recall lamp 3041 and moves the key switch 2060 to the right so as to establish a connection between his head set and the called party who is recalling the attendant, the contacts 3057 of the key switch 2060 are opened and the contacts 3038 thereof are closed so that a ground potential is applied to the conductor 3039. A negative going potential is thus applied to the base electrode of the transistor 3063 so that the flip-flop circuit 3062 is reset in a manner similar to the resetting of the operator lamp flip-flop circuit 2040 described in detail heretofore. When the flip-flop 3062 is reset the transistor 3061 is rendered non-conductive so that the lamp 3041 is no longer energized by the flashing waveform previously coupled through the transistor 3065 since the emitter of this latter transistor is now at a minus value.

If the attendant at cabinet 59 wishes to initiate a call he could use one of the long distance trunk circuits by throwing the corresponding key switch on his panel to connect his headset to an idle long distance trunk circuit. However, such an arrangement has the disadvantage that the trunk circuit might be in use when the attendant wishes to use it for his own call. In order to permit the attendant to initiate calls unrestrictedly the attendant is provided with a separate line circuit 515 the send conductors 3135 and receive conductors 3136 of which are connected to the contacts of a service key switch 3137 provided at the attendant's panel of cabinet 59.

When the key switch 3137 is thrown to the right the attendant's earphone and microphone are connected respectively to the receive conductor 3136 and the send conductors 3135. However, it is necessary for the attendant to develop a seize signal when the key switch 3137 is closed so that a line link can be assigned to the service line circuit 515 in a manner similar to the seizure of a calling line by one of the line links, as described in detail heretofore. To this end, the key switch 3137 is provided with the normally closed contacts 3138 and the normally open contacts 3136. When the key switch 3137 is moved to the right the contacts 3139 thereof are closed so that a ground potential is applied by way of the conductor 3140 and through a condenser 3141 in the seize tone control circuit 3110. When the conductor 3140 is thus grounded a positive signal is coupled through the condenser 3141 and the diode 3113 to the base electrode of the transistor 3114 so that this transistor is rendered non-conductive and a seize tone control pulse is produced on the conductor 3118 in a manner identical to that described above in connection with the control of the seize tone control circuit 3110 at the end of the release pulse developed by the release tone control circuit 3085. Accordingly, when the key switch 3137 is closed to the right a seize tone signal is supplied to the conductors 2080, through the key switch 3137 and over the conductors 3135 to the line circuit 515.

In the illustrated embodiment the line circuit 515 has been arbitrarily assigned the number "99" and hence tens pulses on the conductor T9A and units pulses on the conductor U9A are supplied from the line finder 30 to the line circuit 515. When these tens and units pulses coincide and a seize tone signal is supplied over the conductors 3135, a seizure detector signal is supplied by way of the conductor SDIA to the seizure detector 230 so that an idle line link is associated with the line circuit 515 in the manner described in detail heretofore in connection with the line circuit 111. The voice switches 517 and 519 are then opened in the multiplex time position assigned to the seized line link and the dial tone signal appearing on the receive conductors 21 of highway No. 1 in the corresponding time position is then transmitted through the voice switch 519 and over the conductors 3136 to the attendant's head set earphones at the cabinet 59 so that the attendant is informed that dialing may be initiated. The desired number is then set up on the key set 2090 at the cabinet 59 and the call established in the normal manner.

When a call is initiated by the attendant at cabinet 59 the key switch 3137 is thrown to the right and locks in this position for the duration of the call. However, when the attendant wishes to terminate the call the key switch 3137 is thrown back to its mid-position. When this occurs the contacts 3138 thereof are closed so that the potential on the conductor 3142 rises positively to ground potential. This positive going signal is applied to the release tone control circuit 3085 and is also supplied to a release tone bypath control circuit 3145. The bypath control circuit 3145 routes the release tone developed in response to the release pulse produced by the release tone control circuit 3085 around the contacts of the switch 3137 since after the attendant's call is completed the contacts of the switch 3137 are opened and a path is no longer maintained from the attendant's microphone to the conductors 3135 extending to the line circuit 515. More particularly, the positive signal developed on the conductor 3142 when the key switch 3137 is returned to its mid-position is coupled through a condenser 3146 and a diode 3147 to the base electrode of a transistor 3148, this transistor cooperating with a transistor 3149 to provide a negative pulse of approximately one second duration at the collector of the transistor 3148 in a manner identical to that described above in connection with the release tone control circuit 3085. The negative pulse produced at the collector of the transistor 3148 is coupled through the transistors 3150 and 3151 to the center tap of a secondary winding 3152 of a coupling transformer 3153. The upper and lower ends of the winding 3152 are respectively connected through the normally reversed biased diodes 3154 and 3155 to the conductors 3165 and 3166 which are in turn connected to the conductors 2080. At the same time a release tone trigger pulse from the conductor 3142 is coupled through a diode 3160 to the circuit 3085 so that a release tone control pulse is produced which functions to apply a release tone frequency combination to the conductors 2080 as described above. The negative pulse applied to the center tap of the transformer winding 3152 by the circuit 3145 renders the diodes 3154 and 3155 conductive so that the release tone frequency combination is transmitted through the transformer 3153 and over the conductors 3167 and 3168 to the conductors 3135 extending to the line circuit 515 thus bypassing the open contacts of the switch 3137.

*Information trunk 96*

The information trunks, such as the information trunk circuit 96, are generally similar to the dial-to-dial trunk circuit 64 which has been described in detail heretofore. However, since the information trunks are employed only to set up connections to the attendant's cabinet 59 and are not equipped to handle incoming calls, the information trunk circuits do not include facilities for supplying seize tone and release tone signals to the receive conductors of the associated trunk line. More particularly, the information trunk circuits do not require the seize tone flip-flop 1968, the release tone flip-flop 1995, and their associated circuitry shown and described in detail in connection with the dial-to-dial trunk circuit 64. Also, each information trunk controls only four voice switches to establish two-way connections between the trunk circuit and each pulse multiplex highway on a connection from the information trunk circuit to the attendant's cabinet 59. Accordingly, the voice switches which are controlled from the trunk matrices in the dial-to-dial trunk circuit 64 are not required in the information trunk circuits. However, each information trunk circuit includes facilities for transmitting a ringback tone signal to the calling subscriber when a connection is established to the attendant's cabinet 59 and a lamp on the control panel of the cabinet 59 is also energized from each information trunk circuit so that the attendant is informed that a calling subscriber desires information and the calling subscriber is informed that a connection is being established to the attendant at cabinet 59.

Figure 58:
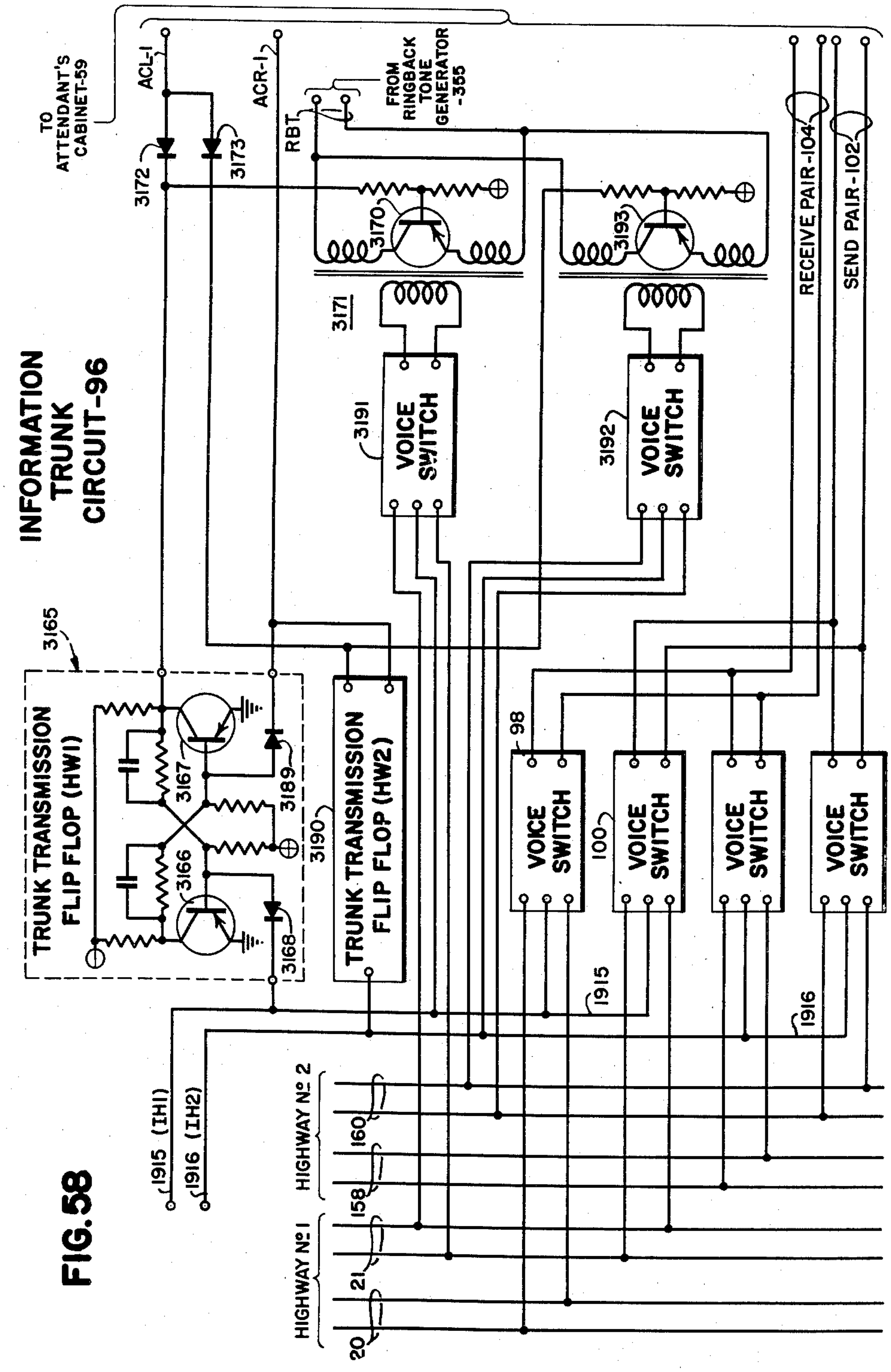
Fig. 58 is a schematic diagram of a portion of one of the information trunk circuits employed in the system of Figs. 4 to 25, inclusive.

The additional circuitry required in the information trunk circuit 96 is shown in Fig. 58 of the drawings. The multiplex pulse output derived from one of the twenty-five flip-flop circuits which are controlled by the selectors associated with highway No. 1 is supplied by way of the conductor 1915 to a trunk transmission flip-flop circuit 3165 comprising the transistors 3166 and 3167, the transistor 3167 being normally conductive. The negative multiplex pulses appearing on the conductor 1915 pass through a diode 3168 to the base electrode of the transistor 3166 and render this transistor conductive so that the flip-flop circuit 3165 is set. When the flip-flop 3165 is set the collector of the transistor 3167 falls to a minus value and this change in collector potential is coupled to the base electrode of a control transistor 3170 which controls the flow of current through the windings of a transformer 3171 which are connected to the ringback tone generator 355 over the conductors RBT. Accordingly, the transistor 3170 is rendered conductive when the flip-flop 3165 is set so that a ringback tone signal is transmitted to the voice switch 3191 and is modulated on the multiplex pulses appearing on the conductor 1915. These ringback tone modulated multiplex pulses are impressed upon the receive conductors 21 of highway No. 1 and pass to the calling subscriber to simulate ringing of the called line. At the same time the changing collector potential of the transistor 3167 is transmitted through a diode 3172 and over the conductor ACL–1 to the attendant's cabinet 59 and is employed therein to light a lamp to indicate to the attendant that a calling subscriber desires information. More particularly, and referring to Fig. 54 of the drawings, the negative signal produced on the conductor ACL–1 is supplied to the base electrode of a transistor 3180 in the attendant's cabinet 59 and renders this transistor conductive. When the transistor 3180 is rendered conductive it in turn renders an output transistor 3181 conductive so that current is supplied to a lamp 3182 on the control panel of the attendant's cabinet 59. The attendant at cabinet 59 then connects his headset to the information trunk circuit send and receive conductors 3185 and 3186 by throwing the information trunk key switch 2063 to the left so that a two-way connection is completed between the attendant and the calling subscriber. When the key switch 2063 is thus thrown to the left the contacts 3187 thereof are closed so that ground potential is applied to a conductor 3188. When the conductor 3188 is grounded a negative signal is transmitted through a condenser 3183 and over the conductor ACR–1 back to the information trunk circuit 96 and is coupled through a diode 3189 to the base electrode of the transistor 3167 so that the flip-flop circuit 3165 is reset to its original condition, at which time the control transistor 3170 is rendered non-conductive and transmission of a ringback tone signal to the calling subscriber is terminated. Also, the potential on the conductor ACL–1 rises to ground so that the lamp 3182 is extinguished.

If the call from the calling subscriber to the information trunk circuit 96 is established over highway No. 2, negative multiplex pulses will be produced on the conductor 1916 corresponding to the setting of a particular one of the twenty-five flip-flop circuits assigned to highway No. 2, such as the flip-flops 379 and 380 of the dial-to-dial trunk circuit 64 and these negative multiplex pulses are supplied to a trunk transmission flip-flop circuit 3190 for highway No. 2. The flip-flop 3190 is identical to the flip-flop 3165 and controls a transistor 3193 which supplies a ringback tone signal to a voice switch 3192 the output of which is connected to the receive conductors 160 of highway No. 2. The flip-flop 3190 is also connected to the conductor ACL–1 through a diode 3173 and to the conductor ACR–1 so that a connection is established to the attendant's cabinet 59 in a manner identical to that described heretofore.

*Multiplex pulse generator 140*

Figure 59:
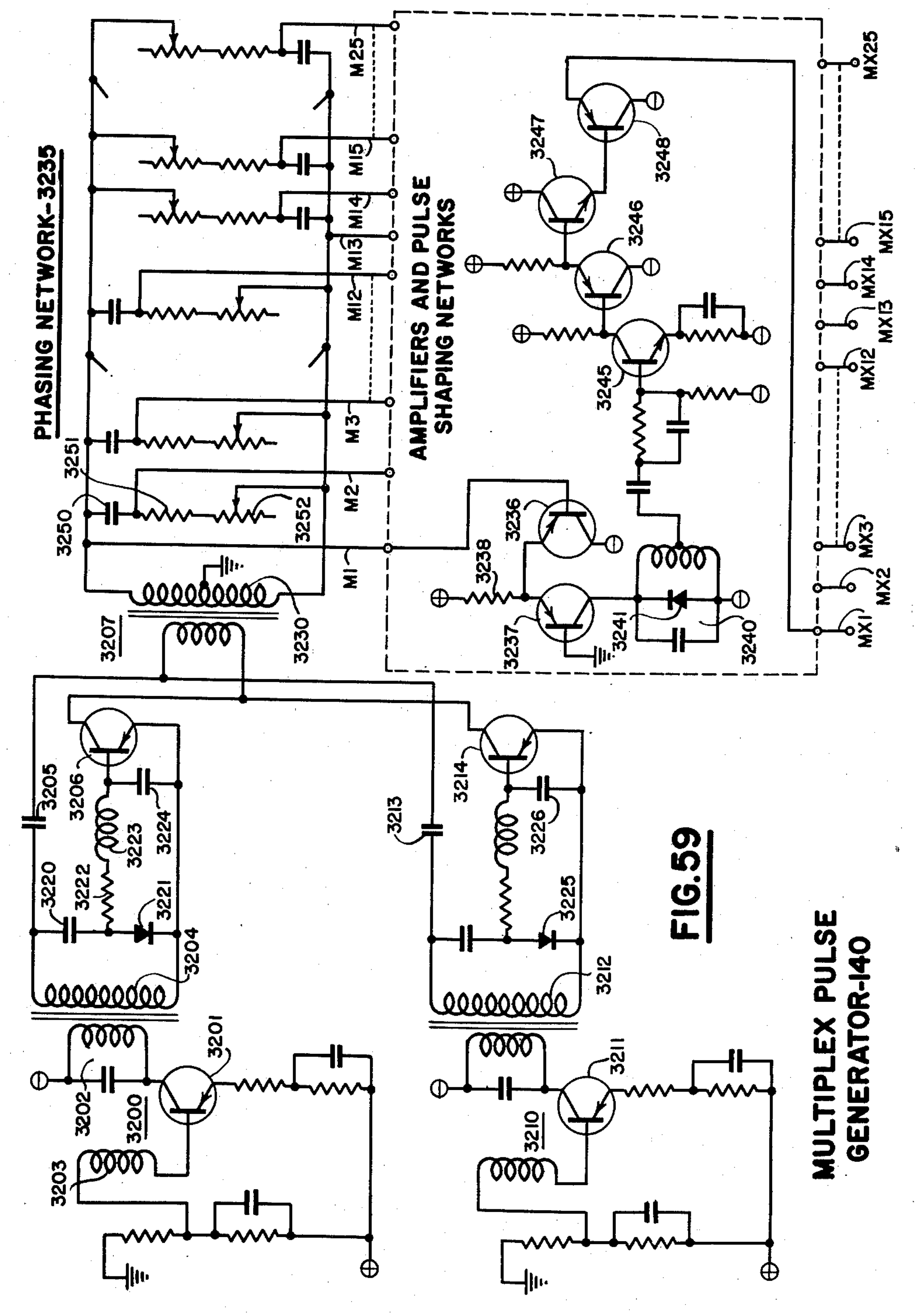
Fig. 59 is a schematic diagram of the multiplex pulse generator employed in the system of Figs. 4 to 25, inclusive.

The multiplex pulse generator 140 is shown in detail in Fig. 59 of the drawings. It will be recalled from the general description of the system that the generator 140 provides negative multiplex pulses on each of the twenty-five output conductors MX1, MX2–MX25, inclsuive, thereof, which are employed to establish the time positions on each of the pulse multiplex highways.

Referring to Fig. 59, the multiplex pulse generator 140 includes a twelve kilocycle sinusoidal oscillator indicated generally at 3200 which includes a transistor 3201 the collector of which is connected through a tank circuit 3202 to minus twelve volts. A feedback winding 3203 is coupled from the tank circuit 3202 to the base electrode of the transistor 3201 so as to sustain oscillations. The oscillations produced across an output winding 3204, which is also coupled to the tank circuit 3202, is supplied through a coupling condenser 3205 and a control transistor 3206 to the primary winding of an output transformer 3207.

In order to provide a reliable and dependable source of multiplex pulses, a second oscillator indicated generally at 3210 is provided which includes a transistor 3211 which is connected in the same type of oscillatory circuit as the transistor 3201. The oscillator voltage produced across the output winding 3212 of the second oscillator 3210 is also coupled through condenser 3213 and a control transistor 3214 to the primary winding of the transformer 3207. The oscillator signals developed across the windings 3204 and 3212 and employed to render the corresponding control transistors conductive. However, if one of these oscillators ceases to generate oscillation the corresponding control transistor is rendered non-conductive so that the disabled oscillator is removed from the circuit. More particularly, the signal produced across the winding 3204 is coupled through a condenser 3220 to a rectifier 3221 across which there is provided a load circuit including the series connected resistor 3222, a choke coil 3223 and a filter condenser 3224. The rectified voltage produced across the condenser 3224 is applied to the base electrode of the transistor 3206 and functions normally to hold this transistor conductive. In a similar manner the rectifier 3225 is employed to rectify the voltage produced across the winding 3212 and the rectified voltage produced across the condenser 3226 is applied to the base electrode of the transistor 3214. If the oscillator 3200 ceases to generate oscillations the voltage normally developed across the condenser 3224 disappears so that the transistor 3206 is rendered non-conductive and the oscillator 3200 is thereby removed from the circuit since the transistor 3206 is connected in series with the winding 3204 to the output transformer 3207. In a similar manner, if the oscillator 3210 fails the transistor 3214 is rendered non-conductive and ceases to function so that the oscillator 3210 is removed from the circuit. The two oscillators 3200 and 3210 are synchronized through the feedback coupling produced in the common output transformer 3207 so that these oscillators normally operate in synchronism to provide an eight kilocycle signal across the secondary winding 3230 of the transformer 3207.

In order to produce multiplex pulses on the twenty-five output conductors of the generator 140 in sequence during each cycle of the eight kilocycle oscillations produced across the winding 3230, there is provided a common phasing network 3235 having twenty-five channels the first of which is shown in detail in the drawings. More particularly, the voltage produced between the upper end of the winding 3230 and the grounded center tap thereof is applied to an AC amplifier comprising the transistors 3236 and 3237 the emitters of which are connected together and through a resistor 3238 to plus twelve volts, the voltage across the upper half of the winding 3230 being applied to the base electrode of the transistor 3236. A parallel tuned circuit 3240 is connected between the collector of the transistor 3237 and minus twelve volts and a rectifier 3241 is connected across the tuned circuit 3240 to improve the output waveform. The transistors 3236 and 3237 are arranged so that the voltage output from the tuned circuit 3240 is substantially independent of supply voltage variations, circuit parameters and temperature effects since the temperature effect on the $I_{co}$ of the transistors is cancelled in these two transistors. The eight kilocycle signal which is developed across the tuned circuit 3240 is coupled to the base electrode of a transistor 3245 the collector of which is connected to the base electrode of a transistor 3246. The transistors 3245 and 3246 constitute a pulse shaping network to convert the alternating current signal derived from the tuned circuit 3240 into a pulse wave train. The output from the collector of the transistor 3246 is coupled through a transistor 3247 and a transistor 3248 to the output conductor MX1 so that negative going multiplex pulses are produced on the conductor MX1 which have a duration of approximately three microseconds and recur at a repetition rate of 8000 cycles per second.

In order to provide twenty-four other outputs of the generator 140 a series of phase shifting circuits are provided in the network 3235. Thus, the condenser 3250, a resistor 3251 and a potentiometer 3252 are connected across the winding 3230, these components being so chosen that a phase shifted voltage is produced in the conductor M2. The phase shifted voltage produced on the conductor M2 is supplied to an amplifier and phase shaping network similar to that provided and shown in detail in connection with the conductor M1, so that negative going multiplex pulses are produced on the output conductor MX2 which follow the pulses produced on the conductor MX1. Only the second, third, twelfth, thirteenth, fourteenth, fifteenth and twenty-fifth phase shifting sections of the network 3235 are shown in the drawings. However, it will be understood that a total of twenty-five outputs is provided by the generator 140 each of which includes an amplifier and pulse shaping network similar to that described in detail in connection with the conductor MX1, a guard interval of two microseconds between pulses being provided by adjustment of the potentiometers in the network 3235, such as the potentiometer 3252.

*Busy tone generator 356*

Figure 60:
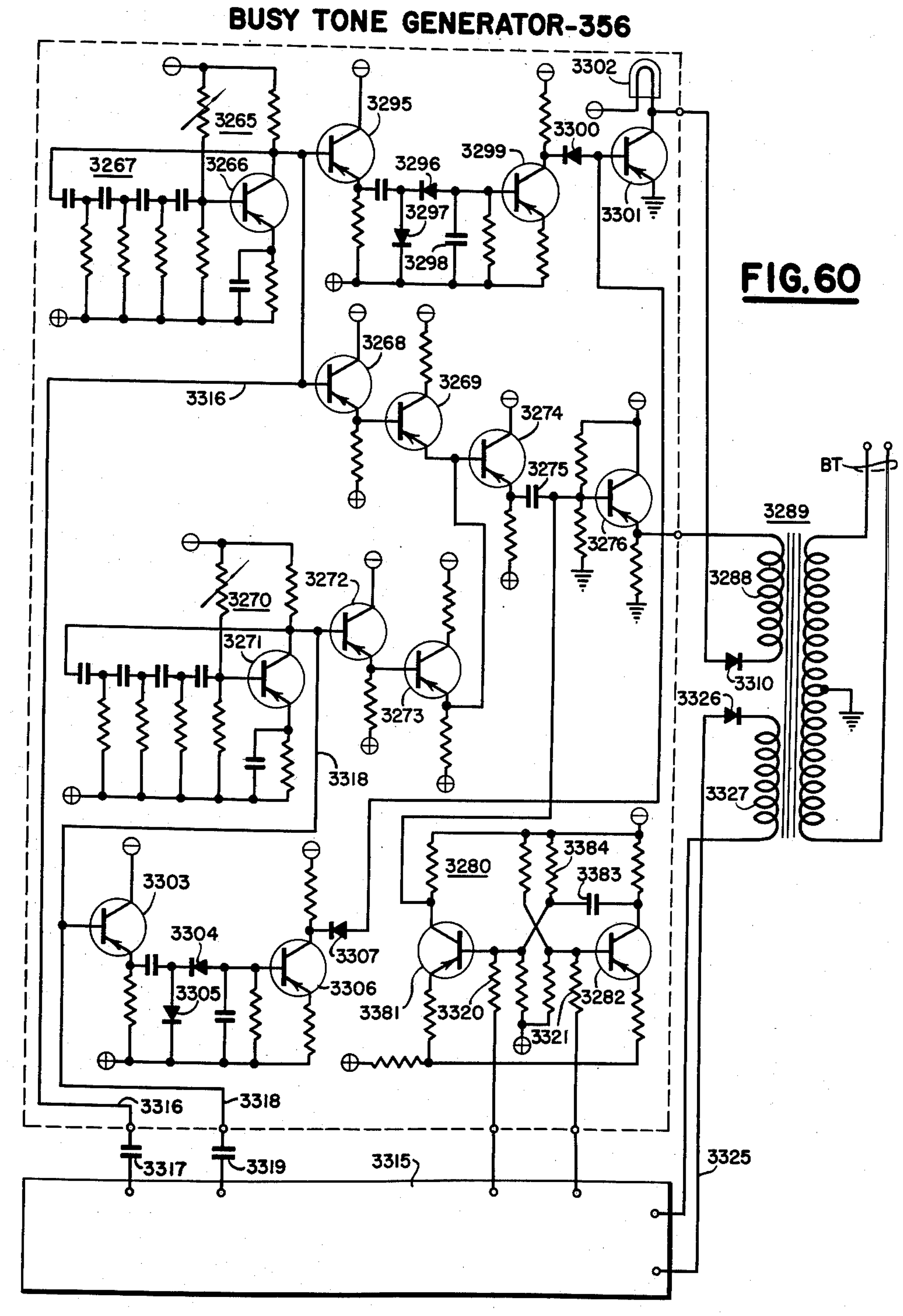
Fig. 60 is a schematic diagram of the busy tone generator employed in the system of Figs. 4 to 25, inclusive.

The busy tone generator 356 is shown in detail in Fig. 60 of the drawings. It will be recalled from the general description of the system that the generator 356 provides a busy tone signal on the conductor BT which is supplied to the connectors of the system for transmission through the controlled voice switches thereof to the calling subscriber in the event that the called line is busy.

Referring to Fig. 60, a 600 cycle oscillator indicated generally at 3265 is provided which includes a transistor 3266 the collector of which is connected to the base electrode thereof through an RC plural section filter network 3267 so as to provide sustained oscillations at a frequency of 600 cycles per second. The output from the collector of the transistor 3266 is coupled through an emitter follower transistor 3268 to the base electrode of an amplifier transistor 3269. A 120 cycle per second oscillator 3270 is also provided which includes a transistor 3271 which is connected as an RC phase shift oscillator, the collector of the transistor 3271 being coupled through an emitter follower transistor 3272 to the base electrode of an amplifier transistor 3273. The emitters of the transistors 3269 and 3273 are connected together and to the base electrode of an emitter follower transistor 3274 the output of which is coupled through a condenser 3275 to the base electrode of an output emitter follower transistor 3276. Accordingly, the 600 cycle signal developed by the oscillator 3265 and the 120 cycle signal developed by the oscillator 3270 are combined in the transistor 3274 and are supplied to the output transistor 3276.

In order to interrupt the busy tone signal, there is provided a free running multivibrator indicated generally at 3280 which includes the transistors 3281 and 3282, these transistors being arranged in a common emitter type of multivibrator circuit. The time constant of the condenser 3283 and the resistor 3284 is so arranged that a square wave having a frequency of sixty impulses per minute is developed at the collector of the transistor 3281 and this square wave signal is connected to the base electrode of the transistor 3276. Accordingly, the busy tone signal at an interrupted rate of sixty impulses per minute is supplied to one winding 3288 of an output coupling transformer 3289.

In order to provide a reliable busy tone source, the output of each of the oscillators 3265 and 3270 is monitored and control circuits are provided so that if either of these oscillators fails the output to the busy tone conductors BT is disconnected. In addition, a second set of oscillators is provided the output of which is also connected to the coupling transformer 3289 so that if one set of oscillators ceases to function the other set may continue to supply the required busy tone signal. More particularly, there is provided a first monitor circuit for the oscillator 3265 which includes an emitter follower transistor 3295 the base electrode of which is connected to the collector of the oscillator transistor 3266. The alternating current signal produced by the oscillator 3265 is rectified in a rectifier circuit including the rectifiers 3296 and 3297 so that a rectified signal is produced across a condenser 3298 which is supplied to the base electrode of a transistor 3299. The collector of the transistor 3299 is coupled through a diode 3300 to the base electrode of an output transistor 3301 in the collector circuit of which is provided an indicator lamp 3302. In a similar manner a monitor circuit is provided for the oscillator 3270 which includes the emitter follower transistor 3303, the rectifiers 3304 and 3305 and the transistor 3306 the collector of which is coupled through the diode 3307 to the base electrode of the transistor 3301. The transistor 3301 is normally non-conductive when the oscillators 3265 and 3270 are running due to the voltages developed by the respective rectifier circuits provided in each oscillator monitor circuit. However, if either of these oscillators ceases to generate oscillations, such as the oscillator 3265, the voltage normally developed across the condenser 3298 disappears so that the transistor 3299 is rendered non-conductive, the diode 3300 is thus rendered conductive and the transistor 3301 is rendered conductive so that the lamp 3302 is energized. At the same time the collector of the transistor 3301 is connected through a diode 3310 to the winding 3288 of the output transformer 3289. When the transistor 3301 is rendered conductive the diode 3310 is reverse biased so that the output circuit from the emitter of the transistor 3276 is open circuited and an interrupted busy tone signal is no longer coupled through the winding 3288 of the transformer 3289 to the conductors BT.

In order that a busy tone signal will be continuously supplied to the conductors BT even though the oscillators 3265 and 3270 cease to function properly, there is provided a second group of oscillators, impulse generator and monitor circuits indicated generally at 3315, these circuits being identical to the first group shown in detail in Fig. 60. In order to synchronize the oscillators of the two groups, the collector of the transistor 3266 is connected by way of the conductor 3316 and through a condenser 3317 to the collector of the corresponding oscillator in the circuit 3315. Also, the collector of the transistor 3271 is connected by way of a conductor 3318 and a condenser 3319 to the collector of the corresponding transistor in the circuit 3315. In addition, the base electrodes of the transistors 3281 and 3282 in the multivibrator 3280 are connected through the resistors 3320 and 3321, respectively, to the base electrodes of the corresponding transistors of the interrupter multivibrator in the circuit 3315. Accordingly, the 600 cycle oscillators, the 120 cycle oscillators and the 120 impulse per minute multivibrator are continuously driven in synchronism. In the circuit 3315 a pair of monitor circuits are provided for the 600 cycle and 120 cycle oscillators the output of these monitor circuits being supplied to a lamp similar to the lamp 3302 to indicate when either one of the oscillators ceases functioning. Also, the monitor output of the circuit 3315 is connected by way of the conductor 3325 and through a diode 3326 to a winding 3327 of the transformer 3289 the other end of the winding 3327 being connected to the interrupted busy tone output of the circuit 3315. Accordingly, synchronized busy tone signals are normally applied to both of the windings 3288 and 3327 of the transformer 3289. However, if the oscillators in either group of circuits cease to function, the corresponding one of the diodes 3310 or 3326 is reverse biased so that the busy tone signal is no longer supplied through the corresponding winding to the conductors BT. In this manner a continuous source of busy tone is assured. If desired, a different impulse rate may be employed for the busy tone signal provided to indicate a busy line and that employed to indicate a busy trunk. To this end, the time constant 3283, 3284 of the multivibrators 3280 may be so chosen as to provide either a sixty impulse per minute rate for the busy tone supplied to indicate a busy called line or a 120 impulse per minute rate to indicate busy trunks, as will be readily understood by those skilled in the art. In this connection, it will be understood that the dial tone generator 335 may comprise a circuit arrangement substantially similar to the busy tone generator 356. However, the choice of oscillator frequencies may be modified as desired and no interruption multivibrators will be required under normal conditions.

*Ringing signal generator 350*

Figure 61:
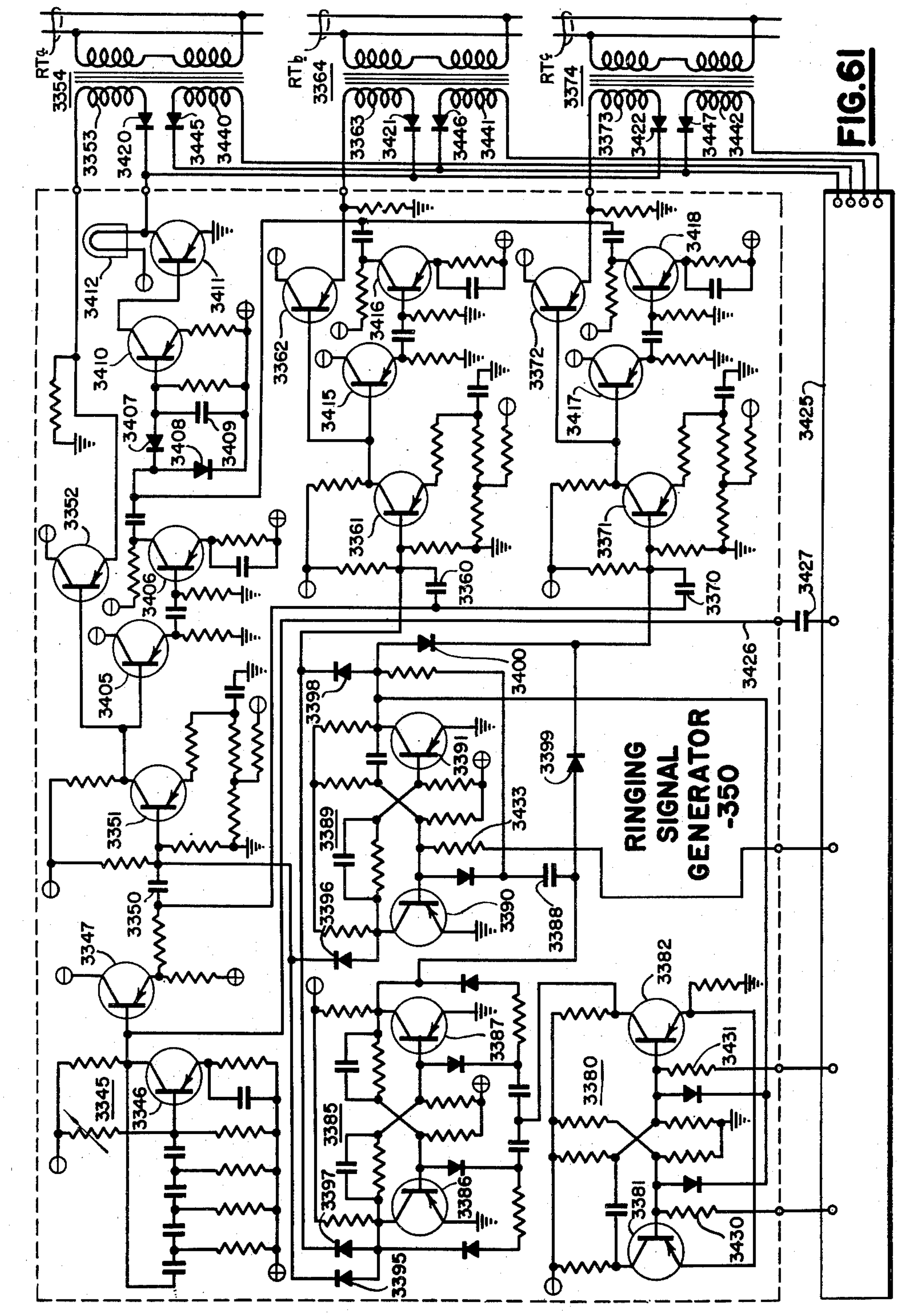
Fig. 61 is a schematic diagram of the ringing signal generator employed in the system of Figs. 4 to 25, inclusive.

The ringing signal generator 350 is shown in detail in Fig. 61 of the drawings. It will be recalled from the general description of the system that this generator is provided for the purpose of supplying a ringing signal to the called subscriber under the control of the connector stages of the system. In the system of the present invention the ringing signal is an alternating current signal, preferably in the order of 420 cycles per second which is suitably modulated to provide on and off intervals. This 420 cycle ringing control signal actuates a 2400 cycle oscillator in the subset of a called subscriber, which energizes a permanent magnet speaker directly, as described in detail in an application of Woodhull and Stern, S.N. 761,045, filed concurrently herewith.

Referring to Fig. 61, a 420 cycle oscillator 3345 is provided which includes a transistor 3346 connected as a phase shift RC oscillator, the collector of the transistor 3346 being connected to the base electrode of an emitter follower transistor 3347. In order to actuate the ringing facilities at the subset a considerable amount of power is required from the generator 350. Accordingly, if a large number of lines are served by the generator 350 the loading on this generator may become excessive in the event that a number of lines are simultaneously rung. In order to prevent excessive loading on the generator 350, this generator is provided with three separate ringing signal channels each of which serve a portion of the lines of the system so that the loading on each channel is reduced. In the illustrated embodiment a group of three ringing signal channels is provided, and the ringing period or on time of each channel is staggered so that only one channel is on at a particular time. Thus, the output of the transistor 3347 is coupled through a condenser 3350 to the base electrode of a transistor 3351 the collector of which is connected through an emitter follower transistor 3352 to one winding 3353 of a coupling transformer 3354 the output windings of which are connected to a pair of ringing bus bars RT*a*. In a similar manner the output of the transistor 3347 is coupled through a condenser 3360, and through the transistors 3361 and 3362 to a winding 3363 of another output transformer 3364 the output windings of which are coupled to a second set of ringing bus bars RT*b*. Also, the output of the transistor 3347 is coupled through a condenser 3370 and the transistors 3371 and 3372 to a winding 3373 of a coupling transformer 3374 the output windings of which are connected to the bus bars RT*c*.

In order to supply a ringing signal sequentially to the conductors RT*a*, RT*b* and RT*c* there is provided a free-running multivibrator 3380 which comprises the transistors 3381 and 3382. The output of the multivibrator 3380 drives a flip-flop circuit 3385 which comprises the transistors 3386 and 3387, the output of the transistor 3387 also being connected through a condenser 3388 to a biased multivibrator 3389 which includes the transistors 3390 and 3391. The outputs of the flip-flop circuit 3385 and the multivibrator 3389 are combined to provide keying waveforms which are supplied to the three ringing channels so as to control the transmission of signals through these channels. Thus, the collector of the transistor 3386 in the flip-flop circuit 3385 is coupled by way of a diode 3395 to the base electrode of the transistor 3351 and the output of the transistor 3390 in the multivibrator 3389 is coupled through the diode 3396 to the transistor 3351. When the square waves from the transistors 3386 and 3390 coincide the transistor 3351 is rendered conductive so that the 420 cycle ringing control signal may be applied to the transformer 3354. In a similar manner the outputs of the transistors 3386 and 3391 are coupled through the diodes 3397 and 3398 to the base electrode of the transistor 3361 to control transmission of the ringing control signal to the transformer 3364 and the outputs of the transistors 3387 and 3391 are coupled through the diodes 3399 and 3400 to the base electrode of the transistor 3371 so as to control transmission of the ringing control signal to the transformer 3374. The transistors 3351, 3361 and 3371 are thus sequentially rendered conductive so that a ringing signal is sequentially applied to the conductors RT*a*, RT*b* and RT*c*.

Each of the above described ringing channels is provided with a monitor circuit which functions to energize an indicating lamp when the oscillator 3345 ceases generating oscillations. Thus, the output of the transistor 3351 is coupled through an emitter follower transistor 3405 and through an amplifier transistor 3406 to the full wave rectifiers 3407 and 3408 so that a rectified voltage is produced across a condenser 3409 which is applied to the base electrode of a transistor 3410 the output of which is supplied to an output transistor 3411 in the collector circuit of which is connected an indicating lamp 3412. In the second channel the transistors 3415 and 3416 function to supply a signal corresponding to the second ringing channel to the rectifiers 3407 and 3408 and in the third channel the transistors 3417 and 3418 function to transmit a signal corresponding to the third ringing channel to these rectifiers. When the oscillator 3345 ceases generating oscillations, the transistor 3411 is rendered conductive and the indicating lamp 3412 is energized. At the same time a rectifier 3420 is reverse biased so that the first channel ringing signal is no longer supplied to the winding 3353 of the transformer 3354. In a similar manner the diodes 3421 and 3422 are also reverse biased so that the ringing signal from the second and third channels is removed from the transformers 3364 and 3374, respectively.

In order to provide a continuous source of ringing signal, a duplicate oscillator, ringing channels, multivibrators and monitor circuits are provided, these circuits being indicated generally at 3425 in the drawings. The oscillator of the circuits 3425 is synchronized with the oscillator 3345 by means of the conductor 3426 which extends from the collector of the transistor 3346 through a coupling condenser 3427 to the collector of the corresponding oscillator in the circuit 3425. In a similar manner, the multivibrator 3380 is synchronized with the corresponding multivibrator in the circuits 3425 by connecting the base electrodes of the transistors 3381 and 3382 through the resistors 3430 and 3431 to the base electrodes of the corresponding transistors in the circuit 3425. The multivibrator 3389 is also synchronized with the corresponding multivibrator in the circuit 3425 by means of the resistor 3433 which is connected from the base electrode of the transistor 3390 to the base electrode of the corresponding transistor in the circuit 3425. The three ringing signal outputs of the circuit 3425 are supplied to the windings 3440, 3441 and 3442 of the transformers 3354, 3364 and 3374, respectively. Also, the output of the indicating lamp circuit of the circuit 3425 is employed to control the diodes 3445, 3446 and 3447 so that the ringing signal provided by the circuit 3425 is disconnected from the coupling transformers in the event that the oscillator in the circuit 3425 ceases generating oscillations. In this manner a continuous source of ringing signal is assured to the ringing conductors RT*a*, RT*b* and RT*c*.

With regard to the ringback tone signal generator 355, a ringback tone signal may be derived from the conductors RT*a*, RT*b* and RT*c* directly and supplied to the connectors of the system, or, in the alternative, a separate generator arrangement similar to the generator 350 may be provided. In this latter case, the ringing and ringback tone signal generators are preferably synchronized so as to have corresponding on and off intervals, as will be readily understood by those skilled in the art.

I claim:

1. In a telephone system, a plurality of lines, a plurality of connectors each including means for registering digital information supplied thereto relative to called lines of the system, an interrogating matrix common to said connectors, allotter means for sequentially allotting said connectors to said common interrogating matrix, and means including said interrogating matrix for determining the idle or busy condition of any called line registered in said connectors.

2. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, means in each of said connectors and responsive to said control signal and said allotting signal for transmitting an interrogating signal to said common matrix, and means in said matrix and responsive to said interrogating signals for determining the idle or busy condition of any called line registered in said connectors.

3. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, means in each of said connectors and responsive to said control signal and said allotting signal for transmitting an interrogating signal to said common matrix, means individual to said lines for supplying idle or busy signals to said common matrix indicating the idle or busy condition of each of the lines, and means in said matrix and responsive to said idle or busy signals and said interrogating signal for controlling cut through to the called lines registered in said connectors.

4. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, m ans in each of said connectors for establishing a connection to the called line registered in the connector in the event the called line is idle, means in each of said connectors and responsive to said control signal and said allotting signal for transmitting an interrogating signal to said matrix, means in said matrix and responsive to said interrogating signal for determining the idle or busy condition of any called line registered in said connectors, and means connecting said matrix to said connection establishing means in each of said connectors so that a connection is established to idle ones of the called lines registered in said connectors.

5. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, means in each of said connectors for establishing a connection to the called line registered in the connector in the event the called line is idle, means in each of said connectors and responsive to said control signal and said allotting signal for transmitting an interrogating signal to said matrix, means in said matrix and responsive to said interrogating signal for determining the idle or busy condition of any called line registered in said connectors, an output channel interconnecting said matrix and said connection establishing means in each of said connectors, and means in said matrix for supplying idle indicating signals to said output channel corresponding to idle ones of the called lines registered in said connectors.

6. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, means in each of said connectors for establishing a connection to the called line registered in the connector in the event the called line is idle, means in each of said connectors and responsive to said control signal and said allotting signal for transmitting an interrogating signal to said matrix, said matrix including a plurality of AND gates individually corresponding to said lines, means for applying said interrogating signals to the AND gate of said matrix corresponding to the called line to be interrogated, means individual to said lines for supplying idle or busy signals to said AND gates of said matrix, an output channel interconnecting all of the AND gates of said matrix and said connection establishing means in each of said connectors, each of said AND gates responding to the simultaneous application of an idle signal and an interrogating signal thereto by supplying an idle control signal to said output channel, and means in each of said connectors and responsive to said idle control signal for establishing a connection to the called line registered in the connector.

7. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, said allotter means also producing blocking signals in timed relation to said allotting signals, means in each of said connectors and responsive to said control signal and said allotting signal for transmitting an interrogating signal to said common matrix, and means in said matrix and responsive to said blocking signals for sequentially employing the interrogating signals supplied thereto from said connectors to determine the idle or busy condition of called lines registered in said connectors.

8. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, said allotter means also producing blocking signals in timed relation to said allotting signals, means in each of said connectors and responsive to said control signal and said allotting signal for transmitting an interrogating signal to said common matrix for the duration of the allotting signal supplied to the connector, and means in said matrix and responsive to said blocking signals for sequentially employing the interrogating signals supplied thereto from said connectors to determine the idle or busy condition of called lines registered in said connectors.

9. In a telephone system, a plurality of lines, a plurality of connectors each including means for registering digital information supplied thereto relative to a called line of the system, means in each of said connectors responsive to called line digit registration in the connector for producing a control signal, an interrogating matrix common to said connectors, allotter means for sequentially supplying allotting signals to said connectors, said allotter means also producing blocking signals during periods between said allotting signals, means in each of said connectors and responsive to said control signal and said allotting signal for transmitting an interrogating signal to said common matrix, and means in said matrix and responsive to said blocking signals for sequentially employing the interrogating signals supplied thereto from said connectors to determine the idle or busy condition of called lines registered in said connectors during periods between said blocking signals.

10. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, and means including said matrix and responsive to said tens and units interrogating signals for determining the idle or busy condition of any called line registered in said connectors.

11. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, means individual to said lines for supplying idle or busy signals to said common matrix indicating the idle or busy condition of each of said lines, and means in said matrix and jointly responsive to said tens and units interrogating signals and to said idle or busy signals for controlling switchthrough to the called lines registered in said connectors.

12. In a telephone system, a plurality of lines, a plurality of connectors each including means for registering tens and units digit information supplied thereto relative to a called line of the system, means in each of said connectors and responsive to tens and units line digit registration in the connector for producing a control signal, an interrogating matrix common to said connectors and including a plurality of AND gates individually corresponding to said lines, allotter means for sequentially supplying allotting signals to said connectors, means in each of said connectors and responsive to said control signal and said allotting signal for transmitting tens and units interrogating signals corresponding to the tens and units designation of the reg'stered called line to the corresponding AND gates of said matrix, and means including said matrix and responsive to said tens and units interrogating signals for determining the idle or busy condition of any called line registered in said connectors.

13. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors and including a plurality of AND gates individually corresponding to said lines, said AND gates being arranged in groups corresponding to the tens and units designations of the lines, allotter means for sequentially supplying allotting signals to said connectors, means in each of said connectors and responsive to said control signal and said allotting signal for transmitting tens and units interrogating signals correspoding to the tens and units designation of the registered called line to the tens and units groups of said AND gates corresponding to the called line, and means including said matrix and responsive to said tens and units interrogating signals for determining the idle or busy condition of any called line registered in said connectors.

14. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors and including a plurality of three input AND gates individually corresponding to said lines, said AND gates being arranged in groups corresponding to the tens and units designations of the lines, allotter means for sequentially supplying allotting signals to said connectors, means individual to said lines for supplying idle or busy signals to one input of said AND gates in said matrix indicating the idle or busy condition of each of said lines, means in each of said connectors and responsive to said control signal and said allotting signal for transmitting tens and units interrogating signals corresponding to the tens and units designation of the registered called line to the other two inputs of the tens and units groups of said AND gates corresponding to the called line, and means responsive to simultaneous application of tens and units interrogating signals and an idle signal to one of said AND gates for controlling switchthrough to the corresponding called line.

15. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors and including a plurality of three input AND gates individually corresponding to said lines, said AND gates being arranged in groups corresponding to the tens and units designations of the lines, allotter means for sequentially supplying allotting signals to said connectors, means individual to said lines for supplying idle or busy signals to one input of said AND gates in said matrix indicating the idle or busy condition of each of said lines, switchthrough means in each of said connectors for establishing a connection to the called line registered in the connector in the event the called line is idle, means in each of said connectors and responsive to said control signal and said allotting signal for transmitting tens and units interrogating signals corresponding to the tens and units designation of the registered called line to the other two inputs of the tens and units groups of said AND gates corresponding to the called line, and an output channel interconnecting the outputs of all of said AND gates in said matrix and said switchthrough means in each of said connectors.

16. In a telephone system, a plurality of lines, a plurality of connectors each including means for registering tens and units digit information supplied thereto relative to a called line of the system, said connectors having individually assigned thereto different time positions which recur in repetitive time position frames, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said alloting signal for transmitting tens and units interrogating signals corresponding to the tens and units designation of the registered called line to said common matrix, means including said matrix and responsive to said tens and units interrogating signals for transmitting an idle signal to said connectors in the event the called line registered therein is idle, and means in each of said connectors and responsive to an idle signal transmitted thereto from said matrix for developing output pulses in the time position assigned to the nonnector.

17. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors and including a plurality of AND gates individually corresponding to said lines, said AND gates being arranged in groups corresponding to the tens and units designations of the lines, allotter means for sequentially supplying allotting signals to said connectors, said allotter means also producing blocking signals in timed relation to said allotting signals, means in each of said connectors and responsive to said control signal and said allotting signal for transmitting tens and units interrogating signals corresponding to the tens and units designation of the registered called line to said common matrix, means in said matrix and responsive to said blocking signals for impressing said tens and units interrogating signals on the tens and units groups of said AND gates corresponding to the called line, and means in each of said connectors and controlled by said matrix AND gates for establishing switch-through to the corresponding called line in the event said called line is idle.

18. In a telephone system, a plurality of lines, a plurality of connectors each including means for registering tens and units digit information supplied thereto relative to a called line of the system, said connectors having individually assigned thereto different time positions which recur in repetitive time position frames, means in each of said connectors and responsive to tens and units called line digit registration in the connector for producing a control signal, an interrogating matrix common to said connectors and including a plurality of AND gates individually corresponding to said lines, said AND gates being arranged in groups corresponding to the tens and units designations of the lines, allotter means for sequentially supplying allotting signals to said connectors, said allotter means also producing blocking signals in timed relation to said allotting signals, means in each of said connectors and responsive to said control signal and said allotting signal for transmitting tens and units interrogating signals corresponding to the tens and units designation of the registered called line to said common matrix, means in said matrix and responsive to said blocking signals for impressing said tens and units interrogating signals on the tens and units groups of said AND gates corresponding to the called line, and means in each of said connectors and controlled by said matrix AND gates for developing output pulses in the time position assigned to the connector.

19. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, means individual to said lines for supplying idle or busy signals to said common matrix indicating the idle or busy condition of each of said lines, means in said matrix and jointly responsive to said tens and units interrogating signals and to said idle or busy signals for developing a matrix output signal when the called line is idle, a switchthrough flip-flop circuit in each of said connectors, means for supplying said matrix output signal to all of said connectors, and means in each of said connectors and jointly responsive to said allotting signal and said matrix output signal for setting said switchthrough flip-flop circuit thereof.

20. In a telephone system, a plurality of lines, a plurality of connectors each including means for registering tens and units digit information supplied thereto relative to a called line of the system, said connectors having individually assigned thereto different time positions in repetitive time position frames, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, means individual to said lines for supplying idle or busy signals to said common matrix indicating the idle or busy condition of each of said lines, means in said matrix and jointly responsive to said tens and units interrogating signals and to said idle or busy signals for developing a matrix output signal when the called line is idle, a switchthrough flip-flop circuit in each of said connectors, means for supplying said matrix output signal to all of said connectors, means in each of said connectors and jointly responsive to said allotting signal and said matrix output signal for setting said switchthrough flip-flop circuit thereof, and means in each of said connectors for developing output pulses in the time position assigned to the connector in response to the setting of said switchthrough flip-flop circuit therein.

21. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, means individual to said lines for supplying idle or busy condition of each of said lines, means in said matrix and jointly responsive to said tens and units interrogating signals and to said idle or busy signals for developing a matrix output signal when the called line is idle, a switchthrough flip-flop circuit in each of said connectors, means for supplying said matrix output signal to all of said connectors, means in each of said connectors and jointly responsive to said allotting signal and said matrix output signal for setting said switchthrough flip-flop circuit thereof, and means in each of said connectors and responsive to the setting of said switchthrough flip-flop circuit thereof for controlling the transmission of a ringing signal over the called line which is registered in the connector.

22. In a telephone system, a plurality of lines, a plurality of connectors each including means for registering tens and units digit information supplied thereto relative to a called line of the system, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens nad units designation of the registered called line to said common matrix, means individual to said lines for supplying idle or busy signals to said common matrix indicating the idle or busy condition of each of said lines, means in said matrix and jointly responsive to said tens and units interrogating signals and to said idle or busy signals for developing a matrix output signal when the called line is idle, a switchthrough flip-flop circuit in each of said connectors, means for supplying said matrix output signal to all of said connectors, means in each of said connectors and jointly responsive to said allotting signal and said matrix output signal for setting said switchthrough flip-flop circuit thereof, and means in each of said connectors and responsive to the setting of said switchthrough flip-flop circuit thereof for controlling the transmission of a ringing signal over the called line which is registered in the connector and a ringback tone signal over the calling line.

23. In a telephone system, a plurality of lines, a plurality of connectors each including means for registering tens and units digit information supplied thereto relative to a called line of the system, a multichannel transmission network including send and receive conductors, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, means individual to said lines for supplying idle or busy signals to said common matrix indicating the idle or busy condition of each of said lines, means in said matrix and jointly responsive to said tens and units interrogating signals and to said idle or busy signals for developing a matrix output signal when the called line is idle, a switchthrough flip-flop circuit in each of said connectors, means for supplying said matrix output signal to all of said connectors, means in each of said connectors and jointly responsive to said allotting signal and said matrix output signal for setting said switchthrough flip-flop circuit thereof, and means in each of said connectors and responsive to the setting of said switchthrough flip-flop circuit thereof for supplying a ringing control signal to the called line which is registered in the connector by way of said send conductors of said network.

24. In a telephone system, a plurality of lines, a plurality of connectors each including means for registering tens and units digit information supplied thereto relative to a called line of the system, each of said connectors having individually assigned thereto different time positions in repetitive time position frames, a multichannel transmssion network including send and receive conductors, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, means individual to said lines for supplying idle or busy signals to said common matrix indicating the idle or busy condition of each of said lines, means in said matrix and jointly responsive to said tens and units interrogating signals and to said idle or busy signals for developing a matrix output signal when the called line is idle, a switchthrough flip-flop circuit in each of said connectors, means for supplying said matrix output signal to all of said connectors, means in each of said connectors and jointly responsive to said allotting signal and said matrix output signal for setting said switchthrough flip-flop circuit thereof, and means in each of said connectors and responsive to the setting of said switchthrough flip-flop circuit thereof for developing pulses in the time position assigned to the connector which are modulated with a ringing control signal and impressing said ringing control signal modulated pulses on the send conductors of said network.

25. In a telephone system, a plurality of lines, a plurality of connectors each including means for registering tens and units digit information supplied thereto relative to a called line of the system, each of said connectors having individually assigned thereto different time positions in repetitive time position frames, a multichannel transmssion network including send and receive conductors, means in each of said connectors and responsive to tens and units called line digit registration in the connector for producing a control signal, an interrogating matrix common to said connectors, allotter means for sequentially supplying allotting signals to said connectors, means in each of said connectors and responsive to said control signal and said allotting signal for transmitting tens and units interrogating signals corresponding to the tens and units designation of the registered called line to said common matrix, means individual to said lines for supplying idle or busy signals to said common matrix indicating the idle or busy condition of each of said lines, means in said matrix and jointly responsive to said tens and units interrogating signals and to said idle or busy signals for developing a matrix output signal when the called line is idle, a switchthrough flip-flop circuit in each of said connectors, means for supplying said matrix output signal to all of said connectors, means in each of said connectors and jointly responsive to said allotting signal and said matrix output signal for setting said switchthrough flip-flop circuit thereof, means in each of said connectors and responsive to the setting of said switchthrough flip-flop circuit thereof for developing pulses in the time position assigned to the connector, means in each of said connectors for modulating said developed pulses with a ringing control signal and impressing said ringing control signal modulated pulses on the send conductors of said network, and means in each of said connectors for modulating said developed pulses with a ringback tone signal and impressing said ringback tone signal modulated pulses on the receive conductors of said network.

26. In a telephone system, a plurality of lines, a subscriber's subset connected to each of said lines, means in each of said subsets for developing a voice frequency seize signal when an off-hook condition on the line is produced, a plurality of connectors each including means for registering digital information relative to a called line of the system, means including one of said connectors for transmitting a ringing signal over a called one of said lines in response to the initiation of a call on a calling one of said lines, said called line subscriber's subset developing a voice frequency seize signal when an off-hook condition is produced on the called line, means in said one connector and responsive to the voice frequency seize signal developed by the called subscriber's subset for transmitting a dial tone signal over the called line to said called subcriber's subset, and means in said called subscriber's subset and responsive to said dial tone signal for terminating development of said voice frequency seize signal.

27. In a telephone system, a plurality of lines, a subscriber's subset connected to each of said lines, means in each of said subsets for developing a voice frequency seize signal when an off-hook condition on the line is produced, a plurality of connectors each including means for registering digital information relative to a called line of the system, means for developing a plurality of time position channels which recur in repetitive time position frames, means responsive to the initiation of a call on one of said lines for developing pulses in one of said time position channels, means for modulating said pulses in accordance with call directing signals transmitted over the calling line, means including one of said connectors and responsive to call directing signal modulation of said pulses for transmitting a ringing signal over a called one of said lines, said called line subscriber's subset developing a voice frequency seize signal when an off-hook condition is produced on the called line, means in said one connector and responsive to the voice frequency seize signal developed by the called subscriber's subset for transmitting a dial tone signal over the called line to said called subscriber's subset, and means in said called subscriber's subset and responsive to said dial tone signal for terminating development of said voice frequency seize signal.

28. In a telephone system, a plurality of lines, a multichannel transmission network, a plurality of line circuits individually terminating said lines in said network, a subscriber's subset connected to each of said lines, means in each of said subsets for developing a voice frequency seize signal when an off-hook condition on the line is produced, a plurality of connectors each including means for registering digital information relative to a called line of the system, means for developing a plurality of time position channels which recur in repetitive time position frames, means responsive to the initiation of a call on one of said lines for developing pulses in one of said time position channels, means for modulating said pulses in accordance with call directing signals transmitted over the calling line, means including one of said connectors and responsive to call directing signal modulation of said pulses for transmitting pulses occurring in one of said time position channels which are modulated with a ringing signal to the line circuit terminating a called one of said lines, said called line subscriber's subset developing a voice frequency seize signal when an off-hook condition is produced on the called line, means in said one connector and responsive to the voice frequency seize signal developed by the called subscriber's subset for transmitting pulses occurring in said one time position channel which are modulated with a dial tone signal to said called line circuit, and means in said called subscriber's subset and responsive to said dial tone signal for terminating development of said voice frequency seize signal.

29. In a telephone system, a plurality of lines, a multichannel transmission network including send and receive conductors, a plurality of line circuits individually terminating said lines in said send and receive conductors, a subscriber's subset connected to each of said lines, means in each of said subsets for developing a voice frequency seize signal when an off-hook condition on the line is produced, a plurality of connectors each including means for registering digital information relative to a called line of the system, means for developing a plurality of time position channels which recur in repetitive time position frames, means responsive to the initiation of a call on one of said lines for developing pulses in one of said time position channels, means for modulating said pulses in accordance with call directing signals transmitted over the calling line, means including one of said connectors and responsive to call directing signal modulation of said pulses for transmitting pulses occurring in one of said time position channels which are modulated with a ringing signal over said send conductors to the line circuit terminating a called one of said lines, said called line subscriber's subset developing a voice frequency seize signal when an off-hook condition is produced on the called line, means in said one connector and responsive to the voice frequency seize signal developed by the called subscriber's subset for transmitting pulses occurring in said one time position channel which are modulated with a dial tone signal over said send conductors to said called line circuit, and means in said called subscriber's subset and responsive to said dial tone signal for terminating development of said voice frequency size signal.

30. In a telephone system, a plurality of lines, a multichannel transmission network including send and receive conductors, a plurality of line circuits individually terminating said lines in said send and receive conductors, a subscriber's subset connected to each of said lines, means in each of said subsets for developing a voice frequency seize signal when an off-hook condition on the line is produced, a plurality of connectors each including means for registering digital information relative to a called line of the system, said connectors having individually assigned thereto different time positions in repetitive time position frames, means responsive to the initiation of a call on one of said lines for establishing a connection to one of said connectors, means in said one connector and responsive to registration of called line digits therein for developing pulses in the time position assigned to said one connector which are modulated with a ringing signal, means for transmitting said ringing signal modulated pulses over said send conductors to the line circuit terminating the registered called line, said called line subscriber's subset developing a voice frequency seize signal when an off-hook condition is produced on the called line, means for modulating the voice frequency seize signal developed by the called subscriber's subset on pulses occurring in said one time position and impressing said modulated pulses on said receive conductors, means in said one connector and responsive to said voice frequency seize signal modulated pulses for developing pulses in the same time position which are modulated with a dial tone signal, means for impressing said dial tone signal modulated pulses on said send conductors, and means in said called subscriber's subset and responsive to said dial tone signal for terminating said voice frequency seize signal.

31. In a telephone system, an impulse responsive line selecting unit adapted to receive signals applied to an input thereof corresponding to numerical digits, comprising a series of tens digit flip-flop circuits, a series of units digit flip-flop circuits, an input AND gate for each of said flip-flop circuits, means for impressing signals corresponding to digits to be registered on one input of all of said input AND gates, and digit register control means connected to another input of said input AND gates for selectively controlling said AND gates so that said digit signals are sequentially registered in said tens and units flip-flop circuits.

32. In a telephone system, an impulse responsive line selecting unit adapted to receive signals applied to an input thereof corresponding to numerical digits, comprising a series of tens digit flip-flop circuits, a series of units digit flip-flop circuits, an input AND gate for each of said flip-flop circuits, means for impressing signals corresponding to digits to be registered on one input of all of said input AND gates, digit register control means connected to another input of said input AND gates for selectively controlling said AND gates so that said digit signals are sequentially registered in said tens and units flip-flop circuits, an interrogating AND gate for each of said flip-flop circuits, each of said interrogating AND gates having one input thereof controlled in accordance with the setting of the associated flip-flop circuit, said digit register control means also supplying a control signal to another input of each of said interrogating AND gates after all digits are registered in the line selecting unit, and means responsive to signals derived from said interrogating AND gates for establishing switchthrough to the called line registered in the line selecting unit in the event the called line is idle.

33. In a telephone system, an impulse responsive line selecting unit adapted to receive signals applied to an input thereof corresponding to numerical digits, comprising a series of tens digit flip-flop circuits, a series of units digit flip-flop circuits, an input AND gate for each of said flip-flop circuits, means for impressing signals corresponding to digits to be registered on one input of all of said input AND gates, digit register control means connected to another input of said input AND gates for selectively controlling said AND gates so that said digit signals are sequentially registered in said tens and units flip-flop circuits, an interrogating AND gate for each of said flip-flop circuits, each of said interrogating AND gates having one input thereof controlled in accordance with the setting of the associated flip-flop circuit, said digit register control means also supplying a control signal to another input of each of said interrogating AND gates after all digits are registered in the line selecting unit, means responsive to signals derived from said interrogating AND gates for establishing switchthrough to the called line registered in the line selecting unit in the event the called line is idle, and means for blocking said interrogating AND gates when switchthrough is established by said last named means.

34. In a telephone system, a plurality of connectors each adapted to receive signals applied thereto corresponding to numerical digits of a called line, each of said connectors including a series of tens digit flip-flop circuits, a series of units digit flip-flop circuits, an input AND gate for each of said flip-flop circuits, means for impressing signals corresponding to digits to be registered on one input of all of said input AND gates, digit register control means connected to another input of said input AND gates for selectively controlling said AND gates so that said digit signals are sequentially registered in said tens and units flip-flop circuits, an interrogating AND gate for each of said flip-flop circuits, each of said interrogating AND gates having one input thereof controlled in accordance with the setting of the associated flip-flop circuit, allotter means for sequentially supplying allotting signals to said connectors, means in said digit register control means for developing a control signal after all digits are registered in the connector, means in each of said connectors and jointly responsive to said control signal and said allotting signal for supplying an enabling signal to another input of each of said interrogative AND gates, and means responsive to signals derived from said interrogating AND gates for establishing switchthrough to the called line registered in the connector in the event the called line is idle.

35. In a telephone system, a plurality of connectors each adapted to receive signals applied thereto corresponding to numerical digits of a called line, said connectors having individually assigned thereto different time positions which recur in repetitive time position frames, each of said connectors including a series of tens digit flip-flop circuits, a series of units digit flip-flop circuits, an input AND gate for each of said flip-flop circuits, means for impressing signals corresponding to digits to be registered on one input of all of said input AND gates, and digit register control means connected to another input of said input AND gates for selectively controlling said AND gates so that said digit signals are sequentially registered in said tens and units flip-flop circuits, an interrogating AND gate for each of said flip-flop circuits, each of said interrogating AND gates having one input thereof controlled in accordance with the setting of the associated flip-flop circuit, allotter means for sequentially supplying allotting signals to said connectors, means in said digit register control means for developing a control signal after all digits are registered in the connector, means in each of said connectors and jointly responsive to said control signal and said allotting signal for supplying an enabling signal to another input of each of said interrogating AND gates, means responsive to signals derived from said interrogating AND gates for establishing switchthrough to the called line registered in the connector in the event the called line is idle, an output AND gate for each of said flip-flop circuits, each of said output AND gates having one input thereof controlled in accordance with the setting of said flip-flop circuits, and means controlled in part by said switchthrough means for supplying an enabling signal to another input of said output AND gates in the time position assigned to the associated connector.

36. In a telephone system, a plurality of connectors each adapted to receive signals applied thereto corresponding to numerical digits of a called line, said connectors having individually assigned thereto different time positions which recur in repetitive time position frames, each of said connectors including a series of tens digit flip-flop circuits, a series of units digit flip-flop circuits, an input AND gate for each of said flip-flop circuits, means for impressing signals corresponding to digits to be registered on one input of all of said input AND gates, and digit register control means connected to another input of said input AND gates for selectively controlling said AND gates so that said digit signals are sequentially registered in said tens and units flip-flop circuits, an interrogating AND gate for each of said flip-flop circuits, each of said interrogating AND gates having one input thereof controlled in accordance with the setting of the associated flip-flop circuit, allotter means for sequentially supplying allotting signals to said connectors, means in said digit register control means for developing a control signal after all digits are registered in the connector, means in each of said connectors and jointly responsive to said control signal and said allotting signal for supplying an enabling signal to another input of each of said interrogating AND gates, means responsive to signals derived from said interrogating AND gates for establishing switchthrough to the called line registered in the connector in the event the called line is idle, an output AND gate for each of said flip-flop circuits, each of said output AND gates having one input thereof controlled in accordance with the setting of said flip-flop circuits, means for supplying pulses to each of said connectors in the time positions respectively assigned thereto, and means in each connector and jointly controlled by said switchthrough means and said pulses for supplying a pulse type enabling signal to another input of said output AND gates.

37. In a telephone system, a plurality of lines, a plurality of connectors each including means for registering digital information relating to a called one of said lines, allotter means for sequentially supplying allotting signals to said connectors, means in each of said connectors and responsive to called line registration therein for producing a control signal, an interrogating matrix common to said connectors, means in each of said connectors and responsive to said control signal for supplying an interrogating signal to said common matrix for the duration of the allotting signal supplied to the connector, means individual to said lines for supplying idle or busy signals to said common matrix indicating the idle or busy condition of each of said lines, means in said matrix and jointly responsive to said interrogating signal and said idle or busy signals for developing a matrix output signal if the called line is idle, means supplying said matrix output signal to all of said connectors, a switchthrough flip-flop circuit in each of said connectors, and means in each of said connectors and jointly responsive to said matrix output signal and said allotting signal for setting said switchthrough flip-flop circuit.

38. In a telephone system, a plurality of lines, a plurality of connectors each including means for registering digital information relating to a called one of said lines, allotter means for sequentially supplying allotting signals to said connectors, means in each of said connectors and responsive to called line registration therein for producing a control signal, an interrogating matrix common to said connectors, means in each of said connectors and responsive to said control signal for supplying an interrogating signal to said common matrix for the duration of the allotting signal supplied to the connector, means individual to said lines for supplying idle or busy signals to said common matrix indicating the idle or busy condition of each of said lines, means in said matrix and jointly responsive to said interrogating signal and said idle or busy signals for developing a matrix output signal if the called line is idle, means supplying said matrix output signal to all of said connectors, a switchthrough flip-flop circuit in each of said connectors, means in each of said connectors and jointly responsive to said matrix output signal and said allotting signal for setting said switchthrough flip-flop circuit, a busy tone delay multivibrator in each of said connectors, means jointly responsive to said control signal and said allotting signal for triggering said delay multivibrator to produce a delay pulse, a busy tone flip-flop circuit in each of said connectors, means for setting said busy tone flip-flop circuit coincident with the trailing edge of said delay multivibrator pulse, and means jointly responsive to said switchthrough flip-flop and said busy tone flip-flop for developing a busy tone signal if the called line is busy.

39. In a telephone system, a plurality of lines, a plurality of connectors each including means for registering digital information relating to a called one of said lines, allotter means for sequentially supplying allotting signals to said connectors, means in each of said connectors and responsive to called line registration therein for producing a control signal, an interrogating matrix common to said connectors, means in each of said connectors and responsive to said control signal for supplying an interrogating signal to said common matrix for the duration of the allotting signal supplied to the connector, means individual to said lines for supplying idle or busy signals to said common matrix indicating the idle or busy condition of each of said lines, means in said matrix and jointly responsive to said interrogating signal and said idle or busy signals for developing a matrix output signal if the called line is idle, means supplying said matrix output signal to all of said connectors, a switchthrough flip-flop circuit in each of said connectors, means in each of said connectors and jointly responsive to said matrix output signal and said allotting signal for setting said switchthrough flip-flop circuit, a busy tone delay multivibrator in each of said connectors, means jointly responsive to said control signal and said allotting signal for triggering said delay multivibrator to produce a delay pulse, a busy tone flip-flop circuit in each of said connectors, means for setting said busy tone flip-flop circuit coincident with the trailing edge of said delay multivibrator pulse, and means for developing a busy tone signal in the event that said busy tone flip-flop circuit is set before said switchthrough flip-flop circuit is set.

40. In a telephone system, a plurality of lines, a plurality of connectors each including means for registering digital information relating to a called one of said lines, said connectors having individually assigned thereto different time positions in repetitive time position frames, allotter means for sequentially supplying allotting signals to said connectors, means in each of said connectors and responsive to called line registration therein for producing a control signal, an interrogating matrix common to said connectors, means in each of said connectors and responsive to said control signal for supplying an interrogating signal to said common matrix for the duration of the allotting signal supplied to the connector, means individual to said lines for supplying idle or busy signals to said common matrix indicating the idle or busy condition of each of said lines, means in said matrix and jointly responsive to said interrogating signal and said idle or busy signals for developing a matrix output signal if the called line is idle, means supplying said matrix output signal to all of said connectors, a switchthrough flip-flop circuit in each of said connectors, means in each of said connectors and jointly responsive to said matrix output signal and said allotting signal for setting said switchthrough flip-flop circuit, a busy tone delay multivibrator in each of said connectors, means jointly responsive to said control signal and said allotting signal for triggering said delay multivibrator to produce a delay pulse, a busy tone flip-flop circuit in each of said connectors, means for setting said busy tone flip-flop circuit coincident with the trailing edge of said delay multivibrator pulse, and means for developing pulses in the time position assigned to the connector which are modulated with a busy tone signal in the event that said busy tone flip-flop circuit is set before said switchthrough flip-flop circuit is set.

References Cited in the file of this patent

UNITED STATES PATENTS 2,694,752 Wright et al. ------------ Nov. 16, 1954

UNITED STATES PATENT OFFICE
CERTIFICATE OF CORRECTION

Patent No. 2,968,697 January 17, 1961

Donald M. Rager, Jr.

It is hereby certified that error appears in the above numbered patent requiring correction and that the said Letters Patent should read as corrected below.

Column 101, line 34, after "units" insert -- called --; column 102, line 67, for "nonnector" read -- connector --; column 104, line 38, after "busy" insert -- signals to said common matrix indicating the idle or busy --; line 64, for "nad" read -- and --; column 107, line 67, for "size" read -- seize --; column 109, line 30, for "interrogative" read -- interrogating --.

Signed and sealed this 10th day of October 1961.

(SEAL)
Attest:

ERNEST W. SWIDER
Attesting Officer

DAVID L. LADD
Commissioner of Patents

USCOMM-DC